United States Patent [19]

Olnowich

[11] Patent Number: 5,535,373
[45] Date of Patent: Jul. 9, 1996

[54] PROTOCOL-TO-PROTOCOL TRANSLATOR FOR INTERFACING DISPARATE SERIAL NETWORK NODES TO A COMMON PARALLEL SWITCHING NETWORK

[75] Inventor: Howard T. Olnowich, Endwell, N.Y.

[73] Assignee: International Business Machines Corporation, Armonk, N.Y.

[21] Appl. No.: 390,893

[22] Filed: Feb. 15, 1995

Related U.S. Application Data

[63] Continuation of Ser. No. 799,602, Nov. 27, 1991, abandoned.
[51] Int. Cl.[6] .................................................... G06F 3/00
[52] U.S. Cl. ...................... 395/500; 370/60.1; 370/94.2
[58] Field of Search ............................... 395/500; 370/56, 370/60, 60.1, 94.1, 94.2

[56] References Cited

U.S. PATENT DOCUMENTS

| | | | |
|---|---|---|---|
| 4,307,446 | 12/1981 | Barton et al. . | |
| 4,475,188 | 10/1984 | Wilson et al. | 370/60 |
| 4,482,996 | 11/1984 | Wilson et al. | 370/60 |
| 4,484,325 | 11/1984 | Wilson et al. | 370/60 |
| 4,695,999 | 9/1987 | Lebizay | 370/58 |
| 4,763,122 | 8/1988 | Franaszek | 340/825 |
| 4,783,738 | 11/1988 | Li et al. . | |
| 4,794,589 | 12/1988 | Finch et al. . | |
| 4,803,485 | 2/1989 | Rypinski | 340/325 |
| 4,914,429 | 4/1990 | Upp | 340/825.8 |
| 4,929,939 | 5/1990 | Varma et al. | 340/825.8 |
| 4,961,140 | 10/1990 | Pechanek et al. . | |
| 4,965,788 | 10/1990 | Newman . | |
| 4,967,405 | 10/1990 | Upp | 359/135 |
| 4,998,242 | 3/1991 | Upp | 370/60 |
| 5,136,584 | 8/1992 | Hedlund | 370/94.1 |
| 5,140,583 | 8/1992 | May et al. | 370/60 |
| 5,144,619 | 9/1992 | Munter | 370/60.1 |
| 5,251,205 | 10/1993 | Callon et al. | 370/60 |

FOREIGN PATENT DOCUMENTS

| | | |
|---|---|---|
| 0420531 | 4/1991 | European Pat. Off. . |
| 0422782 | 4/1991 | European Pat. Off. . |

OTHER PUBLICATIONS

IBM Technical Disclosure Bulletin vol. 29, No. 3, Aug., 1986, pp. 1356–1360, "Dynamically Reconfigurable Integrated Switch", disclosed anonymously.

(List continued on next page.)

Primary Examiner—Richard L. Ellis
Attorney, Agent, or Firm—Lynn L. Augspurger; Eugene I. Shkurko; Jenkens & Gilchrist

[57] ABSTRACT

A generic network device includes a serial line switching apparatus for performing either parallel or serial communications amongst multiple nodes over switching networks. An aspect includes the adaptation of standard and proprietary serial interfaces using either optical or electrical transmission media to interface to a parallel switch. The converted serial data is routed to the selected destination through the parallel switch network, where it is received and converted back into a serial optical or electrical interface/ protocol. Thus, the combination of the switching adapter and an ALLNODE parallel switching network make it feasible for serial message data to be switched and routed to various destinations. Further flexibility is provided which permits the switching adapter to be personalized to support any one of a number of standard and proprietary serial protocols. A personalization PROM specifies the particular serial protocol that each individual adapter is to support. The parallel switching network becomes a flexible media that interconnects and allows different serial protocols to communicate with each other; i.e., any number of different serial protocols can interface with the same parallel switch network. This allows every node of the parallel system to send and receive messages using its own native protocol. However, a node is not restricted to communicating only with others nodes using the same protocol, but is can communicate with any of the other nodes regardless of the serial protocol they use.

18 Claims, 70 Drawing Sheets

OTHER PUBLICATIONS

IBM TDB vol. 33, No. 5, Oct., 1990, "Asynchronous Digital Video Switching System", by Farrell et al, pp. 227–233.

Comm. of the ACM, Jul. '76 vol. 19, No. 7 pp. 395–404 "Ethernet: Distributed Packet Switching for Local . . . ".

Proceedings of the IEEE vol. 77, No. 2, Feb. '89, pp. 238–256 W. Bux, "Token–Ring Local Area Networks and Their . . . ".

T. Feng, IEEE Computer, 0018–1962/81/1200–0012 Dec. '81 pp. 12–27 "A Survey of Interconnection Networks".

M. Marcus, Proceedings of the IEEE, vol. 65, No. 9, Sep. 77 pp. 1263–1271 "The Theory of Connect'g networks & Their . . . ".

H. Siegil, IEEE Computer, Jun. '71, 0018–9162/79/0600–0057 pp. 57–65 "Interconnection Networks for SIMD Machines".

A. Joel Jr., IEEE Computer, Jun. '79, 0018–9162/79/0600–0010, pp. 10–22, "Circuit Switching: Unique Architecture . . . ".

C. Clos, The Bell System Tech. Journal, vol. XXXII, Mar. 1953, pp. 406–424, "A Study of Non–Blocking Switching . . . ".

H. Katseff; IEEE Transactions on Computers, vol. 37, No. 5 May, '88 pp. 604–608 "Incomplete Hypercubes".

L. Bhuyan et al, IEEE Transactions on Computers, vol. C–33 Apr., '84, pp. 323–333 "Generalized Hypercube and . . . ".

M. Pease III; IEEE Transactions on Computers, vol. C–26 May, '77, pp. 458–473 "The Indirect Binery–n–Cube . . . ".

J. Lenfant, IEEE Trans. on Comput., vol. C–27, No. 7, Jul. '78, pp. 637–647 "Parallel Permutations of Data: A . . . ".

H. Stone, IEEE Trans. on Comput., vol. C–20, No. 2, Feb. '71 "Parallel Procesing With the Perfect Shuffle".

K. Lee et al, IEEE Trans. on Comput., vol. 37, No. 5, May '88, pp. 574–584; "On the Augmented Data Manipulator . .

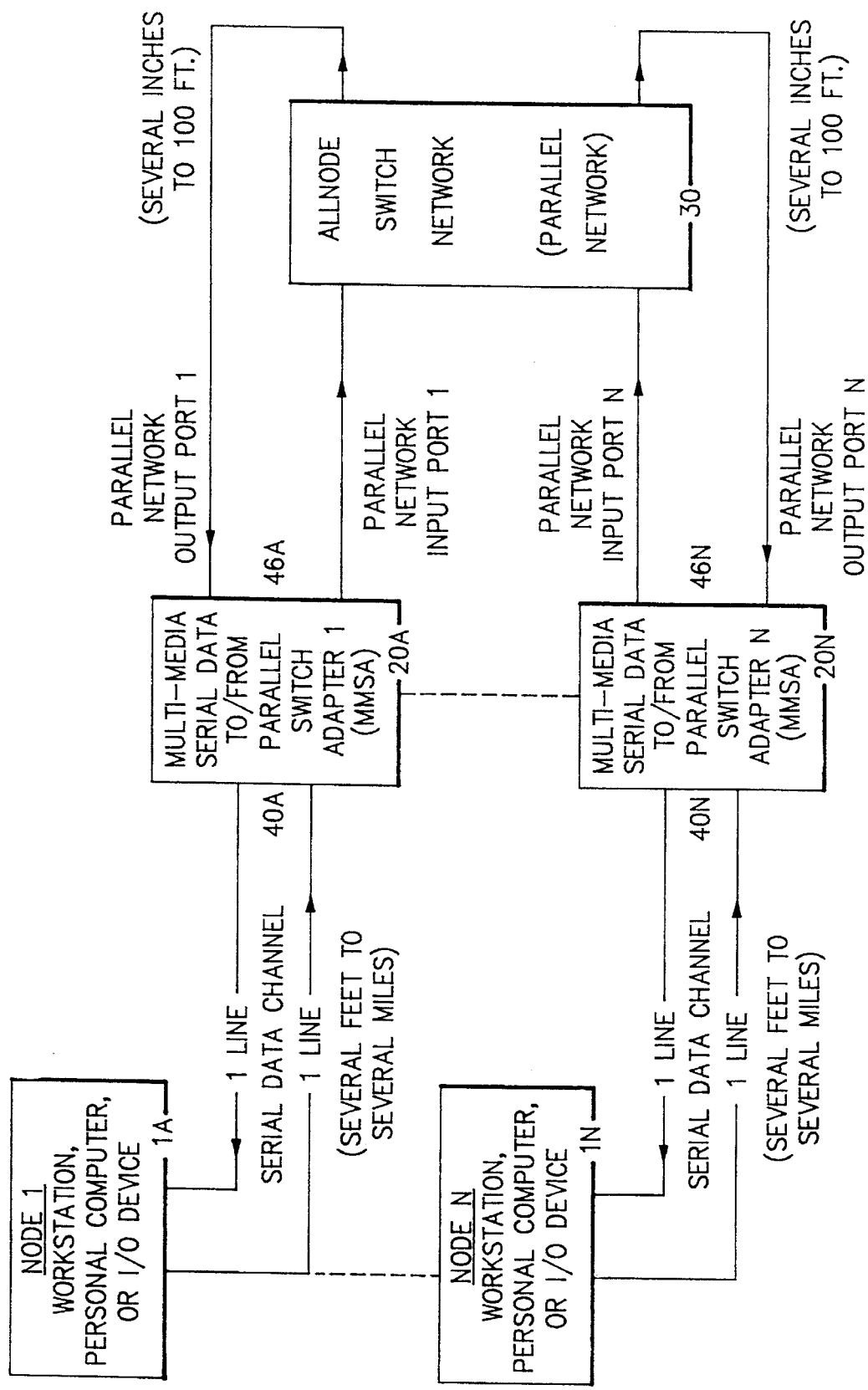

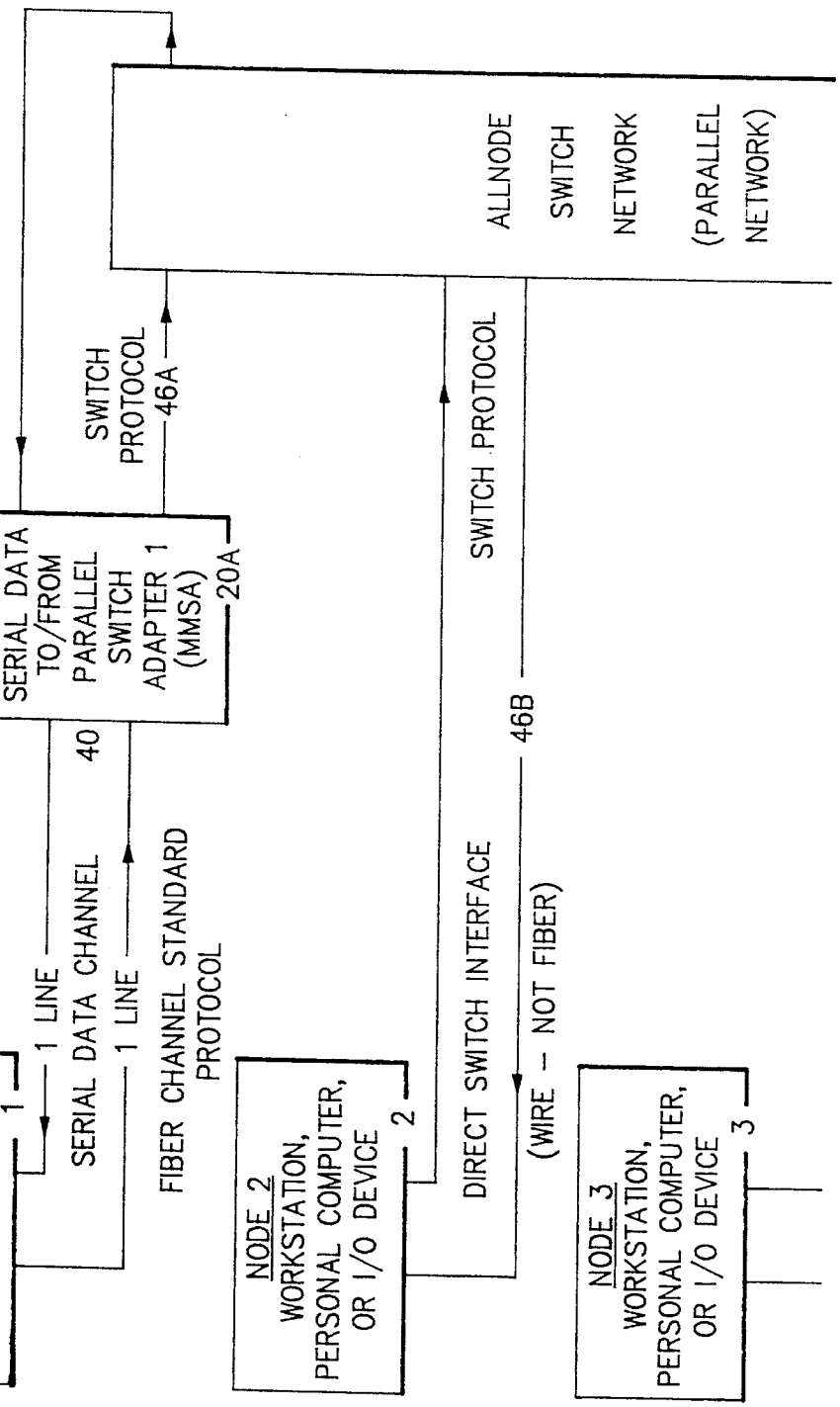

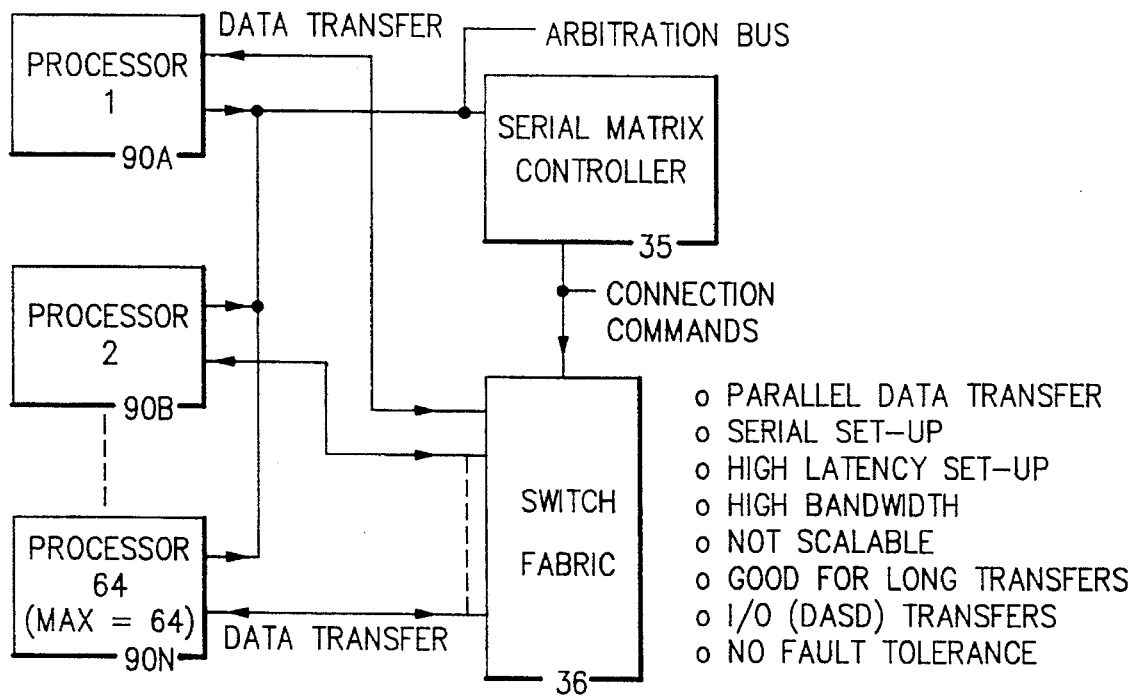
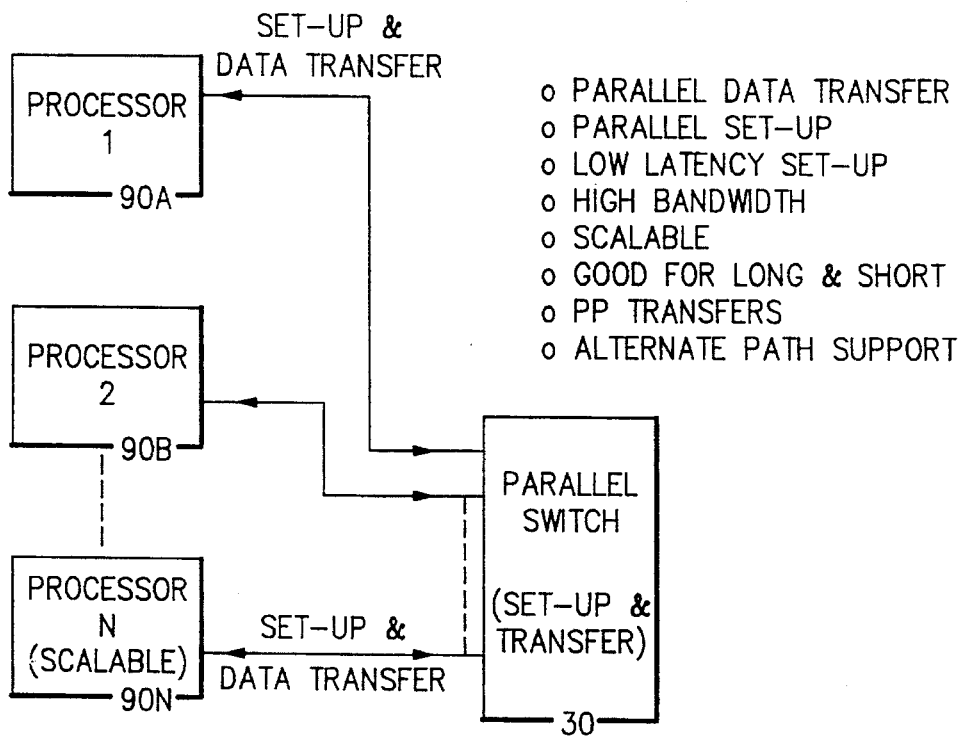
FIG.4

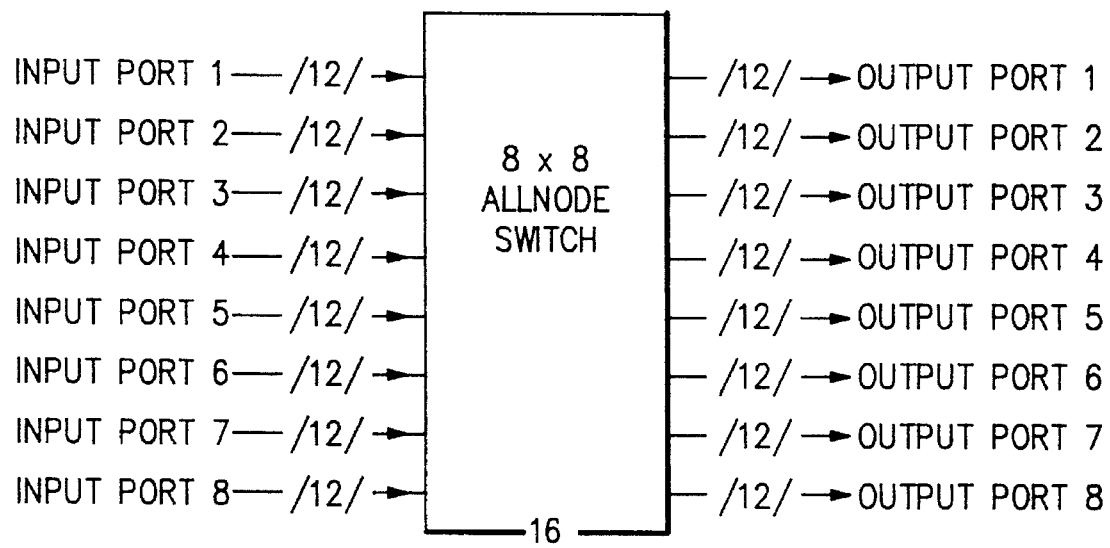
12 LINES PER PORT
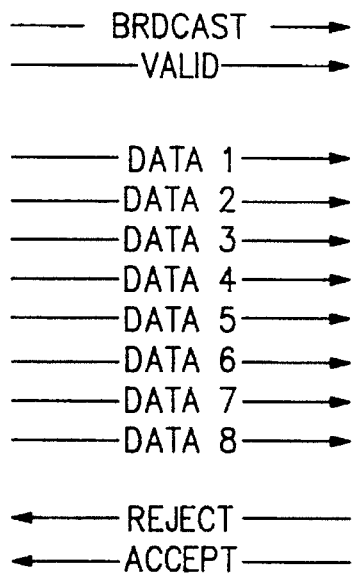
FIG.12

FIG.24B
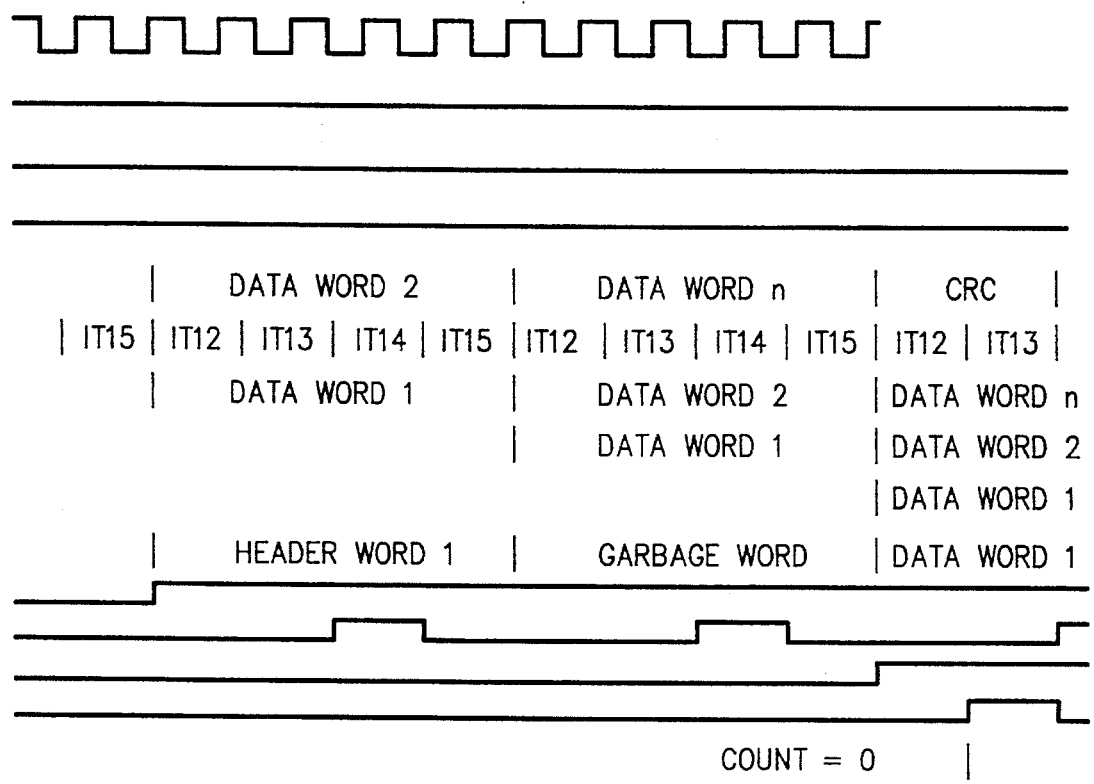
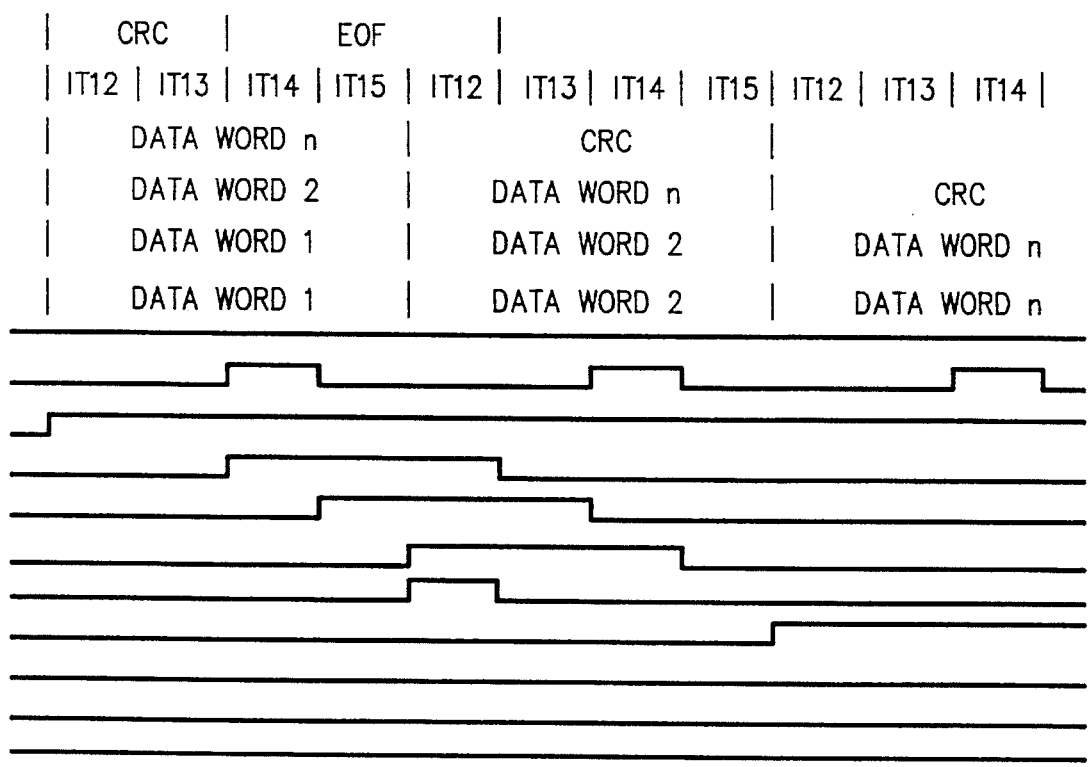

FIG.24C
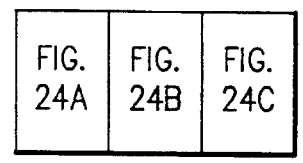
FIG.24
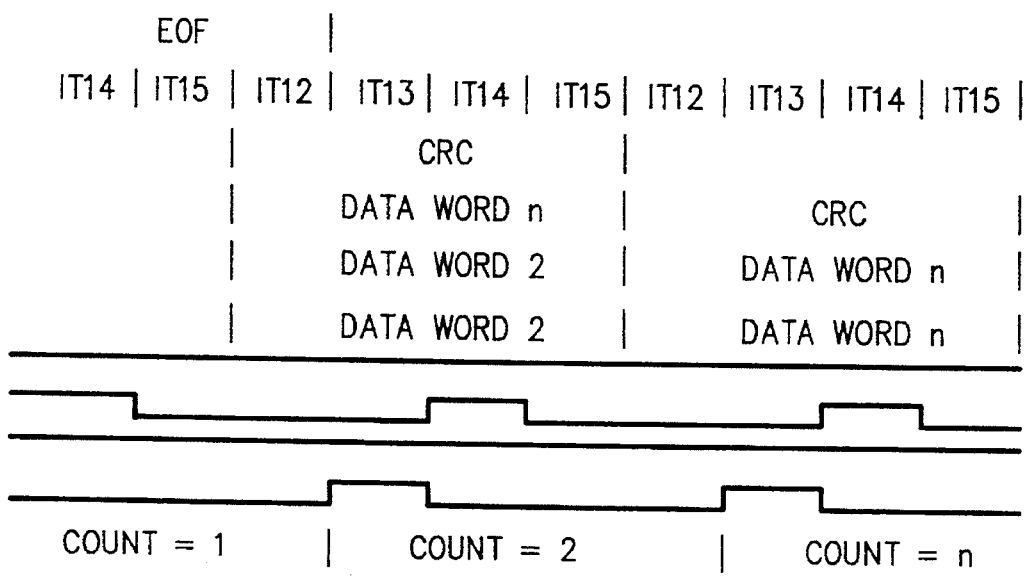
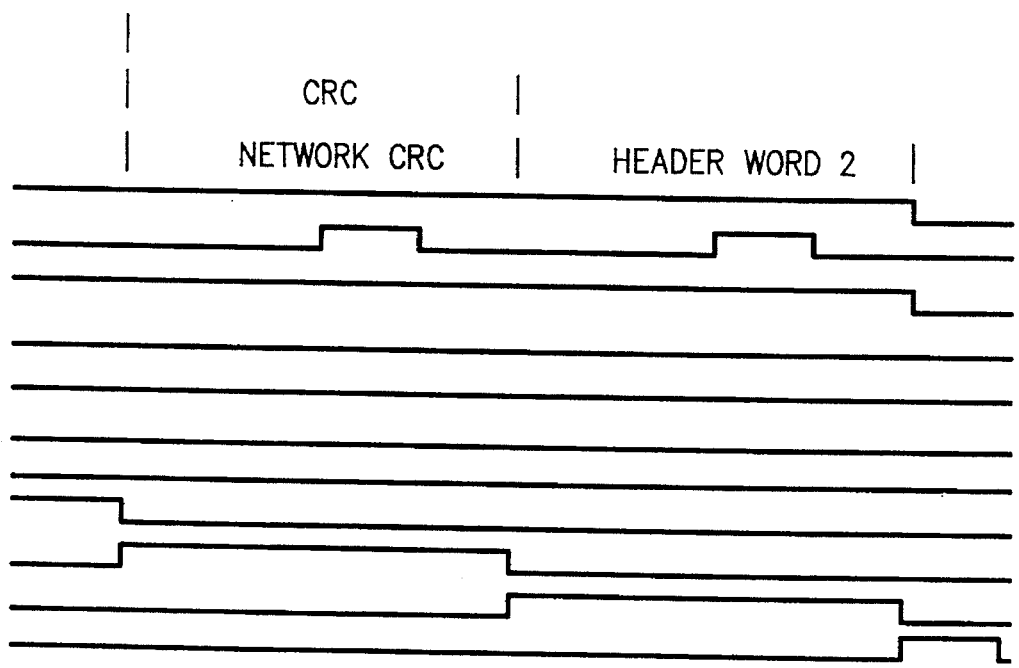

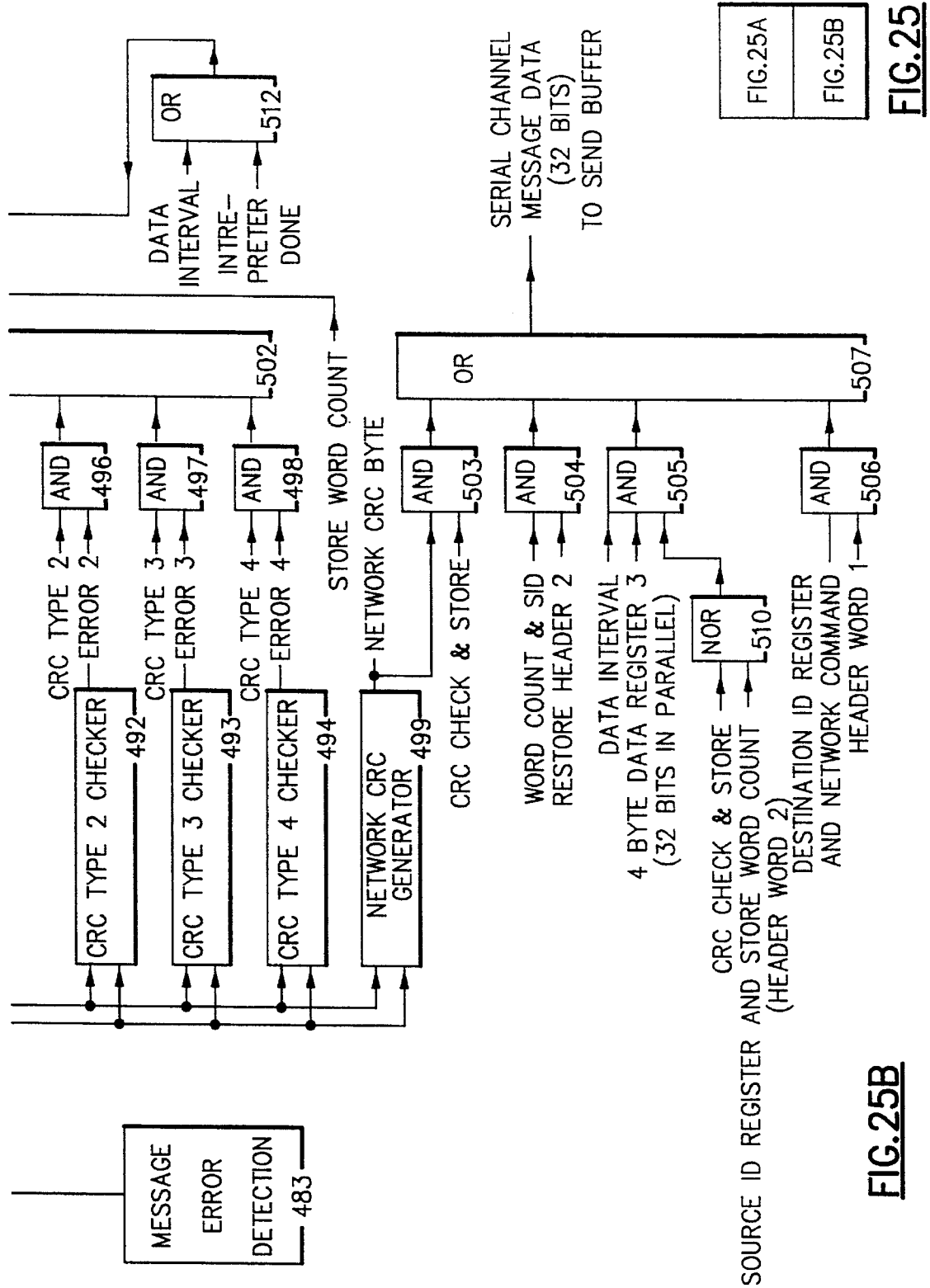

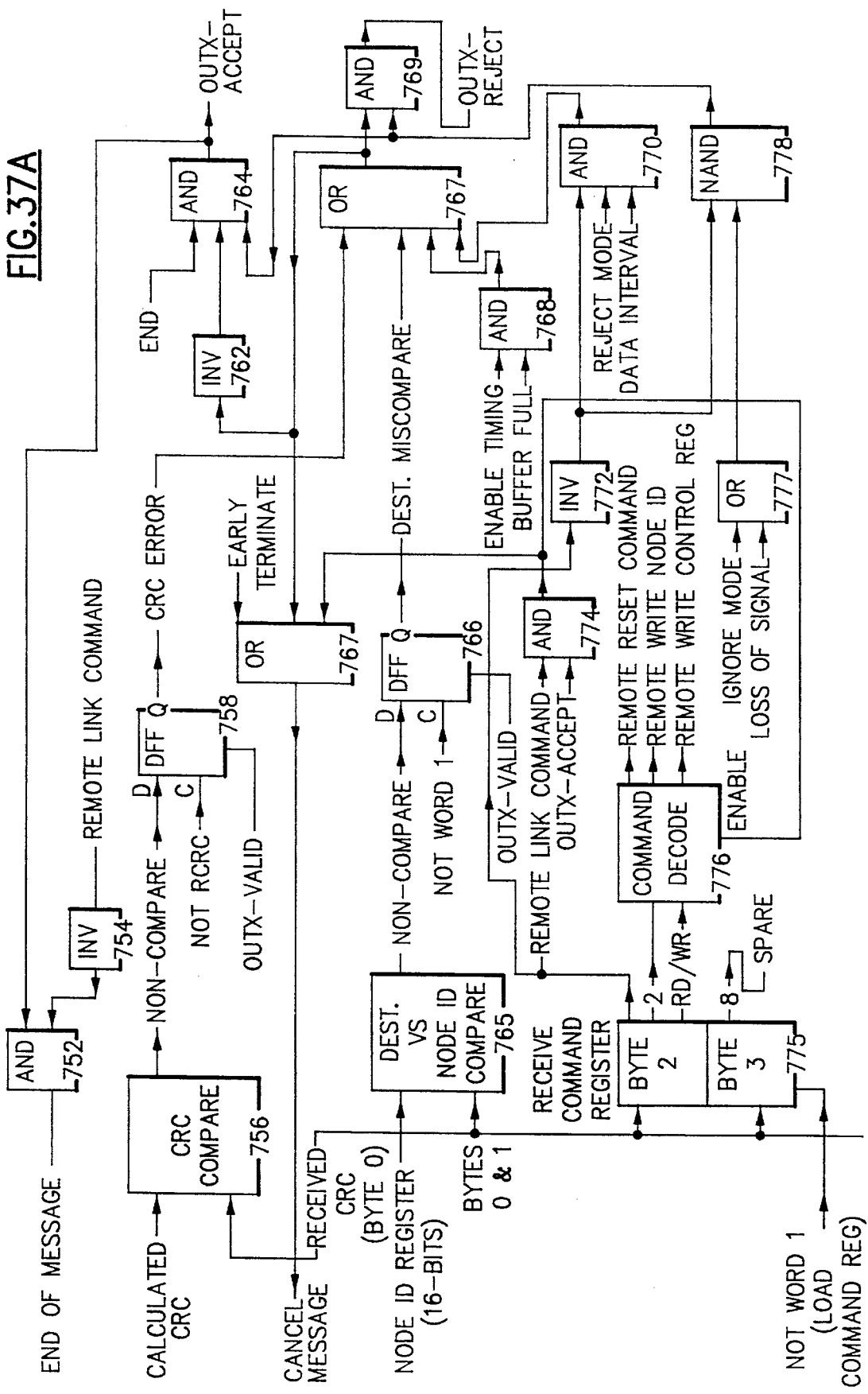

| FIG. 38A | FIG. 38B |

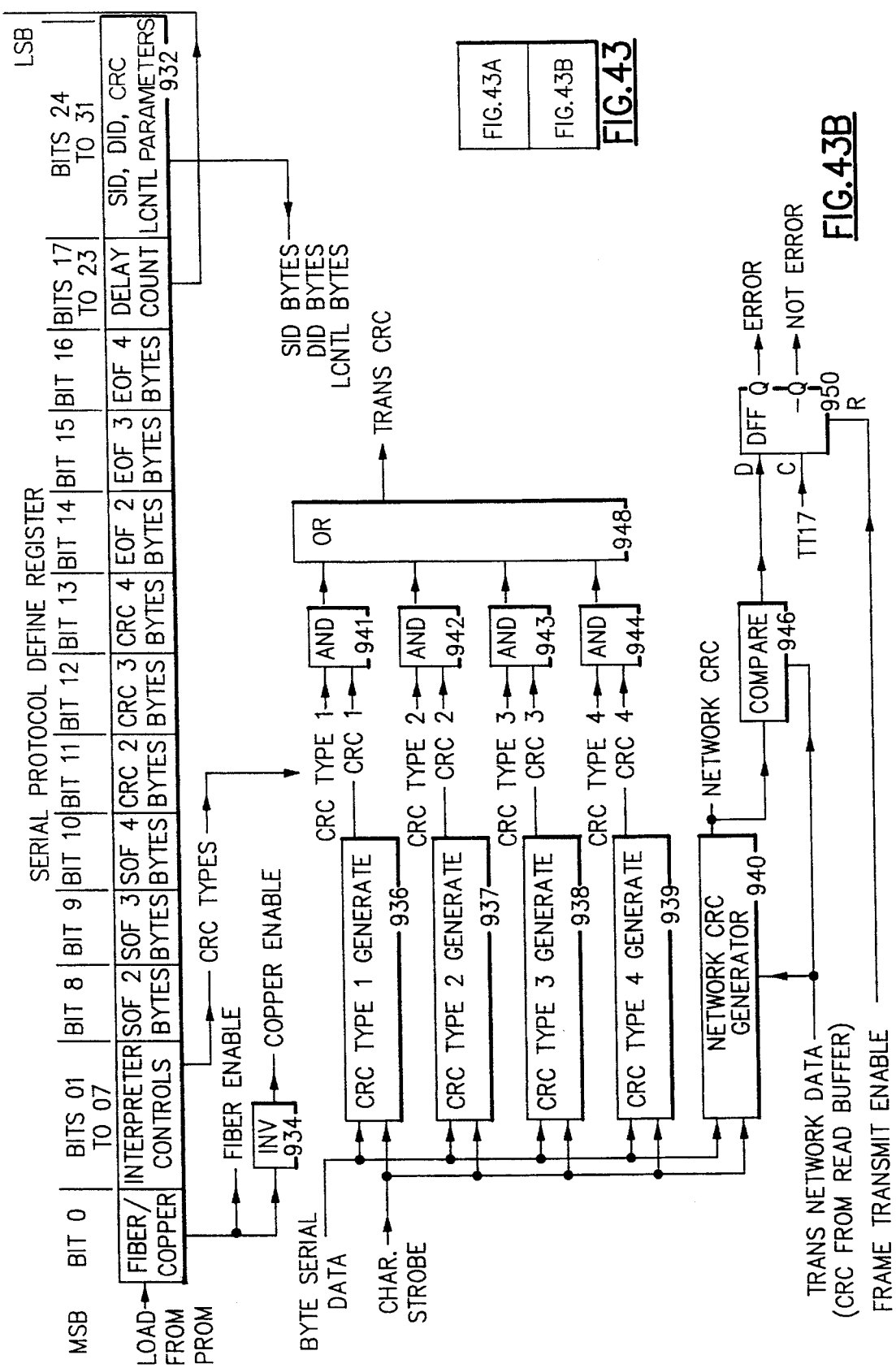

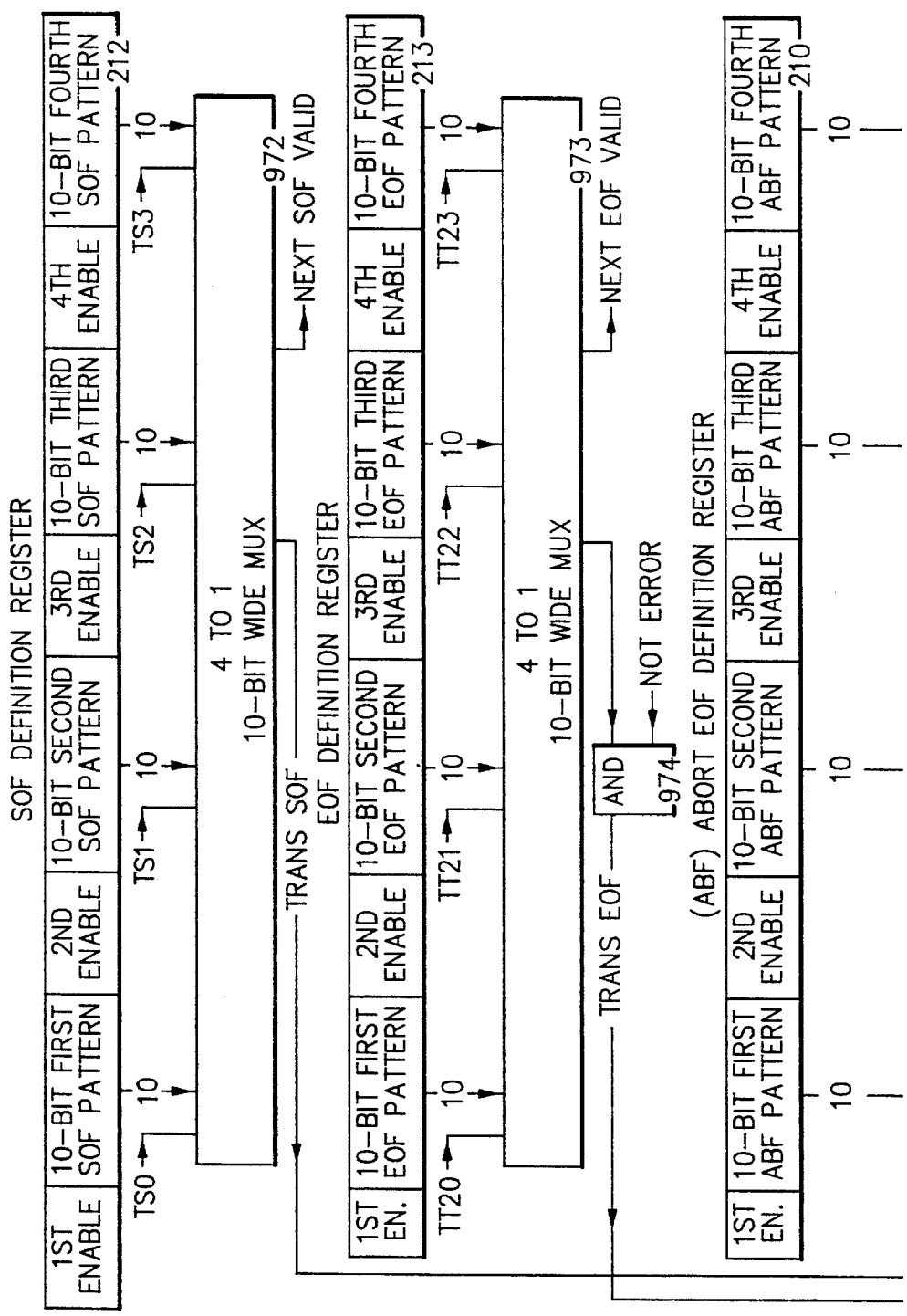

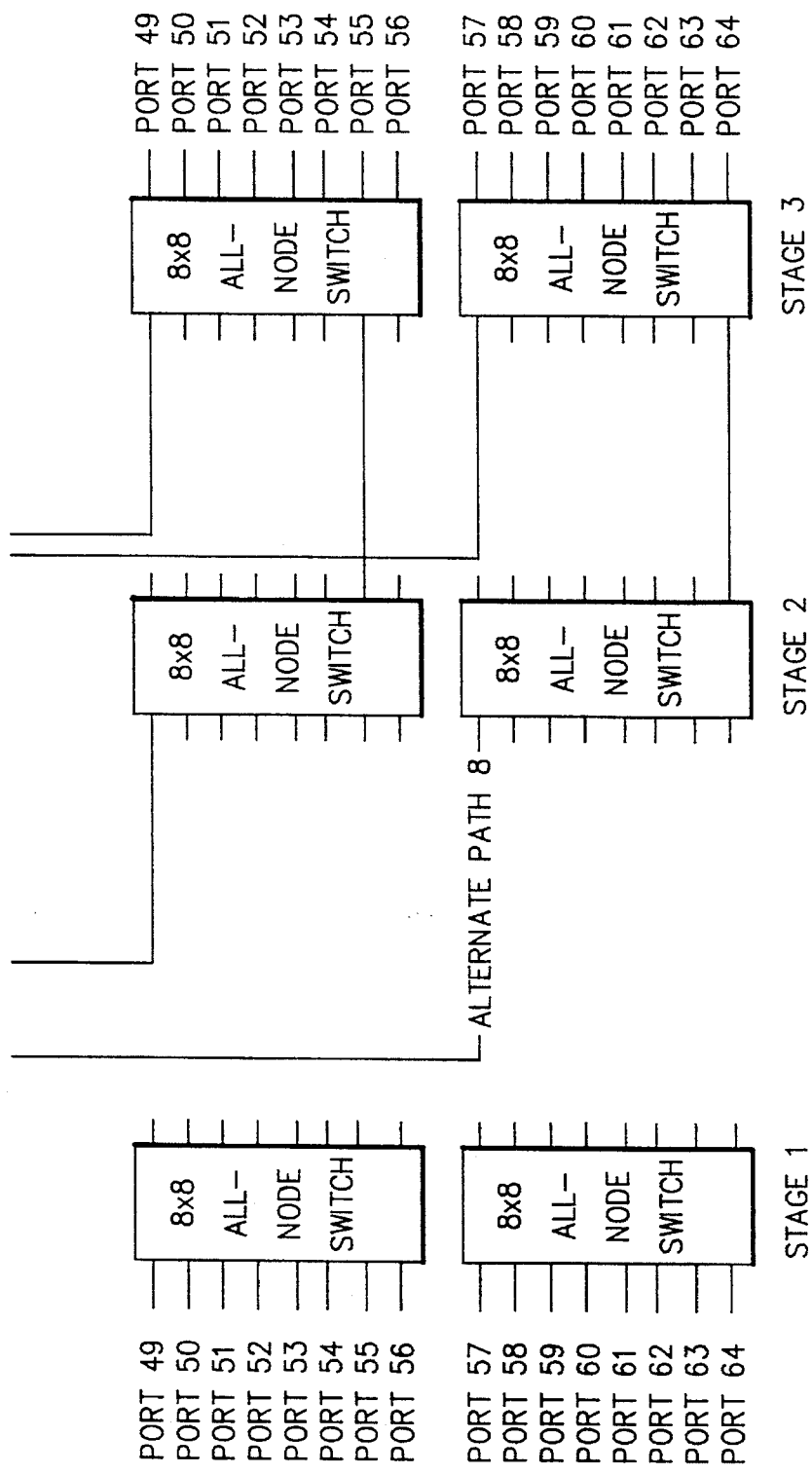

PROTOCOL-TO-PROTOCOL TRANSLATOR FOR INTERFACING DISPARATE SERIAL NETWORK NODES TO A COMMON PARALLEL SWITCHING NETWORK

CROSS REFERENCE TO RELATED APPLICATIONS

This application is a continuation of application Ser. No. 07/799,602, filed Nov. 27, 1991, now abandoned.

The present application claims priority and is a continuation-in-part of the following related Patent Applications:

"Asynchronous Low Latency Data Recovery Apparatus and Method", Betts et al, U.S. Ser. No. 07/659,199, filed Feb. 22, 1991, now abandoned in favor of Ser. No. 08/089,056, filed Jul. 8, 1993.

"All-Node Switch, An Unclocked, Unbuffered Asynchronous Switching Apparatus" by P. A. Franasek et al, U.S. Ser. No. 07/677,543, filed Mar. 29, 1991 now abandoned in favor of Ser. No. 08/143,977, filed Oct. 27, 1993.

"Broadcast/Switching Apparatus For Executing Broadcast/Multi-Cast" by H. T. Olnowich et al U.S. Ser. No. 07/748,316, filed Aug. 21, 1991 now U.S. Pat. No. 5,404,461.

"Multi-Sender/Switching Apparatus For Status Reporting Over Unbuffered Asynchronous Multi-Stage Networks" by H. W. Olnowich et al U.S. Ser. No. 07/748,302, filed Aug. 21, 1991

"Sync-Net—A Barrier Synchronization Apparatus For Multi-Stage Networks" by P. L. Childs et al U.S. Ser. No. 07/748,303, filed Aug. 21, 1991, now U.S. Pat. No. 5,365,228.

"GVT-Net—A Global Virtual Time Calculation Apparatus For Multi-Stage Networks" by P. L. Childs et al U.S. Ser. No. 07/748,295, filed Aug. 21, 1991, now U.S. Pat. No. 5,250,943 and in addition, concurrently filed herewith are related applications:

"Priority Broadcast And Multi-Cast For Unbuffered Multi-Stage Networks" by H. T. Olnowich et al U.S. Ser. No. 07/799,262, filed Nov. 27, 1991, The "Dual Priority Switching Apparatus for Simplex Networks" with H. T. Olnowich, P. Kogge et al U.S. Ser. No. 07/800,652, filed Nov. 27, 1991, now U.S. Pat. No. 5,444,705.

"Multi-Function Network" by H. T. Olnowich et al U.S. Ser. No. 07/799,497, filed Nov. 27, 1991, now abandoned, "Dynamic Multi-Mode Parallel Processor Array Architecture Computer System", P. Kogge, U.S. Ser. No. 07/798,788, filed Nov. 27, 1991, now U.S. Pat. No. 5,475,856.

These applications and the present application are owned by one and the same assignee, namely, International Business Machines Corporation of Armonk, N.Y.

The descriptions set forth in these applications are hereby incorporated into the present application by this reference.

CO-PENDING APPLICATION

There is a co-pending application U.S. Ser. No. 07/753,281, filed Aug. 30, 1991, issued as U.S. Pat. No. 5,307,342, with C. J. Georgiou and T. A. Larsen, inventors, entitled HETEROGENEOUS PORTS SWITCH, assigned in common to the assignee of this application.

FIELD OF THE INVENTION

The inventions relate to multi-stage switching networks, and particularly to systems which use fully parallel and unbuffered switching elements to comprise the multi-stage network. The inventions include applications adapting of serial fiber or copper wire transmission media to parallel switching networks for the purpose of line switching the serial data from various sources to various destinations through the parallel switching network, ways to couple the systems via RF to other systems, and to heterogeneous and homologous computers systems, and to applications for these systems.

BACKGROUND OF THE INVENTIONS

This application is directed to parallel processing, parallel switching networks, and particularly to an improved adaptation of serial fiber or copper wire and wireless transmission media to parallel switching networks for the purpose of interconnecting large numbers of processors with a minimal interface. With the interconnection network it is possible to connect individual processing elements on chips, say of the kind of Li et al, U.S. Pat. No. 4,783,738, issued Nov. 8, 1988, through a network. Through this minimal interface nodes can interact in parallel and form gateways to other nodes and networks, via bridges which may be of wire, fiber optics, wireless radio or other through the air or space transmissions. Thus the switch may form the basis of a generic network of great size and flexibility. The processors can be heterogeneous or homologous and the computer systems which are created by the developments have wide application. Some of these will be described in detail.

The inventions relate to networks. Networks of some type have existed for many years to connect sending devices to receiving devices, and the early networks were telephone related. Coexisting with these networks have been radio and other wireless transmitters and receivers. In recent years there has been a connections of wireless devices to land based systems. However, the existing systems have been to expensive and not sufficiently flexible for high speed parallel coupling of nodes over a network. This has remained a problem despite numerous prior developements and theory.

The practitioner in the computer field will be trained in some networks today. However, as there are many types, the training will not extend to the many available possibilities which have been developed in the network art.

Among the most commonly used networks for digital communication between processors are the Ethernet or Token Ring of LAN networks. "Ethernet: Distributed Packet Switching for Local Computer Networks" Communications of the ACM, July 1976, Vol. 19, No. 7, pp. 395–404; and "Token-Ring Local-Area Networks and Their Performance, W. Bux, Proceedings of the IEEE, Vol 77, No. 2, February 1989, pp 238–256; are representative articles which describe this kind of network, which provide a serial shared medium used by one node at a time to send a message to another node or nodes.

"Data Networks", D. Bertsekas, R. Gallager, Prentice Hall, Inc. 1987, ISBN 0-13-196825-4 025, is a book which describes generally the art of data networks. It describes a broad range of networks and node-to-node communication, drawing on the works of others. FIG. 1.3 at Page 3 illustrates what is considered as a generic network, to which the inventions herein relate. It draws upon the work of many others but falls short in suggesting the solutions achieved by the present inventions.

There are many kinds of networks. "A Survey of Interconnection Networks", T. Feng, IEEE COMPUTER, 0018-1962/81/1200-0012, December 1981, pp 12–27, describes and categorizes the networks of the art. The present application describes something which would be classified as a dynamic network topology, which is of a non-blocking nature. Unlike the restricted networks described the network described in this application can be made to implement a variety of possible network designs. Other papers relating to high level considerations which may be reviewed include: "The Theory of Connecting Networks and Their Complexity: A Review", M. Marcus, Proceedings of the IEEE, Vol 65, No. 9, September 1977, pp 1263–1271; and "Interconnection Networks for SIMD Machines, H. Siegel, IEEE COMPUTER, June 1971, 018-9162/79/0600-0057, pp. 57–65.

Historically many kinds of networks were developed for the telephone system. Telephone switching is described in "Circuit Switching: Unique Architecture and Application", A. Joel, Jr., IEEE COMPUTER, June 1979, 018-9162/79/ 0600-0010, pp 10–22; however, this article considers circuit switching with time-multiplexing and frequency-multiplexing of messages simultaneously onto the same transmission medium, which ideas are not implemented in the preferred embodiment of the inventions here. There are nevertheless networks and network theory which has been developed for non-blocking telephone device to device interconnection. For instance, the CLOS network has been developed. Such kind of network could be formed by the presently described switch, but as will be appreciated from reading the detailed description of the inventions, the CLOS network does not suggest or describe our inventions. The basic work of Clos in non- blocking networks is thought to be "A Study of Non-Blocking Switching Networks", C. Clos, The Bell System Technical Journal, Vol. XXXII, March 1953, pages 406–424. It described a general method for making a network non-blocking (in a manner different from the present inventions preferred embodiment) by making the network large enough to always be able to connect an input to an output by adding more paths or stages to the network. This solution increase greatly costs of a network.

Other networks which could be created by the present inventions include complete and incomplete Hypercubes and Benes networks which are in turn derived from Clos. Hypercube type networks are described in "Incomplete Hypercubes", H. Katseff; IEEE Transactions on Computers, Vol. 37, No. 5, May 1988, 0018-9340/88/0500-0604, pp. 604–608; "Generalized Hypercube and Hyperbus Structures for a Computer Network", L. Bhuyan et al, IEEE Transactions on Computers, Vol. C-33, No. 1, April 1984, pp. 323–333 (EH0246-9/86/0000/0307-1984 IEEE); and The Indirect Binary n-Cube Microprocessor Array, M. Pease, III; IEEE Transactions on Computers, Vol C.26, No. 5, May 1977; pp 458–473. While a hypercube structure could be implemented with the present inventions, it is not our preferred embodiment. The hypercube can be much slower due to relays though nodes than is possible with the present structure of the preferred embodiment. Similarly, the Benes network, as described in "Parallel Permutations of Data: A Benes Network Control Algorithm for Frequently Used Permutations", J. Lenfant, IEEE Transactions on Computers, VOl. C-27, No. 7, July 1978, pp 637–647, uses switches in a recurrent structure with a software algorithm for selecting a route. While such a structure could be implements with the switch of the present inventions, in our preferred embodiment the hardware is used to find a path through a parallel network, again something not suggested here.

Shuffle networks are still another kind of network. Parallel processing with a network as described in "Parallel Processing with the Perfect Shuffle", H. Stone, IEEE Transactions on Computers, Vol C-20, No. 2, Feb. 1971 is a particular kind of multi-stage network with an interconnection pattern which is described as "Perfect Shuffle". This kind of network has better scalabability characteristics than some other networks, and sometimes can achieve good performance. Another application of a shuffle network is for SIMD, as described in "On the Augmented Data Manipulator in SIMD Environments", K. Lee et al, IEEE Transactions on Computers, Vol 37, No. 5, May 1988; pp 574–584; and in one of the related applications referenced above such a machine is disclosed. This perfect shuffle also could be implemented by the present structure, but the system which we have described for search has better non-blocking characteristics. It is also faster than any other known network, with extremely low message latency.

There are many, many facets for integrating computer systems, and with the move to open systems and distributed processing, those working at the highest level of expertise in the art continue to plow the ground of those who developed the theories elucidated in the past. The articles published in Proceedings, COMPUTER NETWORKING SYMPOSIUM, IEEE Computer Society, April 11–13, 1988, IEE Catalog 88-CH2547-8, recognize the problems associated with heterogeneous environments and describe many protocols under consideration; while the Working Implementation Agreements for Open Systems Interconnection Protocols, F. Boland, Vol. 2, No. 1, 1989 Reprint Edition of NISTIR 89-4198, IEEE Computer Society Press, No 2042, ISBN 0-8186-2042-0, worked on message format and other aspects of file transfer between disparate systems which are generally used in commerce today. However, as indicated by the various articles in the Proceedings Vol. III, Ninth Annual Joint Conference on IEEE Computer and Communication Societies, The Multiple Facets of Integration; June 1990, IEEE Society Press. Cat No. 90CH2826-5 using the systems of the past requires much adaptation and considerable work, and there are many limitations which still need to be overcome particularly when many processors are intercoupled to send data between themselves.

The above articles may be supplemented by the patent literature. For instance, several patents may be contrasted to the present inventions. U.S. Pat. No. 4,484,325—4-WAY SELECTOR SWITCH, and U.S. Pat. No. 4,475,188—4-WAY ARBITRATION SWITCH, describe a switch itself, rather than a switch having any adapter for converting serial data to parallel switch data. The switch itself does not provide interfaces to fiber optics or standard protocols, which is an object of the present invention. The switch is not programmable or adaptable to various protocols—if fact it implements its own unique (non-standard) protocol. This switch is organized as a 5 port solution which may allow better latency to the nearest neighbors, but increasingly worse latency to for larger systems. The switch is not equi-distant from all nodes, as is the present invention, which causes communication latency imbalance and difficulty of software routing and software switch management. The switch transfers one bit at a time with each bit requiring an individual handshake, which provides an unbelievably slow communication method—especially through a network. In contrast the present switch handshakes only the transmission of the entire message, which can be thousands or millions of bits—and thus provides a thousand or million times speed improvement. U.S. Pat. No. 4,482,996—Five Pod Node, appears to be associated with the above patents and this patent relates to a node that attaches to the switch, rather than an adapter or a switch.

U.S. Pat. No. 4,307,446—Digital Networks Employing Speed Independent Switches deals with smaller selector and arbitration switches. It describes any combination of one or two input and output ports, but not larger. This patent has the problems mentioned, except this doesn't require a LAN connection and permits multi-stage networks. However, the small size switch may be okay for small systems, but cumbersome and slow for massively parallel systems. It also provides a non-standard serial interface directly and is not provided with anything like the adapters here disclosed, nor does it appear to have considered any flexibility to handle various protocols.

Other patents which may be thought by some to have some elements which are in common with those of the disclosure include: U.S. Pat. No. 4,929,939, entitled High Speed Switching System with Flexible Protocol Capability, by C. J. Georgious and T. A. Larsen. It generally describes a modular multi-plane cross-point switching system which allows efficient switching of both short and long messages. The switching system consists of two distinct types of switching planes, data planes and control/data planes. The data planes are used solely for the purpose of transferring data and contain no hardware to extract control information from the message or to determine the setting of the cross-points in the plane. The control/data planes perform the dual functions of transferring data as well as setting up the switch planes based on control information extracted from the message. The system provides two modes for communication between processors. Shod messages are switched through the control/data planes using message switching to achieve low latency. Long messages are transferred by distributing the data across all the switching planes by means of a protocol based on circuit switching. The basic switch is for a plurality of processors, and the switching station comprises a plurality of switching planes for transferring data therethrough; a plurality of data links, each of said data links being coupled at a first end thereof to a respective one of said switching planes and at a second end thereof to one of said processors; at least one of said switching planes is a control/data plane with controls for controlling the transfer therethrough of data and for controlling data transfer through other of said switching planes; and the switching station is operable in a first mode wherein only said one switching plane is used for data transfer and in a second mode wherein said one switching plane and said other switching planes are used for data transfer. This type of switching system may be called a collision crossbar. It requires at least 10 clocks to set up every stage, is synchronous, and requires up to 5 different networks working in harmony to function properly. Basically it is slower, more expensive than the present ALLNODE Switch—and requires complex synchronization. It is an attempt to make one large crossbar to interconnect all nodes rather than using a multi-stage network. They attempt to solve the-large crossbar pin problem by making the crossbar only 1 bit wide and calling it a switch plane, and using several or many switch p lanes in parallel to get wider data transfers. It uses data planes and control planes and combinations of the two. However, the various planes must be synchronized and problems exist in resolving contention for a given node that could lead to circuit stressing and degraded performance. The various multiple planes are not needed with the present improvements. Another patent of the same nature is represented by the CROSS-POINT SWITCH OF MULTIPLE AUTONOMOUS PLANES, U.S. Pat. No. 4,695,999, which also shows a multi-plane cross-point switching system in which a communication message from a sender is shown. Here the communication is divided into a plurality of data links which are separately connected through autonomous cross-point switches to the receiver where the links are recombined. The cross-points in each plane are separately set by control messages transmitted along with the separate parts of the divided message. While divided messages are possible with the present invention the means disclosed is complex and not simple. Synchronizing planes is still a problem here. The ALLNODE Switch avoids these problems and operates more simply. Further this prior patent cannot adapt various serial protocols to communicate to each other as the present disclosure does; they cannot intermix serial and parallel transfers.

U.S. Pat. No. 4,763,122 entitled Parallel Switching with Round Robin Priority, by P. A. Franaszek, describes another scheme for determining priority of users for a transmission line. This also occurs in the cross point switch described described in U.S. Pat. No. 4,929,939, where multiple planes are used. U.S. Pat. No. 4,763,122 describes how some of these planes can be used to perform a round robin priority scheme which is not needed with the disclosed apparatus.

U.S. Pat. No. 4,961,140 entitled A NEW ADDRESS/ DATA/COMMUNICATION INPUT OUTPUT BUS INCLUDING A NEW COMMANDS AND INSTRUCTIONS BEING USED AS A RESULT OF THE NEW IMPLEMENTATION OF THE NEW BUS IN A MULTI-PROCESSOR COMPUTER SYSTEM describes a single processor to multiple I/O device interface over a bus rather than a switch. This describes something like a microchannel bus and is related only in that the present preferred embodiments can communicate via a microchannel bus.

U.S. Pat. No. 4,803,485—LAN COMMUNICATION SYSTEM, represents a LAN approach which use of the present inventions would replace. This patent describes a medium conversion adapter similar to the present invention, but for adapting various protocols to a communication system having multiple transmission medium segments in a ring configuration, like a token ring or LAN. The token ring can have fiber or metallic interconnections. The present invention differs in that it adapts multiple transmission medium segments in an unbuffered multi-stage parallel transfer configuration, that gets latencies in the sub-microsecond range, rather than in the millisecond range of LAN's, that provides simultaneous and equi-distant communication paths, whose transmission bandwidth and number of simultaneous paths scale with increased system size. The present invention is the replacement for the state-of-the-art LAN approach that reduce latency and improve bandwidth by many orders of magnitude. These differences will be of value in the future.

Harold Stone in his book "High-Performance Computer Architecture", Addison Wesley 1990 recognizes (p. 309) that there is a need in architectures which are parallel for machine mechanisms which minimize overhead required among processors jointly working on the job. The overhead needed need to be solved, and effectively. Interconnection thorough existing networks is slow, and with heterogeneous networks for large interactive data exchanges intolerably slow. While more detail will be found in the detailed description below, it should be recognized that there is a need for an inexpensive high speed switching device which can be used as a "generic". This is an achievement of the present inventions. The achievement allows creating of many new computer systems with heterogeneous and homologous processors, and can be used as a generic network interconnection device for high speed transfers.

SUMMARY OF THE INVENTIONS

The present invention provides a generic solution applicable to performing either parallel or serial communications amongst multiple nodes over switching networks. In particular, the disclosure applies to byte-wide parallel hardware using parallel crossbar switches for a byte parallel multi-sized interface switch for communicating over multi-staged switching networks using electrical switching components. The switch which is described can be manufactured with VLSI technology, and can be made with various technologies on a chip. It becomes the stage of a multi-stage generic network. The switch is a dynamic switch which can be applied with non-blocking for point to point connection of nodal points (to processors) with an apparently optimal two cycle connect time per stage. The number of points connected depends upon the selection of stages applied.

The MULTI-MEDIA SERIAL LINE SWITCHING ADAPTER and the parallel switching network make it feasible for serial message data to be switched and routed to various destinations. This means that for the first time, a parallel electrical switch can efficiently handle either optical or electrical serial data and provide the features required for parallel processing and "farm" approaches, such as low latency, high bandwidth, scalability, fault tolerance, and high reliability. In addition, further flexibility is provided which permits the MULTI-MEDIA SERIAL LINE SWITCHING ADAPTER to be personalized to support the any one of a number of standard and proprietary serial protocols. A personalization PROM is part of the disclosure and specifies the particular serial protocol that each individual adapter is to support. The parallel switching network becomes a flexible media that interconnects and allows different serial protocols to communicate with each other; i.e., any number of different serial protocols can interface with the same parallel switch network. This allows every node of the parallel system to send and receive messages using its own native protocol. However, a node is not restricted to communicating only with others nodes using the same protocol, but it can communicate with any of the other nodes regardless of the serial protocol they use.

One aspect of this solution permits direct parallel electrical tie-in to the parallel switch interface using copper wire. This approach is efficient and economical for short distance connections of 100 ft. or less, but it is not a comprehensive solution that allows longer interconnection distances. Also, as the number of interconnecting nodes increases the cabling complexity becomes worse because of the large number of parallel wires required. In addition, the native parallel switch interface is not a standard interface and there are no existing CPU's or workstations that standardly support the parallel switch interface that would tie directly into the parallel switch.

The second and key aspect of the present invention is the adaptation of standard and proprietary serial interfaces using either optical or electrical transmission media to interface to the parallel switch. A first MULTI-MEDIA SERIAL LINE SWITCHING ADAPTER, disclosed herein, receives either serial optical or electrical interfaces/protocols and converts them into the parallel electrical interfaces/protocols required by the parallel switch. The converted serial data is routed to the selected destination through the parallel switch network, where it is received by a second MULTI-MEDIA SERIAL LINE SWITCHING ADAPTER and converted back into a serial optical or electrical interface/protocol. Both the electrical and optical interfaces can serve as a gateway to wireless transmitters and receivers.

The function of providing compatibility amongst various protocols is provided by the present invention. A node sending a serial message transmits the message in its native protocol over fiber or copper wire to a first MULTI-MEDIA SERIAL LINE SWITCHING ADAPTER, which is dedicated entirely to that individual node and is personalized by the PROM to understand the protocol generated by that node. The first MULTI-MEDIA SERIAL LINE SWITCHING ADAPTER converts the first serial protocol to the parallel protocol of the ALLNODE switch and forwards the converted message to the parallel network. The message is routed through the network to the selected destination, where it is received by a second MULTI-MEDIA SERIAL LINE SWITCHING ADAPTER. The second MULTI-MEDIA SERIAL LINE SWITCHING ADAPTER converts the parallel message it receives in the parallel switch protocol to a second serial protocol -the protocol defined by its personalization PROM and which is the native protocol understood by the receiving node. The second MULTI-MEDIA SERIAL LINE SWITCHING ADAPTER then forwards the message serially to the receiving node over either fiber or copper wire. The first and second serial protocols can be the same or different, and the transfer will be accomplished equally well.

In accordance with our inventions, it is also possible to intermix transfers to or from nodes which implement the parallel switch interface directly. In this case, the conversion provided by one or both MULTI-MEDIA SERIAL LINE SWITCHING ADAPTERS can be bypassed because the message already exists in the appropriate protocol as it either comes directly from a sending node or goes directly to a receiving node.

In accordance with our inventions, we provide a programmable protocol conversion circuit which works equally well for transmitting serial messages across parallel networks regardless of the number of network stages or the size of the network.

In addition, the invention apparatus has the capability of providing a positive feedback acknowledgment that it has successfully transmitted the serial message across the parallel network.

Among the things that these basic and generic features provide is a computer system which can have many many nodes interconnected through and in which the interconnection network provides means for interconnecting for parallel transmission through a node point matrix controlled switch signals enabling coupling set up of a dynamic switching asynchronous network in two cycles a switch. In such a system the set-up is parallel and non-blocking is achieved by alternate paths.

Thus the interconnection network can couple processor nodal points of a dynamic multi-stage switching network for transmitting n messages to n nodal points at the same time or over lapped in any manner as part of a heterogeneous and/or homologous system.

The computer system can have a plurality of heterogeneous and/or homologous processors, with an interconnection network for coupling n processors to n processors via optional parallel channels, or via serial optical, electrical or wireless adapters, to permit n messages to be transmitted dynamically with no significant latency over direct or alternative network paths.

The computer interconnection device provides a network with the matrix controlled switch with parallel set-up providing an interconnection network for asynchronously and dynamically coupling n processor to n processor nodal points point to point with a set up of two cycles per stage. The latency of a switch matrix may be in the range of 150 ns with a delay per stage in the range of 10 nano seconds. With the current bandwidth of my design which is being manufactured, 40 MBS is achieved, and this may be increased. The preferred embodiment utilizes a microchannel interface which has practical advantages, and the low latency which is achieved is considered to be a most important feature. This latency can be lowered with more dense packaging, a dense CMOS, or even more with bi-polar or other higher speed logic.

A computer interconnection device made can generically have a plurality of processor nodes, the interconnection network, and the system can use one or more of the processors for coupling messages comprising parts or all of a message from one or more sending nodes to a plurality of receiving nodes, enabling simulcast of point to point broadcast of instructions and data messages for voice, data and image information from said one or more senders. This application may be useful in control, simulation, and for teaching. In fact, a multimedia system with parallel connections though the interconnection matrix permits a plurality of processor nodes to couple through the interconnection network time variable original digitized data from one or more sending nodes to a plurality of receiving nodes, enabling parallel simulcast of point to point broadcast of instructions and data messages for voice, data and image information from said one or more sending nodes for coherent intermixed presentation of said broadcast information. You can have a digital video presentation with different voice inputs, you can use different languages, all of which might match a scroll or other presentation of stored information.

These features and other improvements are described in the following description. For a better understanding of the inventions, together with related features, reference may be made to the previous ALL-NODE switch application for background. Further, specifically as to the improvements described herein, reference should be made to the following description and the associated drawings.

BRIEF DESCRIPTION OF THE DRAWINGS

FIG. 1 illustrates generally our preferred embodiment of the present invention of a Multi-Media Serial Adaptation apparatus, which has the capability of interconnecting fiber or copper serial channels to a parallel switching network.

FIG. 4 illustrates the advantages of the present invention to establish fully parallel switch network connections with unlimited expansion capabilities, as compared to the state-of-the-art matrix switch networks which are neither fully parallel nor easy to expand.

FIG. 12 illustrates generally our preferred embodiment of the parent switching apparatus to be used with the present invention apparatus to provide an 8 input and 8 output (8×8) crossbar switching apparatus having 8 multiple serial data data paths to provide increased performance.

FIG. 48 shows an application accelerator schematic, while

DETAILED DESCRIPTION OF THE INVENTIONS

Introduction to the Applications

Figure 2B:
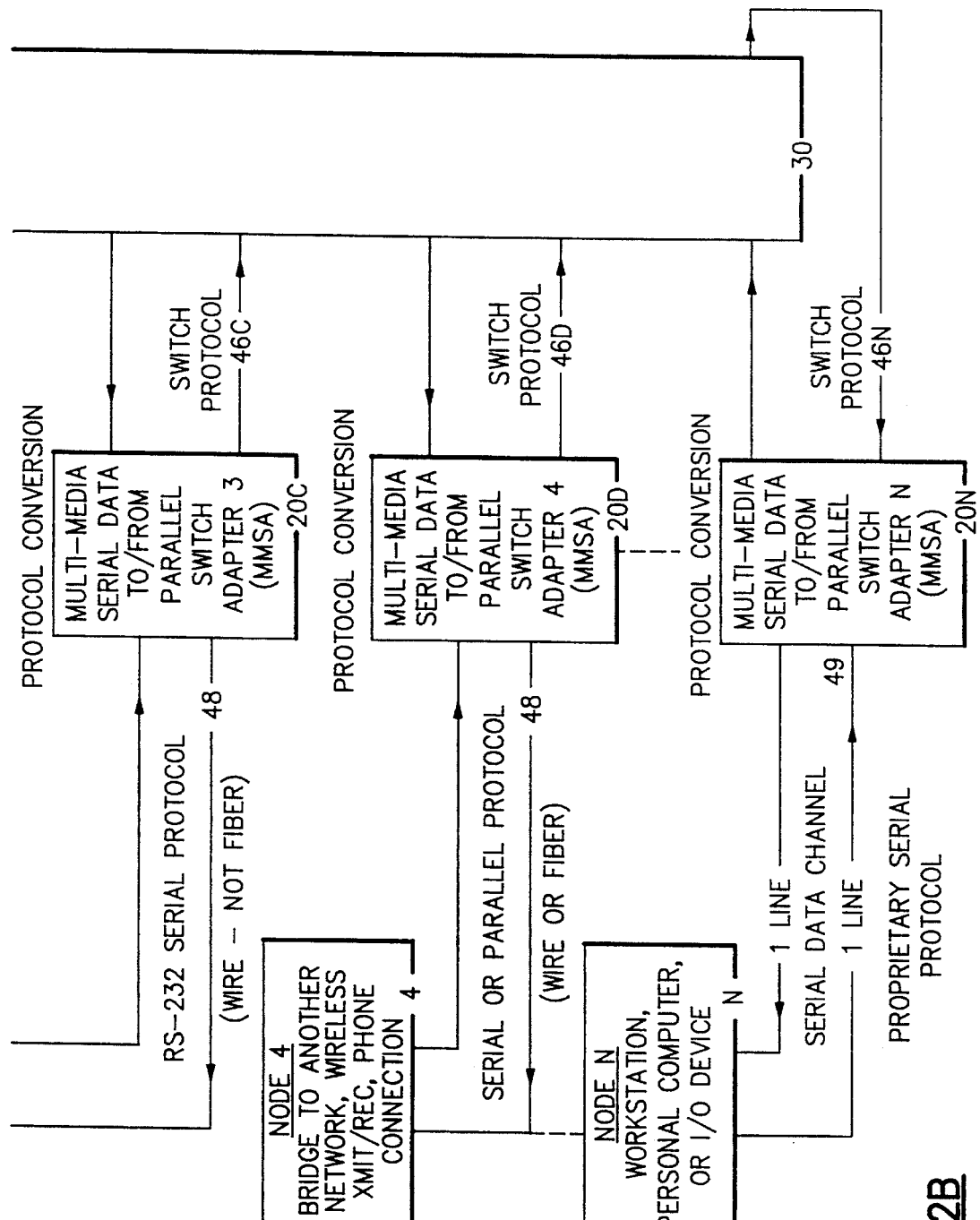
FIG. 2 illustrates the capability of the present invention to perform protocol conversions, which enable fiber serial channels and copper serial channels having various and different protocols to be adapted to the same parallel switch protocol, therefore enabling them to communicate with each other.

The heterogeneous and/or homologous processors in accordance with the inventions can be interconnected to form a shared processing resource—a "farm" of processors—to provide either massive joint computational power for a single task or individual processors assignable to individual tasks. Corporations are beginning to view this type of "farm" approach as being very valuable. Individual workstations can be purchased and given to individual employees to support their work effort during the day. However, in the evenings or on weekends, the workstations are networked together to form a massive processing base for performing batch jobs or parallel processing. Industry should note that massive processing power can be obtained at a lower cost by investing in less expensive workstations, rather than in the traditional single large mainframe processor.

The state-of-the-ad serial set up line switches such as those now being made within IBM and which may be provided by others are not thought to effectively meet the requirements of the new "farm" systems. First, they are inflexible and dictate that a single homogeneous serial transmission media and protocol be employed throughout the entire system. Secondly, they are generally switching systems designed to switch high bandwidth serial transfers without regard for latency. They attack only half the problem in that they provide parallel data communication, but they do not provide for parallel path set-up through the switch. Therefore, they do not provide a full parallel network capability. Instead, all network paths share a central matrix controller function that operates in serial. If a processing node wishes to use a path through the switch, it must first arbitrate for the facilities of the central matrix controller. The matrix controller services one request at a time, causing parallel requests to wait their turn. The central matrix controller acknowledges one switch set-up request at a time. It receives a short message indicating the switch connection desired. The central matrix controller checks a matrix map stored in the central matrix controller's memory and determines whether the requested connection can be established or not. If it can, the central matrix controller sends a command to the switching element (usually referred to as the switch fabric) to make the requested connection. Then the central matrix controller responds to the requesting node telling it whether the desired connection has been made or is not available. The processing node then uses the established connection and transmits data to or from the desired destination through the switch fabric, while the central matrix controller works on establishing the next serial connection. The processing node must go through a similar procedure to break the switch fabric connection using the central matrix controller, when it is finished using a given switch path. Thus, the latency of the central matrix controller approach in regards to establishing and breaking switch paths is very poor. In existing products, this type of approach has been adequate to connect DASD's, Direct Access Storage Devices and disk files, and other I/O devices to computer complexes, or to send batch information between processors. These types of applications transfer long disc records or large batch data at a high bandwidth. The poor latency is amortized over the large transfer and has a small effect on the overall performance. However, this is not the case for the modern "farm" approach, where messages can be short and latency becomes as important, if not more so, as bandwidth. As noted by Harold S. Stone in his book "High-Performance Computer Architecture" (Addison-Wesley 1990, pg.309) that the performance benefits of parallel processing depends strongly on the ratio R/C, where R is the run-time of the processing (the computational work to be done) and C is the communication overhead required amongst n parallel processors jointly working on the job. The value C includes latency as well as bandwidth, and to keep C small and make parallel processing efficient, the switch latency must also be kept small.

Thirdly, another drawback of the central matrix controller switching approach is the limited number of processors that a single central controller can manage. Systems have been built to interconnect 8, 16, 32, and possibly as many as 64 processors, but that appears to be approaching the the limit of the concept. The central matrix controller approach also has a reliability problem in that a failure in the central controller can fail the entire communication system and render the whole parallel system useless.

I have solved some of the problems encountered in the prior art which I referred to above. A distributed switch controller approach, rather than a centralized approach, appears to be a better solution for parallel processing because of its inherent low latency, its ability to withstand failures, and its ability to expand to interconnecting massively parallel systems. The distributed and fully parallel switch utilized herein to solve the "farm" interconnect problem efficiently is an elaboration of the ALLNODE Switch (Asynchronous, Low Latency, inter-NODE switch), which is disclosed in U.S. Ser. No. 07/677,543 and adapted by the present invention to perform the switching of serial data lines at low latency and high bandwidths. The ALLNODE switch provides a circuit switching capability at high bandwidths similar to the switch fabric in the central matrix controlled switches; however, the ALLNODE switch includes distributed switch path connection set-up and teardown controls individually within each switch—thus providing parallel set-up, low latency, and elimination of central point failures. We will further describe in the detailed description a way whereby the ALLNODE switch and the present invention can be used to solve the "farm" problem effectively.

DETAILED DESCRIPTION OF THE SWITCHING NETWORK AND APPLICATIONS

Turning now to the drawings in greater detail, as illustrated by FIG. 1, showing the preferred method of interconnecting N nodes via serial data channels connected to a parallel multi-stage switching network. Each node 1 of a parallel system can be comprised of a workstation, personal computer, mainframe CPU, or any I/O device, such as a DASD. A typical node 1A connects to the parallel network over the standard (e.g. IEEE Fiber Channel Standard FCS) or proprietary (e.g. IBM ESCON or Serial Link Adapter) serial data channel 40A that is normally provided with that particular node; i.e., no unique hardware is required at node 1. Each serial data channel uniquely connects one node to one MULTI-MEDIA SERIAL LINE SWITCHING ADAPTER (MMSA); for instance, serial data channel 40A connects node 1A to MMSA 20A. In turn, each MMSA uniquely connects one serial data channel to one parallel switch port; for instance, MMSA 20A connects serial data channel 40A to parallel switch port interface 46A.

The preferred embodiment uses only unidirectional interfaces, and therefore FIG. 1 shows serial data channels 40A to be comprised of two unidirectional lines, one carrying data from node 1A to MMSA 20A, and one carrying data from MMSA 20A to node 1A. Likewise, the parallel switch interface 46A is comprised of two unidirectional sets of signal lines, one carrying data from MMSA 20A to switch network 30, and one carrying data from the switch network 30 to MMSA 20A. To be consistent with the unidirectional concept, MMSA 20A internally has two sections—one which receives serial data from interface 40A, converts the data to parallel; and sends it to switch interface 46A; and one which receives parallel data from switch interface 46A, converts the data to the designated serial protocol, and sends it to interface 40A.

Referring to FIG. 1, it is possible for any node to send data to any other node through switch network 30. For example, node 1A could send a message using serial data channel 40A to MMSA 20A. MMSA 20A converts the serial message protocol to a parallel message protocol and sends it to switch interface 46A. MMSA 20A receives destination identification data (DID) as part of the serial data message, which it uses to command the switch network 30 to make the connection to the requested destination node (node 1N in our example). Switch network 30 forms the requested connection and parallel data flows from MMSA 20A through network 30 to MMSA 20N. MMSA 20N receives the parallel message protocol over switch interface 46N. MMSA 20N conveals the parallel message protocol to the designated serial message protocol and sends it to node 1N over serial channel 40N. Node 1A sends its own node number, referred to as source identification data (SID), as part of the message, so that node 1N can respond to the message if it so desires. To do this, node 1N constructs a response message using the SID of the message it received as the DID of the response message it generates. Node 1N sends the response message over serial data channel 40N to M SA 20N. MMSA 20N conveals the serial message protocol to a parallel message protocol and sends it to switch interface 46N. MMSA 20N uses the DID it receives to command the switch network 30 to make the connection to the requested destination node (node 1A in our example). Switch network 30 forms the requested connection and parallel data flows from MMSA 20N through network 30 to MMSA 20A. MMSA 20A receives the parallel message over switch interface 46A. MMSA 20A converts the parallel message protocol to the designated serial message protocol and sends it to node 1A over serial channel 40A. In similar fashion any node can communicate with any other node.

Referring to FIG. 2, the flexibility of the MULTI-MEDIA SERIAL LINE SWITCHING ADAPTER 20 (MMSA) and the switch network 30 design is demonstrated. The flexibility allows the present invention to support a nodal system comprised of various types of interfaces. The MMSA can be personalized to support the any one of a number of standard and proprietary serial protocols. A personalization PROM is part of the MMSA, which is used to specificity the particular serial protocol that each individual adapter is to support. For instance, MMSA 20A is shown to be personalized to support the Fiber Channel Standard protocol, whereas MMSA 20C is personalized to support the RS-232 electrical protocol and MMSA 20N is personalized to support a proprietary serial fiber protocol. Thus, it is possible to use the parallel switching network as a multi-media device that interconnects and allows different serial protocols to communicate with each other; i.e., any number of different serial protocols can interface with the same parallel switch network 30. This allows every node of the parallel system to send and receive messages using its own unique protocol. However, a node is not restricted to communicating only with others nodes having the same protocol, but it can communicate with any of the other nodes regardless of the serial protocol they use. For example, node 1 could send a message over serial data channel 40A to MMSA 20A using the Fiber Channel Serial protocol at a 1 gigabit per second (GbS) rate. MMSA 20A is personalized to convert the message received in the Fiber Channel Standard .protocol to a message having the same meaning in parallel switch protocol. MMSA 20A makes the conversion and sends the message to switch interface 46A including the DID switch routing information. After switch network 30 forms the connection indicated by the DID, parallel data flows from MMSA 20A through network 30 to MMSA 20C. MMSA 20C receives the parallel message over switch interface 46C. MMSA 20C is personalized to convert the message received in the parallel switch protocol to a message having the same meaning in the RS-232 serial electrical protocol. MMSA 20C makes the conversion and sends the message at a 1 mega bits per second (Mbs) rate to node 3 over serial channel 48. In similar fashion any node can communicate with any other node using different protocols. A node sending a serial message transmits the message in its native protocol over fiber or copper wire to its associated MMSA, which is personalized by the PROM to understand the protocol generated by that node.

An additional flexibility is shown in FIG. 2. It is possible to intermix transfers to or from nodes which implement the parallel switch interface directly. For instance, node 2 is shown to connect directly to switch network 30 and to provide the parallel switch interface 46B directly, without requiring the serial to parallel protocol conversion functions. Thus, the direct connect interface 46B does not require the services of the MMSA. Node 2 can still communicate with all other nodes of the system. For instance, node 2 could send a message directly to switch network 30 over parallel channel 46B at a 40 megabytes per second (MBS) rate and specify node N as the destination of the message. After switch network 30 forms the connection indicated to node N, parallel data flows from node 2 through network 30 to MMSA 20N. MMSA 20N receives the parallel message over switch interface 46N. MMSA 20N is personalized to convert the message received in the parallel switch protocol to a message having the same meaning in a proprietary serial protocol. MMSA 20N makes the conversion and sends the message at 200MBS to node N over serial channel 49. In similar fashion any node can communicate to or from node 2. In the case where the node supports the switch interface 46B directly, the conversion provided by the MULTI-MEDIA SERIAL LINE SWITCHING ADAPTER is not required because the message already exists in the appropriate protocol as it either comes directly from a sending node or goes directly to a receiving node.

A further flexibility is shown in FIG. 2. Block 4 illustrates that any node of the system, such as node 4, can serve as a bridge to another network, whereby networks of the same type as network 30 (ALLNODE Switch Networks) can be interconnected to each other through network bridge nodes, like node 4. It is also possible to interconnection to network 30, other networks which are of a different type than network 30, such as telephone networks, wireless networks, or other types of multi-stage or crossbar networks through network bridge nodes, like node 4. FIG. 2 shows that bridge nodes, like node 4, can be connected to network 30 by either a serial protocol that goes through MMSA block 20D, or by a parallel protocol that would by pass block 20D in the manner shown by parallel interface 46B.

Figure 3:
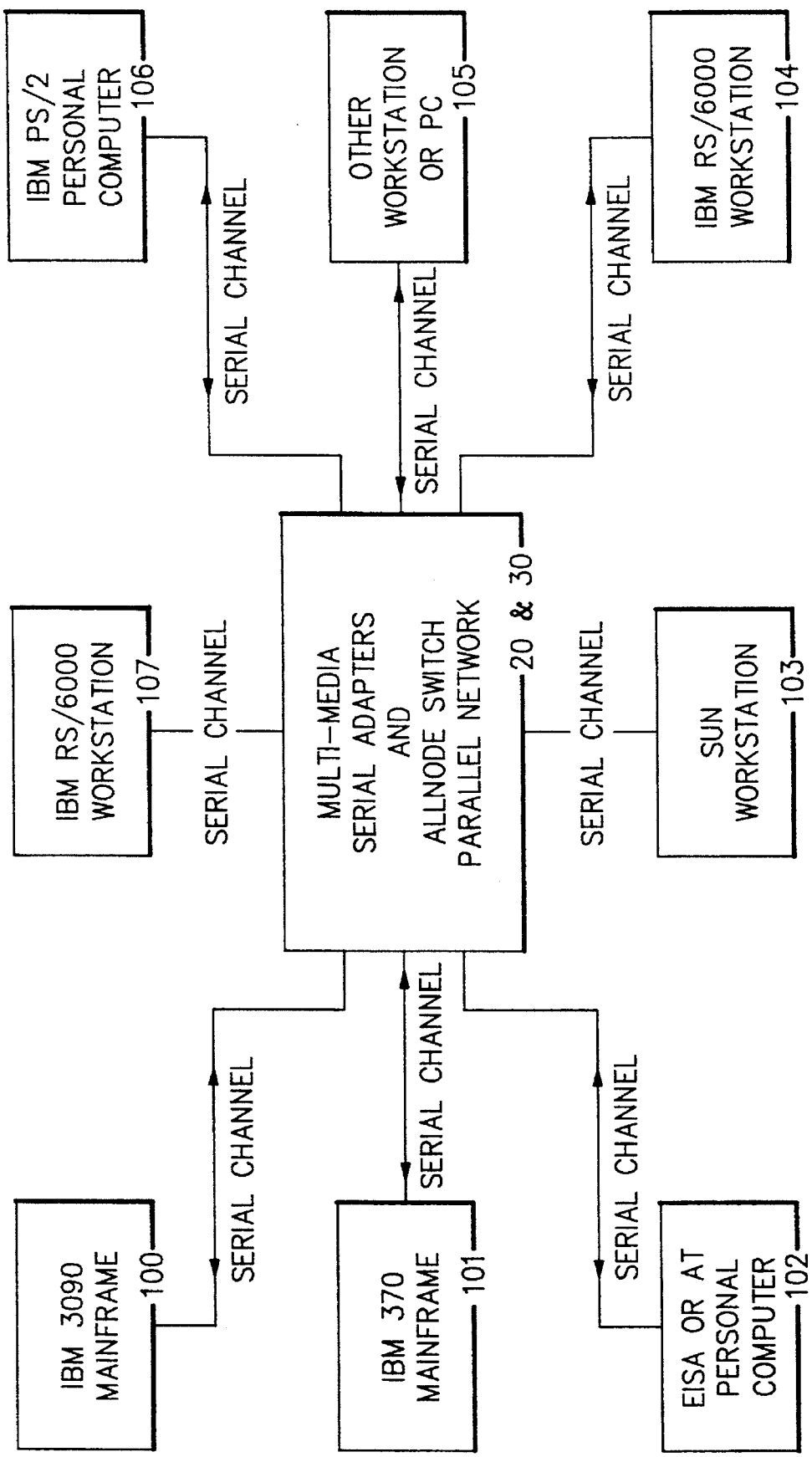
FIG. 3 illustrates the capability of the present invention to provide a multiple serial connections means which allows many processors of the same or different architectures to communicate quickly and efficiently to provide a farm or joint processing capability.

Referring to FIG. 3, the application of the combined function provided by MMSA adapters 20 and the ALLNODE switch network 30 .is shown as a means of interconnecting "farms" of various architectures. The "farm" system is is interconnected by an improved adaptation over a minimal serial fiber or copper wire transmission media to parallel switching networks for the purpose of interconnecting large numbers of processors. The processors can be interconnected to form a shared processing resource—a "farm" of processors—to provide either massive joint computational power for a single task or individual processors assignable to individual tasks. Some of the various "farm" members are shown in FIG. 3 by blocks 100 to 107. Any workstation, personal computer, mainframe, or I/O device can be a node of the "farm" system. All the nodes can be of the same type; for instance, a 100 node "farm" could have blocks 107 at all 100 nodes and interconnection would be provided by block 20&30. However, it is not necessary to have the same block 107 at every node. A system, like the one shown in FIG. 3, having a different processor at every node will work equally well. The limit on the number of nodes that can be interconnect through block 20&30 is restricted by the expansion capability of network 30. There is presently no known limit that would keep the ALLNODE Switch network 30 from expanding to as many as 32,000 nodes.

Referring to FIG. 4, the difference is shown between the present parallel switch interconnection apparatus and the state-of-the-art matrix controlled switches, which do not effectively meet the requirements of modern parallel systems. The matrix switch shown in FIG. 4 attacks only half the problem in that it provides parallel data communication through switch fabric 36 which can support the interconnection of many processors (90A to 90N) simultaneously, but set-up and breakdown of the connections in switch fabric 36 is accomplished serially (not in parallel) through the serial matrix controller 35. All network paths share a central matrix controller function that operates in serial. If processor node 90A wishes to communicate to processor node 90N using a path through the switch fabric 36, processor node 90A must first arbitrate for the facilities of the serial matrix controller 35. The central matrix controller 35 services only one request at a time, causing simultaneous requests to wait their turn. The central matrix controller 35 acknowledges one switch set-up request at a time. It receives a short message from processor node 90A after processor 90A has won the arbitration for the matrix controller 35, the short message indicating the switch connection desired to processor 90N. The central matrix controller 35 checks a matrix map stored in the central matrix controller's memory and determines whether the requested connection can be established or not. If it can, the central matrix controller 35 sends a command to the switch fabric 36 commanding it to make the requested connection. Then, the central matrix controller 35 responds to the requesting processor 90A telling it whether the desired connection has been made or is not available. The processing node 90A then uses the established connection and transmits data to or from the destination processor 90N through the switch fabric 36, while the central matrix controller 35 works on establishing the next serial connection. The processing node 90A must go through a similar procedure to break the switch fabric 36 connection using the central matrix controller 35, when it is finished using a given switch path. Thus, the latency of the matrix switch approach in regards to establishing and breaking switch paths is very poor. Numbers quoted for the latency of existing matrix switch products usually are in the range of 10 to 100 microseconds. However, modern parallel processing systems require latencies in the sub-microsecond range to be efficient.

In contrast, the present invention applies to low latency fully parallel switch networks, also shown in FIG. 4. In this type of network there is no shared matrix controller, but the switch fabric and path set-up and breakdown control is provided by the same block 30. The parallel switch 30 provides parallel data communication, identical to the matrix switch, which can support the interconnection of many processors (90A to 90N) simultaneously. However, the set-up and breakdown of connections is accomplished in parallel quickly through the same parallel switch 30 function. For example, N/2 of the processor nodes 90A to 90N could simultaneously request connections be established through parallel switch 30 and they would all be processed immediately and simultaneously. Thus, the latency of a comparable parallel switch would usually be in the range of 100 ns or less, and N/2 connections can be processed simultaneously giving an effective maximum rate of one set-up every 200/N ns. This yields a 3 to 4 order of magnitude improvement in latency of the parallel switch over the matrix switch.

The distributed and fully parallel switch utilized in the preferred embodiment of the present invention the ALLNODE Switch (Asynchronous, Low Latency, inter-NODE switch), which is disclosed in U.S. Ser. No. 07/677,543 and adapted by the present invention to perform the switching of serial data lines at low latency and high bandwidths. The ALLNODE switch provides a circuit switching capability at high bandwidths similar to the switch fabric in the central matrix controlled switches; however, the ALLNODE switch includes distributed switch path connection set-up and teardown controls individually within each switch—thus providing parallel set-up, low latency, and elimination of central point failures.

It is here understood that the FIGS. 5 to 11 are illustrations which are common to U.S. Ser. No. 07/677,543, the parent application which is incorporated herein by reference as to all of its contents. FIGS. 5 to 11 refer to a 4×4 crossbar implementation of the ALLNODE Switch to illustrate the principles and speed of the switching concept.

Figure 5:
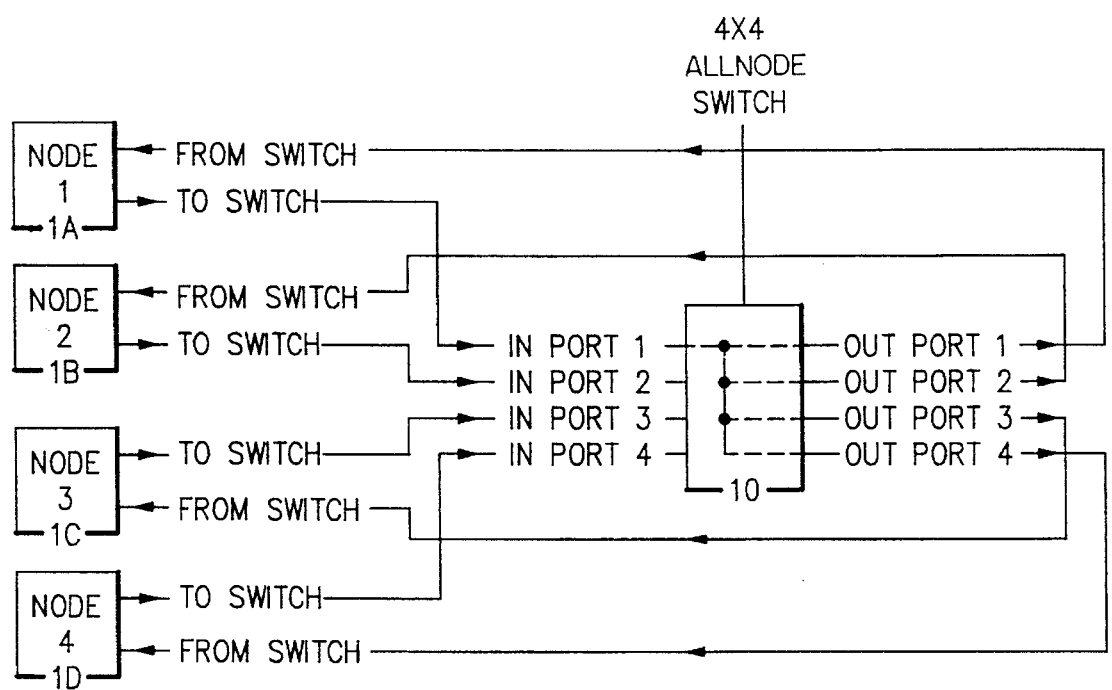
FIG. 5 illustrates a previously disclosed four input and four output (4×4) crossbar switching apparatus, which has the capability of being used with the present invention to provide fully parallel switching means for interconnecting up to four system nodes, as previously disclosed in the prior parent application U.S. Ser. No. 07/677,543.

As illustrated by FIG. 5 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 5 shows a 4×4 crossbar ALLNODE switching apparatus, where the function is to provide a means of connecting any of four input ports on a mutually exclusive basis to any one of the unused four output ports on a priority basis. The 4×4 crossbar ALLNODE switching apparatus can support up to four simultaneous connections at any given time. For instance, Input 1 could be connected to Output 3, Input 2 to Output 4, Input 3 to Output 2, and Input 4 to Output 1.

The ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (20, 22, 24, and 26) by connecting the 4×4 ALL-NODE switching apparatus 10 as shown in FIG. 5. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 6:
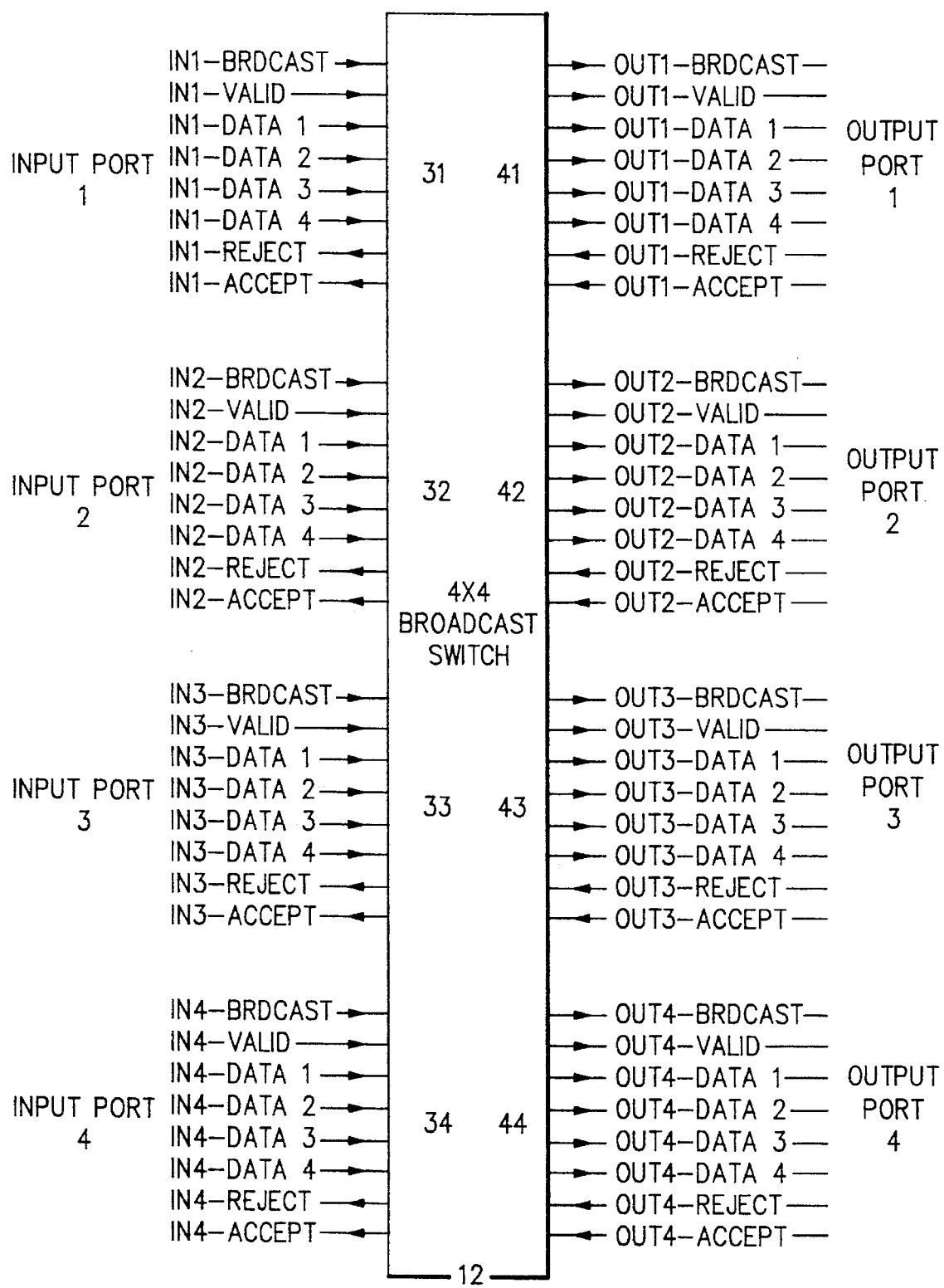
FIG. 6 shows in more detail, as illustrated also in the prior parent application U.S. Ser. No. 07/677,543, the detailed schematic of the 4×4 crossbar switching apparatus and its interface connections.

Referring thus to FIG. 6, block 12 shows an expanded drawing of switching apparatus 10 and defines in detail the interface lines connecting to switching apparatus 10. The set of lines 31, 32, 33, and 34 at each in-port to the switching apparatus 12 are identical in number and function to the set of lines 41, 42, 43, and 44 at each out-port. The sets of interface lines to each input and output port contain eight unique signals: four data lines and four control lines (VALID, REJECT, ACCEPT, and BRDCAST) which are differentiated by a prefix of INX- or OUTX- indicating the direction and number of the port (X) that they are associated with. The four data and VALID and HI PRI lines have a signal flow in the direction going from input to output across switching apparatus 12, while the REJECT and ACCEPT control lines have a signal flow in the opposite direction.

The sets of input port interface lines 31, 32, 33, and 34 transfer control information to switching apparatus 12 for the purpose of commanding and establishing input port to output port connections internal to the said switching apparatus. In addition, the said port interface lines also carry data information to be transferred from input port to output port across the switching apparatus 12. The four data interface lines contained in interfaces 31, 32, 33, and 34 do not restrict the transfer of data across switching apparatus 12 to only four bits of information, but rather the said four data lines can each contain a string of serial data making the transmission of any size data possible. For example, the said four data lines could transfer data at a 160 Mbits/sec rate, if all four data lines were transmitting serial data at a 40 MHZ rate.

The Switch Interface requires only 8 signals, as shown in FIG. 6, to transmit and control dual priority data through the network—the data transfer width is ½ byte (4 bits) at a time. The signals required are:

DATA: 4 parallel signals used to command switch connections and transmit data messages.

VALID: When active, indicates that a message is in the process of being transmitted. When inactive, indicates a RESET command and causes all switches to reset to the IDLE state. All switch functions are reset, except the high priority latches.

BRDCAST: When active, indicates the message in process is to be broadcast (sent in parallel) to all nodes, or that the present switch connection is to be held and maintained, even when the VALID line goes inactive.

REJECT: Signal flow is in the opposite direction from the other 6 signals. When active, it indicates that a REJECT or error condition has been detected.

ACCEPT: Signal flow is in the same direction as the REJECT signal and opposite to that of the other 6 signals. When in the low state, it indicates that a message is in the process of being received and checked for accuracy. When active, it indicates the message has been received correctly.

Figure 7:
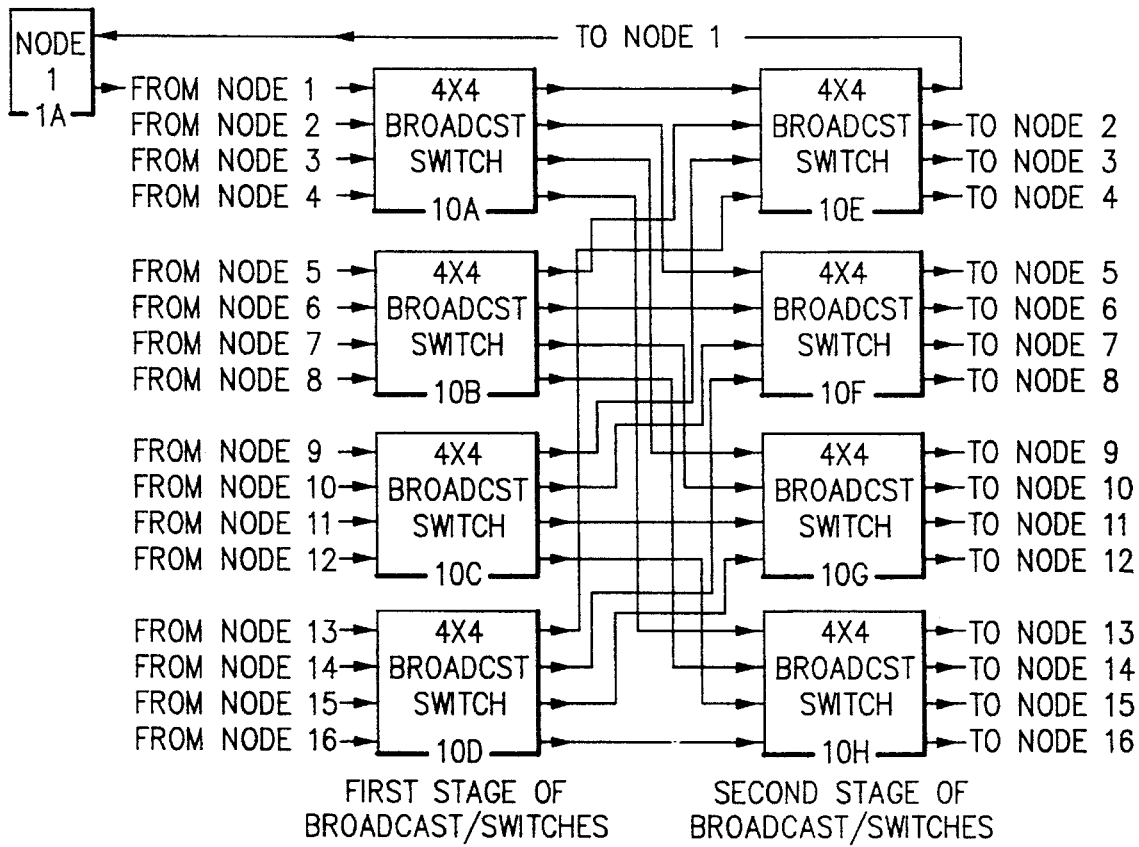
FIG. 7 shows a typical method for cascading the 4×4 prior parent embodiment of the invention switching apparatus to accommodate systems having more than 4 nodes.

Referring to FIG. 7, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner.

Figure 8:
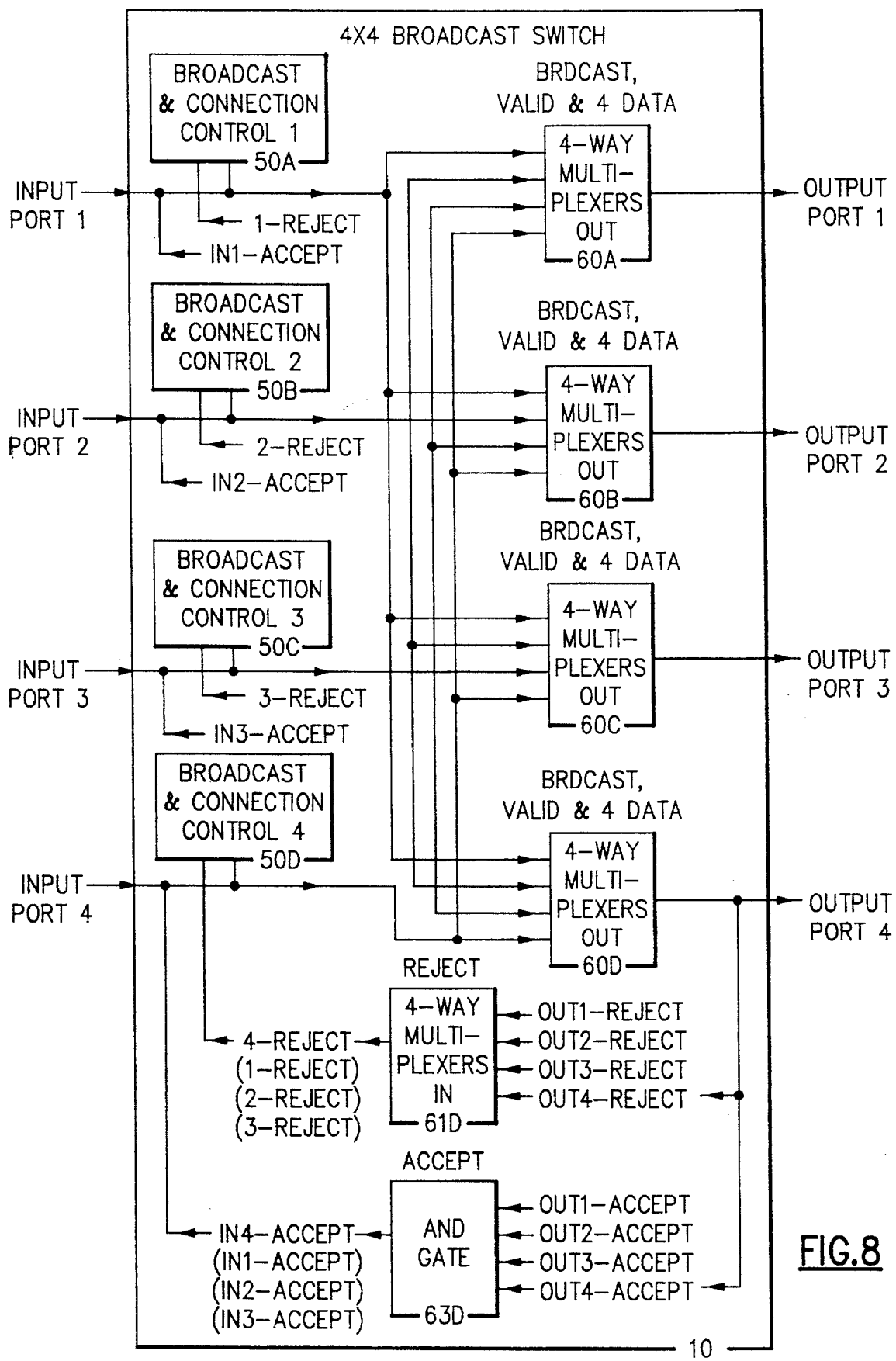
FIG. 8 shows a schematic block diagram of the simple data flow and control path implementations of the 4×4 prior parent embodiment of the invention switching apparatus.

Referring to FIG. 8, a functional diagram of the simple data flow across ALLNODE switching apparatus 10 is illustrated. The BRDCAST, VALID and four data lines at each input port, inside the switch, and at each output port are represented by a single line in FIG. 8 for simplicity. For instance, the BRDCAST, VALID, and four data lines entering broadcast/switch 10 at IN PORT 1 go to five internal functional blocks of broadcast/switching apparatus 10; these are blocks 50A, 60A, 60B, 60C, and 60D. Block 50A makes the decision as to which of the four possible output ports are to be connected to input port 1. The BRDCAST, VALID, and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the BRDCAST, VALID, and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the BRDCAST, VALID, and four data signals. A command or message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 9:
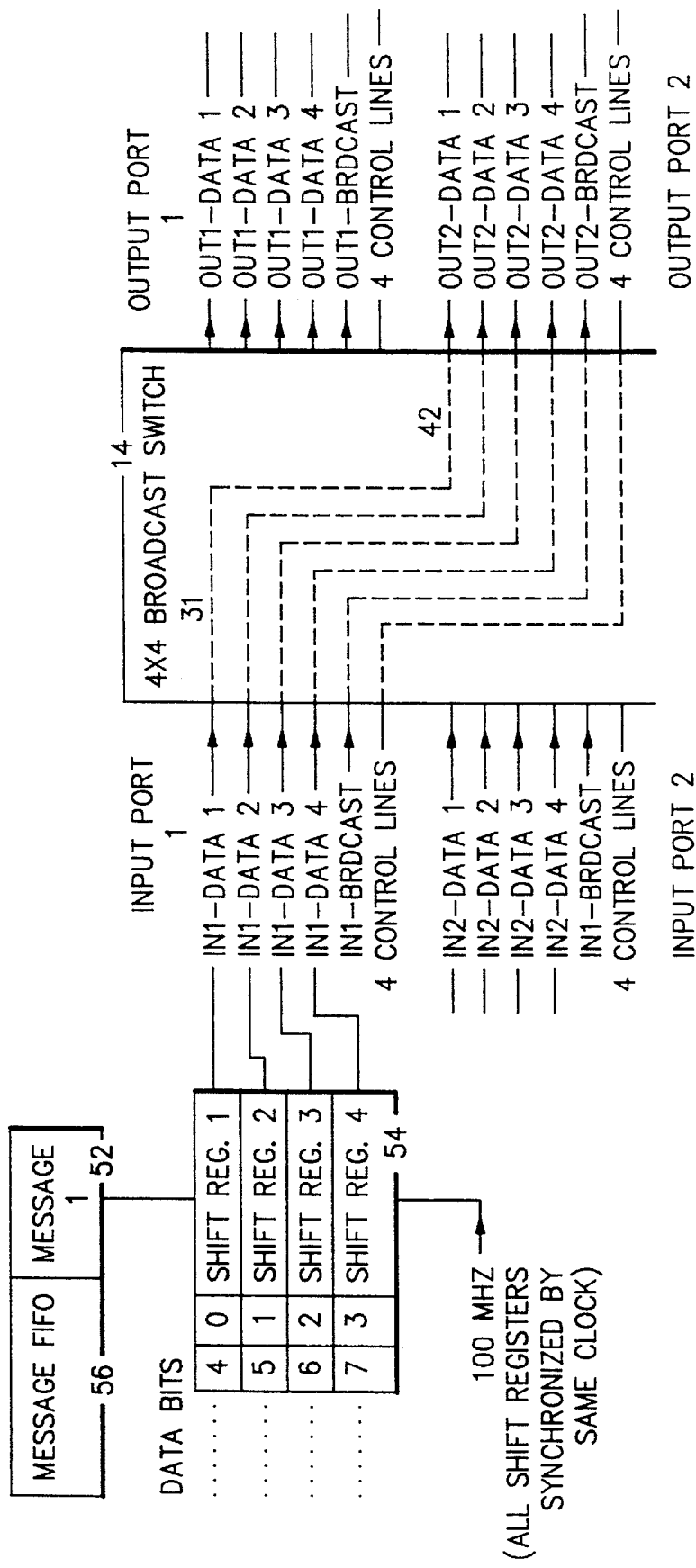
FIG. 9 illustrates a typical method for generating parallel control and and multiple line serial data information to be sent to the 4×4 prior parent embodiment of the invention switching apparatus over four synchronous data lines.

Referring to FIG. 9, blocks 56, 52, and 54 illustrate a typical method for generating multi-line (parallel)/serial data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 9). However, the four different input port sources (31, 32, 33, and 34) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 9 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 10:
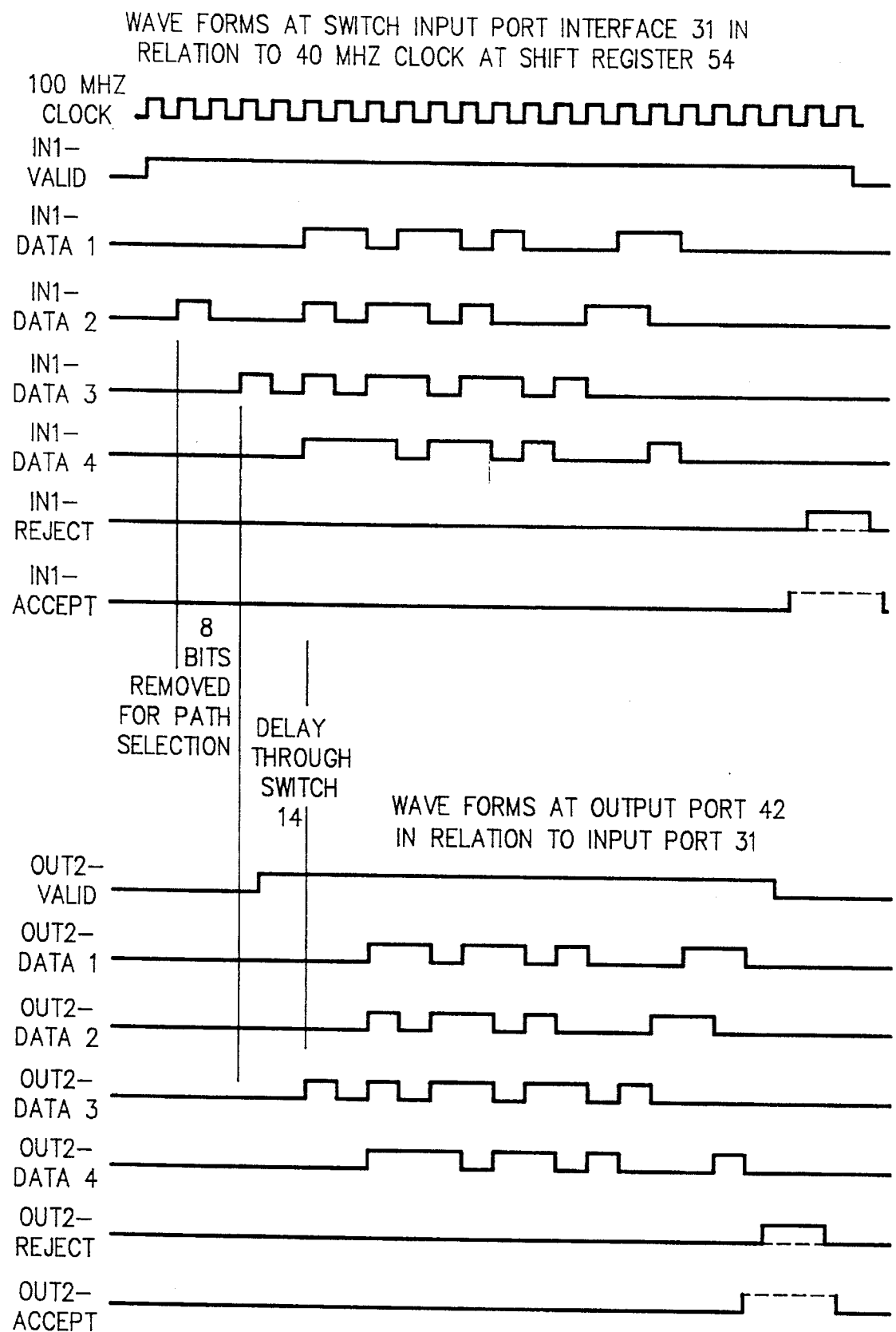
FIG. 10 shows a typical timing diagram for routing the interface signals arriving at one input port of the 4×4 prior parent embodiment of the invention switching apparatus to one output port.

Referring to FIG. 10, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path Selection recommended here is one out of N encoding with a return to zero (called a DEAD FIELD).

Figure 11:
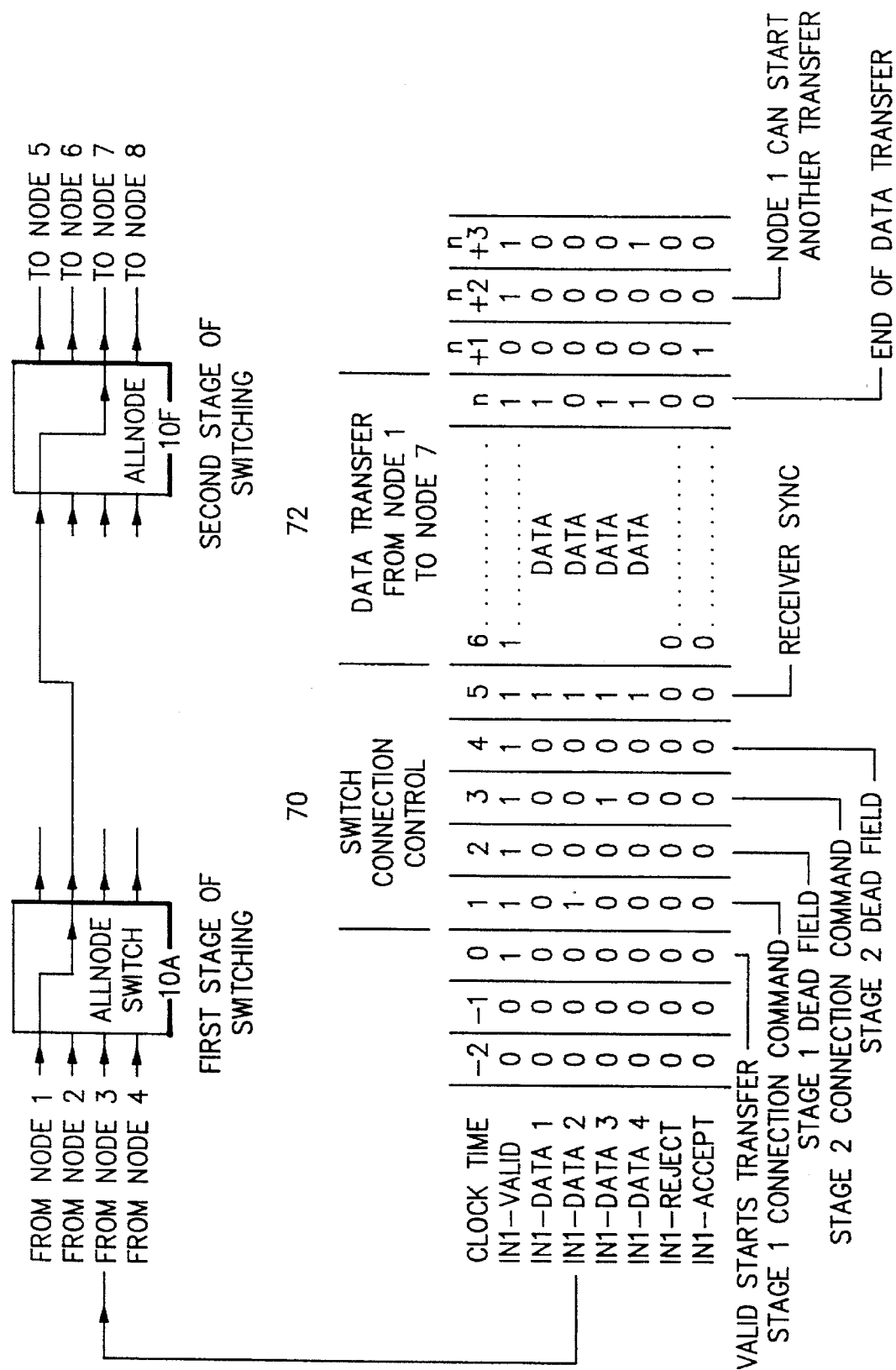
FIG. 11 illustrates the typical method of selecting and establishing a transmission path through a network comprised of the invention switching apparatus for the purpose of sending data from one node to another.

Referring to FIG. 11, a typical example of the exact serial bit patterns and control signal activation is shown for sending control and data information to switching apparatus 10; The example references the cascaded, two stage switching network shown in FIG. 7 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 7. In the signal sequence of 1's and 0's, time advances from left to right, so that the values seen at clock time -2 arrive at switch 10A first, and the values at clock time -1 arrive second, etc. The values of the IN1-DATA and IN1-VALID lines are all zeroes and cause nothing to happen at switch 10A during times -2 and -1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 11. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example illustrated in FIG. 11, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 8. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 11. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodiment, as shown in FIG. 11 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are effectively operating at the same frequency.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 9), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 11, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 1 OF could be BUSY at clock time 3, causing switch 1 OF to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports I and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

The present invention is comprised of two major portions as shown in FIG. 1, the serial adapter 20 and the switching apparatus 30. The preferred embodiment of the switching element comprising the switching apparatus 30 is shown in FIG. 12, which is an expanded 8×8 version of the 4×4 ALLNODE Switch 10. The 8×8 ALLNODE Switch 16 functions exactly the same as the 4×4 ALLNODE Switch 10, except that it implements byte wide (8 bit) data and has 8 input ports and 8 output ports. The input and output port interfaces are identical and are comprised of 8 data lines and 4 control lines each.

Figure 13A:
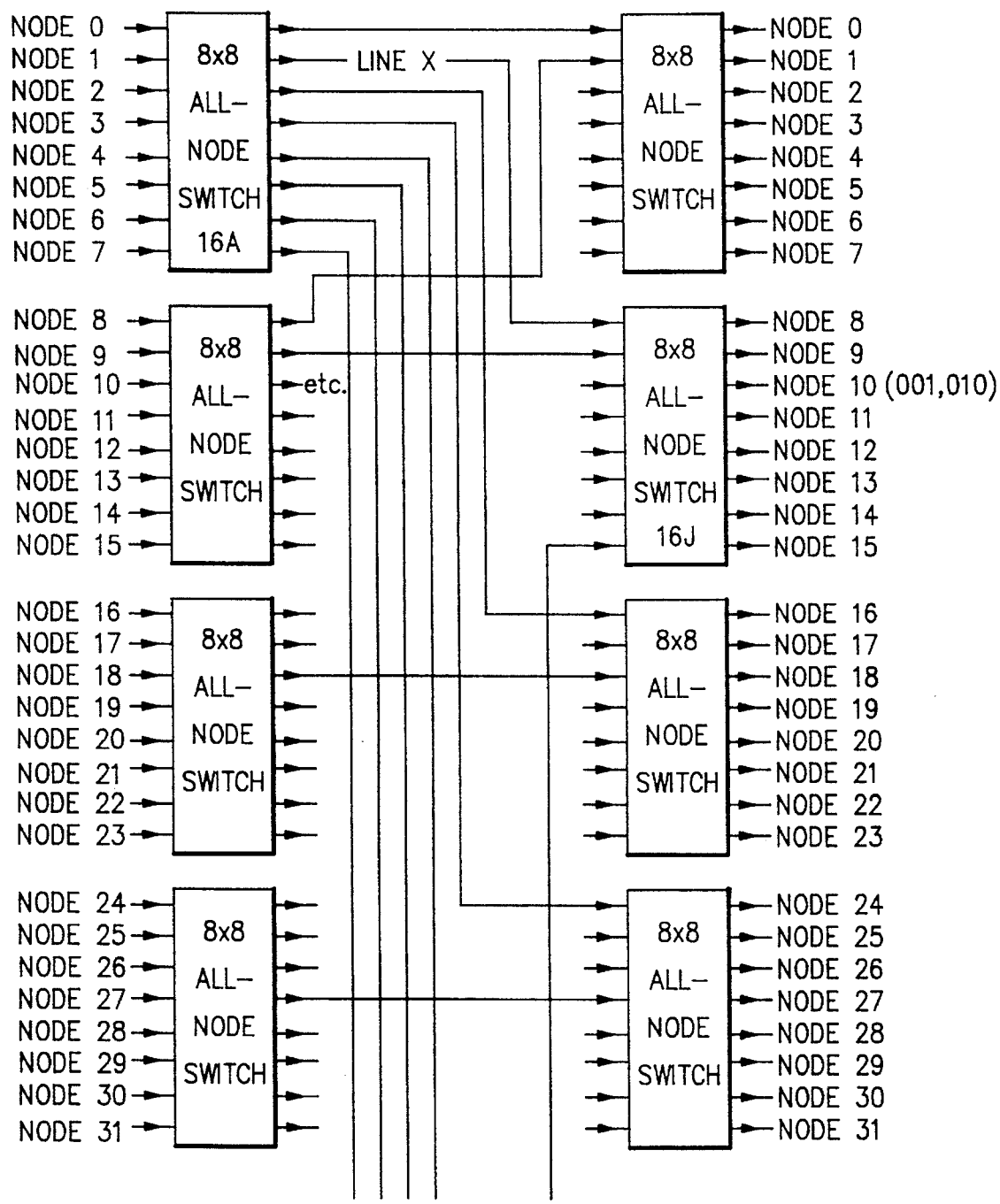
FIG. 13 illustrates typical method for cascading the preferred embodiment switching apparatus to accommodate systems having up to 64 nodes by employing two stages of switches.
Figures 13, 13A, 13B:
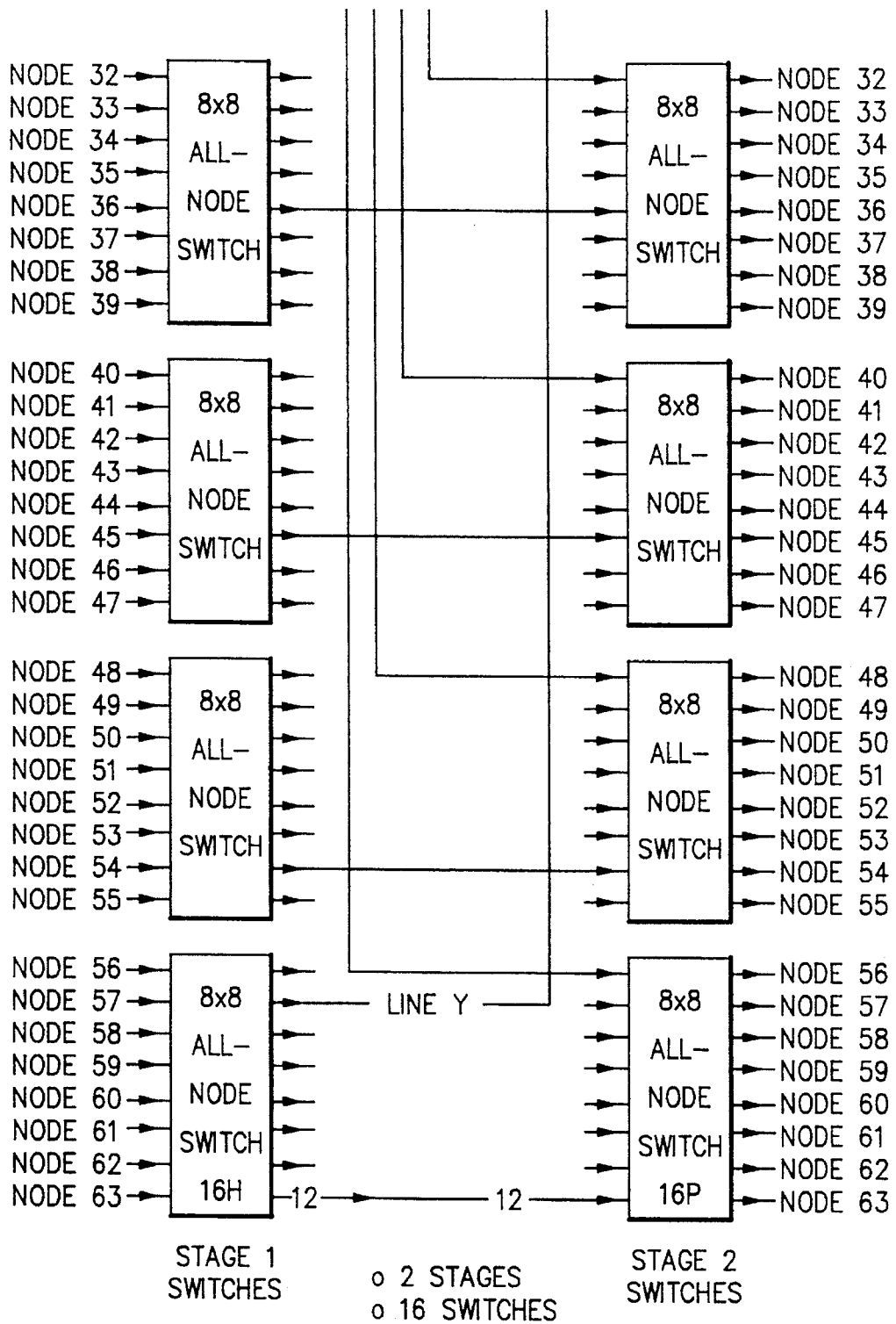

Referring to FIG. 13, the 8×8ALLNODE switch 16 can be cascaded into two stages by interconnecting 16 ALLNODE switch 16 devices as shown, 8 devices per stage to provide full interconnection amongst 64 nodes. I have selected as a preferred embodiment 64 nodes because most algorithms which have needed parallel implementation would appear to be serviced adequately by 64 nodes, preferably RS/6000 type nodes. This number should not be considered limiting, as 512 or 32000 nodes can be made into a network with the device described. This 64 node network is the preferred embodiment for the present invention parallel switch network 30. All nodes are connected equidistantly, such that any node can send a message to any other node including itself by traversing 2 and only 2 stages of the network. The inputs to the switch network are shown on the left and the outputs from the switch network are shown on the right of FIG. 13. The 64 nodes attached to the network are numbered from 0 to 63. Each node has an input port of 12 lines to the network and receives an output port of 12 lines from the network, as shown by interface 46A in FIG. 1. The input and output to the network ports are named identically (such as "NODE 0"), because both interface to the same node, one interface coming from the node to the switch network 30 and one interface coming from switch network 30 to the node.

A message may be sent via switch network 30 from any node to any other node. The destination of each message is specified by a destination ID number indicating which node is to receive the message from the sending mode which assigns the message. The destination ID (DID) number is equal to the physical node number of the node attached to the network and is independent of the source of the message. For instance, any node 0 to 63 wishing to send a message to node 10, sends the message to DID=10. The DID is used to route the message to the correct path in the network, so that it arrives at the proper destination only (in this case, node 10). The DID is the binary representation of the destination node number segmented into two three-bit binary values to form the routing information for the network, with each three-bit value controlling one stage of the switch. The values occur in 3-bit groups because three bits are required to select one of the eight possible output ports at each 8×8 switch 16. For instance, for the two-stage network shown in FIG. 13, the six-bit binary representation for destination ID number 10 is (001,010), where the first 3 bits (001) indicate the output port that is to be selected in switch stage 1; and the second three bits indicate (010) the output port that is to be selected in switch stage 2. If, as an example, node 1 wishes to send a message to node 10, the output port selected in switch stage 1 would be the second output port down on the right hand side of the switch 16A (corresponding to the selection value for stage 1 (001)). Node 1 forms a connection through switch 16A to "LINE X" to the first input port of switch 16J. Next switch 16J is commanded to make the connection to its third output port via the second 3-bit binary value (010)—where node 10 is located. Thus, the connection from node 1 to node 10 is completed, based only on the binary representation of the destination DID number.

The present invention connects serial interfaces to switch network 30 interfaces. Turning now to the serial interfaces, many different serial protocols exist but they have many common aspects. Therefore, a typical serial interface will be described herein as the preferred embodiment of the serial protocol and used as an example of how any serial interface can be adapter to the switch network 30.

Most serial fiber protocol use a message frame to transfer data, where the frame proceeds the message data with a link header and define the end of the data message using a link trailer.

MESSAGE FRAME

| LINK HEADER | DATA FIELD | LINK TRAILER |

The link header and link trailer are each comprised of several entities as follows:

| SOF | DID | SID | CNTL | CRC | EOF |

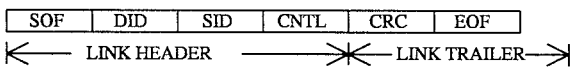

SOF=Stad of Frame Delimiter—Two to four 10-bit characters having fixed patterns which delineate the beginning of a message. Two different SOF patterns are used—connect and passive. The Connect-SOF causes a connection to be established in the network, passive assumes no connection is required, but that a previously formed connection has been held active. This field is assumed to be two characters in the preferred embodiment in the following sequence: first 001111 1001, second 001111 1000 to indicate Connect-SOF, and first 001111 1010, second 001111 1000 to indicate Passive-SOF.

EOF=End of Frame Delimiter—Two to four 10-bit characters having fixed patterns which delineate the end of a message. Two different EOF patterns are used—disconnect and passive. The Disconnect-EOF causes a connection to be broken in the network after the present message is transmitted, passive inhibits the breaking of the network connection, so that the previously formed connection is held active. EOF is also used to identify the preceding field as the CRC field. This field is assumed to be three characters in the preferred embodiment in the following sequence: first 001111 0110, second 001111 1001, third 001111 1001 to indicate Disconnect-EOF, and first 001111 0110, second 001111 0101, third 001111 1010 to indicate Passive-EOF.

CRC=The Cyclic Redundancy Check Field—Two to four 10-bit characters which is used to check the integrity of all transmitted fields in the message except the SOF and EOF fields. The polynomial used for the transmission of CRC in the preferred embodiment is:

$$X^{16} + X^{12} + X^5 + 1$$

which generates a two 10-bit character CRC field.

CNTL=The Link Control field indicates the type of frame and other link control information. This field is assumed to be one byte in the preferred embodiment, having the following meaning:

| MSB | Bit 0 | Bit 1 | Bit 2 | Bit 3 | Bit 4 | Bit 5 | Bit 6 | Bit 7 | LSB |
|-----|-------|-------|-------|-------|-------|-------|-------|-------|-----|
|     | LINK COMMAND - 5 Bits | | | | | Spare | Read = 1 Write = 0 | 1 = Link 0 = Device | |

00010 — Link Reject (Returns Link Control Register)
00011 — Device Reject (Returns Link Control Register)
01100 — Link Acknowledge
01101 — Link Control Register Read or Write
01110 — Node ID Register Read or Write
01111 — Reset The Abort-EOF is a special EOF sequence to indicate that the current message is to be discarded immediately. This field is assumed to be three characters in the preferred embodiment in the following sequence: first 001111 0110, second 001111 0010, third 001111 0010 to indicate Abort-EOF.

DID=Destination Identification (ID) field—Two to four 10-bit characters which specify the node which is to receive the Device Data Message or the Link Control Command. This field is assumed to be two bytes in the preferred embodiment, having the following meaning:

Serial protocols usually support two basic types of messages—Link and Device Messages, where Link messages are directed to control the serial interface logic and the switch network, while Device messages are directed to other nodes in the system. A Link Control short message doesn't require any data message at all,

LINK CONTROL SHORT MESSAGE

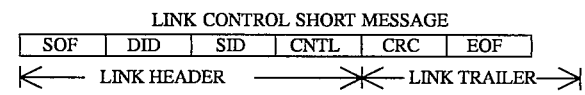

whereas, a Link Control Long message or device message uses a data message portion of the frame. As shown here by the preferred embodiment of the Device and Link Control message.

DEVICE AND LINK CONTROL MESSAGE

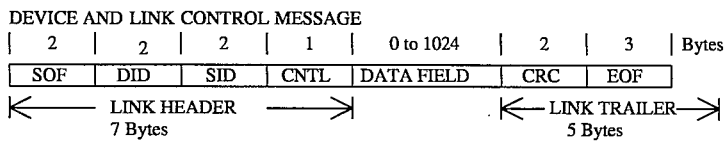

| DID VALID | DID |
|-----------|-----|
| | MSB 15-bits LSB |
| First Byte | Second Byte |

SID=Source ID field—Two to four 10-bit characters which specify the node sending the message, so that responses can be directed to the appropriate node. This field is assumed to be two bytes in the preferred embodiment, having the following meaning:

| SID VALID | SID |
|-----------|-----|
| | MSB 15-bits LSB |
| First Byte | Second Byte |

Devices messages can request responses and/or acknowledgements, but these device protocols are part of the data field and are not considered here. The device protocols are merely transmitted by the present invention like any other part of the data field and not operated on in any manner by the present invention, just transferred from one node to another where the device protocols are acted upon by the processor at the receiving node.

Most fiber serial interface transmit continuous sequences in between serial messages to keep the media synchronized and immediately available when serial messages become available. The preferred serial interface embodiment assumes the following continuous sequences and the following responses from the end of the serial interface receiving the continuous sequence:

1. IDLE—Message frame transmission is allowed—Respond with IDLE or send message frame.
2. UD—Unconditional Disconnect—Respond with UDR sequence.
3. UDR—Unconditional Disconnect Response—Respond with IDLE.
4. NOS—Not Operational Sequence—Respond with OLS
5. OLS—Off Line Sequence—Respond with UD Referring to FIG. 14, a block diagram of the MULTIMEDIA SERIAL ADAPTER (MMSA) 20 is shown to interconnect 2 serial interface ports to two parallel/serial (referred to hereafter as parallel) switch ports. One serial interface port receives serial data either over fiber by Fiber Optic Receiver Module 126 or over copper wire by Serial to Parallel Receiver Module 128—whichever one is active. The serial data is received and the link header and trailer interpreted by block 140. Then, the data message is translated into a data message having the parallel switch protocol. The converted message is stored in the Switch Message Send Buffer 160 until it is received in full, then the Switch Message Send logic 180 reads the data message form buffer 160 and sends it over the parallel switch network 30 to the commanded destination based on the DID. If the data message in buffer 160 is a Link Control Message, it is routed to and processed by block 172, instead of being sent to the switch network 30. Block 180 implements a switch output port which sends byte wide data to the switch network, and becomes an input port to an ALLNODE Switch 16 in network 30. The corresponding output from the switch network 30 is connected to Switch Message Receive Logic 170, which acts as a switch input port from the network and receives data messages from the network 30. The message received from the network is stored as is in the Switch Message Receive Buffer 150 until it is received in full, then the Message Frame Transmitter and Protocol translator 130 reads the data message form buffer 150 and converts it to the serial data protocol, generates the link header, serializes the message, generates the link trailer, and transmits the entire frame either over fiber using Fiber Optic Transmitter Module 122 or over copper wire using the Serial to Parallel Transmitter Module 120—whichever one is active. In addition, the MMSA 20 function controls the detection and generation of continuous sequences over the serial fiber interfaces using block 132, and generates the necessary clocks required by the MMSA 20 using block 124.

Figure 14:
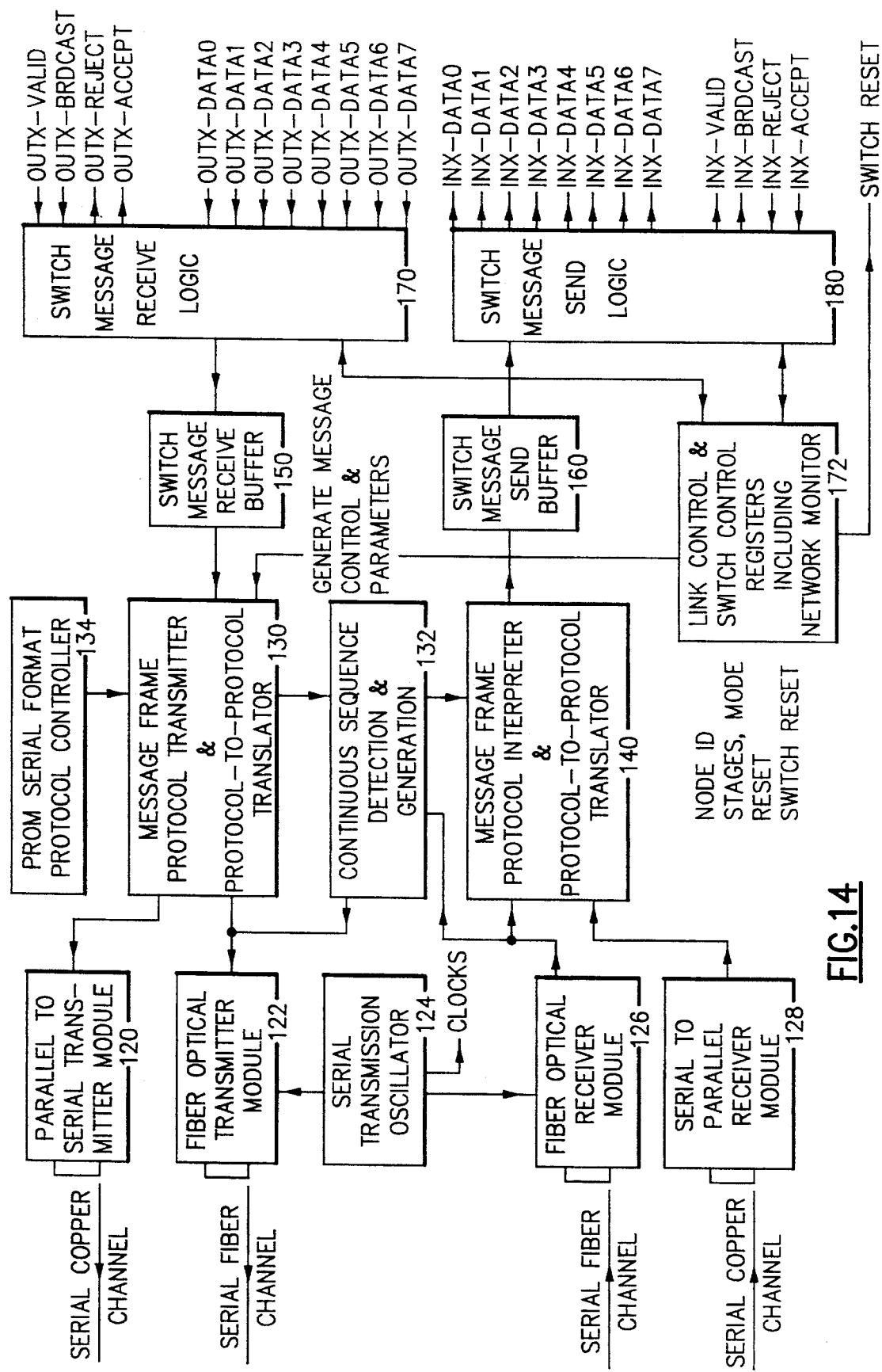
FIG. 14 shows a schematic block diagram of our preferred embodiment of the present invention of a Multi-Media Serial Adaptation apparatus, showing the function it performs of connecting serial fiber or copper interfaces to a parallel switching network.

With respect to FIG. 14, it will be seen how Block 172 as part of the Link Control function provided by block 172 allows for the monitoring of network parameters and activity.

Figure 15:
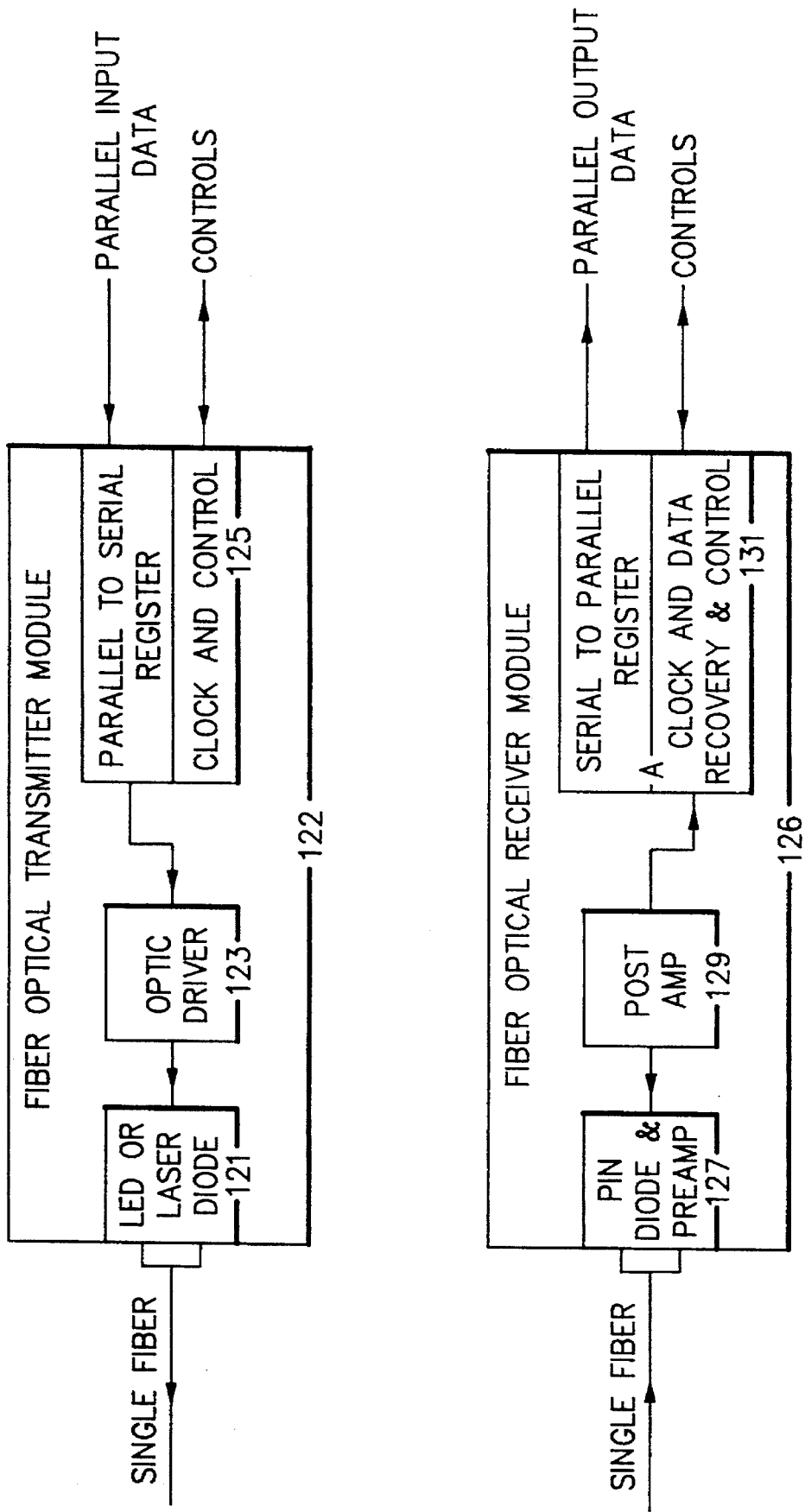
FIG. 15 shows a schematic block diagram of the general functions performed by fiber optic modules and how they relate to the present invention.

Referring to FIG. 15, a more detailed drawing of Fiber Optical Transmitter Module 122 is shown. The module receives byte wide parallel input data into block 125, which converts the data to bit serial and transmits the data over fiber using optical driver 123 and either LED or laser diodes 121. Fiber Optical Receiver Module 126 is shown to receive bit serial data from the fiber interface into pin diode and preamp 127 and post amplifier 129. The serial data is then recovered and converted to byte parallel data in block 131. Modules 122 and 126 meeting the requirements described are not unique, and IBM with ESCON or other series and manufacturers have such devices for sale. For instance, AT&T sells an ODL 200 fiber optic LED and photodiode sender receiver, and also have a laser transceiver which encompasses both a sender and receiver, it is understood.

Figure 16:
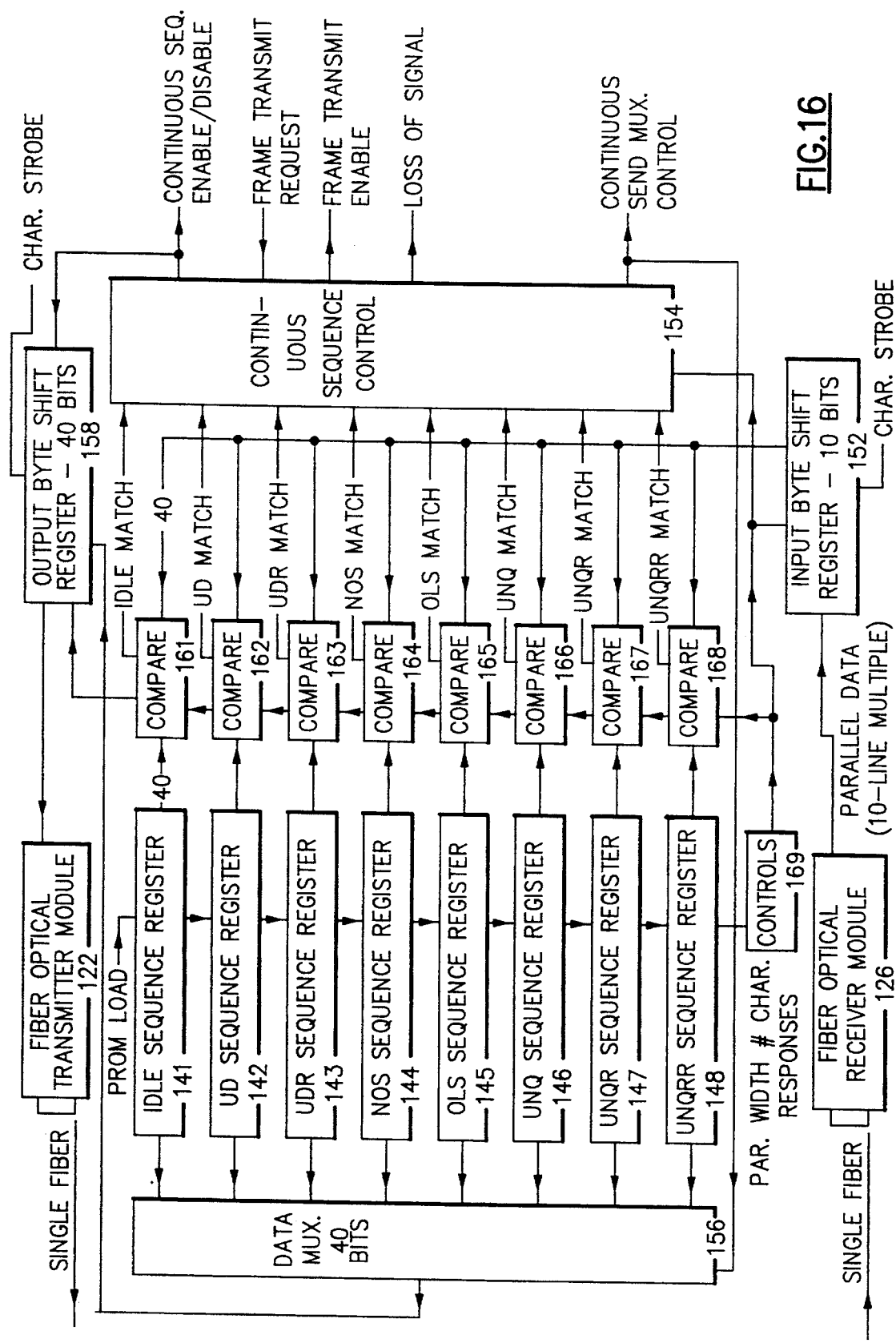
FIG. 16 shows a schematic block diagram of our preferred embodiment of the continuous sequence support provided as a portion of the present invention to continuously monitor fiber optic serial data.

Referring to FIG. 16, a more detailed drawing of the Continuous Sequence and Generation block 132 from FIG. 14 is shown, which is shown to contain 8 registers 141 to 148 which are initially loaded from PROM Serial Format Controller 134. The PROM 134 is uniquely programmed for every different serial protocol-supported by MMSA 20 and upon detecting power-on conditions, the contents of PROM 134 are loaded into registers, like 141 to 148, to control the subsequent operation of the MMSA 20 in a unique manner to conform to the selected serial protocol. Registers 141 to 145 each define the bit pattern that block 132 is to recognize for each of the standard continuous sequences—IDLE, UD, UDR, NOS, and OLS, respectively. In addition, registers 146 to 148 provide the capability to recognize 3 non-standard sequences to give added flexibility to block 132. Register 146 defines a unique continuous sequence that is non-standard, but can still be programmed to be recognized. Register 147 defines the continuous sequence which is generated in response to the unique UNQ sequence, and Register 148 defines the continuous sequence which is generated in response to the unique register UNQR sequence. Control block 169 is also loaded from PROM 134 and defines for each serial protocol which continuous response is to be generated for each incoming continuous sequence detected. The incoming fiber is continuously monitored to determine if a continuous sequence or a valid message is being received. The serial bit stream is received into module 126 and converted to 10-bit parallel data which is stored in register 152. Register 152 then sends sequences of consecutive bytes as they are received to comparators 161 to 168, where each comparator individually checks the incoming data to see if it compares to any one of the values programmed into registers 141 to 148, respectively. On a mutually exclusive basis, one continuous sequence of the 8 possible sequences will be recognized by one of the comparators 161 to 168, which will inform the Continuous Sequence Control block 154 of the detection of a match condition. Block 154 will then refer to Controls block 169 to determine what response it should issue to the detected continuous sequence. Block 154 will respond by controlling multiplexer 156 to select the proper response sequence and send it to block 158, where the data is converted to byte parallel, and sent to block 120 where is is serialized and transmitted in response over the fiber interface. Block 154 also controls the inserting of valid messages into the continuous sequence stream. Block 154 receives the Frame Transmit Request from the Message Frame Protocol Transmitter block 130 of FIG. 14, when block 130 has a valid message ready for transmission. At the appropriate instant, after the transmission of a complete IDLE sequence, block 154 responds to block 130 with the Frame Transmit Enable signal, which defines the interval when block 130 can use register 158 and transmitter module 122 to transmit a valid message. Synchronized with the completion of the valid message by the transmission of the link trailer, block 130 drops the Frame Transmit Request signal, which causes block 154 to drop the Frame Transmit Enable signal and to then return to transmitting continuous IDLE sequences.

Figure 17:
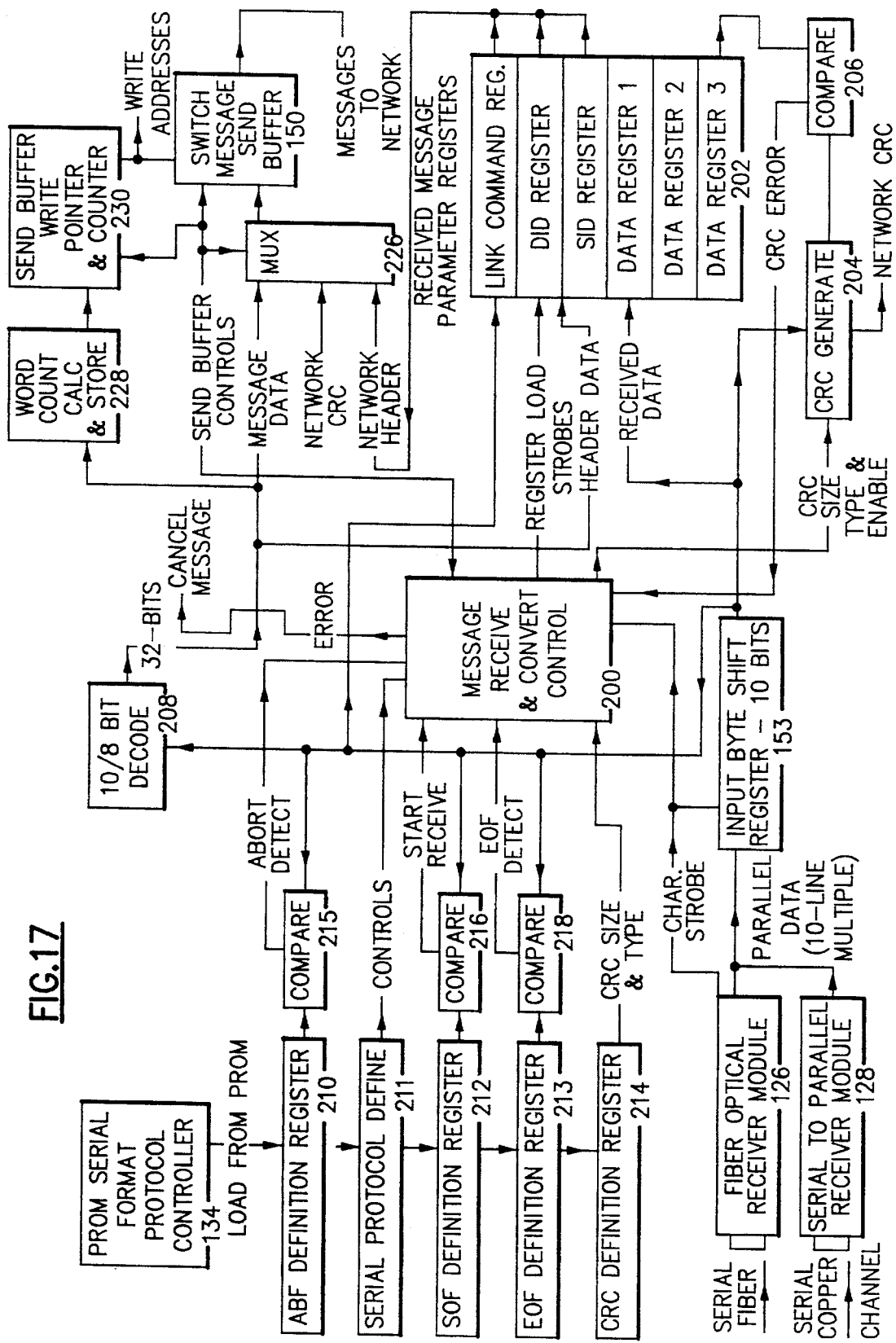
FIG. 17 shows a schematic block diagram of our preferred embodiment of the serial frame receive and protocol translation functions provided as a portion of the present invention to adapt serial data protocols to the preferred parallel switch protocol.

Referring to FIG. 17, a more detailed drawing of the Frame Interpreter and Protocol-to-Protocol Translator block t40 from FIG. 14 is shown, which is shown to contain 5 registers 210 to 214 which are initially loaded from PROM Serial Format Controller 134. The PROM 134 is uniquely programmed for every serial protocol supported by MMSA 20 and upon detecting power-on conditions, the contents of PROM 134 are loaded into registers, like 210 to 214, to control the subsequent operation of MMSA 20 in a unique manner to conform to the selected serial protocol. Register 212 defines the bit pattern for each byte in the SOF portion of the link header plus the number of bytes in the SOF. This not only allows the SOF bit patterns to be programmable, but it also controls the size of the SOF field. The incoming fiber is continuously monitored to determine if a continuous sequence or a valid message is being received. The serial bit stream is received into module 126 or 128 and converted to 10-bit parallel data which is stored in register 153. Register 153 looks for valid messages by examining every 10-bits arriving to check for the SOF sequence. Register 153 sends all incoming sequences to comparator 216 to check for an incoming pattern match against the SOF Definition Register 212.

Figure 19:
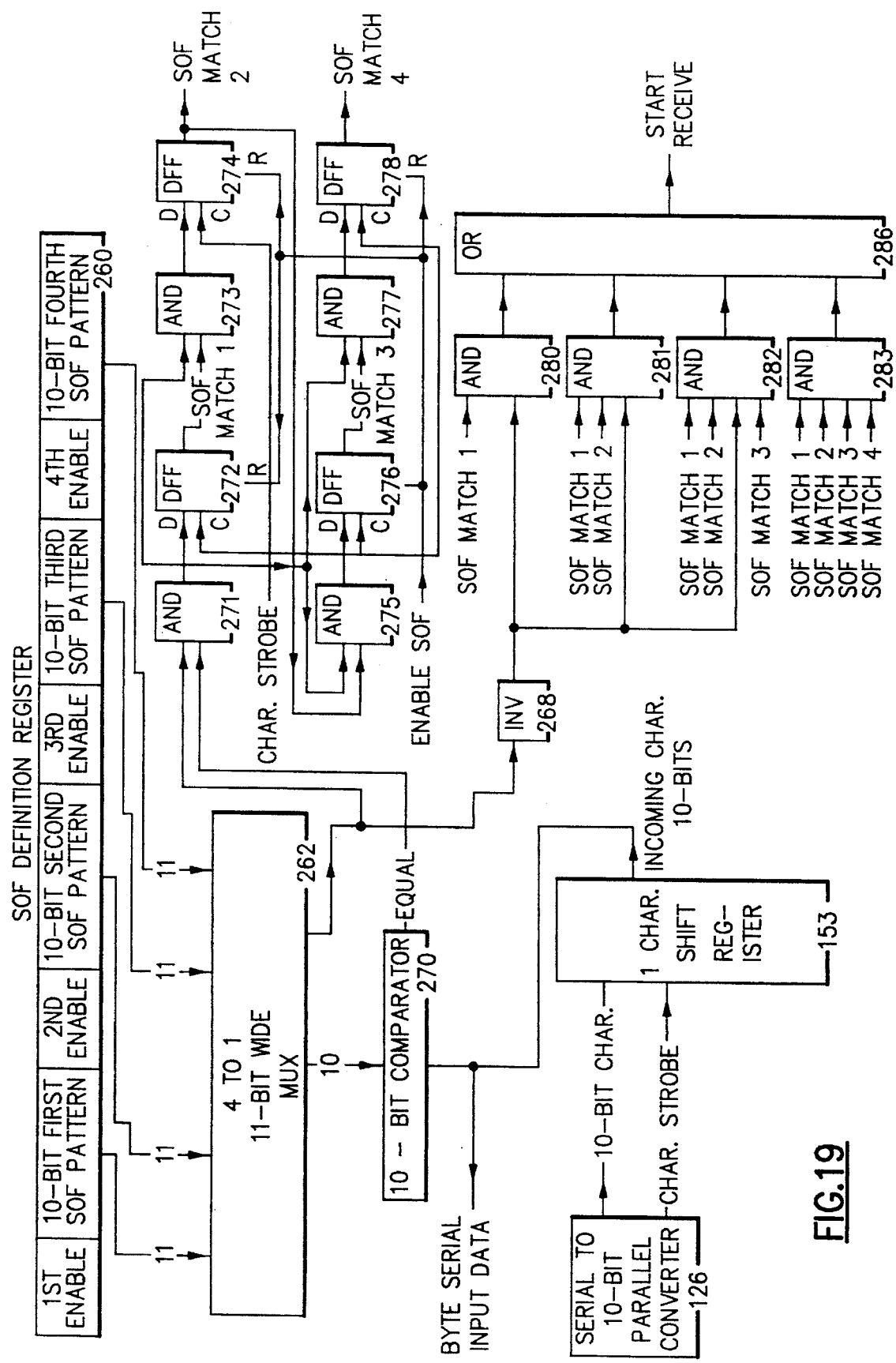
FIG. 19 shows a schematic logic diagram of our preferred embodiment of the serial frame receive and protocol translation function provided for the purpose of recognizing the start of a serial frame of message data arriving at the present invention over serial fiber or copper input channels.

Referring to FIG. 19, more specific details of the SOF checking logic is shown. The SOF Definition Register 212 is shown in more detail by block 260. Register 260 is organized in 11-bit sections—an Enable bit plus a 10-bit SOF pattern. The 11-bit values from Register 260 are multiplexed to form one 11-bit value at a time by MUX 262. 10 bits from MUX 262 are fed to comparator 270 to perform a compare against every incoming 10-bit pattern (coming through receiver module 126 to register 153). If the incoming 10-bits compare identically to the first SOF pattern and the first Enable bit is set as detected by gate 271, latch 272 is set to record that SOF Match 1 has occurred. MUX 262 steps to select the second 10-bit pattern from register 260 and compares that pattern to the next arriving 10-bit pattern from register 153. If the second 10-bit compare is successful and the second Enable bit is set as detected by gate 273, latch 274 is set to record that SOF Match 2 has occurred. MUX 262 steps to select the third 10-bit pattern from register 260 and compares that pattern to the next arriving 10-bit pattern from register 153. If the third 10-bit compare is successful and the third Enable bit is set as detected by gate 275, latch 276 is set to record that SOF Match 3 has occurred. MUX 262 steps to select the fourth 10-bit pattern from register 260 and compares that pattern to the next arriving 10-bit pattern from register 153. If the fourth 10-bit compare is successful and the fourth Enable bit is set as detected by gate 277, latch 278 is set to record that SOF Match 4 has occurred. This selection process could continue to perform further 10-bit compares; however, the preferred embodiment only proceeds through four compares and the preferred serial protocol only requires 2 compares to detect SOF. If all four 10-bit compares match, as detected by gate 283, then the output of OR gate 286 goes active indicating that a complete 4 value SOF sequence has been recognized and the start of a frame (SOF) containing a valid message is detected. The flexible SOF detection logic works equally well for SOF fields containing 1, 2 or 3 10-bit characters. For instance, if the SOF was defined to be only a one 10-bit character sequence, the second Enable bit in register 260 would be programmed to be a 0. This would cause the input to inverter 268 to go to a 0 after latch 272 was set to indicate the first 10-bit match. This would cause the inverter 268 to go to a one and enable gate 280 after the first match and subsequently cause the output of OR gate 286 to go active indicating that a 1 value SOF sequence has been recognized and the start of a frame (SOF) containing a valid message has been detected. If SOF was defined to be a two 10-bit character sequence, the third Enable bit in register 260 would be programmed to be a 0. This would cause the input to inverter 268 to go to a 0 after latches 272 and 274 were set to indicate the first two 10-bit matches. This would cause the inverter 268 to go to a one and enable gate 281 after the second match and subsequently cause the output of OR gate 286 to go active indicating that a 2 value SOF sequence has been recognized and the start of frame (SOF) containing a valid message has been detected. If SOF was defined to be three 10-bit character sequence, the fourth Enable bit in register 260 would be programmed to be a 0. This would cause the input to inverter 268 to go to a 0 after latches 272, 274, and 276 were set to indicate the three 10-bit matches. This would cause the inverter 268 to go to a one and enable gate 282 after the third match and subsequently cause the output of OR gate 286 to go active indicating that a 3 value SOF sequence has been recognized and the start of a frame (SOF) containing a valid message has been detected.

Figure 24A:
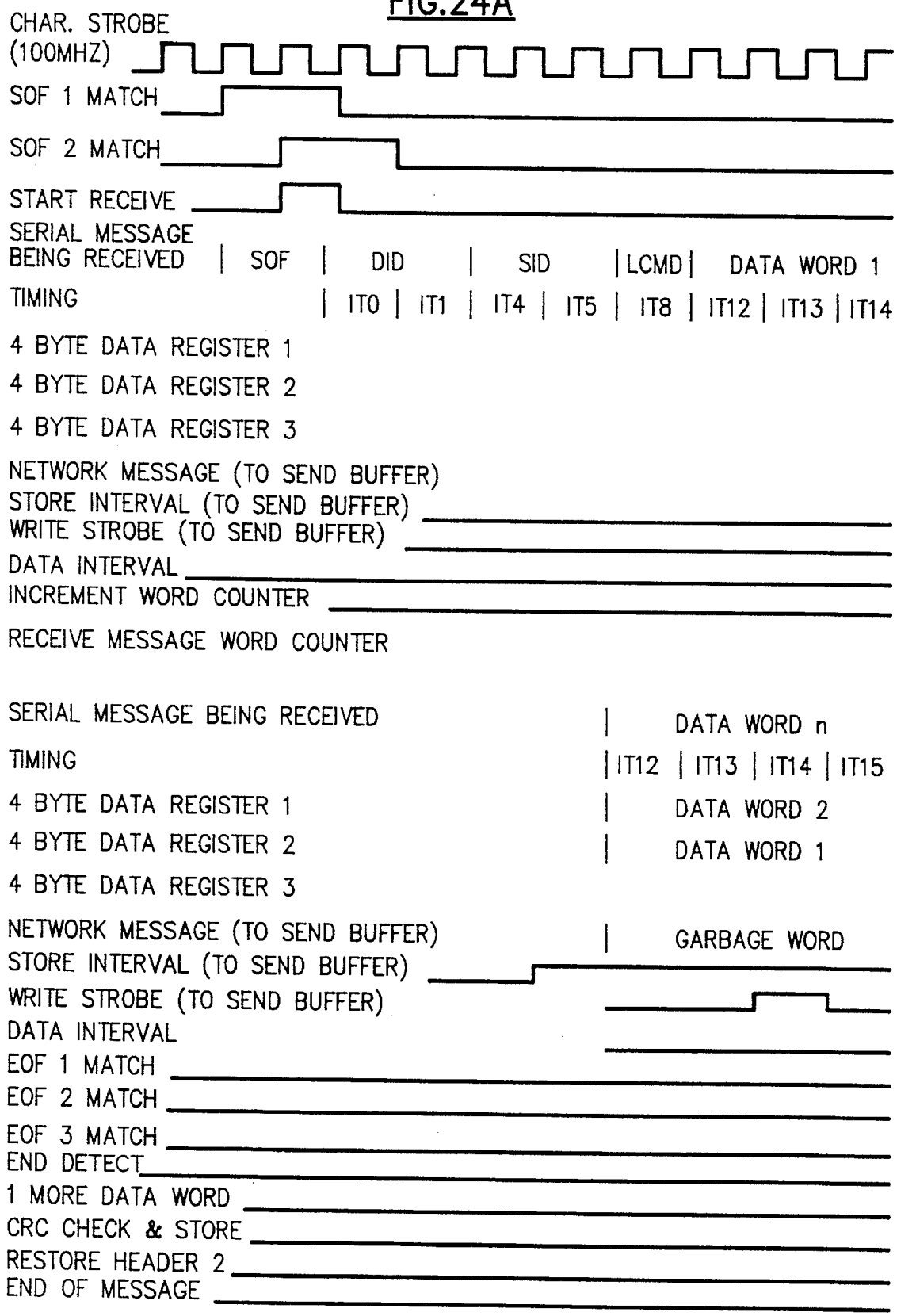
FIG. 24 is a timing diagram, which shows a typical example of the serial frame receive and protocol translation function of the present invention receiving and translating the protocol for a message frame received over the serial fiber or copper interface.

Referring to FIG. 24, the timing for the receive frame and interpretation logic is shown in regards to the functions shown in FIG. 17 performed by block 140 in FIG. 14. The timing shown is in regards to the preferred embodiment of the serial protocol which recognizes SOF based on two 10-bit characters. Thus, FIG. 24 shows SOF 1 and SOF 2 matches occurring and leading to the generation of the START RECEIVE signal 286 to indicate that an SOF has been recognized and that a valid message will follow. The MESSAGE RECEIVE & CONVERT CONTROL logic 200 (FIG. 17) then becomes active as started by the START RECEIVE signal 286 and begins to receive, interpret, and convert the incoming valid message.

Figure 22A:
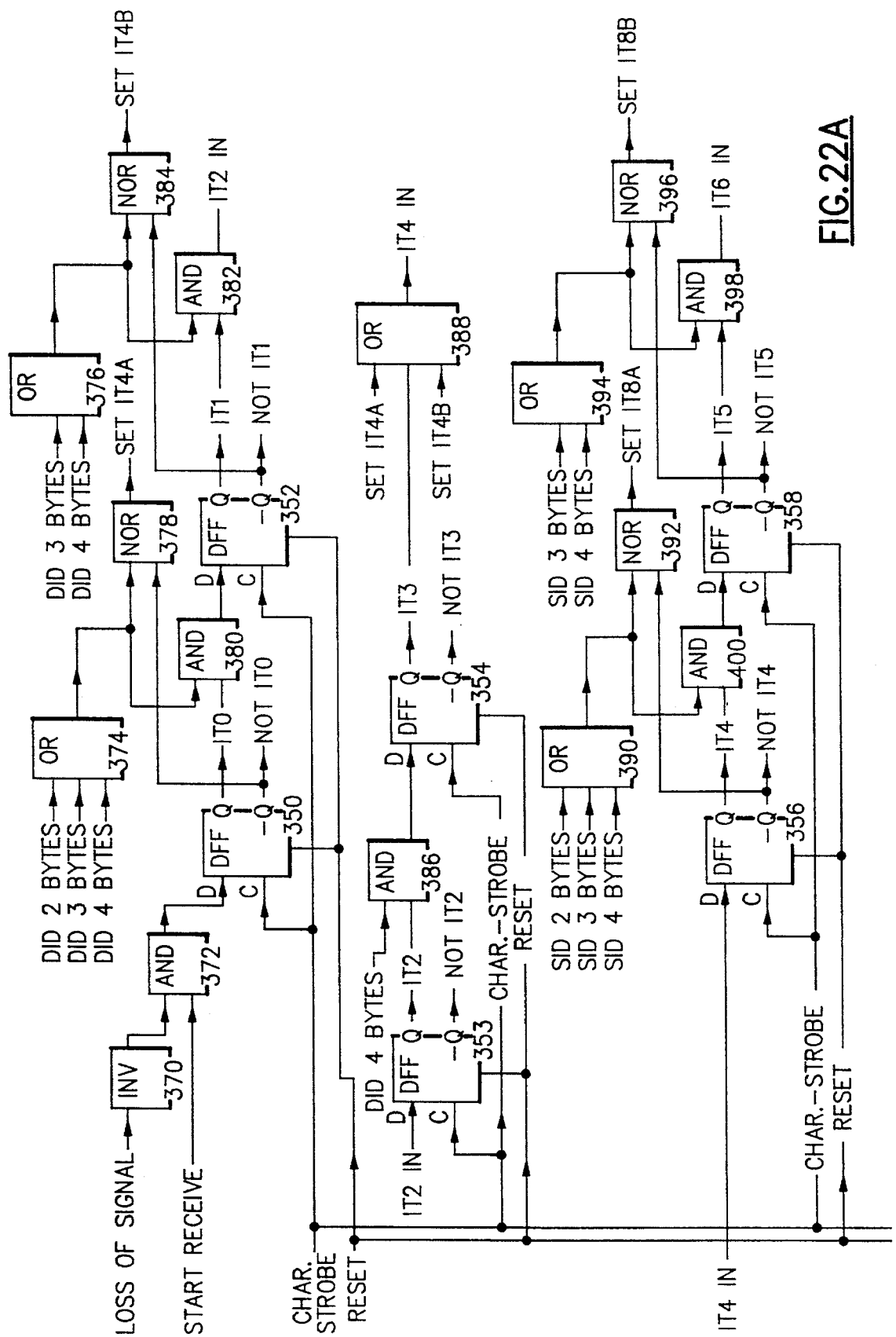
FIG. 22 shows a detailed logic diagram of the timing function of our preferred embodiment of the serial frame receive and protocol translation function of the present invention.
Figure 22B:
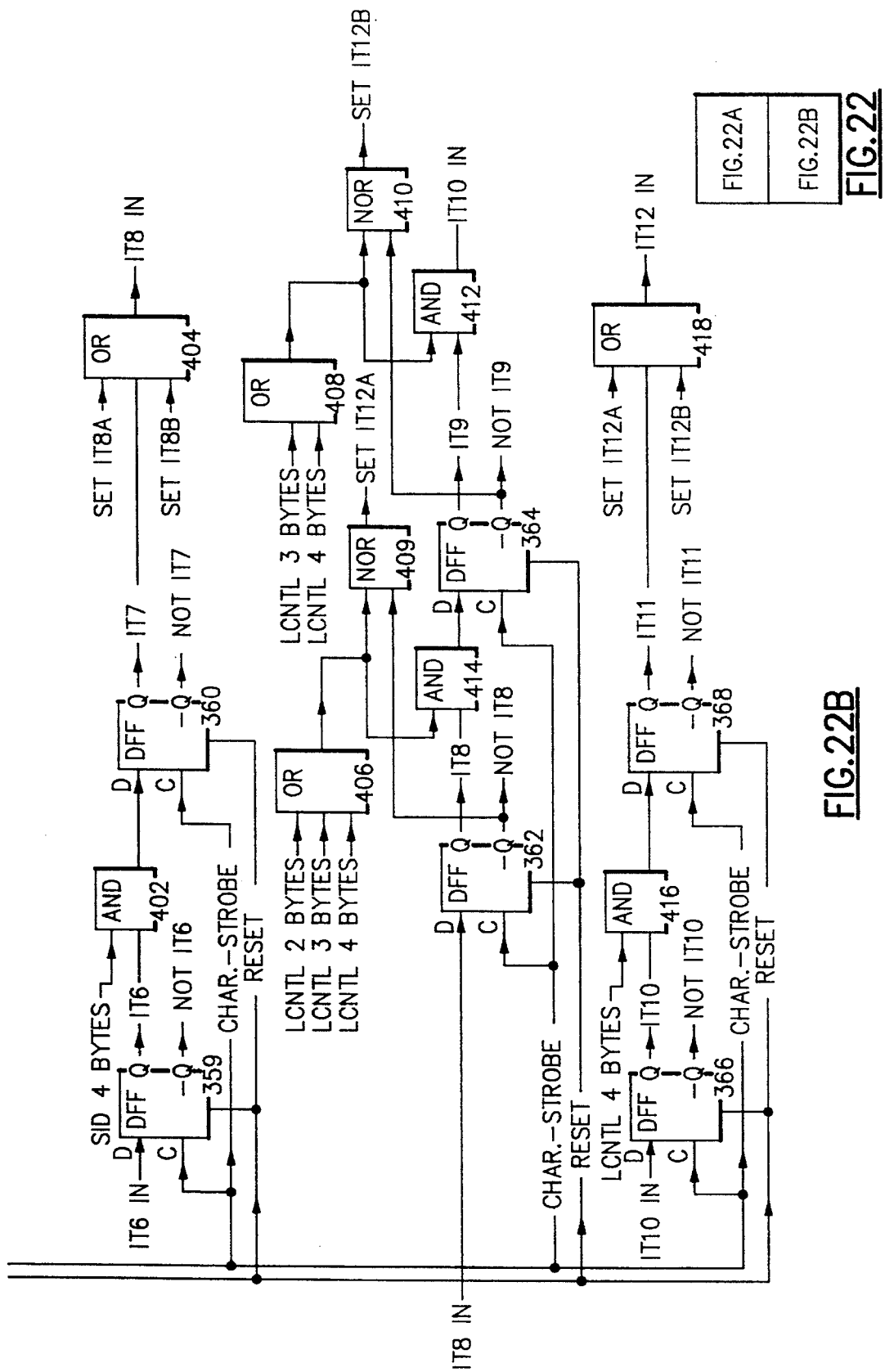
Figure 26:
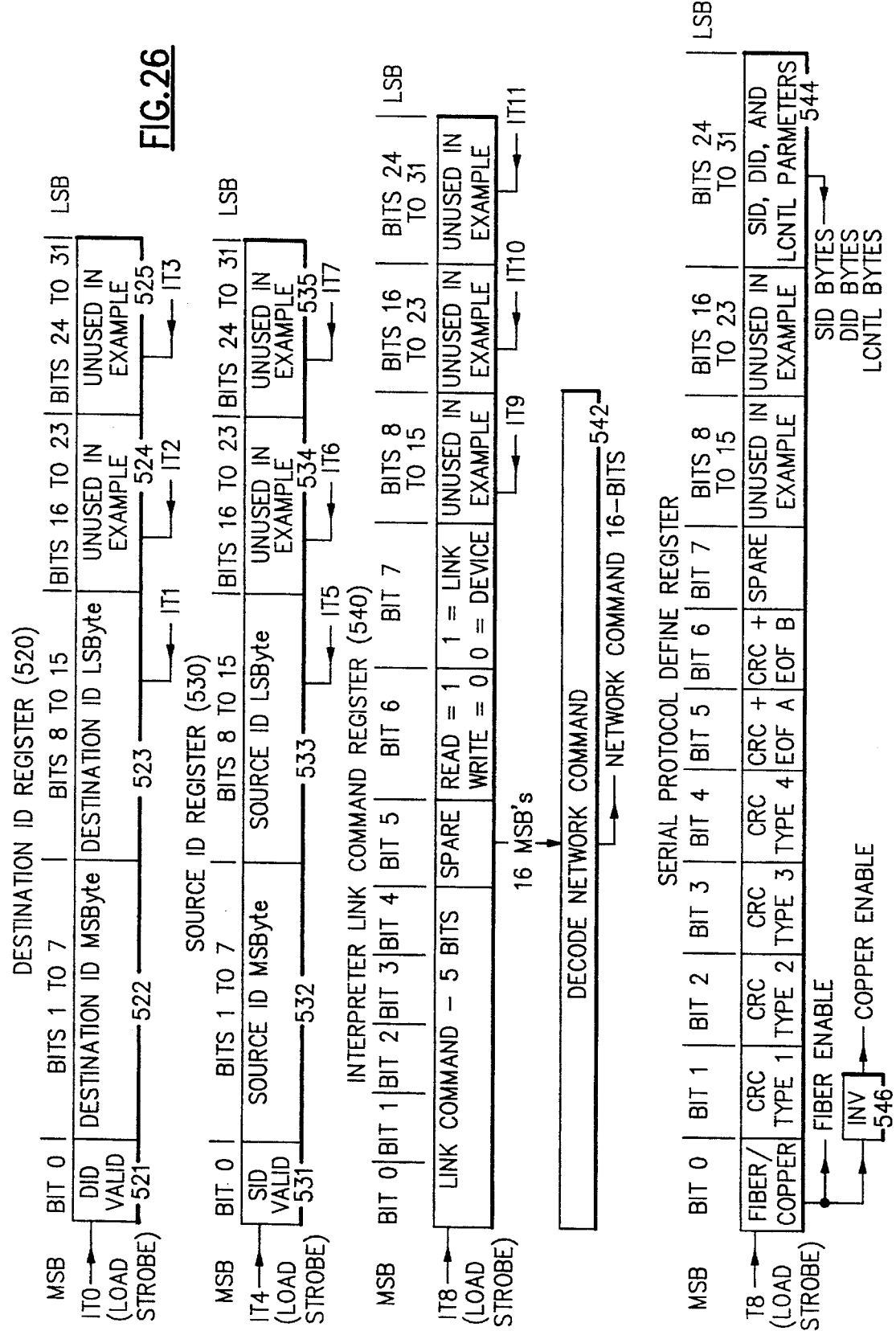
FIG. 26 shows a detailed logic diagram of the message parameter registers required by our preferred embodiment of the serial frame receive and protocol translation function of the present invention to translate protocols.

Referring to FIG. 22, more specific details of the MESSAGE RECEIVE & CONVERT CONTROL logic 200 (FIG. 17) is shown. The START RECEIVE signal 286 becoming active to gate 372 starts the timing logic by causing latch 350 to set upon the arrival of the next 10-bit character after the two SOF characters, the next arrival is indicated by the Char. Strobe signal from Module 126 (FIG. 17). Latch 350 defines the IT0 signal (Interpreter Time 0) as the very first interval of time following the SOF detection. For the preferred serial protocol, the first two characters following the SOF characters define the DID field of the link header as shown in FIG. 24, and the DID field occurs during IT0 and IT1 times. When the next Char. Strobe following IT0 loads the second DID character into register 153, at the same time IT1 latch 352 sets and IT0 latch resets to indicate that the second DID character has arrived. The length of the DID field, like the length of the SOF, is programmable based on the value stored into the SERIAL PROTOCOL DEFINE Register 211 (FIG. 17) during the initial lead of data from the PROM Serial Format Protocol Controller 134. The SERIAL PROTOCOL DEFINE Register 211 is shown in more detail in FIG. 26 as block 544. Block 544 generates some programmable signals which define whether the length of the field as DID 2 BYTES, DID 3 BYTES, or DID 4 BYTES. These DID control signals are used in FIG. 22 in gates 374, 376, and 386 to determine the length of the DID field and to control the associated timing logic. If DID 2 Bytes is active, as in our example of the preferred serial protocol, the IT1 latch 352 is set next and marks the arrival of the second DID character (or byte). If DID 3 Bytes is active, the IT1 latch sets as well as the IT2 latch 353, which marks the arrival of the third DID character. If DID 4 Bytes is active, the the IT1 and IT2 latches set as well as the IT3 latch 353, which marks the arrival of the fourth DID character. However, for the preferred serial protocol with DID 2 Bytes being set, IT2 and IT3 do not get set but are skipped and IT4 follows IT1 as shown in FIG. 24. When DID 3 Bytes and DID 4 Bytes are zeroes, gate 376 goes to a zero and causes gate 384 to go to a 1 and set IT4 latch 356 through gate 388, immediately following IT1 when the next Char. Strobe following IT1 loads the first SID character into register 153. At the same time IT4 latch 356 sets, IT1 latch 352 gets reset.

For the preferred serial protocol, the first two characters following the DID characters define the SID field of the link header as shown in FIG. 24, and the SID field occurs during IT4 and IT5 times. When the next Char. Strobe following IT4 loads the second SID character into register 153, at the same time IT5 latch 358 sets and IT4 latch 356 resets to indicate that the second SID character has arrived. The length of the SID field, like the length of the DID, is programmable based on the value stored into the SERIAL PROTOCOL DEFINE Register 211 (FIG. 17) during the initial load of data from the PROM Serial Format Protocol Controller 134. The SERIAL PROTOCOL DEFINE Register 211 is shown in more detail in FIG. 26 as block 544. Block 544 generates some programmable signals which define whether the length of the field as SID 2 BYTES, SID 3 BYTES, or SID 4 BYTES. These SID control signals are used in FIG. 22 in gates 390, 394, and 402 to determine the length of the SID field and to control the associated timing logic. If SID 2 Bytes is active, as in our example of the preferred serial protocol, the IT5 latch 358 is set next and marks the arrival of the second SID character (or byte). If SID 3 Bytes is active, the IT5 latch sets as well as the IT6 latch 359, which marks the arrival of the third SID character. If SID 4 Bytes is active, the the IT5 and IT6 latches set as well as the IT7 latch 360, which marks the arrival of the fourth SID character. However, for the preferred serial protocol with SID 2 Bytes being set, IT6 and IT7 do not get set but are skipped and IT8 follows IT5 as shown in FIG. 24. When SID 3 Bytes and SID 4 Bytes are zeroes, gate 394 goes to a zero and causes gate 396 to go to a 1 and set IT8 latch 362 through gate 404, immediately following IT5 when the next Char. Strobe following IT5 loads the first Link Control character into register 153. At the same time IT8 latch 362 sets and IT5 latch 358 gets reset.

For the preferred serial protocol, the first character following the SID characters defines the Link Control field of the link header as shown in FIG. 24, which occurs during IT8 time. The length of the LCNTL (Link Control) field, like the length of the DID and SID fields, is programmable based on the value stored into the SERIAL PROTOCOL DEFINE Register 211 (FIG. 17) during the initial load of data from the PROM Serial Format Protocol Controller 134. The SERIAL PROTOCOL DEFINE Register 211 is shown in more detail in FIG. 26 as block 544. Block 544 generates some programmable signals which define whether the length of the field as LCNTL 2 BYTES, LCNTL 3 BYTES, or LCNTL 4 BYTES. These LCNTL control signals are used in FIG. 22 in gates 406, 408, and 416 to determine the length of the LCNTL field and to control the associated timing logic. If LCNTL 2 Bytes is active, the IT9 latch 364 is set next and marks the arrival of the second LCNTL character (or byte). If LCNTL 3 Bytes is active, the IT9 latch sets as well as the IT10 latch 366, which marks the arrival of the LCNTL character. If LCNTL 4 Bytes is active, the the IT9 and IT10 latches set as well as the IT11 latch 368, which marks the arrival of the fourth LCNTL character. However, for the preferred serial protocol the LCNTL fiels is only one character in length as defined by all 3 LCNTL Byte signal being zeroes from register 544. Therefore, IT9, IT10, and IT11 do not get set but are skipped and IT12 follows IT8 as shown in FIG. 24. When LCNTL 2 Bytes, LCNTL 3 Bytes, and LCNTL 4 Bytes are all zeroes, gate 406 goes to a zero and causes gate 409 to go to a 1 and set IT12 latch 420 (FIG. 23) through gate 418, immediately following IT8 when the next Char. Strobe following IT5 loads the first message data character into register 153. At the same time IT12 latch 420 sets and IT8 latch 362 gets reset. As the DID, SID and Link Control Command characters arrive into logic block 140 in FIG. 14, as shown in detail by FIG. 17, they are processed during times IT0 to IT11 and stored into the associated registers in block 202 of FIG. 17. The processing involves converting them from 10-bit characters to 8-bit bytes by the 10 to 8-bit decoder 208. For the preferred serial protocol, the only conversion required for the link header and message data is the 10 to 8-bit conversion. However, there is nothing to inhibit the present invention from performing more complex conversions that can be programmable and defined by unused bits in register 544 of FIG. 26. These registers block 202 which receive the converted link header data are further detailed in FIG. 26. The DID register 520 can store up to 4 bytes of data with sections 521 and 522 being loaded from data stored in register 153, which is converted by block 208 and stored into register 520 at IT0 time. Likewise, section 523 of register 520 is loaded at IT1 time, section 524 is loaded at IT2 time when the 3 byte option is enabled, and section 525 is loaded at IT3 time when the 4 byte option is enabled, with all sections being loaded from data stored in register 153 which is converted by block 208.

The SID register 530 can store up to 4 bytes of data with sections 531 and 532 being loaded from data stored in register 153, which is converted by block 208 and stored into register 530 at IT4 time. Likewise, section 533 of register 530 is loaded at IT5 time, section 534 is loaded at IT6 time when the 3 byte option is enabled, and section 535 is loaded at IT7 time when the 4 byte option is enabled, with all sections being loaded from data stored in register 153 which is converted by block 208.

The LCNTL Command register 540 can store up to 4 bytes of data with MSB 8-bits being loaded from data stored in register 153, which is converted by block 208 and stored into register 540 at IT8 time. Likewise, other bytes of register 540 can be loaded at IT9 to IT 11 times, if the multiple byte option is enabled. Block 542 shows an example of a more complex conversion where bits 16 to 23 of register 544 define how the 8-bit command in register 540 is converter into a 16 bit command to be sent to network 30.

Referring to FIG. 24, the timing shows that starting at time IT12 the data portion of the message begins arriving, with four 10-bit characters arriving serially into register 153 and being converted to 8-bit bytes which are stored into the data registers of block 202, where they are accumulated into 4 byte (32-bit) data words. One byte of data is clocked into the 4-byte register every IT12 to IT15 time. For the preferred serial protocol, the first data character follows immediately after the LCNTL character. The next Char. Strobe following IT8 loads the first data character into register 153 and sets IT12, at the same time IT8 latch 362 resets. The length of the message data is variable with a new data byte following every Char. Strobe time until the link trailer is detected.

Figure 23A:
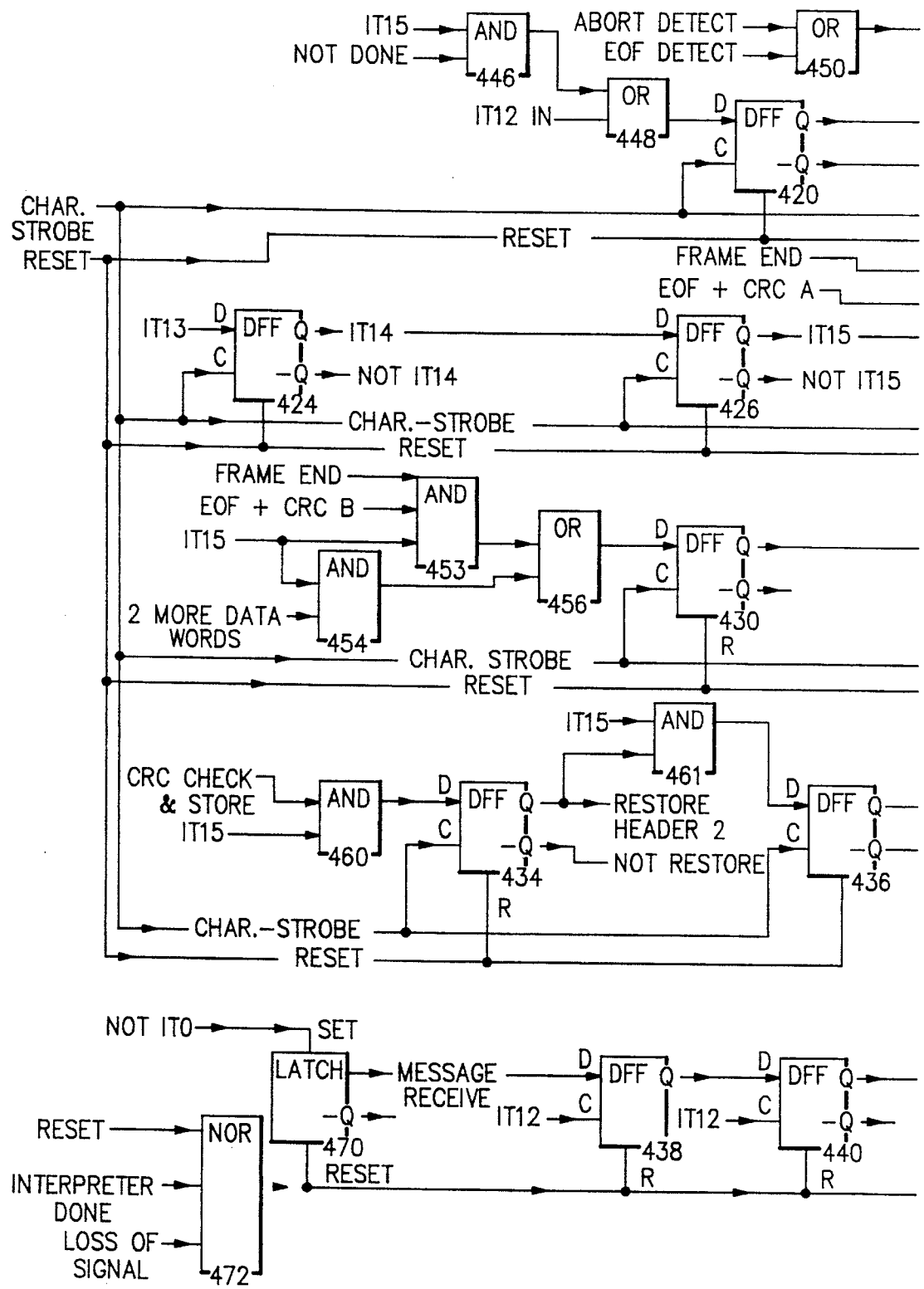
FIG. 23 shows an additional detailed logic diagram of the timing and control function of our preferred embodiment of the serial frame receive and protocol translation function of the present invention.
Figure 23B:
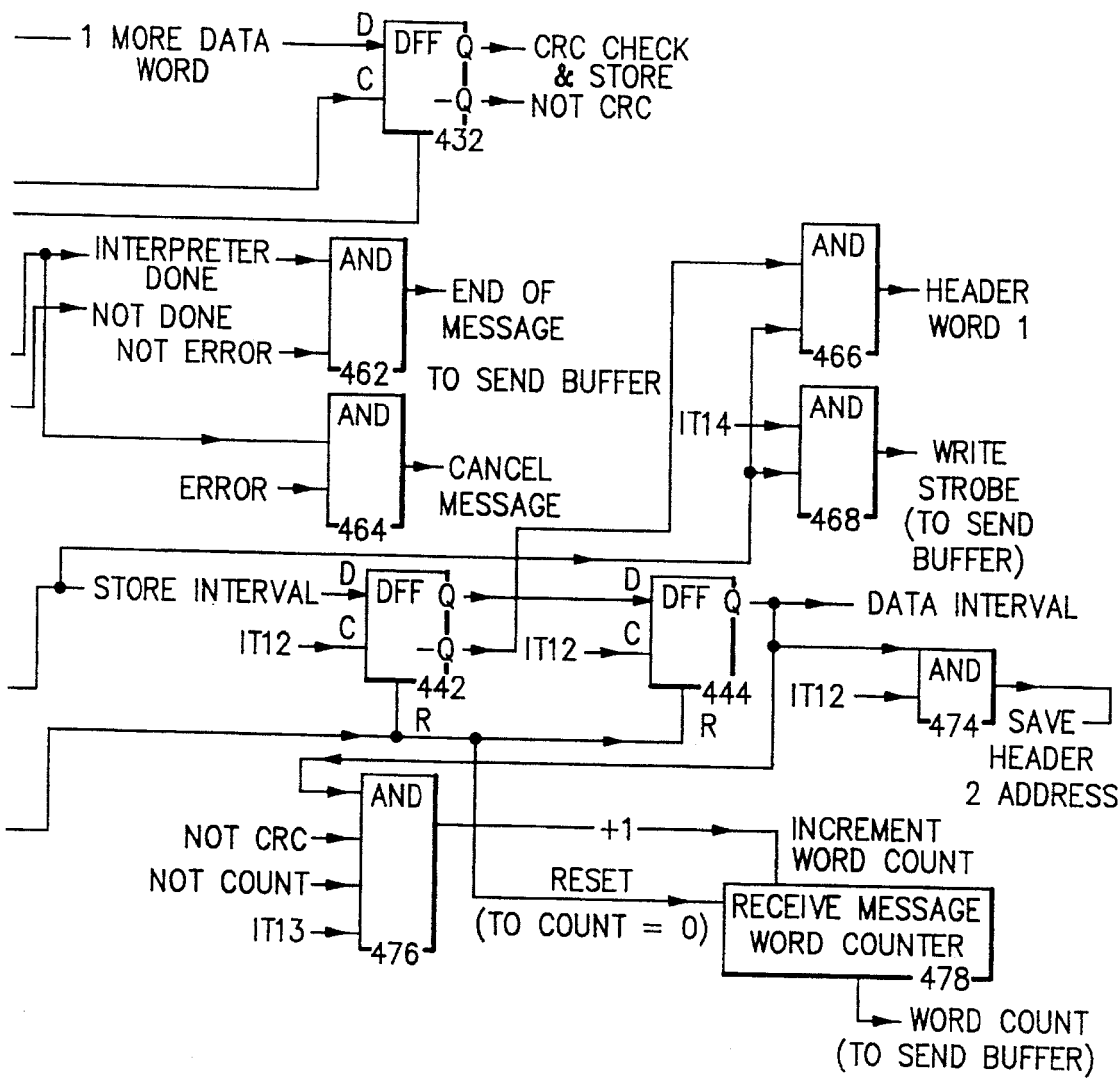

FIG. 23 shows the generation of the IT12 to IT15 signals. Gate 448 allows the input from the LCNTL logic to set IT12 latch 420 after the LCNTL field has completely arrived and been stored in register 540 of FIG. 26. The next Char. Strobe signal causes IT12 latch 420 to set IT13 latch 422, while IT12 latch 420 gets reset. Likewise, the two following Char. strobes set the IT14 latch 424 and IT15 latch 426 and complete the detection of a 4-byte data entity. The timing then recycles for every successive 4 bytes as shown in FIG. 24, with IT15 causing IT12 to set again. This occurs through gate 446 which goes active at IT15 time as long as the end of the data has not been detected. Gate 446 causes gate 448 to go active and causes IT12 to be repeated after every IT15 time.

Figure 25A:
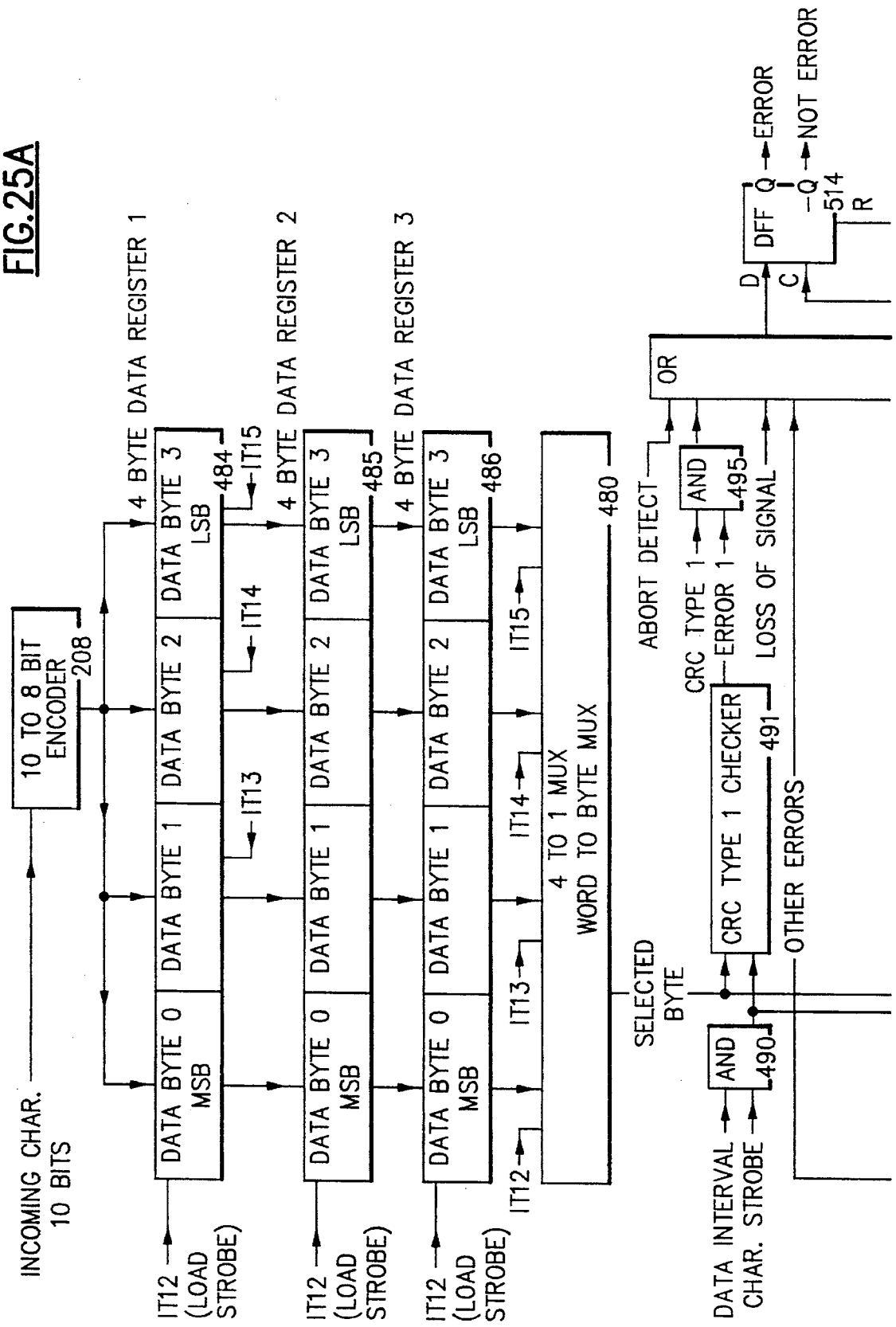
FIG. 25 shows a detailed logic diagram of the function performed by our preferred embodiment of the serial frame receive and protocol translation function of the present invention to reconstruct the serial message frame into the protocol to be sent to the parallel switch network.

Referring to FIG. 25, more detail is shown for the data registers of block 202 of FIG. 17. Incoming 10-bit data is converted to 8-bit bytes by block 208 and then stored into 4-byte Data Register 1 block 484 with one byte being stored at IT12 time, one at IT13 time, one at IT14 time, and one at IT15 time, until 4 bytes have been accumulated. At the next IT12 time, the 4-bytes accumulated in block 484 are simultaneously shifted to 4-byte Data Register 2 block 485, as the next incoming byte is stored in Data Byte 0 of block 484 (also at IT12 time). When the next IT12 time occurs, 4-bytes in block 485 are simultaneously shifted to 4-byte Data Register 3 block 486, while the 4-bytes accumulated in block 484 are simultaneously shifted to 4-byte Data Register 2 block 485, and the next incoming byte is stored in Data Byte 0 of block 484 (also at IT12 time). From 4-byte Data Register 3, the data is moved to the Switch Message Send Buffer 160 of FIG. 14, as it prepares to become a message to be sent to network 30. FIG. 14 shows the timing of the three 4-byte Data Registers as incoming data words are shifted from one register to another.

Figure 18:
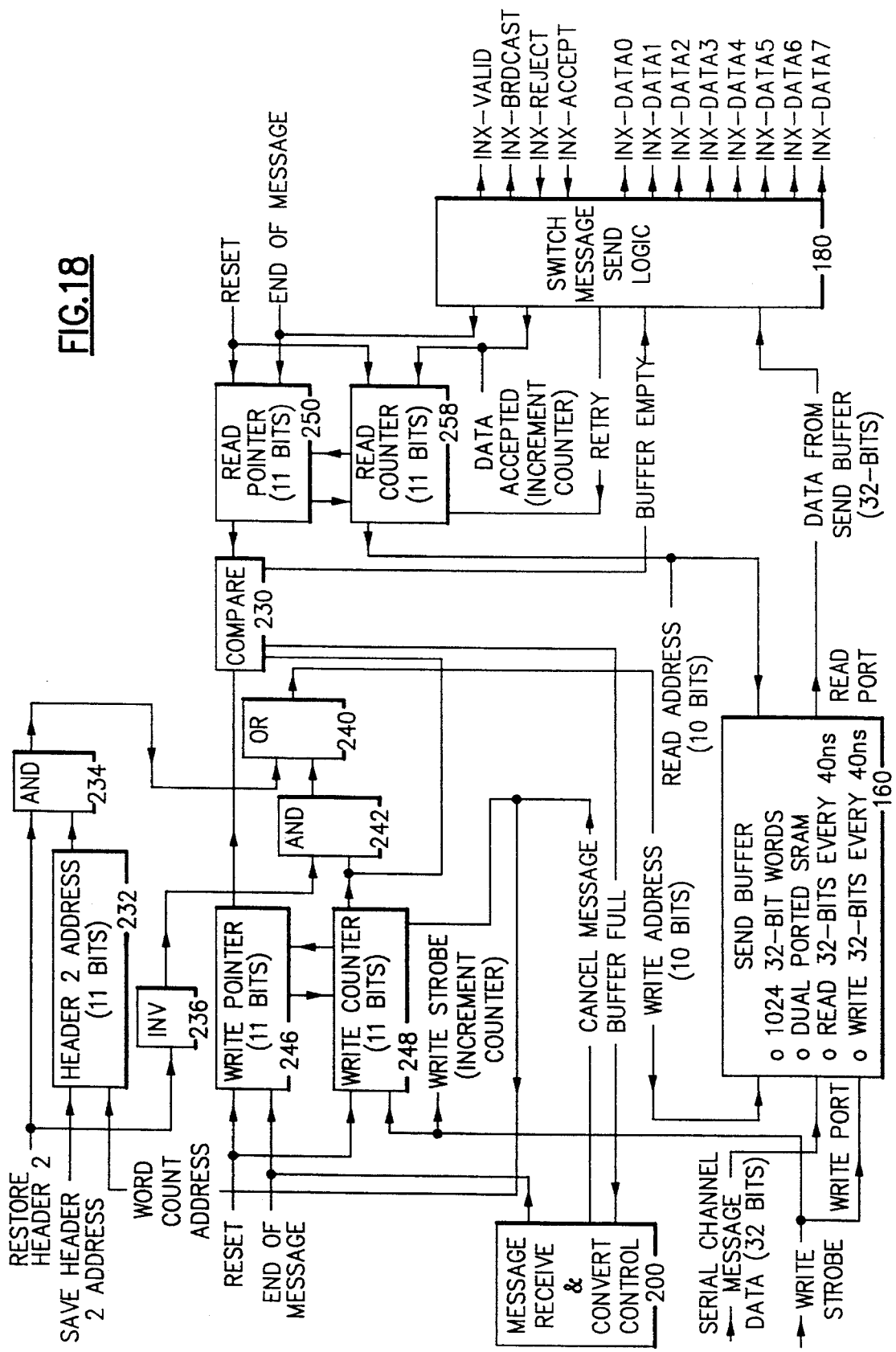
FIG. 18 shows a schematic block diagram of our preferred embodiment of the buffer memory for the purpose of temporarily storing messages being sent from the serial channels to the parallel switch network.

Referring to FIG. 18, the converted message is stored in the Switch Message Send Buffer 160 until it is received in full, then the Switch Message Send logic 180 reads the data message from buffer 160 and sends it over the parallel switch network 30. Block 200 controls the writing of Serial Channel Message Data, 32-bit words, into buffer 160 as commanded by the WRITE STROBE signal. The Send Buffer 160, for the preferred embodiment, contains 1024 32-bit words and is dual ported, so that one 32-bit word write and one 32-bit word read can occur simultaneously at a 25 MHZ rate (every 40 ns), which provides the capability of supporting up to a 1 gigabyte/sec serial data rate. The write function to Send Buffer 160 is controlled by two 11-bit entities: a write pointer 246 and a write counter 248. A Reset signal shall reset both of these 11-bit values to all zeroes. As block 200 writes each word into the write port of the buffer, the write counter 248 is used to address the write port of buffer 160 through gates 242 and 240. When each 32-bit write is complete, the write counter increments with the fall of the WRITE STROBE signal from block 200 in preparation for the next write operation. Block 200, after storing a complete valid message to buffer 150, sends the END OF MESSAGE signal, which sets the write pointer 246 equal to the write counter 248 to indicate that the valid message has been successfully stored to buffer 160. Block 200 can cancel a message or partial message from buffer 160 by issuing the CANCEL MESSAGE signal, which rolls back the value of write counter 248 by setting write counter 248 equal to the write pointer 246, pointing it back to the beginning of where the valid message was written or partially written, so that it can be rewritten correctly at a later time. When the ten low-order bits of write pointer 246 are equal to the ten low-order bits of write counter 248, as detected by comparator 238, but the high-order bit is different, buffer 160 is completely full and the BUFFER FULL signal is sent to block 200. As long as the BUFFER FULL condition exists, block 200 is prevented from doing further writes to the buffer.

The Switch Message Send logic 180 reads 32-bit words from buffer 160 and sends them to network 30. The read function is controlled by two 11-bit entities: read pointer 250 and read counter 258. A Reset signal shall reset both of these 11-bit values to all zeroes. As block 180 reads each word from the buffer, the read counter 258 is used to address the read port of buffer 160 directly. When each 32-bit read is complete, the read counter increments with the fall of the DATA ACCEPTED signal from block 180 in preparation for the next read operation. Block 180, after reading and successfully transmitting a complete valid message over network 30 from buffer 160, sends the END OF MESSAGE signal, which sets the read pointer 250 equal to the read counter 258 to indicate that the valid message has been successfully transmitted. This action effectively removes the transmitted message from the buffer and steps to the beginning of the next message to be transmitted. This clears space in buffer 160 to be used again by a future valid message. Block 180 can retry the transmission of a message or partial message to network 30 from buffer 160 by issuing the RETRY signal, which rolls back the value of read counter 258 by setting read counter 258 equal to the read pointer 250, pointing it back to the beginning of the valid message so that it can be reread. When the eleven bits of write pointer 246 are equal to the eleven bits of read pointer 250, as detected by comparator 238, buffer 160 is empty and the BUFFER EMPTY signal is sent to block 180. As long as the BUFFER EMPTY condition exists, block 180 is informed that there are no valid messages waiting to be sent to network 30. When block 200 stores a complete valid message to an empty buffer 160 and advances write pointer 246 by issuing the END OF MESSAGE signal, the write pointer 246 no longer equals the read pointer 250, which is detected by comparator 238 and deactivates the BUFFER EMPTY signal to block 180, informing it that there is now a valid message to be sent to network 30.

Figure 27:
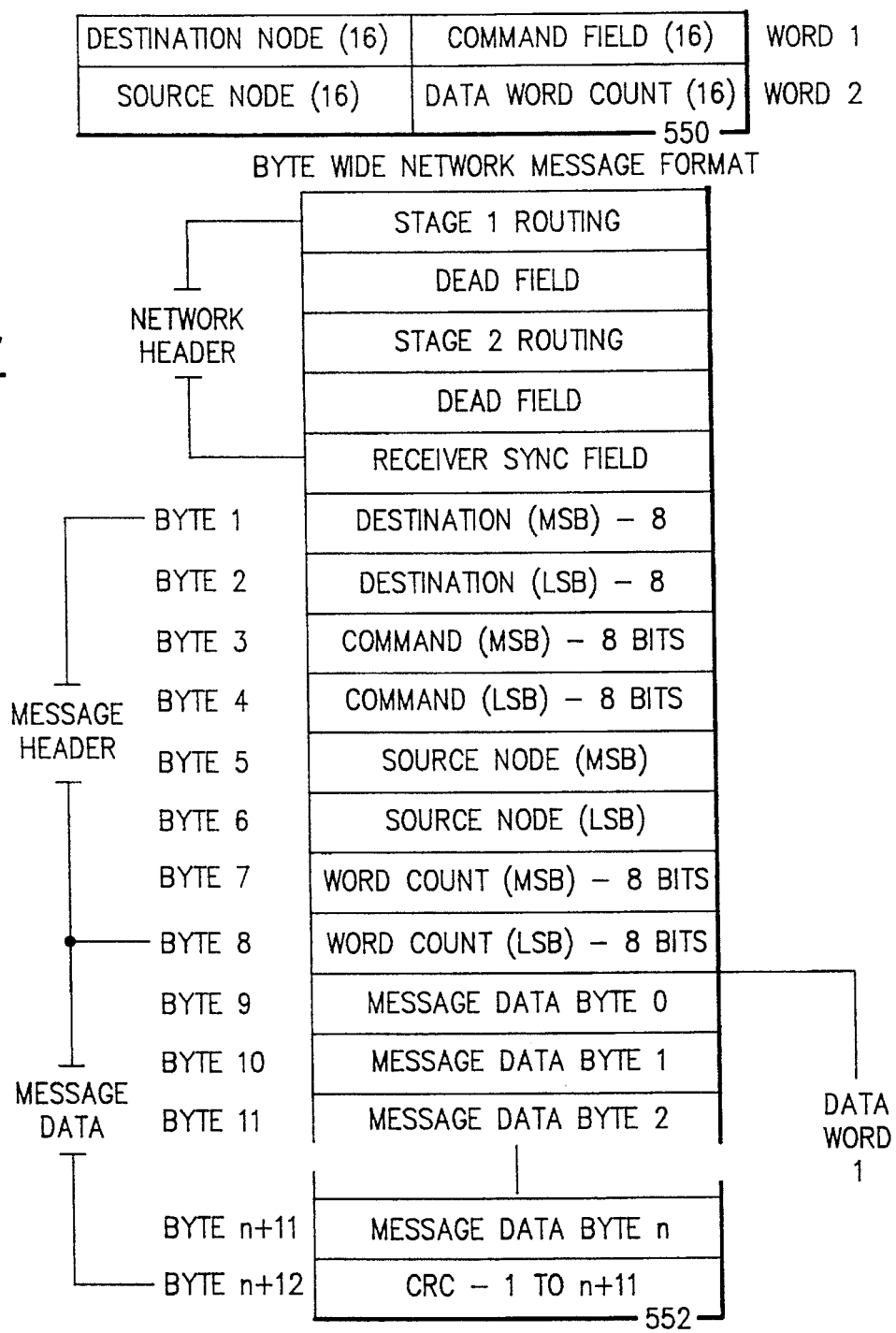
FIG. 27 shows a schematic diagram of the preferred embodiment of the parallel switch protocol and the command field provided as a means of communication with the switching network by the present invention.

The function of block 140 of FIG. 14 is to write a valid message to buffer 160 that is converted to the message format required by network 30. FIG. 27 shows the message format required by the preferred embodiment of network 30. The network 30 requires that a valid message have a two 32-bit word Message Header, as shown by block 550. Word 1 of the Message Header contains the destination node number that defines which node is to receive the valid message (the converted DID value), and the command field defining the type of message and other message control parameters, as shown in detail by block 554 (this is the converted LCNTL field). Word 2 of the message header contains the source node number that is generating the valid message (the converted SID value) and word count of the actual message data (excluding the two message header words). Block 180 reads the valid message from buffer 160 and sends a message over network 30 that is byte wide and has the content shown by block 552. Block 180 uses the destination field to locate the receiving the node and to determine a path through network 30 to the destination node. Block 180 makes up the Network Header from the destination field and prefixes the message with the Network Header as shown by block 552 to be used by network 30 to route the valid message to the proper destination and to synchronized the receiving node when the data arrives. Network 30 strips the Network Header from the valid message as it makes its way through the network, stage by stage, and the receiving node strips the RECEIVER SYNC FIELD after it gets in synchronization with the incoming message. Therefore, the actual valid message that gets moved from the source node to the destination node over network 30 is the Message Header and Message Data portion of the message format shown in block 552. The Message Header portion of block 552 is the exact same two word header shown by block 550, just broken into individual bytes for transmission over network 30. The Message Data portion of block 552 is the data words which are stored sequentially to buffer 160 by block 140; however, they are broken into individual bytes for transmission over network 30. The last portion of block 552 is a CRC field which is sent last and used to check the accuracy of the valid message.

The function of block 140 of FIG. 14 is to write a valid message to buffer 160; i.e., a message which is converted to the message format required by network 30 so that buffer 160 contains the proper two word Message Header, the Message Data words, and the CRC field. Block 140 does this by writing a 32-bit word to buffer 160 every IT12 to IT15 time period, except for the first one, as shown in FIG. 24 by the NETWORK MESSAGE (TO SEND BUFFER) line of the timing diagram. FIG. 24 shows the network message format being created in buffer 160 by first writing Header Word 1 to buffer 160 at the second IT12 to IT15 time. However, block 140 has a problem in creating Header Word 2 of the NETWORK MESSAGE, because the preferred serial protocol does not transmit a Word Count value. Thus, a Word Count Value is not immediately available as required by the network message protocol as shown by block 550 of FIG. 27. The preferred serial protocol sent by the source node permits a variable number of data words to be transmitted as determined by the detection of the EOF field. Thus, block 140 can eventually determine the word count as the data words are received from the serial interface and counted, but it does not know this word count early in the message to be able to store an accurate Header Word 2 during the third IT12 to IT15 time period. The way block 140 solves this problem is that block 140 stores a garbage 32-bit word to buffer 160 in the initial Header Word 2 slot to reserve a place for Header Word 2 in the sequential order of the message. Block 140 then returns to the Header Word 2 slot at the very end of the message, after it has calculated the data word count value and restores the Header Word 2 slot in buffer 160 with the correct value, as shown in FIG. 24.

Referring to FIG. 18, the detailed logic 228 and 230 (FIG. 17) required to reserve the Header Word 2 slot in buffer 160 and to find that slot later is shown. The output of word counter 248 is sent to register 232, which saves the Header 2 slot address. Block 200 issues the SAVE HEADER WORD 2 signal during the third IT12 to IT15 time period during the time it is writing garbage into Header Word 2 slot. This causes the address of Header Word 2 in buffer 160 to be saved in register 232 for later use. At the end of the message, after the CRC value is stored to buffer 160, block 200 issues the CORRECT HEADER 2 SLOT signal, which causes register 232 to address buffer 160 through gates 234 and 240, so that the reserved Header 2 slot can be rewritten. This completes the entire write of the valid message to buffer 160, and then the END OF MESSAGE signal can be issued as shown in FIG. 24.

Referring to FIG. 23, latch 470 sets at IT0 time and stays active for the duration of the MESSAGE RECEIVE interval until reset by gate 472 when the message interpretation is done, a reset signal is issued, or the Continuous Sequence block 132 of FIG. 14 detects a loss of the incoming signal or a return to a continuous sequence. Latch 438 sets at the first IT12 time and is active for the duration of the message receive operation from the first IT12 to IT15 time period and thereafter. Latch 440 sets at the second IT12 time and is active for the duration of the message receive operation from the second IT12 to IT15 time period and thereafter. Latch 442 sets at the second IT12 time and is active for the duration of the message receive operation from the second IT12 to IT15 time period and thereafter. Latch 444 sets at the third IT12 time and is active for the duration of the message receive operation from the third IT12 to IT15 time period and thereafter. The combination of latch 440 being set and latch 442 not being set is decoded in gate 466 and defines the second IT12 to IT15 time period when Header Word 1 is written into buffer 160. Gate 474 provides the proper timing pulse to register 232 to cause it to save the Header 2 slot address for later use. DATA INTERVAL latch 444 defines the IT12 to 15 time periods that are used to store message data words to buffer 160; the DATA INTERVAL timing is shown in FIG. 24. Latch 444 is used to enable the calculation of the number of data words stored into buffer 160, for later use in Header Word 2. Latch 444 enables counter 478 to count the number of incoming data words until the link trailer is detected, as shown by the timing of the INCREMENT WORD COUNTER signal in FIG. 24. Gate 468 generates the WRITE STROBE signal to buffer 160 at every IT14 time starting with the Header Word 1 slot and continuing through the storing of the corrected Header Word 2 as shown in FIG. 24.

Referring to FIGS. 25, Serial Channel Message Data that is written to buffer 160 (32-bits at at time) as it is assembled in the correct order by a multiplexer built from gates 503 to 507. Header Word 1 is gated to buffer 160 at the second IT12 to IT15 time period by gate 506 through gate 507 from a combination of the high order 16 bits from register 520 (DID) and 16 bits of the decoded network command from block 542 of FIG. 26. Message Data Words are gated to buffer 160 from 4-byte Data Register 3 of FIG. 25 during the DATA INTERVAL signal 444 time period through gates 505 and 507. The sending of Data Words to buffer 160 continues every IT12 to IT15 time period during DATA INTERVAL 444 until the EOF or ABORT sequences are detected in the serial stream of incoming data.

Figure 20:
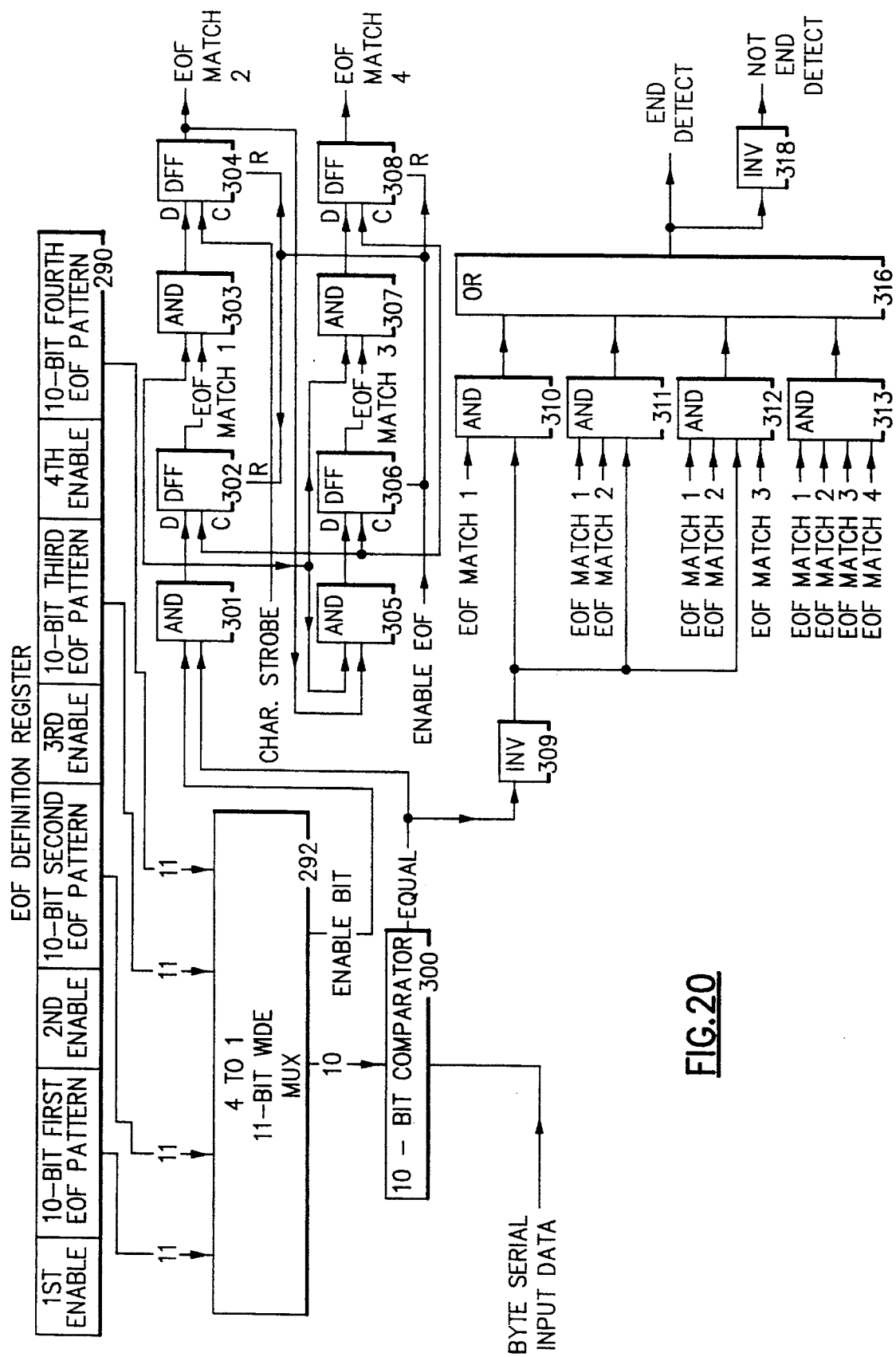
FIG. 20 shows a schematic logic diagram of our preferred embodiment of the serial frame receive and protocol translation function provided for the purpose of recognizing the end of a serial frame of message data arriving at the present invention over serial fiber or copper input channels.
Figure 21:
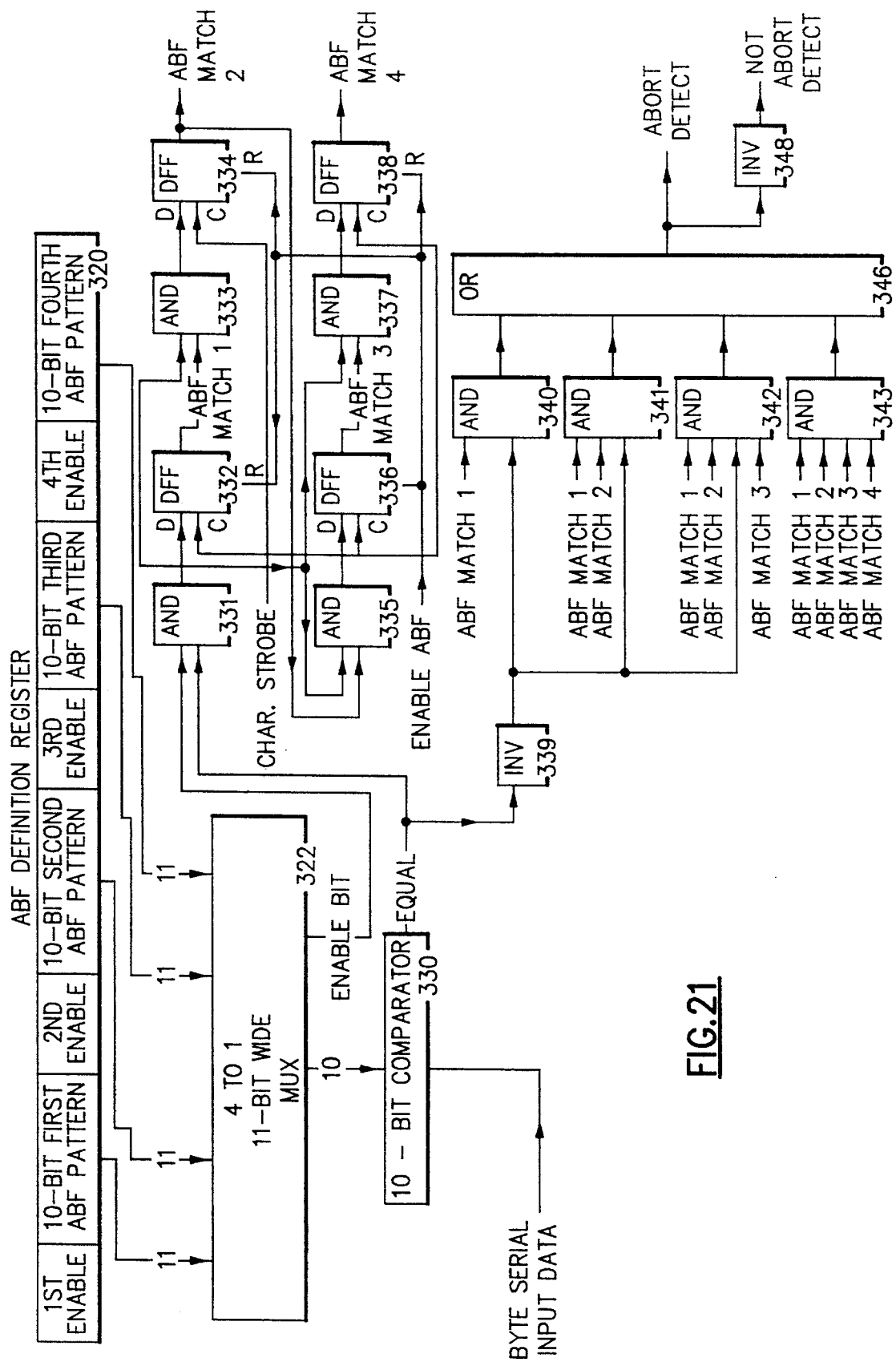
FIG. 21 shows a schematic logic diagram of our preferred embodiment of the serial frame receive and protocol translation function provided for the purpose of recognizing the aborting of a serial frame of message data arriving at the present invention over serial fiber or copper input channels.

Referring to FIG. 20, more specific details of the EOF checking logic is shown. The EOF Definition Register 213 (FIG. 17) is shown in more detail by block 290. Register 290 is organized in 11-bit sections—an Enable bit plus a 10-bit EOF pattern. The 11-bit values from Register 290 are multiplexed to form one 11-bit value at a time by MUX 292. 10 bits from MUX 292 are fed to comparator 300 to perform a compare against every incoming 10-bit pattern (coming through receiver module 126 to register 153). If the incoming 10-bits compare identically to the first EOF pattern and the first Enable bit is set as detected by gate 301, latch 302 is set to record that EOF Match 1 has occurred. MUX 292 steps to select the second 10-bit pattern from register 290 and compares that pattern to the next arriving 10-bit pattern from register 153. If the second 10-bit compare is successful and the second Enable bit is set as detected by gate 303, latch 304 is set to record that EOF Match 2 has occurred. MUX 292 steps to select the third 10-bit pattern from register 290 and compares that pattern to the next arriving 10-bit pattern from register 153. If the third 10-bit compare is successful and the third Enable bit is set as detected by gate 305, latch 306 is set to record that EOF Match 3 has occurred. MUX 292 steps to select the fourth 10-bit pattern from register 290 and compares that pattern to the next arriving 10-bit pattern from register 153. If the second 10-bit compare is successful and the second Enable bit is set as detected by gate 307, latch 308 is set to record that EOF Match 4 has occurred. This selection process could continue to perform further 10-bit compares; however, the preferred embodiment only proceeds through four compares and the preferred serial protocol only requires 3 compares to detect EOF. If all four 10-bit compares match, as detected by gate 313, then the output of OR gate 316 goes active indicating that a complete 4 value EOF sequence has been recognized and the end of a frame (EOF) containing a valid message is detected. The flexible EOF detection logic works equally well for EOF fields containing 1, 2 or 3 10-bit characters. For instance, if the EOF was defined to be only a one 10-bit character sequence, the second Enable bit in register 290 would be programmed to be a 0. This would cause the input to inverter 309 to go to a 0 after latch 302 was set to indicate the first 10-bit match. This would cause the inverter 309 to go to a one and enable gate 310 after the first match and subsequently cause the output of OR gate 316 to go active indicating that a 1 value EOF sequence has been recognized and the end of a frame (EOF) containing a valid message has been detected. If EOF was defined to be a two 10-bit character sequence, the third Enable bit in register 290 would be programmed to be a 0. This would cause the input to inverter 309 to go to a 0 after latches 302 and 304 were set to indicate the first two 10-bit matches. This would cause the inverter 309 to go to a one and enable gate 311 after the second match and subsequently cause the output of OR gate 316 to go active indicating that a 2 value EOF sequence has been recognized and the end of frame (EOF) containing a valid message has been detected. If EOF was defined to be three 10-bit character sequence, the fourth Enable bit in register 290 would be programmed to be a 0. This would cause the input to inverter 309 to go to a 0 after latches 302, 304, and 306 were set to indicate the three 10-bit matches. This would cause the inverter 309 to go to a one and enable gate 312 after the third match and subsequently cause the output of OR gate 316 to go active indicating that a 3 value EOF sequence has been recognized and the end of a frame (EOF) containing a valid message has been detected. For the preferred serial protocol, three 10-bit patterns will eventually cause a match to be detected through gate 312, which will cause the output of gate 316 to go active and gate 318 to go to zero to define the END DETECT signal and its inverse. In a similar manner, FIG. 21 shows the programmable implementation of a 1 to 4 character detection of the ABORT FRAME (ABF) ending sequence. For the preferred serial protocol if an ABF sequence is transmitted, three 10-bit patterns will cause a match to be detected through gate 342, which will cause the output of gate 346 to go active and gate 348 to go to zero to define the ABORT DETECT signal and its inverse.

FIG. 24 shows the normal ending sequence for a valid message transmitted using the preferred serial protocol. After a variable number n data words have been transmitted, the message is ended with two character of CRC data at times IT12 and 13, and 3 EOF characters at the following IT14, 15, and 12 times. EOF MATCH 1 is shown to go active at IT14 time, EOF Match 2 at IT15 time, and EOF Match 3 and END DETECT at the following IT12 time. The storing of data words is delayed through the three 4-byte registers, so that when END Detect becomes active there are still two data words that require storing to buffer 160 as shown by the timing of FIG. 24. Referring to FIG. 23, more specific details of the EOF frame control logic is shown. Gate 450 logically ORs the EOF DETECT and the ABF DETECT signals to form a composite FRAME END signal that feeds gate 452 and causes latch 420 to set at the same IT12 time during which the EOF DETECT signal is active. Latch 428 feeds gates 454 and 456 causing latch 430 to set at the following IT12 time and indicate that 1 more data word is still to be stored to buffer 160 during this IT12 to IT15 time as shown by the timing in FIG. 24. Latch 430 feeds latch 432 and causes it to set at the following IT12 time and indicate that the network CRC check word is to be stored to buffer 160 during this IT12 to IT15 time as shown by the timing in FIG. 24. Latch 432 feeds gate 460 causing latch 432 to set at the following IT12 time and indicate that the Header Word 2 is to be restored to buffer 160 during this IT12 to IT15 time as shown by the timing in FIG. 24. Latch 434 feeds gate 461 causing latch 436 to set at the following IT12 time and indicate that the the INTERPRETER is now DONE and has stored a complete message to buffer 160 in the network message format. Latch 436 being set, causes the END OF MESSAGE signal to be issued to buffer 160 through gate 464 if no error or ABORT conditions were detected, the CANCEL MESSAGE signal to be issued to buffer 160 through gate 462 if error or ABORT conditions were detected, latches 470, 438, 440, 442, and 444 to be reset to terminate the present operation, and word counter 478 to be reset to zero in preparation for the next incoming message.

Referring to FIG. 25, Serial Channel Message Data is written to buffer 160 (32-bits at at time) as it is assembled in the correct order by a multiplexer 226 built from gates 503 to 507. The network CRC byte is generated by block 499 and stored to buffer 160 at the IT12 to IT15 time period defined by latch 432 through gates 503 and 507. The correct Header Word 2 is restored to buffer 160 at the last IT12 to IT15 time period as defined by latch 434 through gates 504 and 507 from a combination of the high order 16 bits from register 530 (SID) and 16 bits from Word Counter 478 (FIG. 23). Referring to FIGS. 17 and 25, register 214 is initially loaded from PROM 134 and is thereby programmed to implement a flexible CRC approach, where register 214 is used to define two concurrent CRC implementations—the one used by the serial protocol and the one used by the network message protocol. Block 204 performs the generation of 2 types of CRC implementations simultaneously, while block 206 performs the serial protocol message CRC checking. Blocks 491 to 494 show a more detailed implementation of the combined functions of blocks 204 and 206, where 4 different types of CRC generation are perform simultaneously, on the incoming serial message by blocks 491, 492, 493, and 494, respectively. The incoming message is fed from 4-byte Data Register 3 to MUX 480, which feds one byte at a time to the CRC Checkers 491 to 493 simultaneously. At the end of the message the incoming CRC Bytes are also transmitted to the CRC Checkers 491 to 493 through MUX 480, where the determination is made as to whether the calculated CRC is equal to the transmitted CRC or not. If they are not equal, an error is detected. Register 214 is programmed to select one of the 4 CRC generators 491 to 493 as the method used by the present serial protocol. The mutually exclusive selection signals from register 214 feed gates 495 to 498, respectively, and select the appropriate error signal from the CRC generators 491 to 493 and make the selected error indication available to gate 502. In addition, other error checks can be programmed to be executed by block 483. Any errors detected by block 483, or the ABORT DETECT function, or a loss of signal over the serial interface are combined in gate 502 and cause ERROR latch 514 to set. If any error condition is detected, the CANCEL MESSAGE signal from gate 464 (FIG. 23) is issued to buffer 160 to wipe out any erroneous data transmitted to the buffer, and thus prevent an erroneous message from being sent over the network.

Figure 31A:
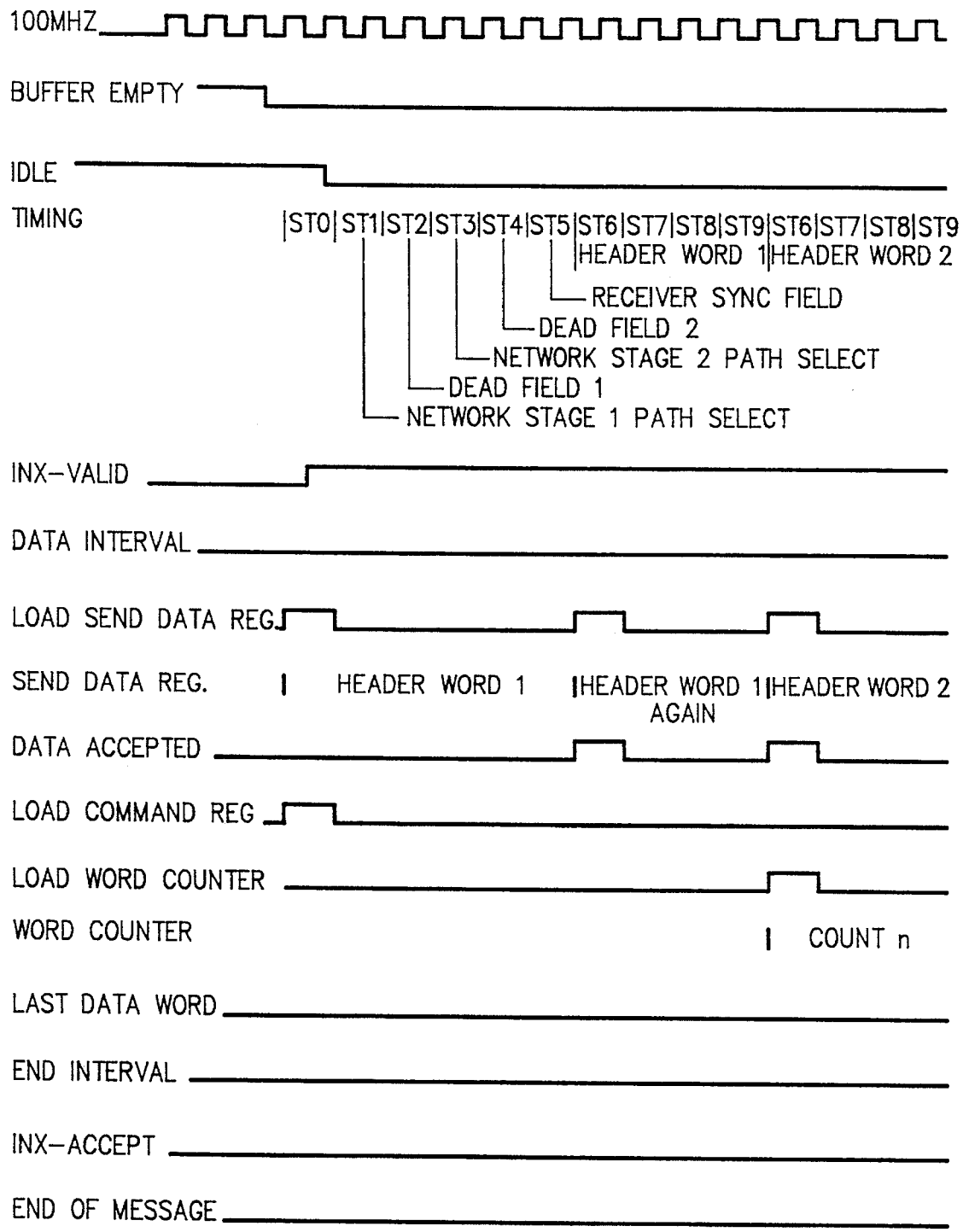
FIG. 31 is a timing diagram, which shows a typical example of the network send function in regards to the control and establishment of connections in the parallel switch network.
Figures 31, 31B:
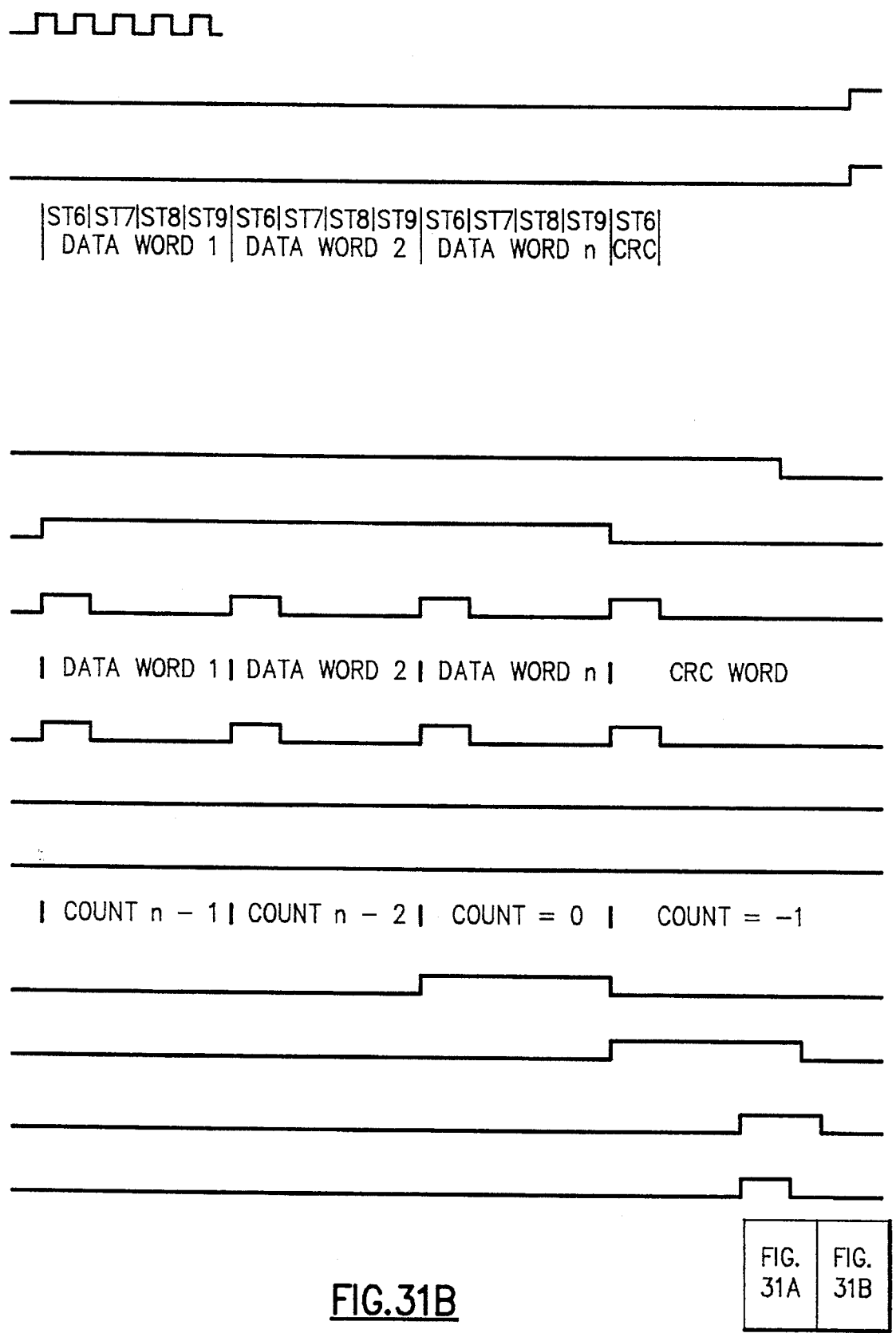

Referring to FIG. 14, once block 140 places and complete message in buffer 160 which has been converted to the network message format, it is the function of block 180 to read the message from buffer 160 and to transmit it to the proper destination node over network 30. The timing for the Network Message Send function is shown in FIG. 31 including the establishment of the network path and the sending of the valid message over the network path. When the BUFFER EMPTY signal from block 238 (FIG. 18) is active, the Network Send Logic is IDLE and not active. When the BUFFER EMPTY signal goes to zero, the Network Send Logic 180 is activated and generates a series of timing signals called ST0 to ST9 (Sending Time 0 to 9) that control the send operation as shown in FIG. 31.

Figure 28A:
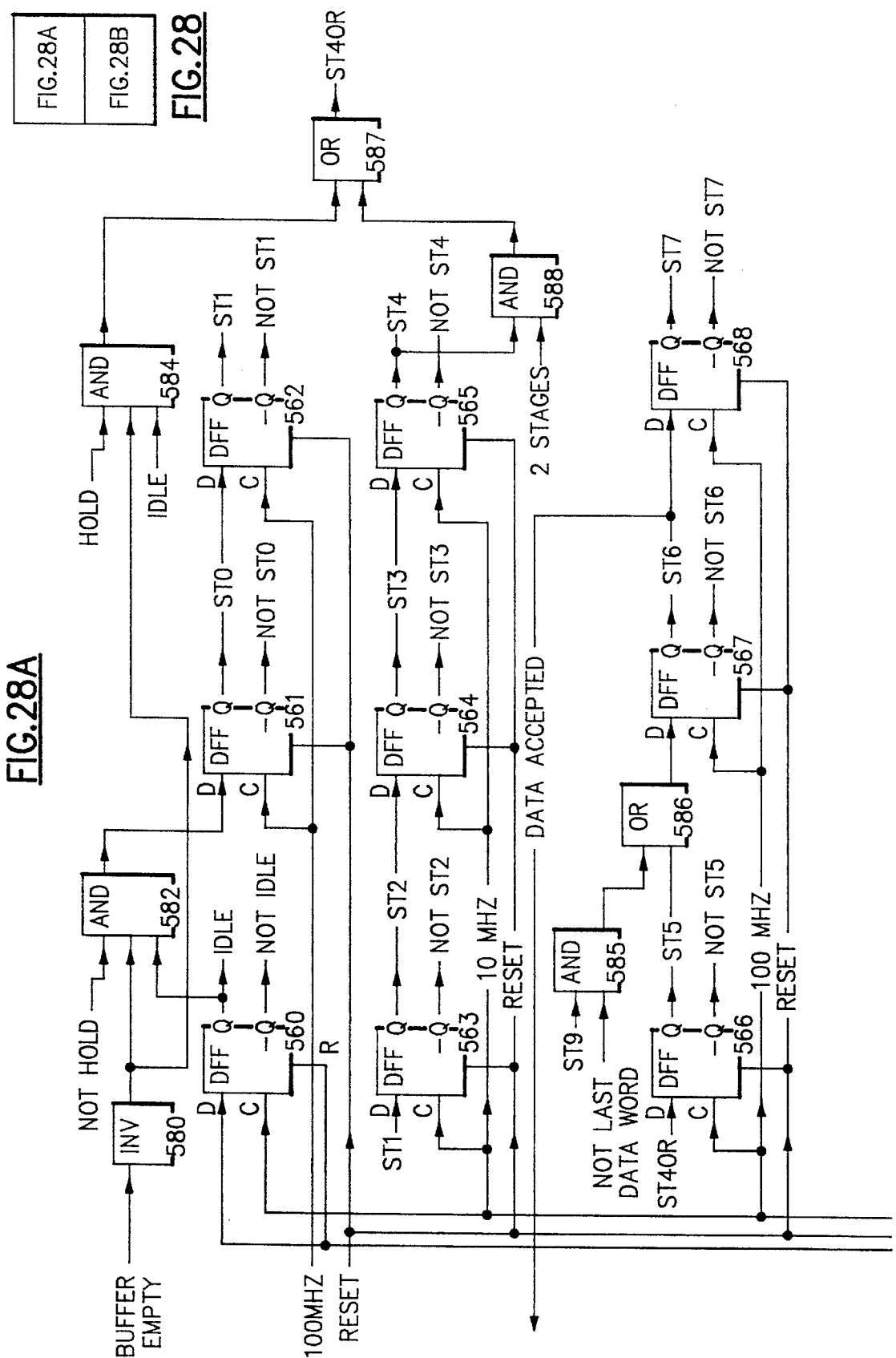
FIG. 28 shows a detailed logic diagram of the timing function of our preferred embodiment of the network send function of the present invention, which accesses messages from the send buffer and transmits them to the parallel switch network.
Figure 28B:
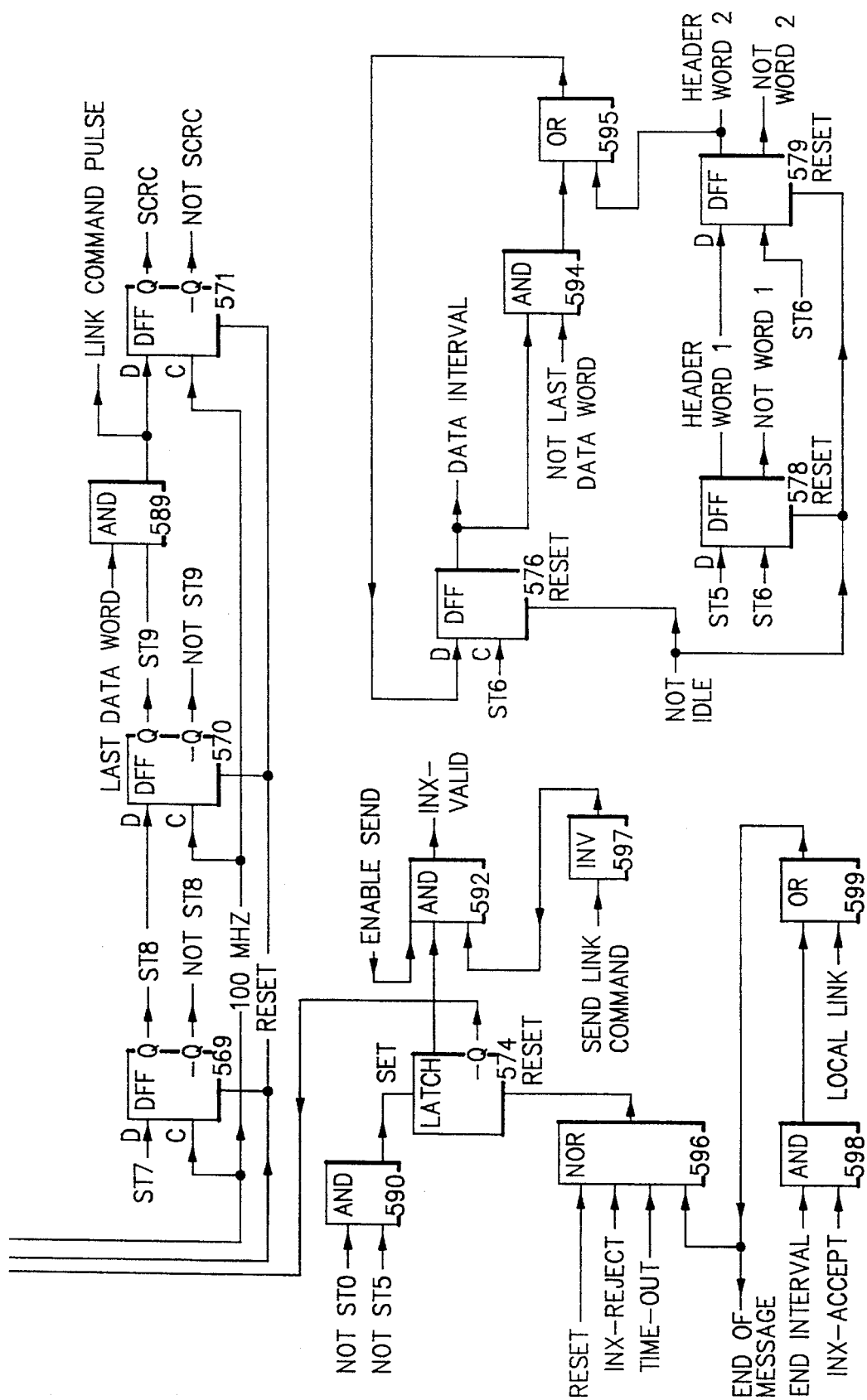

Referring to FIG. 28, the detailed timing logic of block 180 is shown. The BUFFER EMPTY arrives into block 180 from buffer 160, is inverted by gate 580, and used in conjunction with the latch 560 IDLE state to set ST0 latch 561 through gate 582. Latch 561 feeds gate 590 and causes latch 574 to set, which feeds the IDLE latch 560 and causes it to reset—taking block 180 out of the IDLE state. The ST0 to ST9 timing latches and the IDLE latch all are set and reset based on a 100 MHZ clock signal having a 10 ns period, which is the basic transmission frequency of the preferred embodiment of block 180 and causes a byte of data to be transmitted at a 100 Mbyte/sec rate to stay compatible with up to a 1 gigabit/sec serial data incoming rate. The 100 MHZ signal causes a new timing signal to be set every 10 ns and the old timing signal to be reset. For instance, the first rise of the 100 MHZ clock signal after the BUFFER EMPTY signal goes inactive, the ST0 signal is set and the IDLE signal is reset. The second rise of the 100 MHZ clock signal after the BUFFER EMPTY signal goes inactive, ST1 latch 562 which is fed from the ST0 signal is set, and the ST0 signal is reset at the same time. This continues in sequence, as shown in FIG. 31, right through time ST9. After ST9 latch 578 is set, it feds back through gates 585 and 586 and causes ST6 latch 567 to set a second time following ST9. Again ST7, 8, and 9 follow the setting of ST6 in sequence every 10 ns, and again ST6 follows ST9. This ST6 to ST9 timing loop continues until all the data words n in the message have been sent to the network 30 as shown in FIG. 31.

Figure 29:
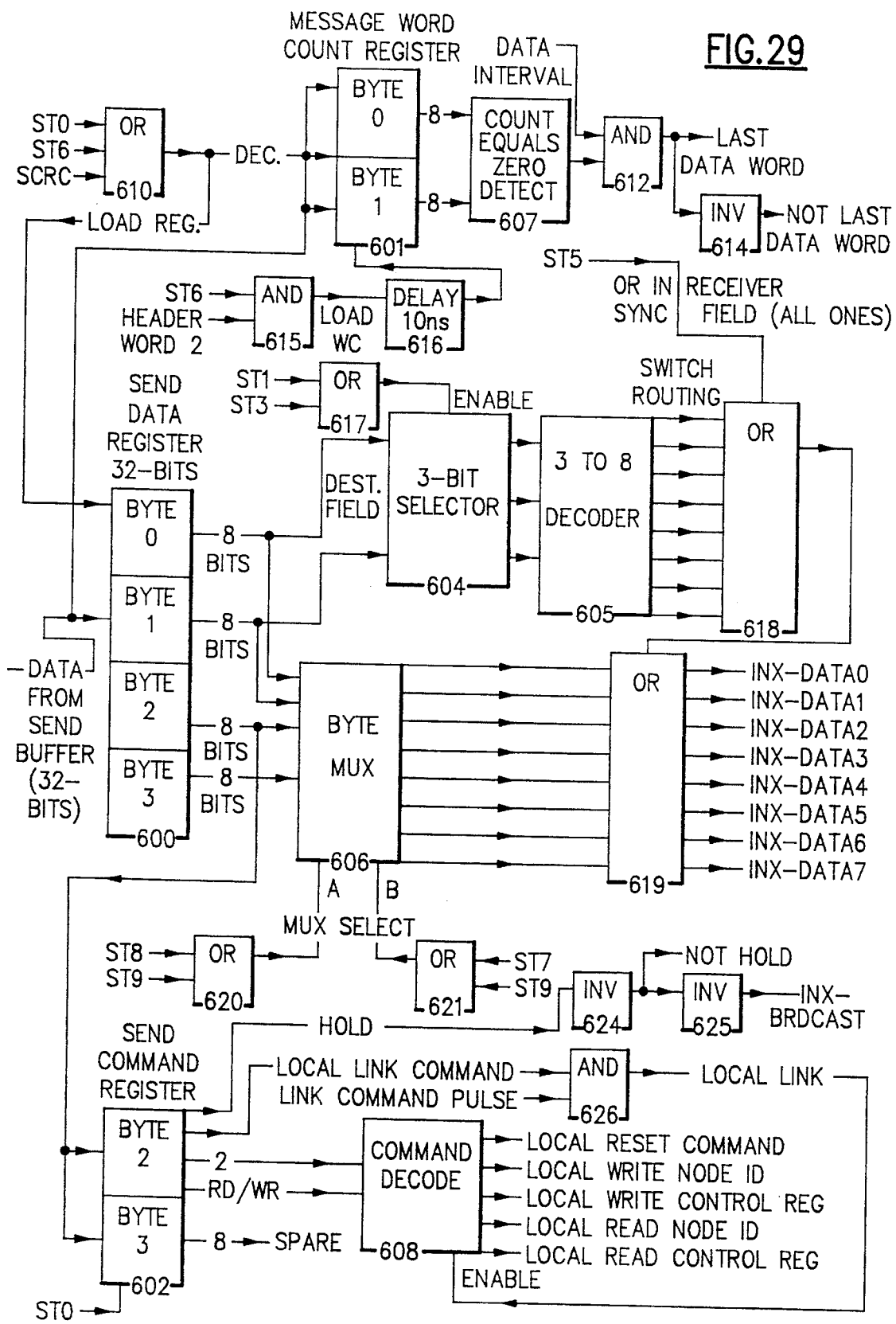
FIG. 29 shows a detailed logic diagram of the control function of our preferred embodiment of the network send function of the present invention.

Referring to FIG. 29, the detailed logic of block 180 which takes 32-bit words from buffer 160 and converts them into the byte wide network message protocol is shown. A 32-bit word is read from buffer 160 into the four byte register 600 every 40 ns. The first word is read in at ST0 time, clocking register 600 through gate 610 at ST0 time. The first word is Header Word 1, which contains the destination node ID in bytes 0 and 1 and the command field in bytes 3 and 4, as shown in FIG. 27. The 3-bit selector function 604 is a multiplexer function which looks at the destination node field (bytes 0 and 1) of register 600 and selects 3 bits at a time to construct the network header portion of the network message as shown by block 552. The preferred network 30 embodiment has two network stages as shown by FIG. 13, and requires two stage routing bytes to establish a path through network 30—a stage 1 routing byte which is constructed at time ST1 and a stage 2 routing byte that is constructed at ST3 time, as shown in FIG. 31. 3-bit selector 604 and 3-to-8 decoder 605 combine to construct the stage 1 and 2 routing bytes from the destination node bytes stored in register 600. During time ST1, selector 604 selects the low order 3 bits of byte 1 of register 600 to be gated through to decoder 605 which converts the 3-bits to an 8 bit code that becomes the stage 1 routing byte, which is transmitted to network 30 through gates 618 and 619 over the INX-DATA lines. During time ST3, selector 604 selects the next high order 3 bits of byte 1 of register 600 to be gated through to decoder 605 which conveals the 3-bits to an 8 bit code that becomes the stage 2 routing byte, which is transmitted to network 30 through gates 618 and 619 over the INX-DATA lines. For larger networks, the process would continue to generate further stage routing bytes based on the higher order bits of the destination node field in bytes 0 and 1 of register 600; however, for the two stage preferred embodiment, just the two routing bytes are required and the higher order destination node bits are not used. Gate 617 is used to enable blocks 604 and 605 only at ST1 or ST3 times, so that for all other times decoder 605 passes all zeroes to gate 618; this causes the all zeroes dead fields to be generated during times ST2 and ST4 times, as shown in FIG. 31. At ST5 time, gate 618 ORs an all ones data byte to network 30 through gate 619 over the INX-DATA lines, which provides the receiver sync field portion of the network message. Previous to sending the network header to network 30, the INX-VALID signal to network 30 is activated by gate 592 (FIG. 28) to inform network 30 that a valid message is being transmitted.

Figure 32A:
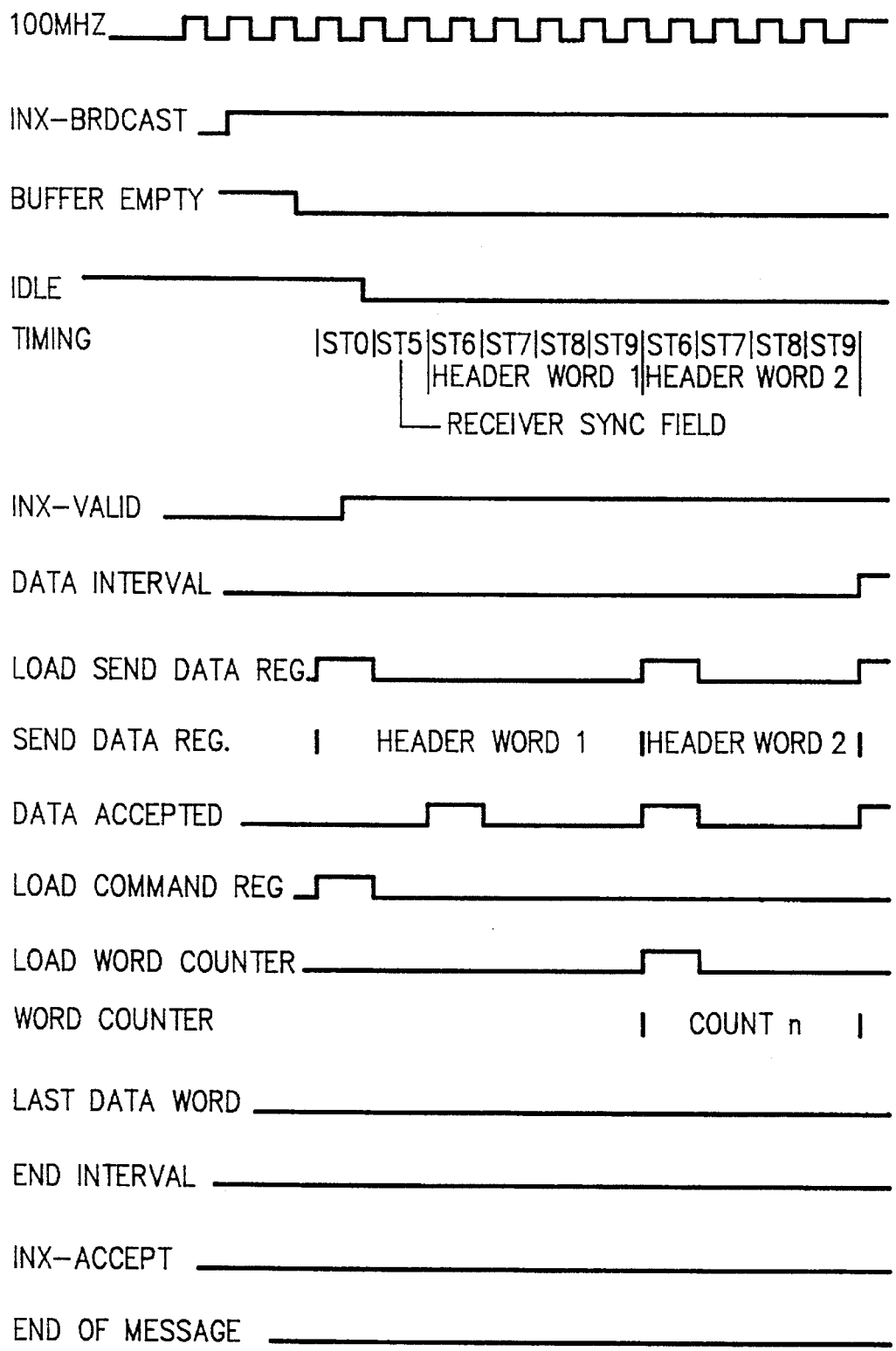
FIG. 32 is a timing diagram, which shows a typical example of the network send function in regards to sending a message to a previously established path in the parallel switch network.
Figures 32, 32B:
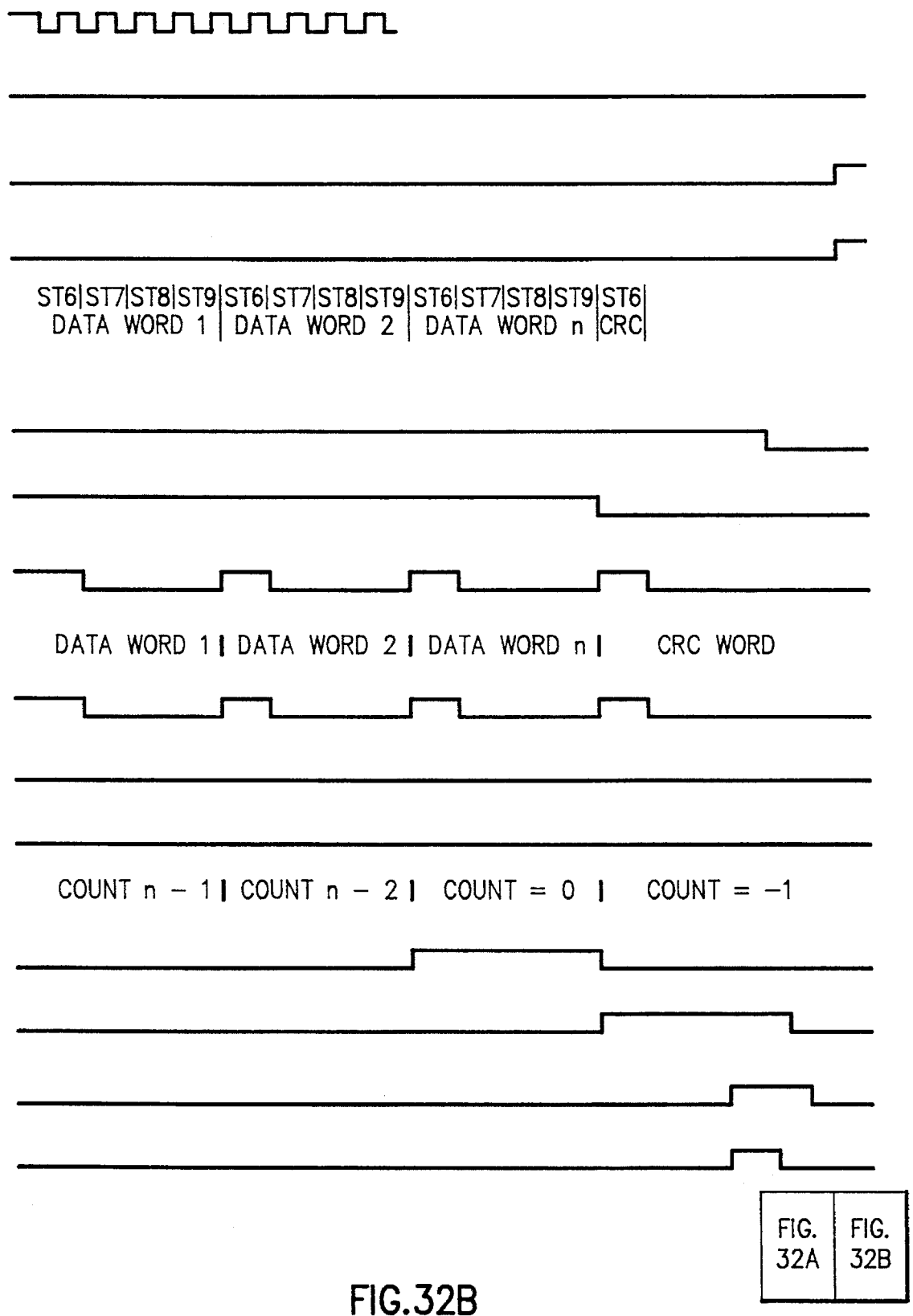

Also at ST0 time, bytes 2 and 3 of the first Header Word which contain the command field are loaded into register 602, as well as register 600. The Command Register 602 is decoded by block 608 into 5 different Local Link Command types. This decode is based on the bit definition shown in block 554 of FIG. 27, where bits 21 to 23 define the type of link command to be executed and bit 20 defines whether it is a read or write command (reset can only be a write command). In addition, bits 16 to 19 of block 554 give overall information about the command type. If bit 16 (Device Command) is set, the command is designated to be executed by the destination node and is to be ignored by block 180. If bit 17 (Local Link Command) is set, the command is designated to be executed by block 180, and bits 20 to 23 should be decoded to define the specific command type. If bit 16 (Remote Link Command) is set, the command is designated to be executed by the Switch Message Receive logic block 170 (FIG. 14) and is to be ignored by block 180. If bit 19 (Hold Network Connection) is set, the command is designated to be executed by block 180, such that any established network connection is held rather than being broken at the end or in between retries of the present message. Referring back to FIG. 29, the bit 19 HOLD (Network Conn.) control signal is latched in register 602 and sent to network 30 through gates 624 and 625 as the INX-BRDCAST signal, which when active causes the network connections established by block 180 to maintain any connections that are presently established or that will be established. The connections are held in network 30 until both the INX-BRDCAST and INX-VALID signals go inactive simultaneously. It is through command bit 19 that Frame Interpreter block 140 communicates the SOF- and EOF-passive and connect sequences to block 180, so that block 180 follows the serial protocol passive and connect commands properly. The timing for the sending of a passive-message, as defined by the HOLD bit from register 602 and the INX-BRDCAST signal being set, over a previously established connection in network 30 is shown in FIG. 32. In this case, gates 582 and 584 in FIG. 28 cause the timing to go from ST0 directly to ST5 skipping the stage 1 and 2 routing bytes and their associated dead fields usually generated by times ST1 to ST4. This is possible because the network 30 path connections are already established and the portion of the network header which usually performs this function can be skipped.

For messages that are sent to network 30 by block 180, the message header and message data portion of the message shown in block 552 of FIG. 27 is constructed starting at time ST6, and one 32-bit word is transmitted to network 30 as 4 consecutive bytes sent every ST6 to ST9 time period. Byte MUX 604 constructs this portion of the message by selecting byte 0 from register 600 at time ST6, byte 1 at time ST7, byte 2 at time ST8, and byte 3 at time ST9 as controlled by gates 620 and 621. At every ST6 time through gate 610, register 600 is loaded with a new 32-bit word from buffer 160 to be sent to network 30. The DATA ACCEPTED signal is generated by latch 567 in FIG. 28 and is the same as the ST0 signal. The DATA ACCEPTED signal causes the read counter associated with buffer 160 to increment the read address to buffer 160 every ST6 time, which causes new data to be loaded into register 600 at the following ST6 time as shown in the timing diagram of FIG. 31. The control logic of FIG. 28 marks the sending of Header Word 1 by setting latch 578 during the first ST6 to 9 time period, and the sending of Header Word 2 by setting latch 579 during the second ST6 to 9 time period. After the two message header words are transmitted, the message data words are transmitted during the DATA INTERVAL specified by latch 576 which is set through gate 595 and held set through gates 594 and 595 until the LAST DATA WORD is detected. During Header Word 1 time 578, the Destination Node ID is transmitted in the first two bytes and the command field in the second two bytes as shown in FIG. 27. During Header Word 2 time 579, the Source Node ID is transmitted in the first two bytes and the word count field in the second two bytes as shown in FIG. 27. At the same ST6 time that Header Word 2 is loaded into register 600 (the second ST6 time), count register 601 of FIG. 29 is loaded through gate 615 and delay 616 with the word count value for the present message, and defines how many data words are provided with the present message. Delay block 616 causes count register 601 to be loaded after the first 610 decrement signals has been issued, so that count register 601 is not decremented for Header Words 1 or 2. However, as every data word is loaded into register 600 at ST6 time, count register 601 is decremented by 1 at subsequent ST6 times, as shown in FIG. 31. Count Equals Zero Detect block 607 detects when count register 601 has decremented to zero as an indication that the last data word of the message has been loaded into register 600. Count register 601 going to zero and being detected by block 607 causes the LAST DATA WORD signal and its inverse to be generated by gates 612 and 614. Referring to FIG. 28, the Last DATA WORD signal into gate 585 prevents ST6 from occurring again after the last byte of the last data word is transmitted at ST9 time, instead gate 589 causes the SEND CRC latch 571 to set (SCRC) after the last ST9 signal transmits the last data byte. The SCRC signal 571 goes to gate 610 (FIG. 29) and cause the CRC byte from buffer 160 to be loaded into register 600, from which it is sent through MUX 606 and gate 619 to network 30 over the INX-DATA lines, as shown by FIG. 31. This completes the sending of the valid message to network 30, and the setting of SCRC latch 571 causes END INTERVAL latch 632 (FIG. 30) to become active. The INX-VALID signal 592 is left active during END INTERVAL 632 giving the receiving node an opportunity to respond to the valid message with either an INX-ACCEPT or INX-REJECT signal. FIG. 31 shows the timing for the receiving node accepting the message and responding with the INX-ACCEPT signal. Referring to FIG. 28, the INX-ACCEPT signal occurring during the END INTERVAL 632 time period causes gates 598 and 599 to go active and the END OF MESSAGE signal 599 to go active, which goes to buffer 160 and causes the valid message just sent and accepted to be erased from the buffer 160 and latch 574 to be reset through gate 596. The resetting of latch 574 causes the INX-VALID signal to go inactive which breaks the connection established through network 30 (if the HOLD signal from register 602 is not active) and returns the network pod to the idle condition, which is caused by latch 574 setting the IDLE latch 560. If the BUFFER EMPTY signal is still active or becomes active again, indicating that buffer 160 has another valid message to be sent, the network send message operation will start over again from the beginning and process the next valid message.

Figure 30:
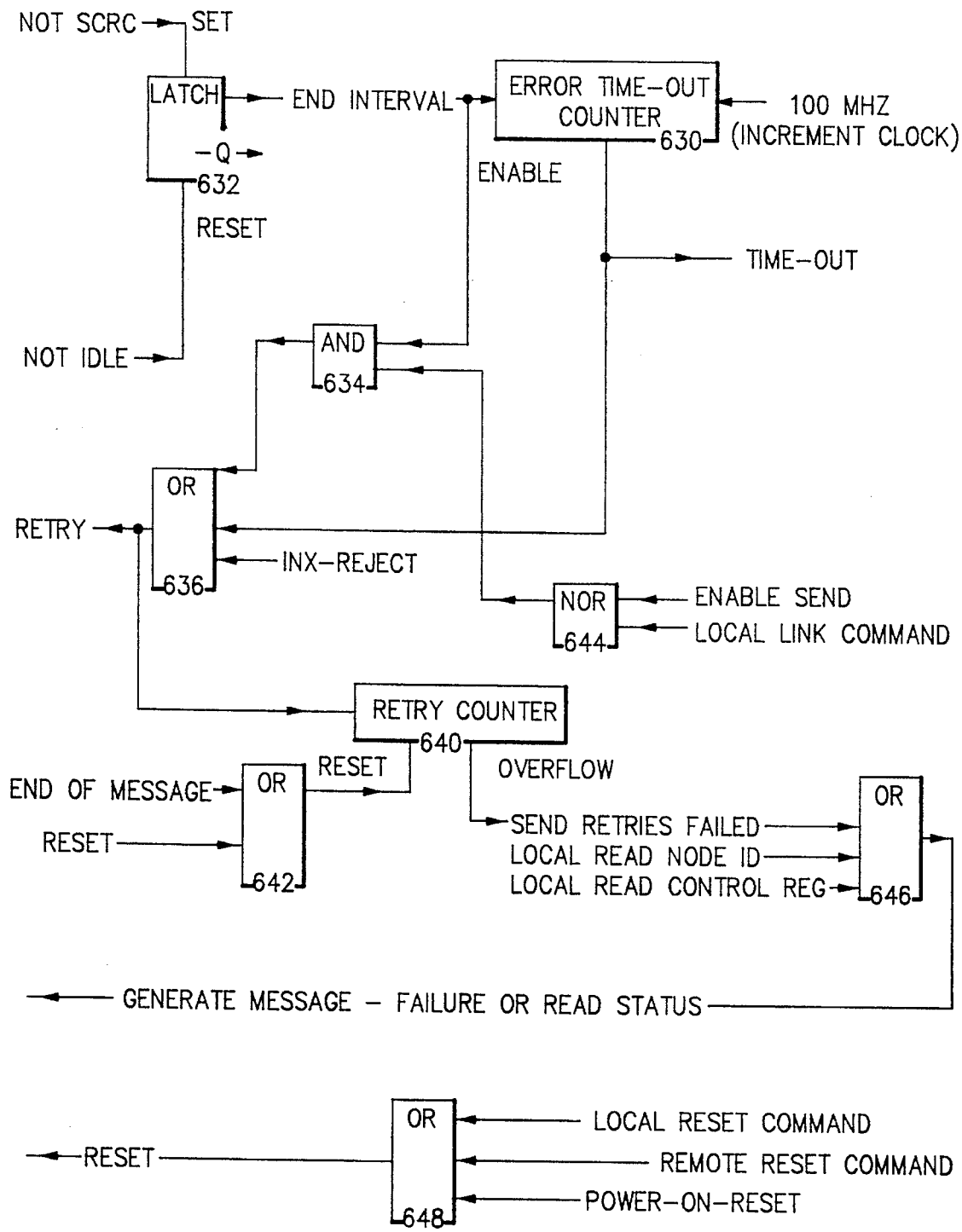
FIG. 30 shows a detailed logic diagram of the termination and retry functions of our preferred embodiment of the network send function of the present invention.
Figure 33A:
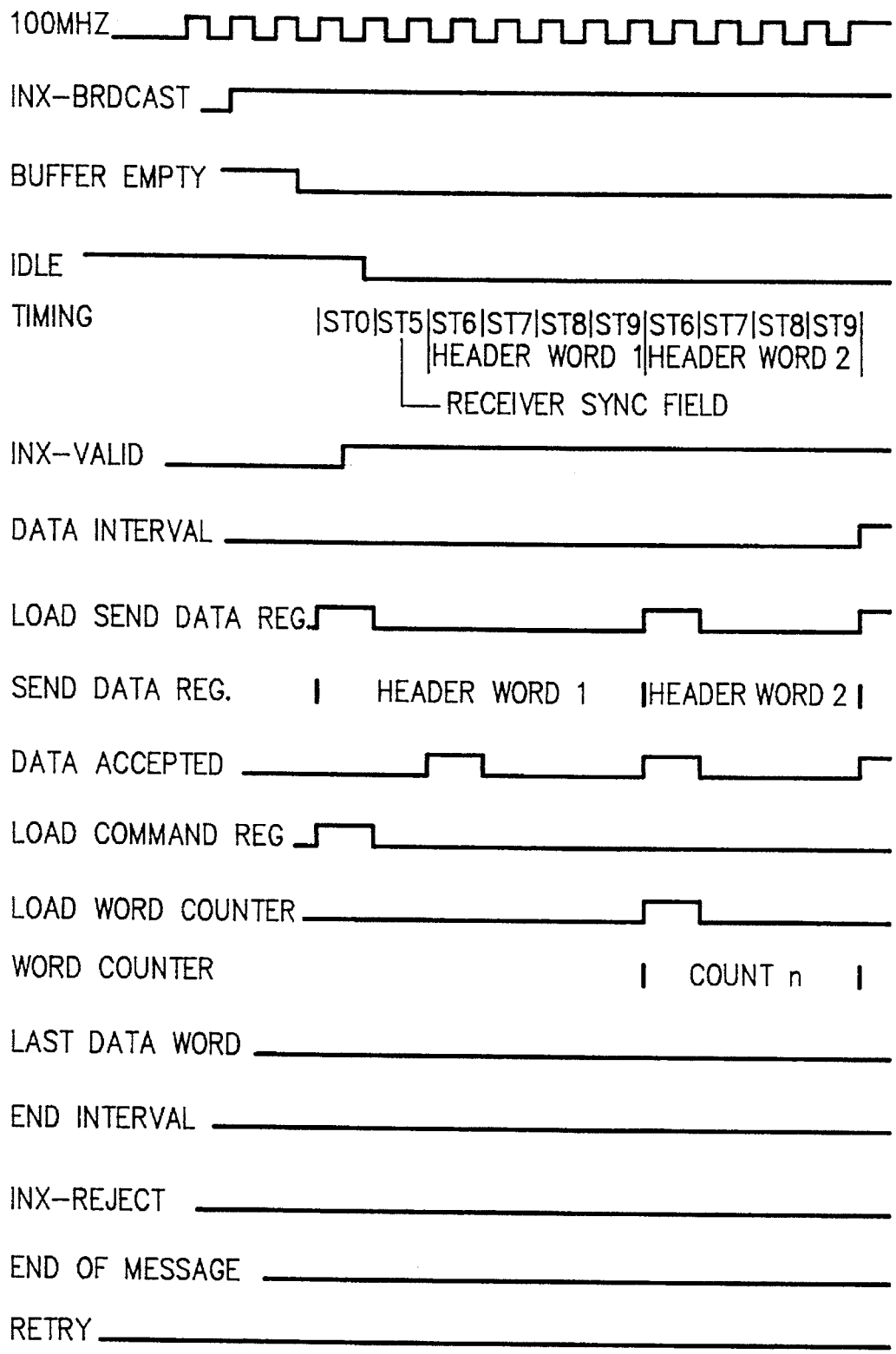
FIG. 33 is a timing diagram, which shows a typical example of the network send function in regards to the connection in the parallel switch network being busy and causing a rejection of the message.
Figure 33B:
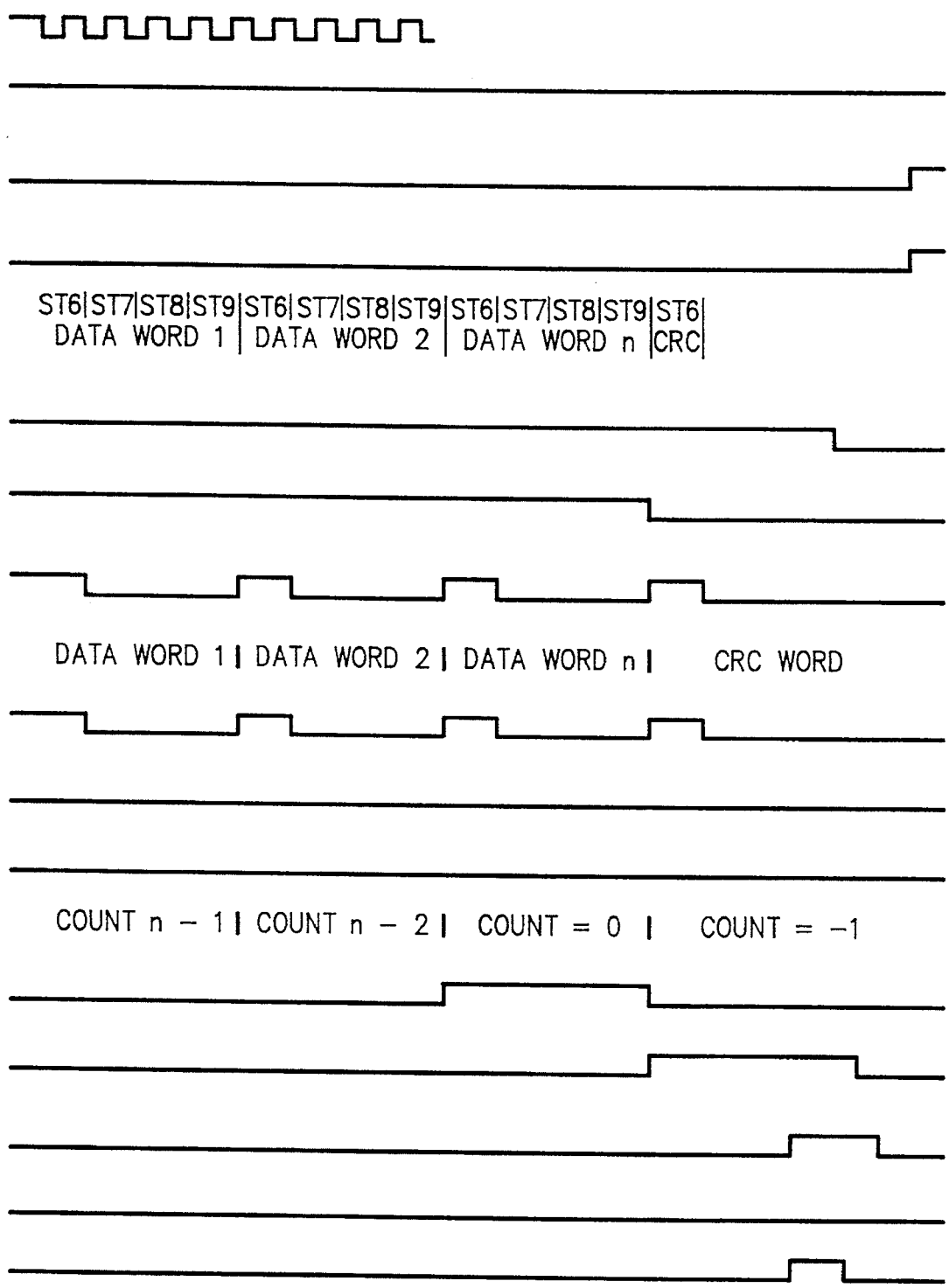
Figure 33:
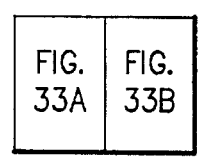

Referring to FIG. 33, the typical timing for a REJECT network sequence is shown. Either the receiving node because it detected an error in the message or does not have room available to receive the message, or the network 30 because the commanded connection is blocked and unavailable can respond to a message with the INX-REJECT signal. The timing shown in FIG. 33 is for the destination node rejecting the message. In this case, the latch 574 is reset through gate 596, which causes the INX-VALID signal to go inactive, the network 30 connections to be broken (if the HOLD signal from register 602 is not active), and IDLE latch 560 to become active again. However, the END OF MESSAGE signal 599 is not generated, and therefore does not cause the valid message to be erased from the buffer 160. Instead, the RETRY 636 signal of FIG. 30 is generated and causes the buffer 160 read counter to be reset to point back to the beginning of the valid message, so that it can be tried again. This causes the BUFFER EMPTY signal to remain active, indicating that buffer 160 still has a valid message to be sent, and the network send message operation will start over again from the beginning and process the same valid message over again and again, every time it is rejected. There is a limit on the number of retries, as defined by RETRY Counter 640 of FIG. 30, which is initialized to the allowable retry count through gate 642 every time the MMSA 20 logic is reset or a valid message is successfully transmitted as detected by the END OF MESSAGE signal 599. Counter 640 is incremented every time the RETRY 636 signal is issued to buffer 160. If retries continue to occur until counter 640 overflows, a major error is detected through gate 646 and returned to the source node as an indication that the valid message was not able to be transmitted due to a failure. An additional TIMEOUT check is performed on every valid message sent to network 30, in case the receiving node does not respond with either an INX-ACCEPT or INX-REJECT signal. The TIMEOUT condition is detected by counter 630, which is enabled to count by the END INTERVAL signal 632 and counts at a 100 MHZ rate until the counter overflows and there has been no response from the destination node. This TIMEOUT causes a RETRY of the message through gate 636, a reset of latch 574 and INX-VALID, and a return to IDLE through gate 596. If a message is either accepted or rejected by the destination node or network 30, the END INTERVAL latch 632 is reset by the return to the IDLE condition, and the TIMEOUT counter 630 is reset and disabled, so that no TIMEOUT condition is detected.

Figure 34:
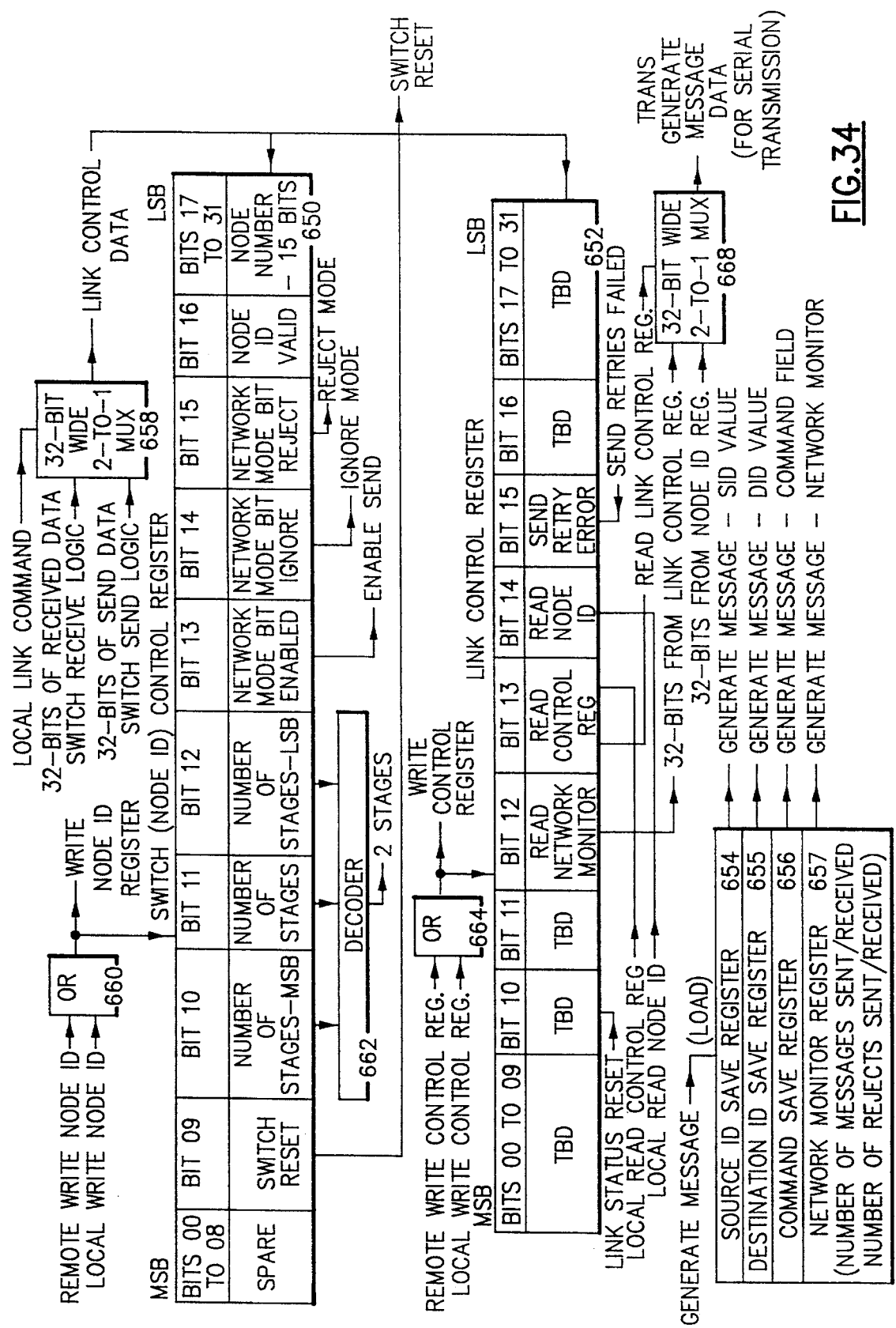
FIG. 34 shows a detailed logic diagram of the serial link control functions of our preferred embodiment of the network send function of the present invention.

Referring to FIG. 34, the Link Control & Switch Control Registers block 172 of FIG. 14 is shown in more detail. The bit 17 command bit (Local Link Command) is latched in register 602 (FIG. 29) and sent to gate 626 and used to enable the decoding of the local commands to be executed by block 180. Local Link commands are not sent to network 30, as gates 597 and 592 (FIG. 28) are used to keep the INX-VALID signal from going active during a Local Link Command and to prevent the transmission of the Local Link Message to network 30. Instead, the Local Write Node ID command, as generated by command decoder 608, goes to register 650 through gate 660 and causes a data message word to be written into register 650 from register 600 through MUX 658. The information in register 650 is used to control the interface of blocks 170 and 180 (FIG. 14) to network 30. Register 650 defines the number of stages in the network, the Node ID number (Source and Destination Node) associated with the network pod, a Switch Reset, and other network controls. The Local Write Control Reg command as generated by command decoder 608 goes to register 652 through gate 664 and causes a data message word to be written into register 652 from register 600 through MUX

658. The information in register 652 is used to control the link interface, mainly in a TBD manner (for instance, possibly making the Retry Count used by counter 640 a programmable entity). However, bits 12 to 15 of register 652 are used to define the type of message that should be generated in response to the serial interface that issued the Local Read Node ID or Local READ Control Reg commands from block 608, or the message that should be generated because of a Send Retry Error detected by Retry Counter 640 of FIG. 30. Note, that block 180 in itself cannot generate a response message to the serial interface message received over module 126 or 128 in FIG. 14, because block 180 does not interface to the serial side of MMSA 20. Instead, block 180 must send a Generate Message signal 646 (FIG. 30) to block 130 requesting that block 130 generate a serial response message. So that block 130 has the proper parameters for generating a response message as requested by block 180, block 180 saves the necessary parameters in registers 650, 652, 654, 655, 656, and 657 and makes them available to block 130. Register 657 saves parameters associated with the activity of network 30, such as the number of messages sent, the number of messages received, the number of rejects sent, the number of rejects received, etc. Thus, through the reading of register 657 it is possible to monitor the activity of network 30 on a periodic basis as control by the issuance of local or remote Link Commands. Also, note that block 170 when receiving a Remote Link Command as defined by bit 18 of register 554 (FIG. 27), can send write commands to block 172 as detailed by gate 660 of FIG. 34 allowing a Remote Write Node ID command to load register 650 as well as a Local Write Node ID command; block 170 can also send commands to gate 664 allowing a Remote Write Control Reg command to load register 652 as well as a Local Write Control Reg command; and MUX 658 can select write data from block 170 as well as block 180.

Figure 35:
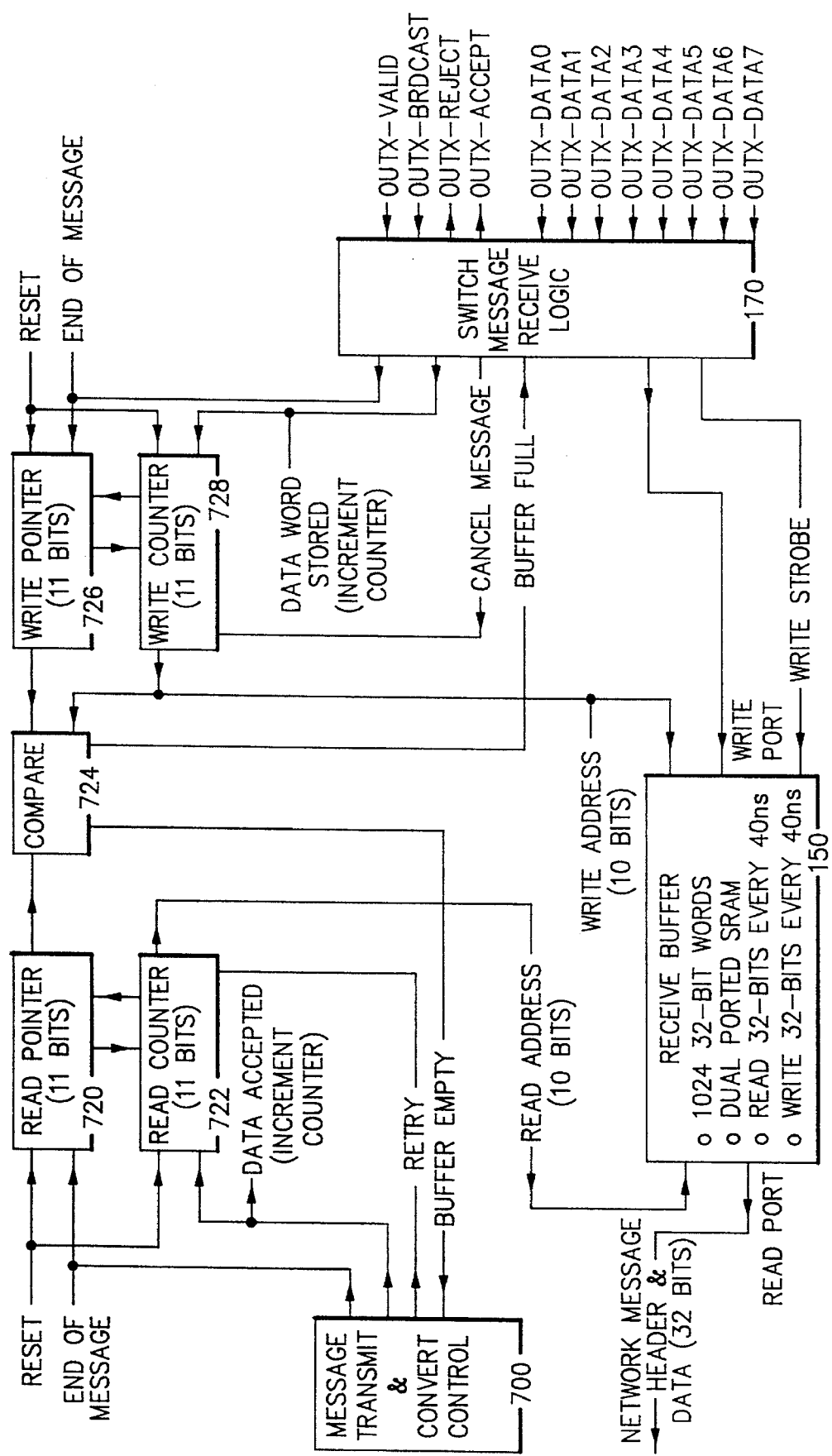
FIG. 35 shows a schematic block diagram of our preferred embodiment of the buffer memory for the purpose of temporarily storing messages being sent from the parallel switch network to the serial channels.

A valid message is transmitted over network 30 and arrives at a destination node, coming into the Switch Message Receive Logic block 170 as shown in FIG. 14, which stores the received message to to Switch Message Receive Buffer (Recv Buffer) 150. Referring to FIG. 35, the valid message is accepted into the Recv Buffer 150 until it is complete, then the block 700 portion of block 130 reads the valid message from buffer 150 and translates it to a serial protocol message to be sent over serial interface transmitter module 120 or 122. Block 170 controls the writing of Valid Message Data, 32-bit words at a time, into buffer 150 as commanded by the WRITE STROBE signal. The Recv Buffer 150, for the preferred embodiment, contains 1024 32-bit words and is dual ported, so that one 32-bit word write and one 32-bit word read can occur simultaneously at a 25 MHZ rate (every 40 ns). This provides the capability of supporting up to a 1 gigabyte/sec serial data rate and a 100 MBS network rate. The write function to Recv Buffer 150 is controlled by two 11-bit entities: a write pointer 726 and a write counter 728. A Reset signal shall reset both of these 11-bit values to all zeroes. As block 170 writes each word into the write pod of buffer 150, the write counter 728 is used to address the write port of buffer 150 directly. When each 32-bit write is complete, the write counter increments with the fall of the DATA WORD STORED signal from block 170 in preparation for the next write operation. Block 170, after storing a complete valid message to buffer 150, sends the END OF MESSAGE signal, which sets the write pointer 726 equal to the write counter 728 to indicate that the valid message has been successfully stored to buffer 150. Block 170 can cancel a message or partial message from buffer 150 by issuing the CANCEL MESSAGE signal, which rolls back the value of write counter 728 by setting write counter 728 equal to the write pointer 726. This points write counter 728 back to the beginning of where the valid message was written or partially written, so that it can be rewritten correctly at a later time. When the ten low-order bits of write pointer 726 are equal to the ten low-order bits of write counter 728, as detected by comparator 724, but the high-order bit is different, buffer 150 is completely full and the BUFFER FULL signal is sent to block 170. As long as the BUFFER FULL condition exists, block 170 is prevented from doing further writes to buffer 150.

The Message Transmit & Conveal Control logic 700 reads 32-bit words from buffer 150. The read function is controlled by two 11-bit entities: read pointer 720 and read counter 722. A Reset signal shall reset both of these 11-bit values to all zeroes. As block 700 reads each word from buffer 150, the read counter 722 is used to address the read port of buffer 150 directly. When each 32-bit read is complete, the read counter increments with the fall of the DATA ACCEPTED signal from block 700 in preparation for the next read operation. Block 700, after reading and successfully transmitting a complete valid message over the serial interface, sends the END OF MESSAGE signal, which sets the read pointer 720 equal to the read counter 722 to indicate that the valid message has been successfully transmitted. This action effectively removes the transmitted message from the buffer and steps to the beginning of the next message to be transmitted, thus clearing space in buffer 150 to be used again by a future valid message. Block 700 can retry the serial transmission of a message or padial message from buffer 150 by issuing the RETRY signal, which rolls back the value of read counter 722 by setting read counter 722 equal to the read pointer 720. This points read counter 722 back to the beginning of the valid message so that it can be reread. When the eleven bits of write pointer 726 are equal to the eleven bits of read pointer 720, as detected by comparator 724, buffer 150 is empty and the BUFFER EMPTY signal is sent to block 700. As long as the BUFFER EMPTY condition exists, block 700 is informed that there are no valid messages waiting to be sent to the serial interface. When block 170 stores a complete valid message to an empty buffer 150 and advances write pointer 726 by issuing the END OF MESSAGE signal, the write pointer 726 no longer equals the read pointer 720, which is detected by comparator 724 and deactivates the BUFFER EMPTY signal to block 700, informing it that there is now a valid message waiting in buffer 150.

Figures 37, 37B:
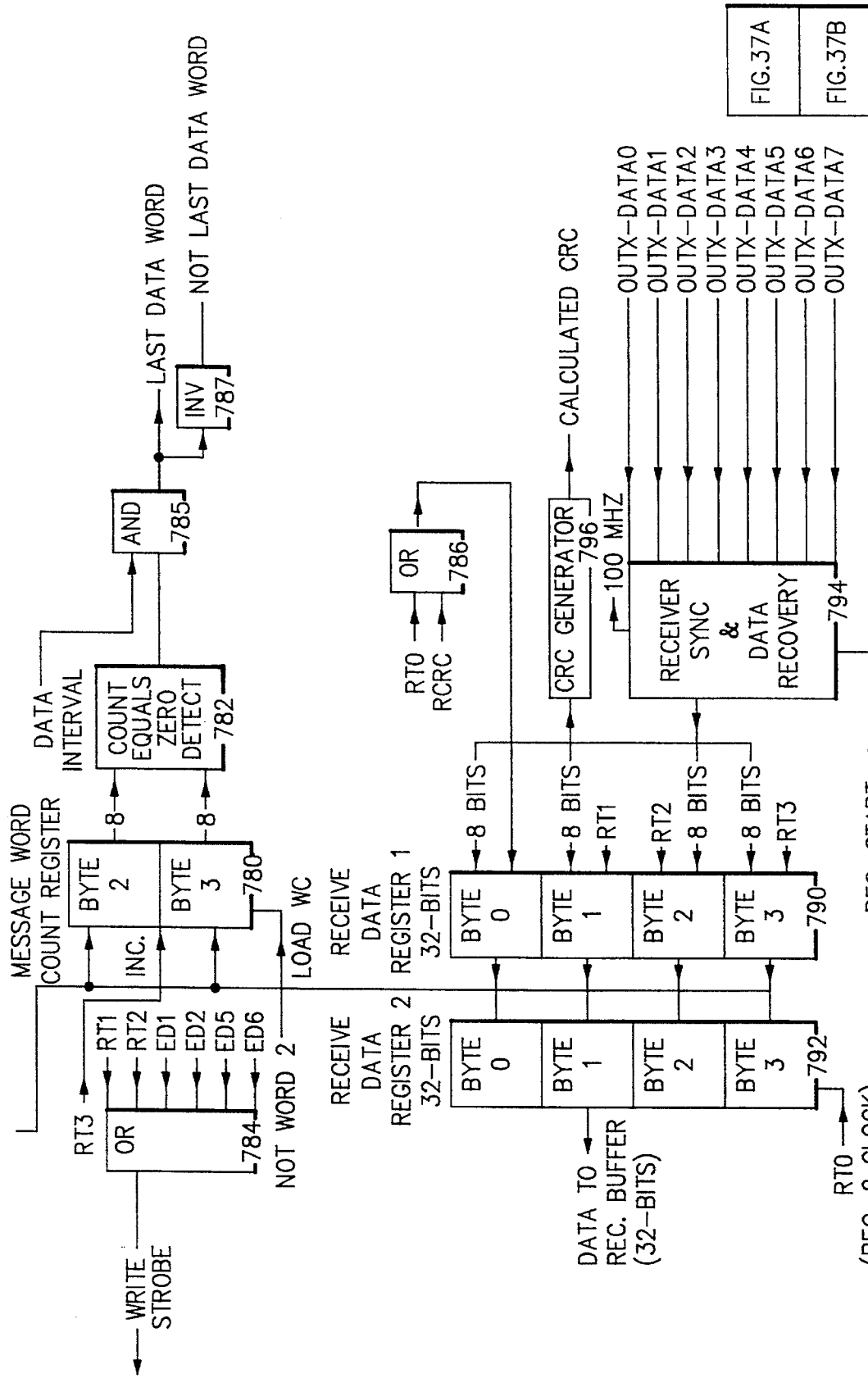
FIG. 37 shows a detailed logic diagram of the control function of our preferred embodiment of the network receive function of the present invention.
Figure 38A:
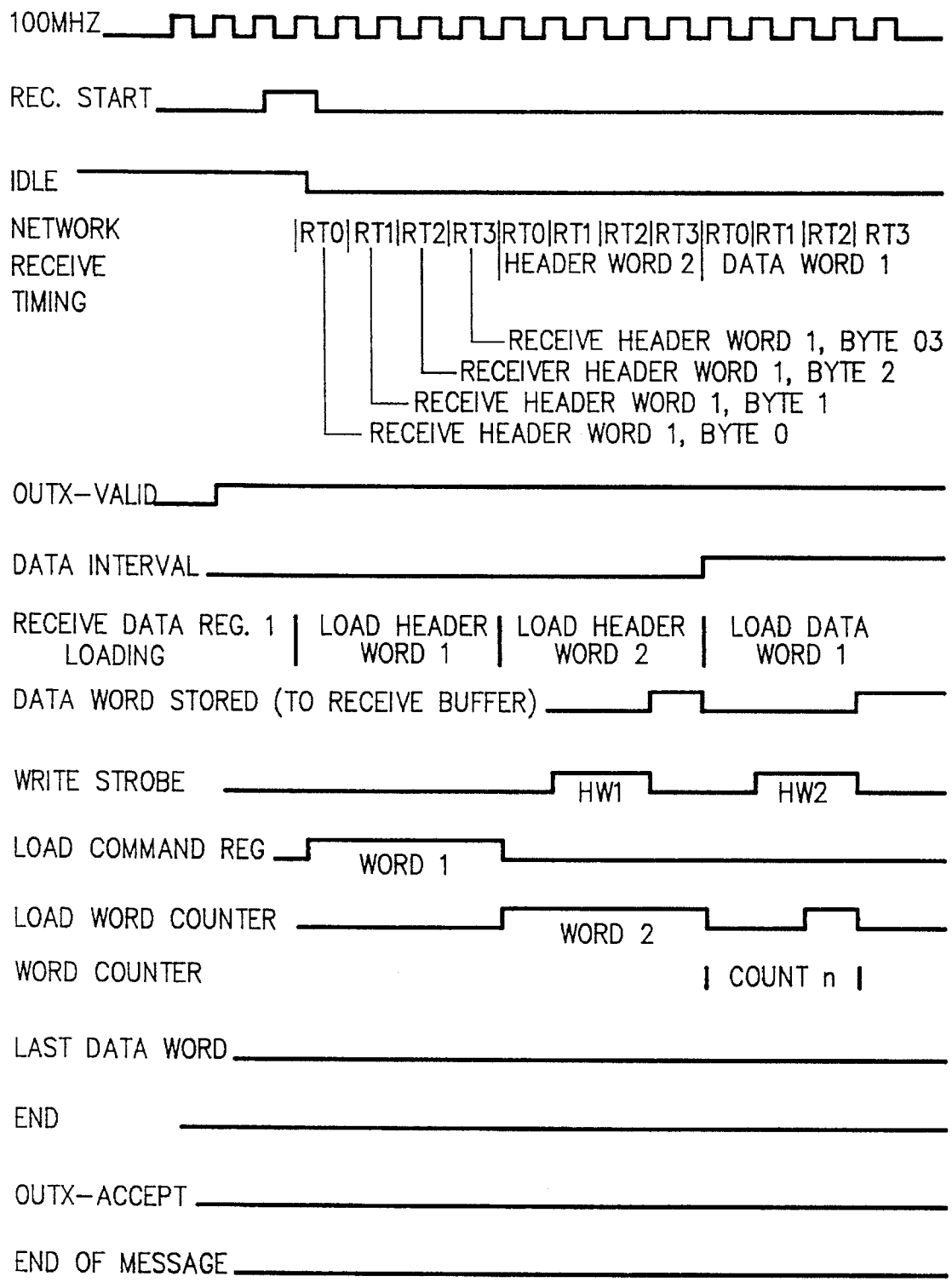
FIG. 38 is a timing diagram, which shows a typical example of the network receive function in regards to receiving a message from the parallel switch network and storing it in the receive buffer memory.
Figures 38, 38B:
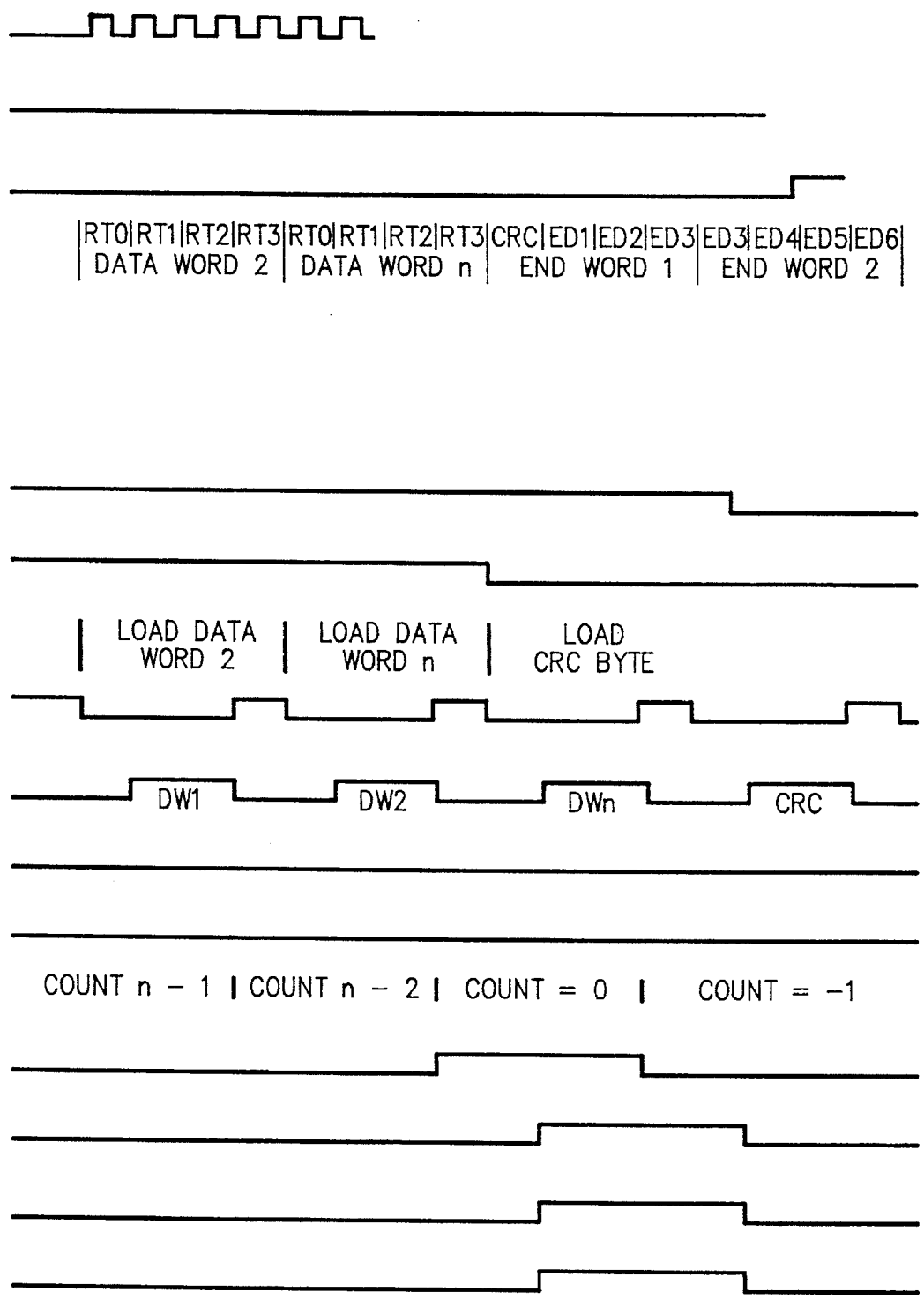

Referring to FIG. 38, the timing for Switch Message Receive logic 170 is shown. The Receiver Sync & Data Recovery Logic block 794 (FIG. 37) continuously monitors the eight OUTX-DATA lines coming from network 30, looking for the all ones receiver sync byte, which is shown as the last network header byte in FIG. 27 (but the first byte of the valid message to appear at block 170). Note that the previous network header bytes are used and stripped from the received message by network 30. When block 794 detects a valid receiver sync byte, it aligns its 100 MHZ receiving clock to the incoming message data. The details of how block 794 synchronizes its 100 MHZ clock to the incoming data in one clock time is disclosed in U.S. Ser. No. 07/659,199, filed Feb. 22, 1991 entitled "ASYNCHRONOUS LOW LATENCY DATA RECOVERY APPARATUS AND METHOD", which should be referenced for further details. Block 794 also issues a synchronized Rec Start signal that goes active on the detection of the receiver sync byte, and activates block 170 from its previously IDLE state.

Block 170 generates a series of timing signals called RT0 to RT3 (Receiving Time 0 to 3) that control the receive operation, as shown in FIG. 38.

Figure 36:
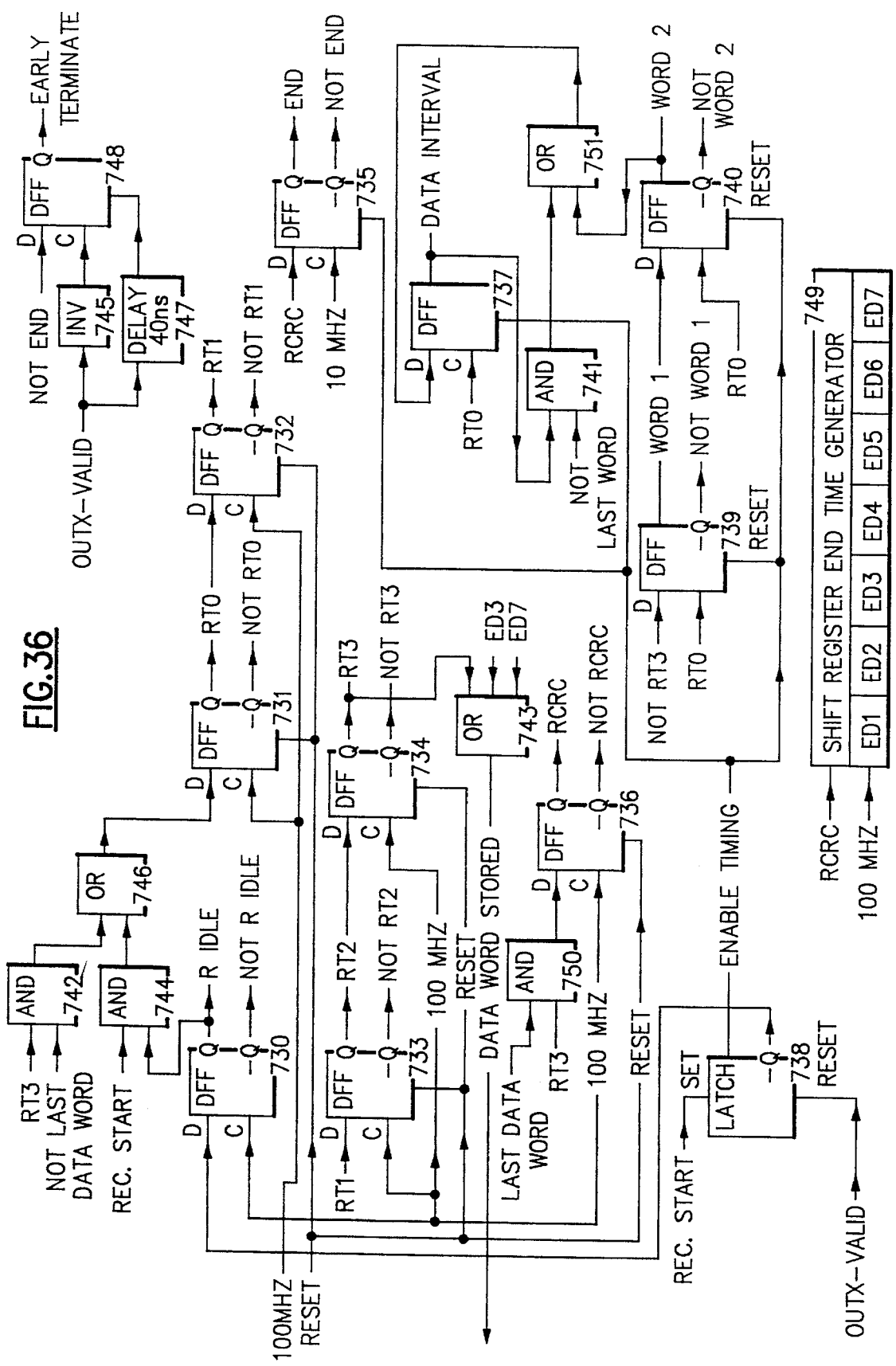
FIG. 36 shows a detailed logic diagram of the timing function of our preferred embodiment of the network receive function of the present invention, which receives messages from parallel switch network and stores them in the receive buffer memory.

Referring to FIG. 36, the detailed timing logic of block 170 is shown. The Rec Start being activated sets the ENABLE TIMING latch 738 and goes into gate 744, where it is used in conjunction with the latch 730 R IDLE to set the RT0 latch 731 through gate 746. Latch 738 feeds feeds the R IDLE latch 730 and causes it to reset—taking block 170 out of the IDLE state. The RT0 to ST3 timing latches and the R IDLE latch 730 are all set and reset based on the synchronized 100 MHZ clock signal selected by block 794 and having a 10 ns period, which is compatible with the block 180 transmission frequency (but not synchronized to it). The 100 MHZ signal causes a new timing signal to be set every 10 ns and the old timing signal to be reset. For instance, the first rise of the 100 MHZ clock signal after the Rec Start signal goes active, the RT0 signal is set and the R IDLE signal is reset. The second rise of the 100 MHZ clock signal after the Rec Start signal goes active, RT1 latch 732 which is fed from the RT0 signal is set, and the RT0 signal is reset at the same time. This continues in sequence, as shown in FIG. 38, right through time RT3. After RT3 latch 734 is set, it feds back through gates 742 and 746 and causes RT0 latch 731 to set a second time following RT3. Again RT1, 2, and 3 follow the setting of RT0 in sequence every 1.0 ns, and again RT0 follows RT3. This RT0 to RT3 timing loop continues until all the message header and message data words n have been received from network 30 into block 170, as shown in FIG. 38. After the last RT3 time, RCRC latch 736 sets through gate 750 for 1 clock time. RCRC latch 736 feeds the Shift Register End Time Generator 749, which generates a sequence of 7 one-clock End Timing pulses (ED1 to ED7), as shown in FIG. 38, which are used at the very end of the operation to complete the store of the received data and CRC words to buffer 150.

Referring to FIG. 37, the detailed logic of block 170 which receives byte-wide data from network 30 and assembles the bytes into 32-bit words to be stored to buffer 150 is shown. A 32-bit word is stored to buffer 150 from the four byte Receive Data Register 2 (792) every 40 ns at RT3 time. Receive Data Register 2 (792) is loaded every RT0 time from Receive Data Register 1 (790), which is loaded a byte at a time as the byte-wide data is received and synchronized as it comes from network 30 into block 794. The first word is Header Word 1, which contains the destination node ID in bytes 0 and 1, and the command field in bytes 3 and 4, as shown in FIG. 27. During time RT0, register 790 receives and loads byte 0 at time RT0, byte 1 at time RT1, byte 2 at time RT2, and byte 3 at RT3 time. The WRITE STROBE signal generated by gate 784 is the logical OR of the RT1 and RT2 signals and causes the 32-bit word stored in register 792 to be written into buffer 150. The DATA WORD STORED signal is generated by OR gate 743, which issues DATA WORD STORED pulses at every RT3 time plus at ED3 and ED7 times, as shown in FIG. 38. Each DATA WORD STORED pulse causes the write counter associated with buffer 150 to increment the write address to buffer 150. The DATA WORD STORED signal 743 allows new data to be stored into the next sequential location in buffer 150 at the following WRITE STROBE 784 time, as shown in the timing diagram of FIG. 38. The control logic of FIG. 36 marks the receiving of Header Word 1 by setting latch 739 during the first RT0 to 3 time period, and the receiving of Header Word 2 by setting latch 740 during the second RT0 to 3 time period. After the two message header words are received into register 790, the message data words are received during the DATA INTERVAL specified by latch 737 which is set by latch 740 through gate 751 and held set through gates 741 and 751 until the LAST DATA WORD is detected. During Header Word 1 time 739, the Destination Node ID is received into register 790 in the first two bytes and the command field in the second two bytes as shown in FIG. 27. During Header Word 2 time 740, the Source Node ID is received in the first two bytes and the word count field in the second two bytes of register 790 as shown in FIG. 27. At the end of Header Word 2 time 740, the word count as received by bytes 2 and 3 are loaded into count register 780 from register 790. Count register 780 defines how many data words are provided with the present message. Count Register 780 is decremented every RT3 time, except for Header Words 1 and 2. Count Equals Zero Detect block 782 detects when count register 780 has decremented to zero, as an indication that the last data word of the message has been loaded into register 790. Count register 780 going to zero and being detected by block 782 causes the LAST DATA WORD signal and its inverse to be generated by gates 785 and 787. Referring to FIG. 36, the Last DATA WORD signal into gate 742 prevents RT0 from occurring again after the last byte of the last data word is received at RT3 time, instead gate 750 causes the Recv CRC latch 736 to set (RCRC) after the last RT3 signal receives the last data byte. The RCRC signal 736 goes to gate 786 (FIG. 37) and causes the CRC byte from block 794 to be loaded into register 790 byte 0, from where it is compared in block 756 to the calculated CRC byte generated by block 796 during real time as the complete message arrived through block 794. The RCRC signal 736 feeds the END latch 735 and causes it to set at the rise of the next 100 MHZ clock signal, while the RCRC signal 736 resets at the same time. The fall of the RCRC signal 736 clocks latch 758 and records a CRC error if the calculated CRC byte does not compare identically with the received CRC byte. The next 100 MHZ clock rise after the RCRC latch latch 736, causes it to reset and activate the END latch 735. End signal 735 causes block 170 to respond to the receive message by sending either an OUTX-ACCEPT or OUTX-REJECT signal to network 30.

FIG. 38 shows the timing for the receiving node accepting the message and responding with the OUTX-ACCEPT signal. Referring to FIG. 37, the OUTX-ACCEPT signal 764 occurs during the END 735 time period, if block 170 is: not going to issue the OUTX-REJECT signal 769, has not been commanded to the IGNORE MODE, or has not experienced a Loss of Signal from the serial interface as detected by gates 777 and 778 (either of these conditions are over-ridden if the command being received is a Remote Link Command as specified by bit 18 of register 554 of FIG. 27 and decoded by register 775 and gate 772). When block 170 is commanded to the IGNORE MODE, it never issues OUTX-ACCEPT, OUTX-REJECT, or the END OF MESSAGE signals. When OUTX-ACCEPT goes active, the END OF MESSAGE signal 752 is also driven active, if the inverse Remote Link Command as specified by bit 18 of register 554 of FIG. 27 and decoded by register 775 and gate 754 is active. The END OF MESSAGE signal 752 goes to buffer 150 and causes the message just received and accepted to be recorded as a valid message in buffer 150. The END OF MESSAGE signal 752 is not activated for a Remote Link Command, because that command is executed by block 170. Any Remote Link command message sent to buffer 150 is erased from buffer 150 by issues the CANCEL MESSAGE signal 760, rather than the END OF MESSAGE signal 752. The CANCEL MESSAGE signal 760 is issued through gate 774 for any Remote Link Command message, through gate 767 for any rejected message, or by latch 748 for the Early Terminate of a message. A message is considered to be terminated early if the OUTX-VALID signal goes inactive prior to the entire message by received successfully. This is detected by the fall of the OUTX-VALID signal through gate 745 (FIG. 36) to set latch 748 and then 40 ns later to reset latch 748 through delay block 747, thus causing the Early Terminate signal 748 to be a 40 ns pulse.

A message is rejected by block 170 responding with the OUTX-REJECT signal if a CRC ERROR was detected by latch 758, buffer 150 is full and cannot receive any messages as detected by gate 768, block 170 has been commanded to the REJECT MODE as detected by gate 770, or logic block 765 has detected a destination miscompare error. When block 170 is commanded to the REJECT MODE, it rejects every message by always issuing the OUTX-REJECT signal, and never issuing the OUTX-ACCEPT or the END OF MESSAGE signals. The destination miscompare error is detected by block 765 when the destination Node ID received over the network 30 in Header Word 1 and loaded into bytes 0 and 1 of register 790 does not compare identically with the NODE ID value stored in the Node ID Register 650 (FIG. 34). The destination miscompare error means that a message that should have gone to another destination was erroneously received into this destination, and is therefore rejected. Latch 766 stores the value of the destination compare at the end of Word 1 latch 739 time and is feed to gate 767 to cause OUTX-REJECT to go active, if there is a miscompare. Either the OUTX-ACCEPT or OUTX-REJECT signals, once activated, remain active until the OUTX-VALID signal from the network 30 is reset to zero. When this happens, The ENABLE TIMING latch 738 (FIG. 36) is reset causing the END latch 735 to reset and the R IDLE latch 730 to set, thus completing the reception of the present message and returning block 170 to the IDLE state. OUTX-VALID going to zero also resets the OUTX-REJECT signal by resetting latches 766,758,737, and 738.

Referring to FIG. 37, the command field is received as bytes 2 and 3 of Header Word 1 into register 790 and sent to the Receive Command Register 775, where the received command field is latched for the duration of the message receive operation. The command received could instruct block 170 to receive a normal valid message to be sent to buffer 150, or to execute a Remote Link Command. Referring to FIG. 34, the Link Control & Switch Control Registers block 172 of FIG. 14 is shown in more detail. The bit 18 command bit (Remote Link Command) is latched in register 775 and used to over-ride some normal valid message receiving sequences. In addition, other bits 20 to 23 of register 775 are decoded in block 776 to define the individual Remote Link Commands to be executed by block 170. Remote Link commands are not sent to block 700, as gates 754 and 772 are used to prevent a valid Remote Link command from being stored successfully into buffer 150. Instead, the Remote Write Node ID command, as generated by command decoder 776, goes to register 650 through gate 660 and causes a data message word to be written into register 650 from register 792 through MUX 658. The information in register 650 is used to control the interface of blocks 170 and 180 (FIG. 14) to network 30. Register 650 defines the number of stages in the network, the Node ID number (Source and Destination Node) associated with the network pod, a Switch Reset, and other network controls. The Remote Write Control Reg command as generated by command decoder 776 goes to register 652 through gate 664 and causes a data message word to be written into register 652 from register 792 through MUX 658. The information in register 652 is used to control the link interface, Referring to FIG. 34, a Remote Write Node ID command can load register 650 as well as a Local Write Node ID command, which allows network 30 to be set up either from the local node processor or over the network from a remote node processor. Block 170 can also send commands to gate 664 allowing a Remote Write Control Reg command to load register 652 as well as a Local Write Control Reg command; and MUX 658 can select write data from block 170 as well as block 180.

Figure 39:
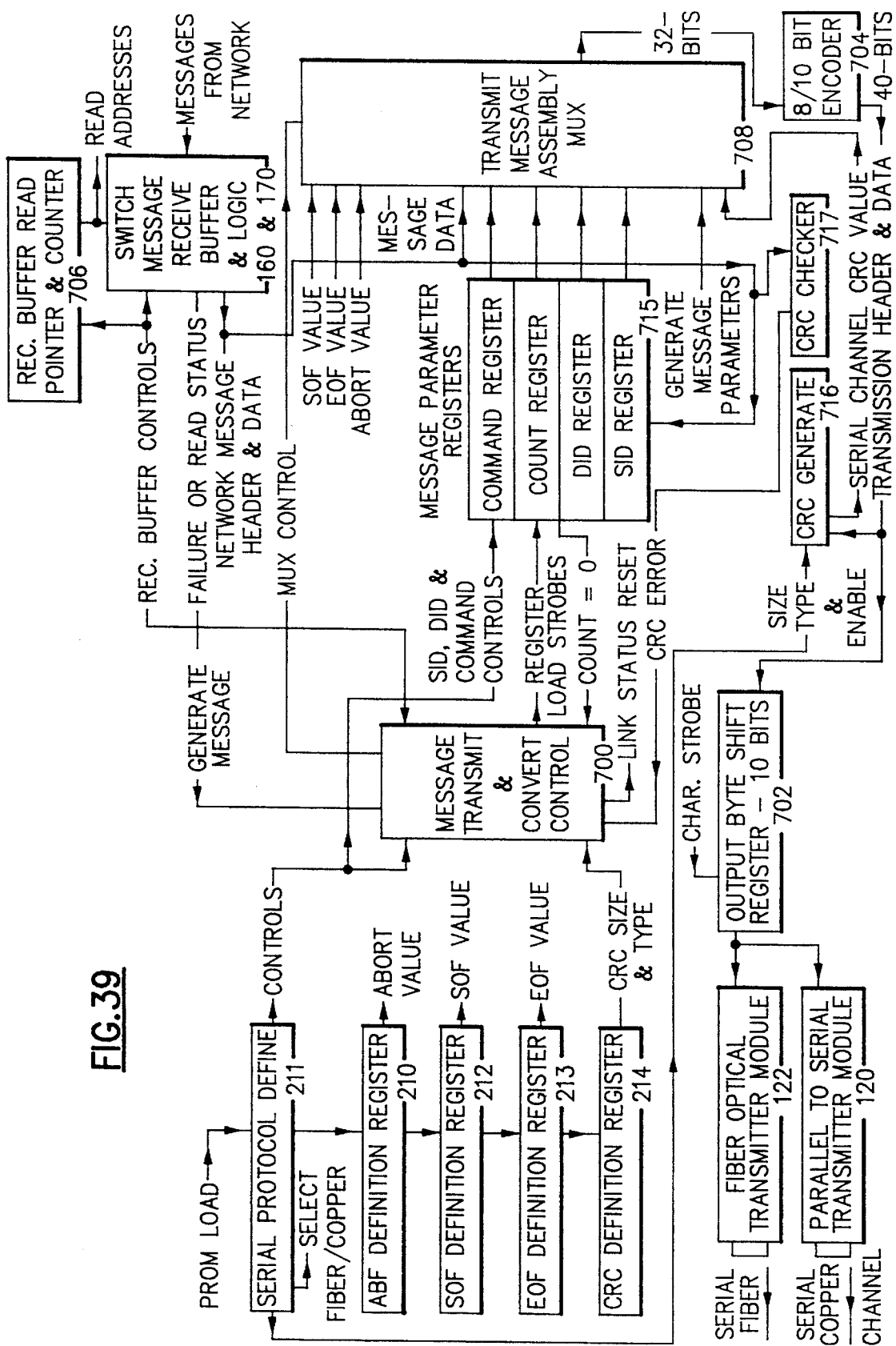
FIG. 39 shows a schematic block diagram of our preferred embodiment of the serial frame transmit and protocol translation functions provided as a portion of the present invention to send serial data protocols over fiber or copper channels when communications are received from the parallel switch network.

Referring to FIG. 14, the message received from network 30 is stored as is in the Switch Message Receive Buffer 150, then the Message Frame Transmitter and Protocol Translator 130 reads the data message form buffer 150 and converts it to the serial data protocol, generates the link header, serializes the message, generates the link trailer, and transmits the entire frame either over fiber using Fiber Optic Transmitter Module 122 or over copper wire using the Serial to Parallel Transmitter Module 120—whichever one is active. Referring to FIG. 39, a more detailed drawing of the Frame Transmitter and Protocol Translator block 130 is shown, which is shown to contain 5 registers 210 to 214 which are the same registers used in FIG. 17 and are initially loaded from PROM Serial Format Controller 134. The PROM 134 is uniquely programmed for every serial protocol supported by MMSA 20 and upon detecting power-on conditions, the contents of PROM 134 are loaded into registers, like 210 to 214, to control the subsequent operation of MMSA 20 in a unique manner to conform to the selected serial protocol. Register 212 defines the bit pattern for each byte in the SOF portion of the link header plus the number of bytes in the SOF. This not only allows the SOF bit patterns to be programmable, but it also controls the size of the SOF field. Block 130 conveals the valid message stored in buffer 150 into a message compatible with the preferred serial protocol by first generating the link header. The SOF bit pattern defined in register 212 is transmitted as the first pad of the link header portion of the serial message. The serial bit stream sent to module 120 or 122 and is converted to 10-bit parallel data by encoder 704 and transmitted through register 702. Register 702 sends all valid messages which are converted into the 10-bit characters of the preferred serial protocol to modules 120 or 122 to be converted to bit-serial data and transmitted over fiber or copper wire to the destination node.

Figure 42A:
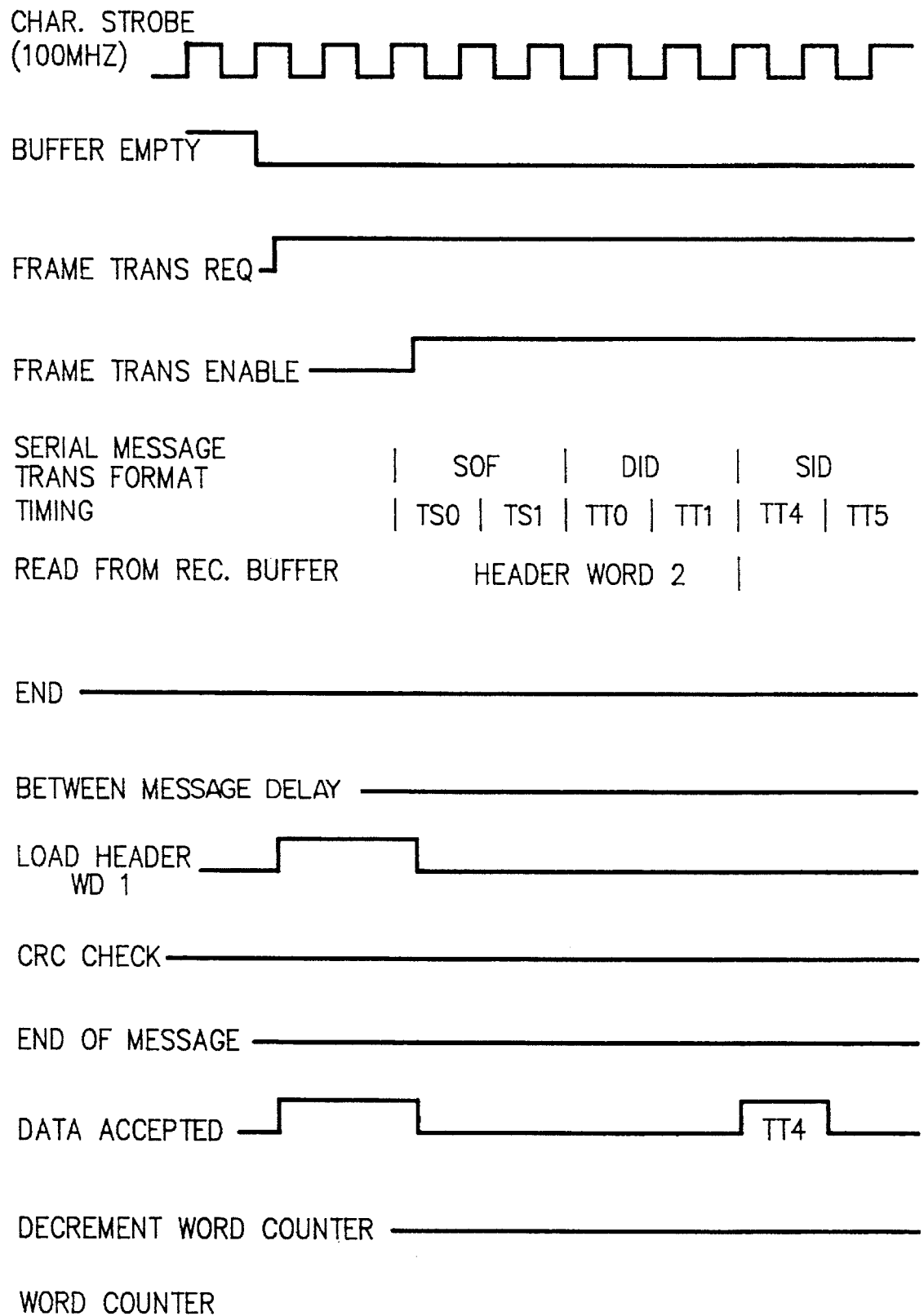
FIG. 42 is a timing diagram, which shows a typical example of the serial frame transmit and protocol translation function of the present invention receiving and translating the protocol for a message received over the parallel switch network.
Figure 42B:
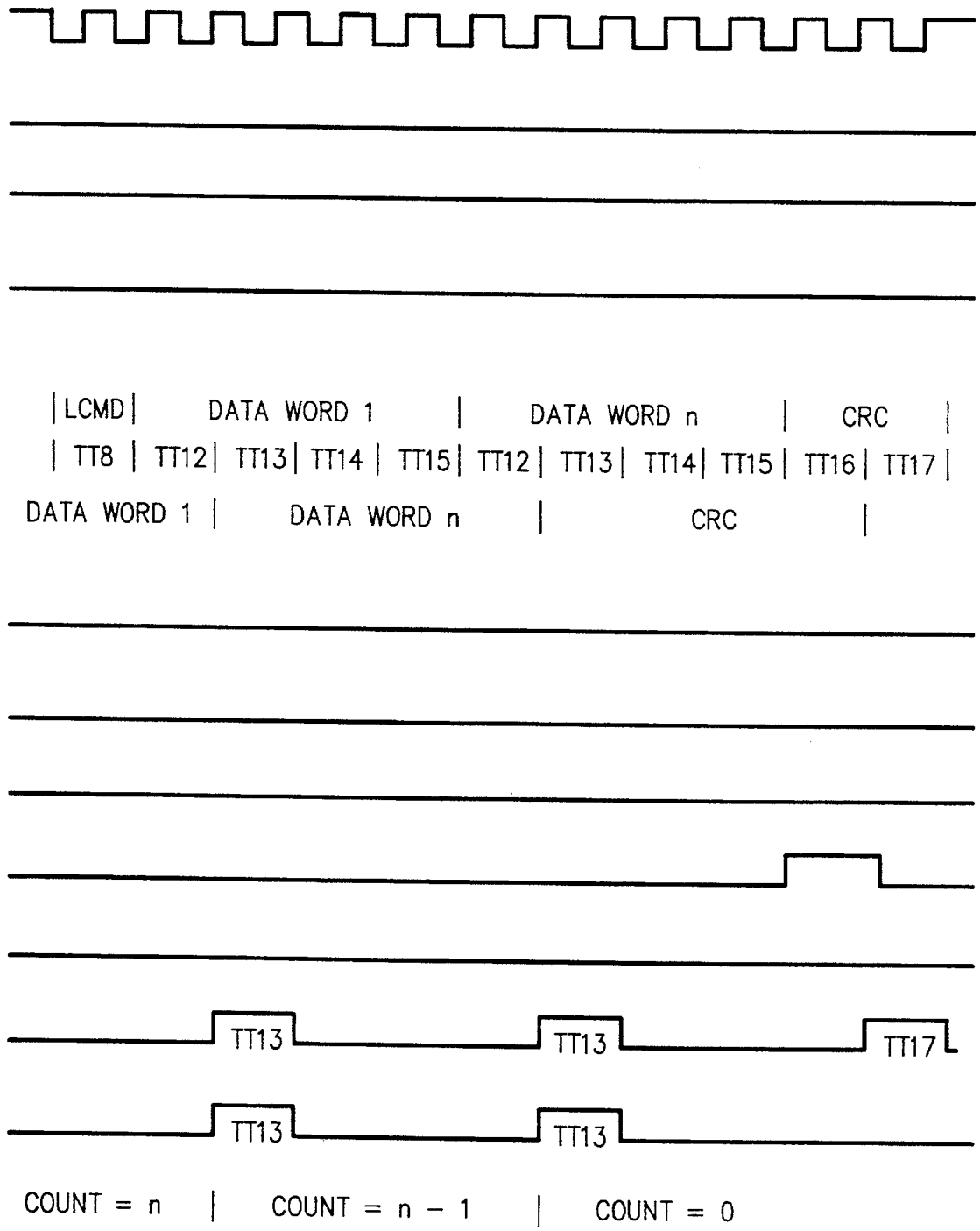
Figure 42C:
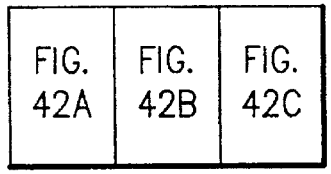
Figure 42:
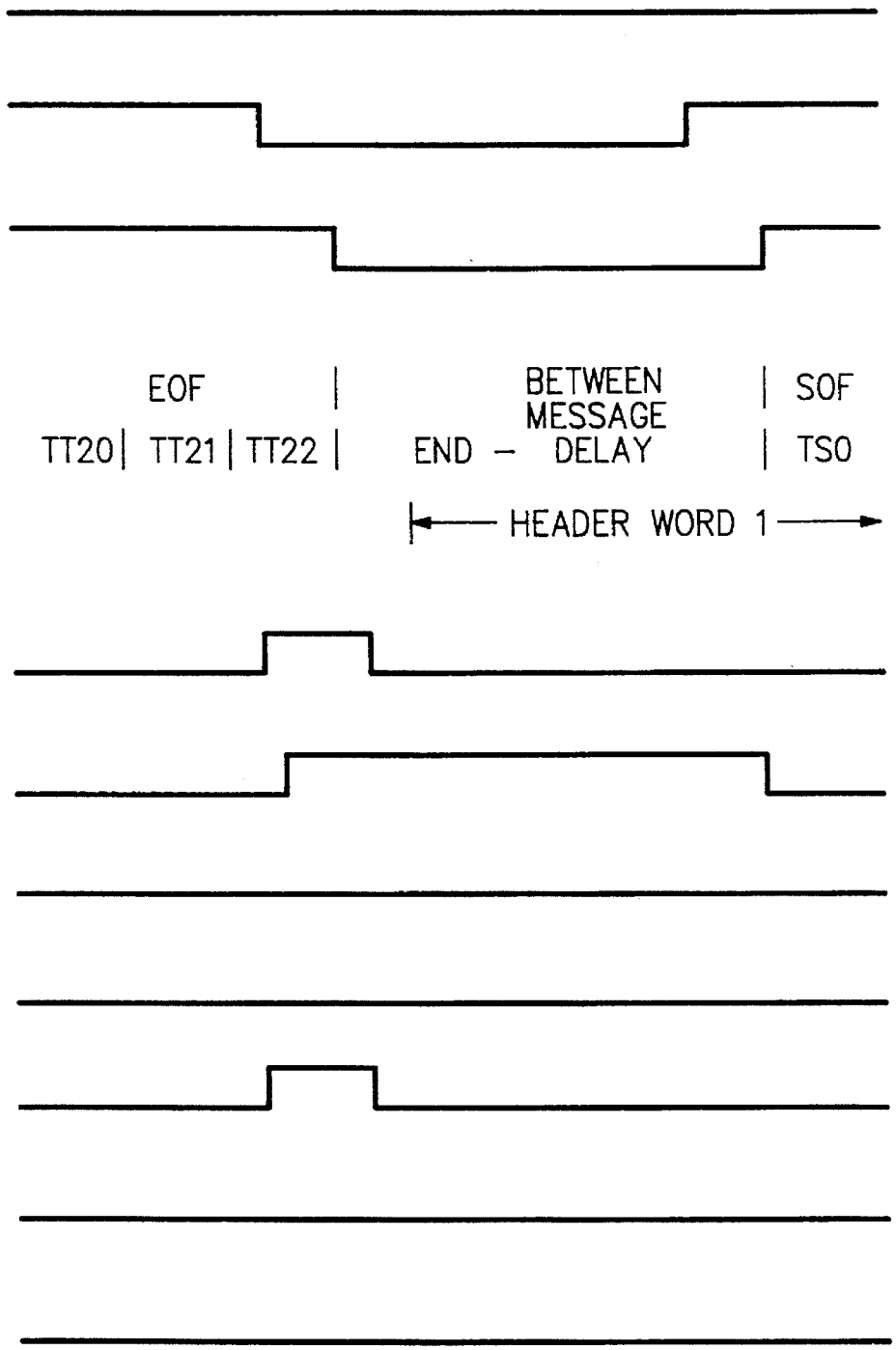

It is the function of block 130 to read a valid message from buffer 150 and to transmit it to the proper destination node over the serial interface. Referring to FIG. 42, the timing for the Frame Transmission and Protocol Translation function performed by block 130 is shown. When the BUFFER EMPTY signal from block 724 (FIG. 35) is active, block 130 is IDLE and not active. When the BUFFER EMPTY signal goes to zero, block 130 is activated and generates a series of timing signals called TS0 to TS3 (Timing SOF 0 to 3) and TT0 to TT24 (Transmission Time 0 to 24) that control the block 130 operation as shown in FIG. 42.

Figure 40A:
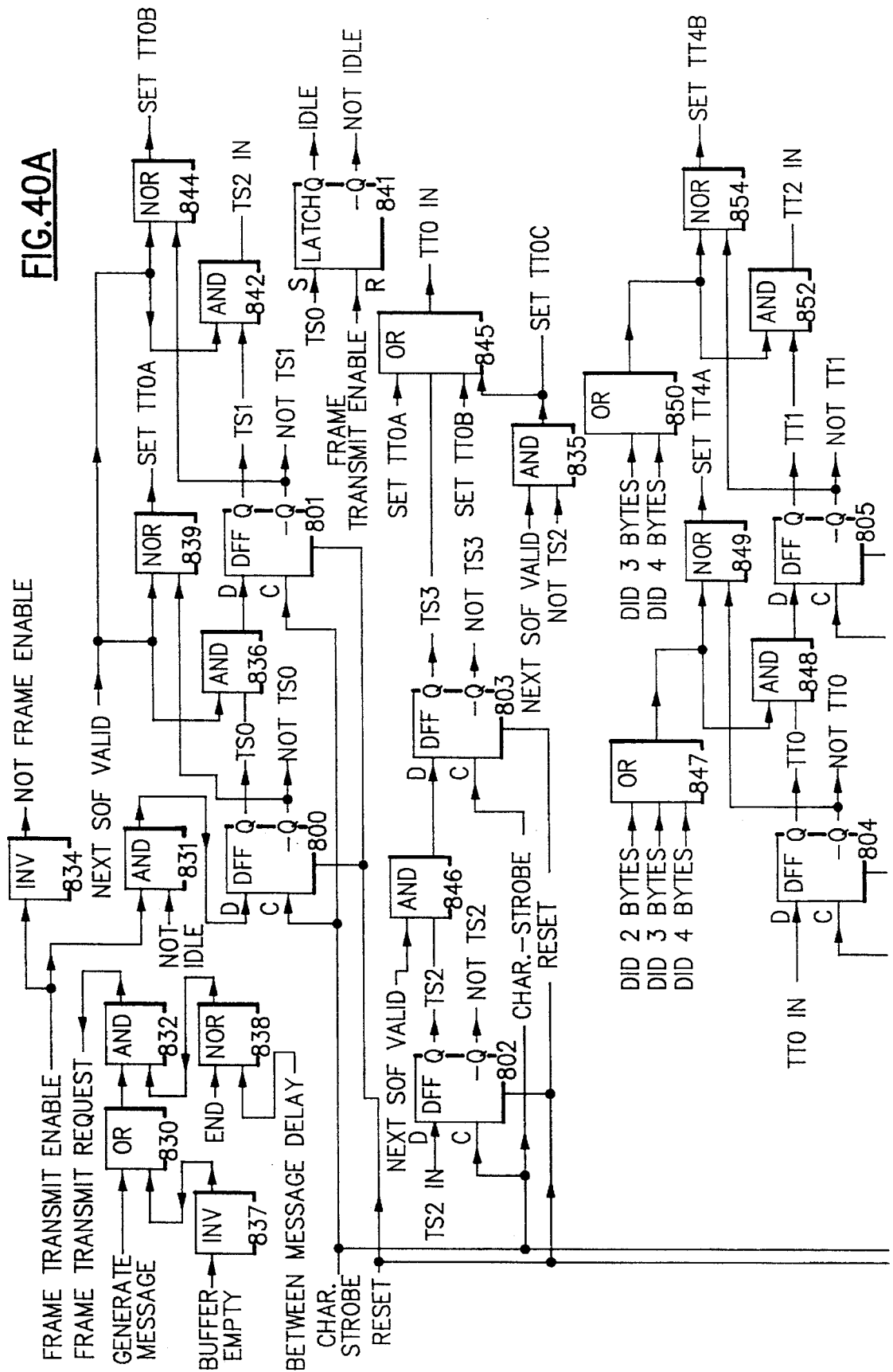
FIG. 40 shows a detailed logic diagram of the timing function of our preferred embodiment of the serial frame transmit and protocol translation function of the present invention.
Figure 40B:
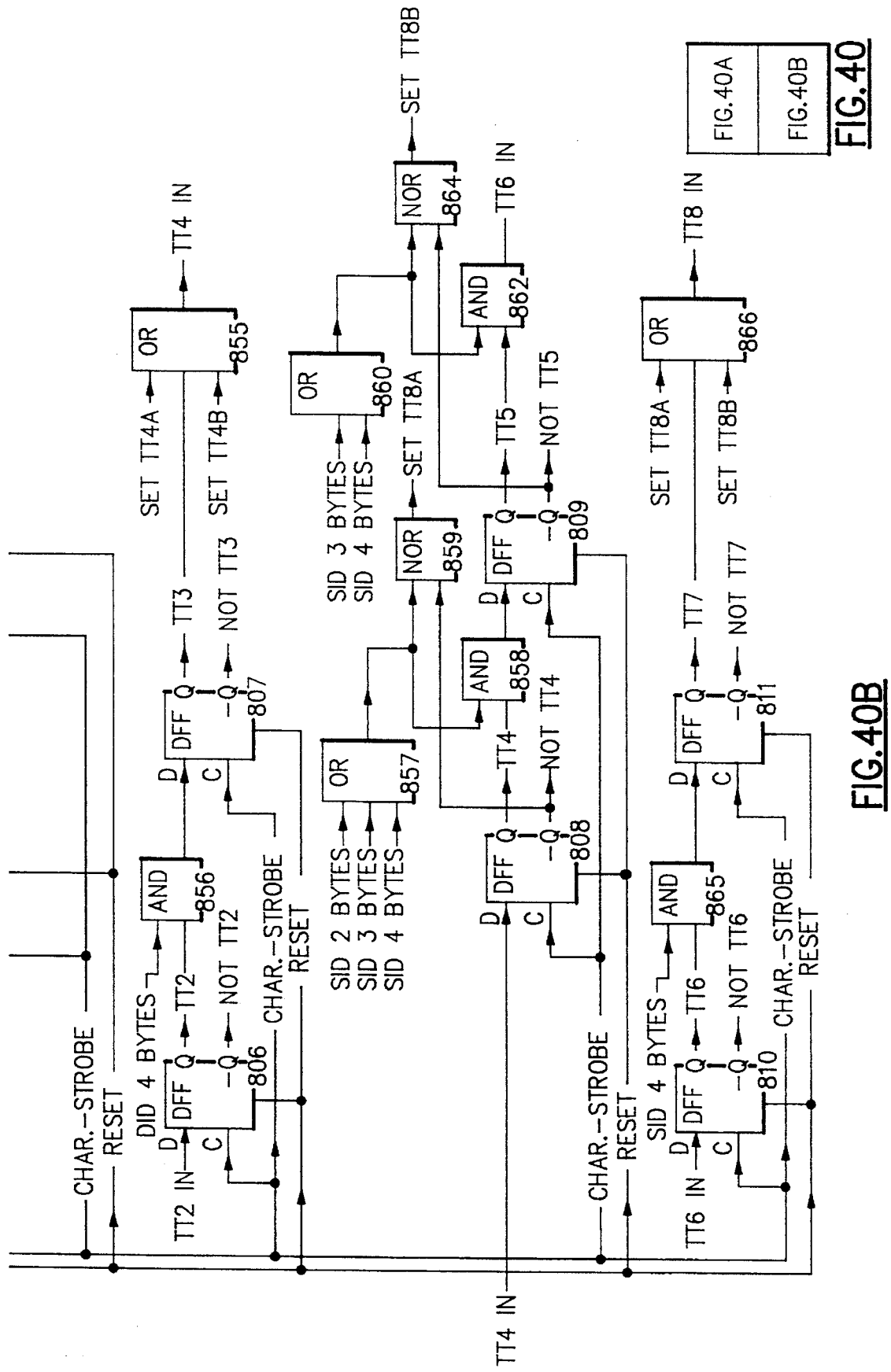

Referring to FIG. 40, the detailed timing logic of block 130 is shown. The BUFFER EMPTY arrives into block 130 from buffer 150, is inverted by gate 837, going through gates 830 and 832 to generate the Frame Transmit Request signal 832 to block 154 of the Continuous Sequence Control logic shown in FIG. 16. Block 154 controls the inserting of valid messages into the continuous sequence stream. At the appropriate instant after the transmission of a complete IDLE sequence, block 154 responds to the Frame Transmit Request signal 832 with the Frame Transmit Enable signal, which defines the interval when block 130 can use register 702 and transmitter module 120 or 122 to transmit a valid message over the serial interface. Synchronized with the completion of the valid message by the transmission of the link trailer, block 130 drops the Frame Transmit Request signal, which causes block 154 to drop the Frame Transmit Enable signal and to then return to transmitting continuous IDLE sequences. The Frame Transmit Enable, when first activated to FIG. 40, arrives into TS0 latch 800 through gate 831 and immediately synchronizes and starts the block 130 timing logic by setting TS0 latch 800. The TS0 signal being set, resets IDLE latch 841 as block 130 moves from the IDLE state into the serial message generation state. All the block 130 timing latches are set and reset based on the Char. Strobe signal having a 40 ns period, which is the basic 10-bit character transmission frequency of the preferred serial protocol and causes a 10-bit character to be transmitted to module 120 or 122 at a 100 char./sec frequency which is compatible with up to a 1 gigabit/sec serial data transmission rate. The Char. Strobe signal causes a new timing signal to be set every 40 ns and the old timing signal to be reset. For instance, the first rise of the Char. Strobe signal after the Frame Transmit Enable signal goes active, the TS0 signal is set. The second rise of the Char. Strobe signal after the Frame Transmit Enable signal goes active, TS1 latch 801 which is fed from the TS0 signal is set, and the TS0 signal is reset at the same time because of the NOT IDLE signal into gate 831. This continues in sequence, as shown in FIG. 42, right through time TT22 (skipping certain timing values where appropriate).

Figure 44B:
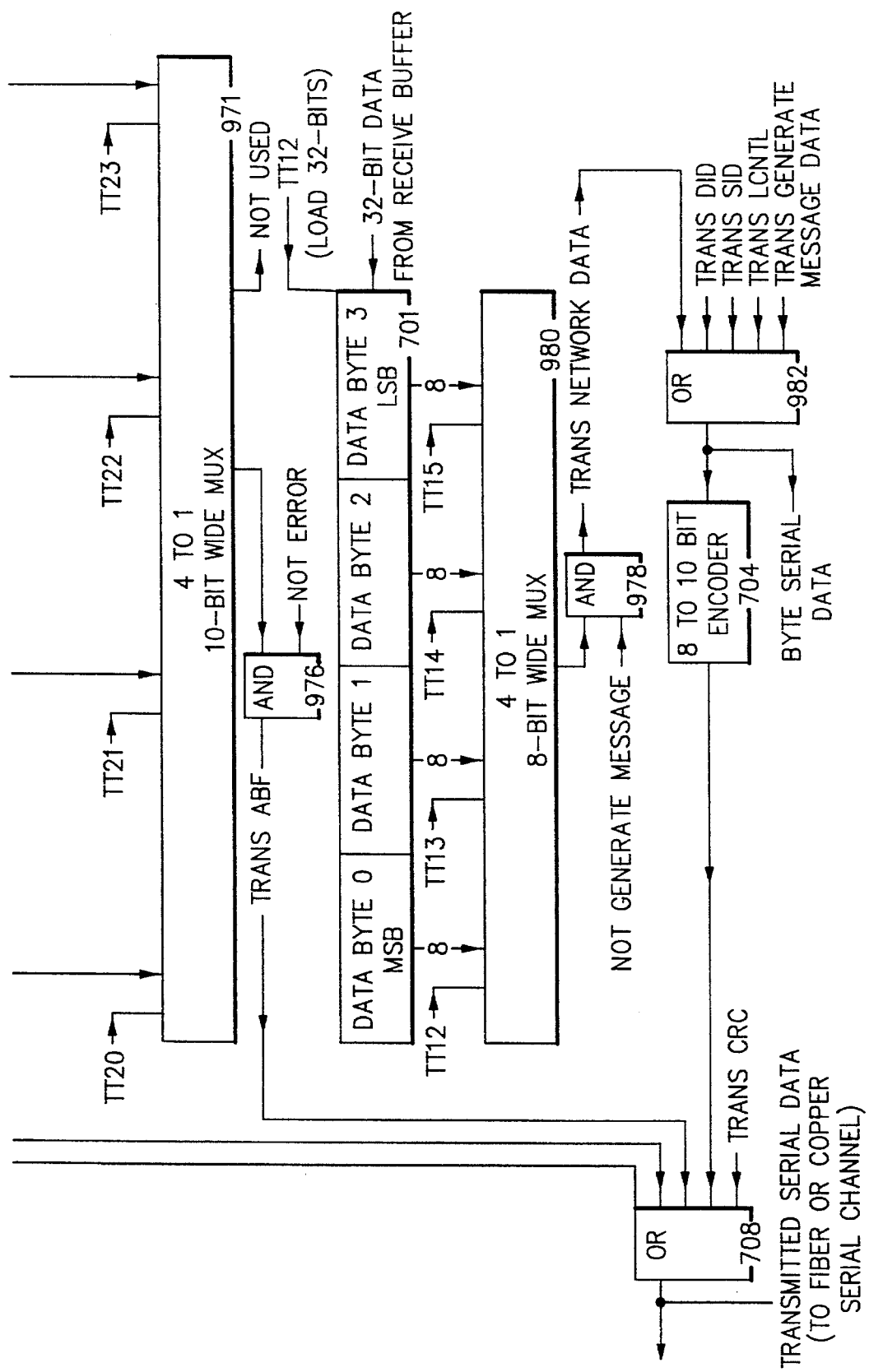
FIG. 44 shows a detailed logic diagram of the serial data generation function of our preferred embodiment of the serial frame transmit and protocol translation function of the present invention.

Referring to FIG. 42, the timing shown is in regards to the preferred embodiment of the serial protocol which generates two 10-bit SOF characters as the first portion of the generated Serial message. Referring to FIG. 44, more specific details of the SOF generation logic is shown. Register 212 is shown to be organized in 11-bit sections—an Enable bit plus a 10-bit SOF pattern. The 11-bit values from Register 212 are multiplexed to form one 11-bit value at a time by MUX 972. 10 bits from MUX 972 are fed to OR gate 708 (which is the detailed implementation of the Transmit Message Assembly MUX 708 of FIG. 39), and brings together the various portions of the serial message by feeding them to register 702 through encoder 704 for transmission to the destination node. The eleventh bit selected by MUX 972 is of the Enable bit for the next 10-bit character and generates the NEXT SOF VALID signal from block 972. The NEXT SOF VALID signal goes to FIG. 40 to control timing signals TS1 to TS3. The number of SOF characters generated, ranging from 1 to 4 characters, depends on the value of the NEXT SOF VALID signal which controls the timing gates TS0 to TS4—enabling one timing gate to generate one SOF character. For the preferred serial protocol, TS0 will always be activated and cause the 10-bit first SOF pattern and the 2nd Enable bit of register 212 (FIG. 44) to be gated to the output of MUX 972 as the TRANS SOF signal and the NEXT SOF VALID signal, respectively, during TS0 time. The NEXT SOF VALID signal will be programmed to be a logical 1 during TS0 time for the preferred protocol, and drives gates 836 and 839 (FIG. 40). The NEXT SOF VALID signal being a one disables gate 839 and enables gate 836 at TS0 time, so that for the next rise of the Char. Strobe signal, TS1 latch 801 is set as shown in FIG. 42. TS1 being set will cause the 10-bit second SOF pattern and the 3rd Enable bit of register 212 to be gated to the output of MUX 972 as the TRANS SOF signal and the NEXT SOF VALID signal, respectively, during TS1 time. The NEXT SOF VALID signal will be programmed to be a logical 0 during TS1 time for the preferred protocol defining only a two character SOF field. The NEXT SOF VALID signal being a zero disables gate 842 and enables gate 844 at TS1 time, so that for the next rise of the Char. Strobe signal, TS2 latch 802 and TS3 latch 804 are skipped over and the timing sequence is forced to set TT0 latch next through gates 844 and 845 as shown in FIG. 42. TS2 and TS3 would not be skipped over if the preferred serial protocol required a 3 or 4 byte SOF field.

Figure 41A:
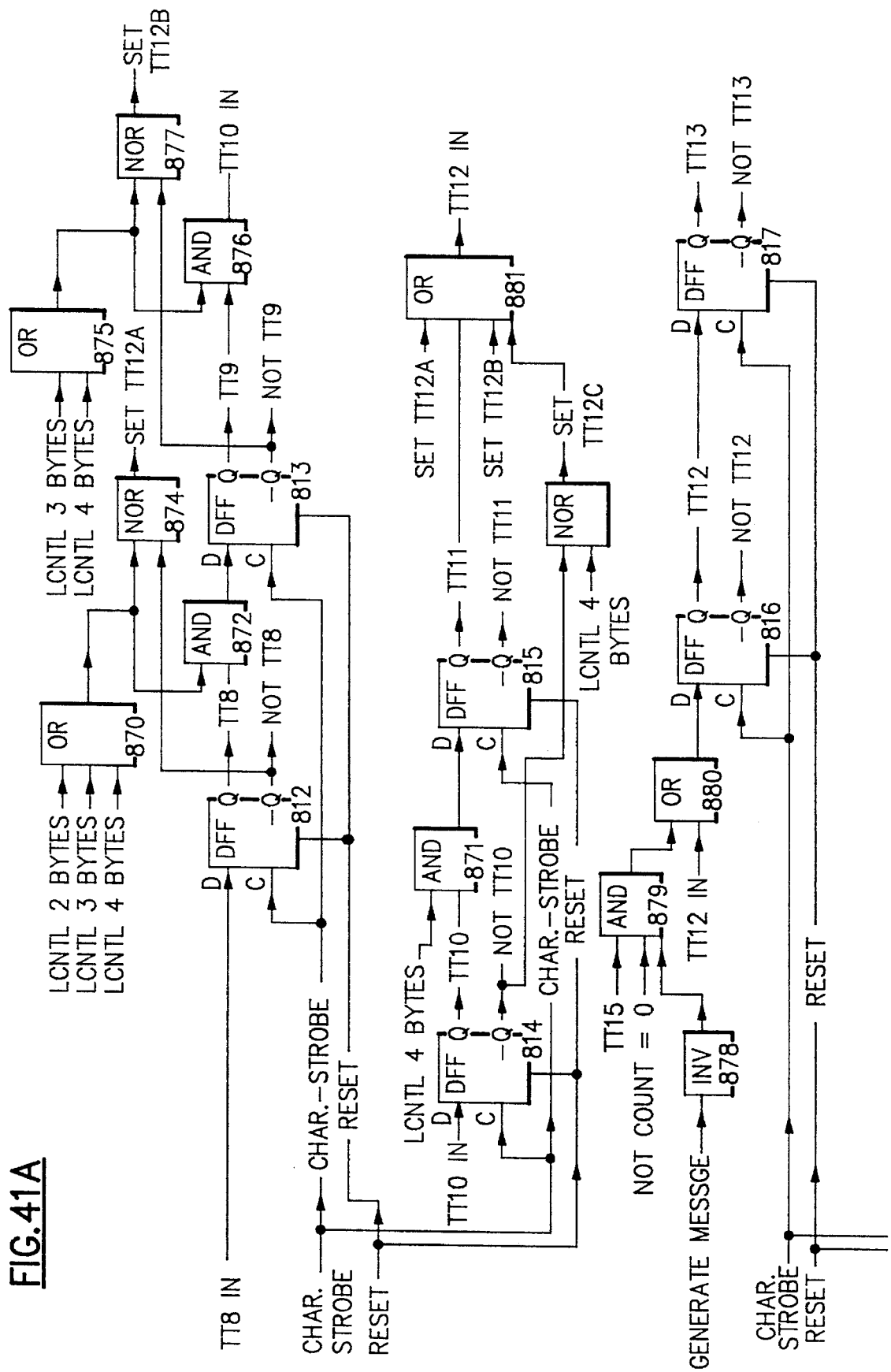
FIG. 41 shows an additional detailed logic diagram of the timing and control function of our preferred embodiment of the serial frame transmit and protocol translation function of the present invention.
Figure 41:
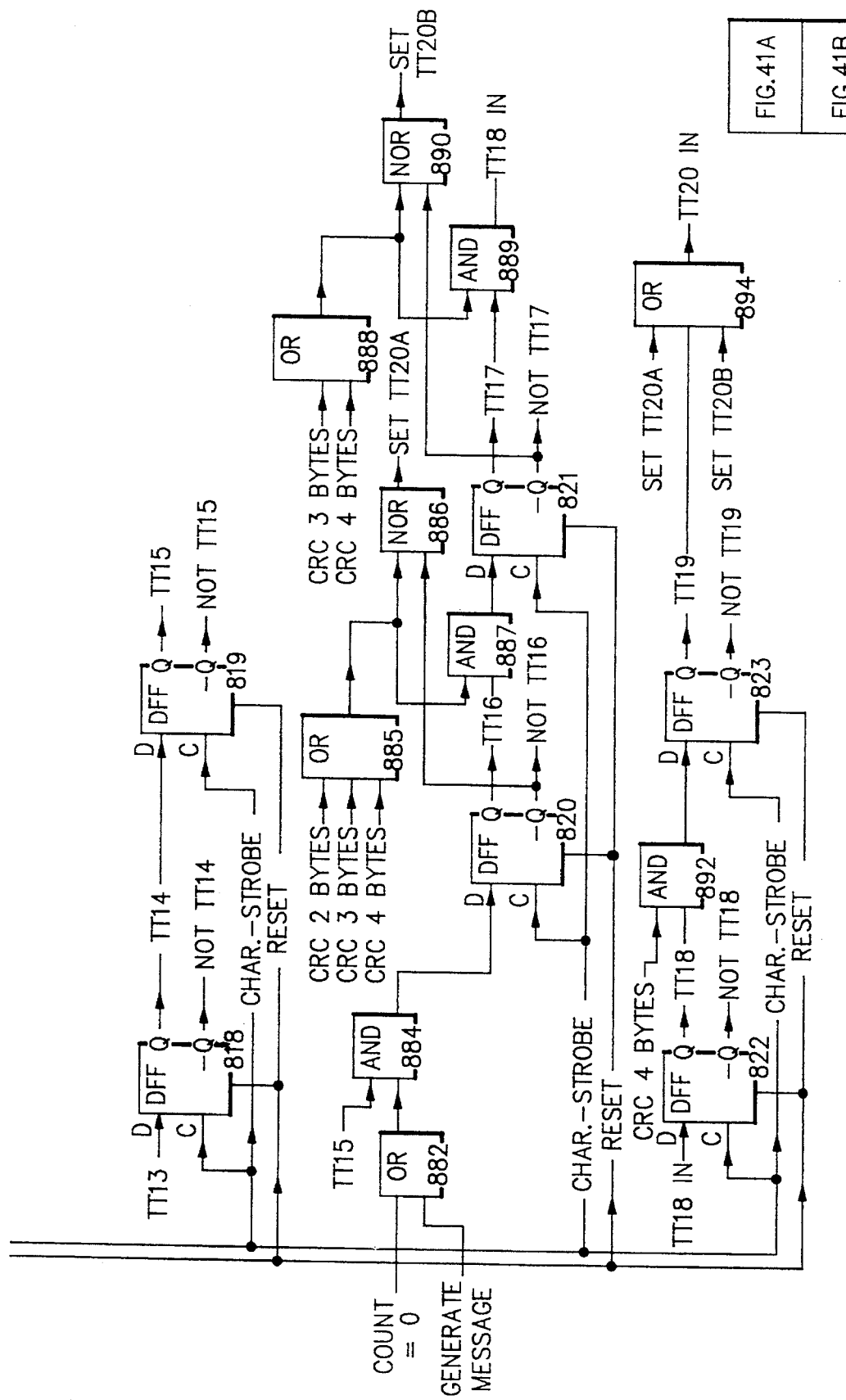

Referring to FIGS. 40 and 41, more specific details of the TT0 to TT24 timing signals is shown. The TT0 IN signal 845 becoming active to TT0 latch 804 during TS1 time causes the TT0 signal to set upon the arrival of the next Char. Strobe signal, after the two SOF characters have been generated. Latch 804 defines the TT0 signal (Transmission Time 0) as the very first interval of time following the SOF generation. For the preferred serial protocol, the first two characters following the SOF characters are the DID field of the link header as shown in FIG. 24, and the DID field occurs during TT0 and TT1 times as shown in FIG. 42. When the next Char. Strobe following TT0 loads the first DID character into register 702, at the same time TT1 latch 805 sets and TT0 latch 804 resets. The length of the DID field is programmable based on the value stored into the SERIAL PROTOCOL DEFINE Register 211 (FIG. 39) during the initial load of data from the PROM Serial Format Protocol Controller 134. The SERIAL PROTOCOL DEFINE Register 211 is shown in more detail in FIG. 26 as block 544. Block 544 generates some programmable signals which define whether the length of the field as DID 2 BYTES, DID 3 BYTES, or DID 4 BYTES. These DID control signals are used in FIG. 40 in gates 847, 850, and 856 to determine the length of the DID field and to control the associated timing logic. If DID 2 Bytes is active, as in our example of the preferred serial protocol, the TT1 latch 805 is set next and controls the generation of the second DID character (or byte). If DID 3 Bytes is active, the TT1 latch sets as well as the TT2 latch 806 in a mutually exclusive sequence after the TT0 signal, and the 3 timing signals control the generation of three DID characters. If DID 4 Bytes is active, the TT1 and TT2 latches set as well as the TT3 latch 807 in a mutually exclusive sequence after the TT0 signal, and the 4 timing signals control the generation of four DID characters. However, for the preferred serial protocol with DID 2 Bytes being set, TT2 and TT3 do not get set but are skipped and TT4 follows TT1 as shown in FIG. 42. When DID 3 Bytes and DID 4 Bytes are zeroes, gate 850 goes to a zero and causes gate 854 to go to a 1 and set TT4 latch 808 through gate 855, immediately following TT1 when the next Char. Strobe following TT1 loads the second DID character into register 702. At the same time TT4 latch 808 sets, TT1 latch 807 gets reset.

For the preferred serial protocol, the first two characters following the DID characters define the SID field of the link header as shown in FIG. 24, and the SID field occurs during TT4 and TT5 times. When the next Char. Strobe following TT4 loads the first SID character into register 702, at the same time TT5 latch 809 sets and TT4 latch 808 resets. The length of the SID field, like the length of the DID, is programmable based on the value stored into the SERIAL PROTOCOL DEFINE Register 211 (FIG. 39) during the initial load of data from the PROM Serial Format Protocol Controller 134. The SERIAL PROTOCOL DEFINE Register 211 is shown in more detail in FIG. 26 as block 544. Block 544 generates some programmable signals which define whether the length of the field as SID 2 BYTES, SID 3 BYTES, or SID 4 BYTES. These SID control signals are used in FIG. 40 in gates 857, 860, and 865 to determine the length of the SID field and to control the associated timing. If SID 2 Bytes is active, as in our example of the preferred serial protocol, the TT5 latch 809 is set next and controls the generation of the second SID character (or byte). If SID 3 Bytes is active, the TT5 latch sets as well as the TT6 latch 810 in a mutually exclusive sequence after the TT4 signal, and the 3 timing signals control the generation of three SID characters. If SID 4 Bytes is active, the TT5 and TT6 latches set as well as the TT7 latch 811 in a mutually exclusive sequence after the TT4 signal, and the 4 timing signals control the generation of four SID characters. However, for the preferred serial protocol with SID 2 Bytes being set, TT6 and TT7 do not get set but are skipped and TT8 follows TT5 as shown in FIG. 42. When SID 3 Bytes and SID 4 Bytes are zeroes, gate 860 goes to a zero and causes gate 864 to go to a 1 and set TT8 latch 812 through gate 866, immediately following TT5 when the next Char. Strobe following TT5 loads the second SID character into register 702. At the same time TT8 latch 812 sets, TT5 latch 809 gets reset.

For the preferred serial protocol, the first character following the SID characters defines the Link Control field of the link header as shown in FIG. 24, which occurs during TT8 time. The length of the LCNTL (Link Control) field, like the length of the DID and SID fields, is programmable based on the value stored into the SERIAL PROTOCOL DEFINE Register 211 (FIG. 39) during the initial load of data from the PROM Serial Format Protocol Controller 134. The SERIAL PROTOCOL DEFINE Register 211 is shown in more detail in FIG. 26 as block 544. Block 544 generates some programmable signals which define whether the length of the field as LCNTL 2 BYTES, LCNTL 3 BYTES, or LCNTL 4 BYTES. These LCNTL control signals are used in FIG. 41 in gates 870, 871, and 875 to determine the length of the LCNTL field and to control the associated timing logic. If LCNTL 2 Bytes is active, the TT9 latch 813 is set next and controls the generation of the second LCNTL character (or byte). If LCNTL 3 Bytes is active, the TT10 latch 814 sets as well as the TT9 latch 813 in a mutually exclusive sequence after the TT8 signal, and the 3 timing signals control the generation of three LCNTL characters. If LCNTL 4 Bytes is active, the TT9 and TT10 latches set as well as the TT11 latch 815 in a mutually exclusive sequence after the TT8 signal, and the 4 timing signals control the generation of four LCNTL characters. However, for the preferred serial protocol with SID 2 Bytes being a zero, TT9, TT10 and TT11 do not get set but are skipped and TT12 follows TT8 as shown in FIG. 42. When LCNTL 2 Bytes to LCNTL 4 Bytes are zeroes, gate 870 goes to a zero and causes gate 874 to go to a 1 and set TT12 latch 816 through gate 881, immediately following TT8 when the next Char. Strobe following TT8 loads the LCNTL character into register 702. At the same time TT12 latch 816 sets, TT8 latch 812 gets reset.

Figure 45:
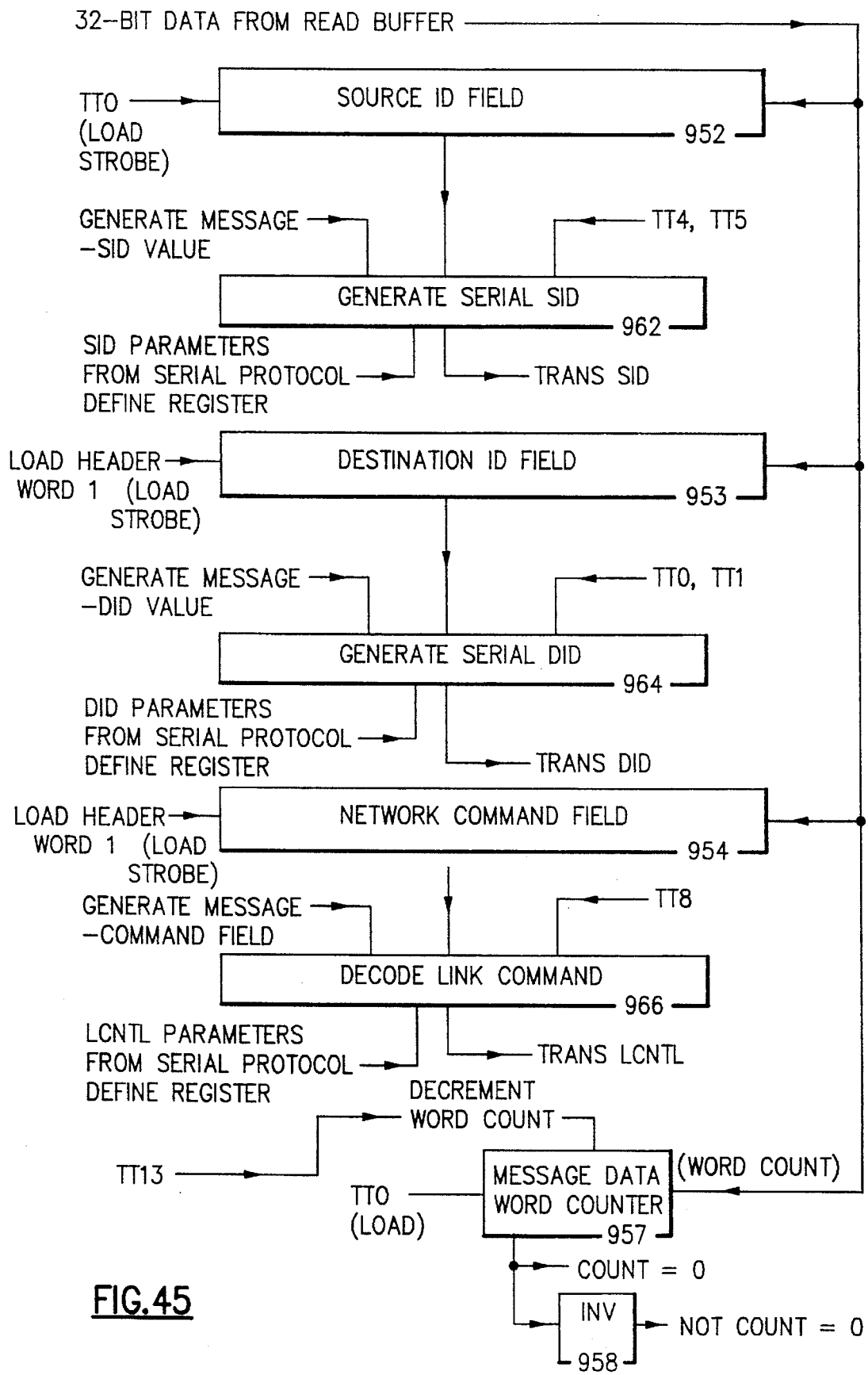
FIG. 45 shows a detailed logic diagram of the message parameter registers required by our preferred embodiment of the serial frame transmit and protocol translation function of the present invention to translate protocols.

Referring to FIG. 39, the DID, SID and Link Control Command timing signals TT0 to TT11 cause the associated 10-bit characters to be read from register block 715, sent to Transmit Assembly MUX 708, encoder 704, register 702, and finally to the serial transmitter module 120 or 122. The processing performed by block 130 involves converting the values in registers 715 to 10-bit characters and sending them in the proper sequence to register 702. For the preferred serial protocol, the only conversion required for the link header and message data is the 10 to 8-bit conversion. However, there is nothing to inhibit the present invention from performing more complex conversions that can be programmable and defined by unused bits in register 544 of FIG. 26. Register block 715 which receives and stores Header Word 1 and Header Word 2 data in the network parallel protocol format are further detailed in FIG. 45. The DID register 953 can store up to 4 bytes of data being loaded in the preferred embodiment from the high order 16-bits of Header Word 1 data received from buffer 150 at LOAD HEADER WORD 1 time as shown in FIG. 42. The Generate Serial DID block 964 uses the data stored in register 953 to generate up to 4 DID bytes as controlled by timing signals TT0 to TT3 and any special programmable DID parameters required from Serial Protocol Define Register 211. The 1 to 4 bytes generated by block 964 as the TRANS DID signal goes to gate 982 of FIG. 44, where it is time multiplexed during times TT0 to TT3 to encoder 704 to be converted to 10-bit characters before being sent to register 702 through OR MUX 708. The SID register 952 can store up to 4 bytes of data being loaded in the preferred embodiment from the high order 16-bits of Header Word 2 data received from buffer 150 at TT0 time as shown in FIG. 42. The Generate Serial DID block 962 uses the data stored in register 952 to generate up to 4 SID bytes as controlled by timing signals TT4 to TT7 and any special programmable SID parameters required from Serial Protocol Define Register 211. The 1 to 4 bytes generated by block 962 as the TRANS SID signal goes to gate 982 of FIG. 44, where it is time multiplexed during times TT4 to TT7 to encoder 704 to be converted to 10-bit characters before being sent to register 702 through OR MUX 708. The Network Command field register 954 can store up to 4 bytes of data being loaded in the preferred embodiment from the low order 16-bits of Header Word 1 data received from buffer 150 at LOAD HEADER WORD 1 time as shown in FIG. 42. The Decode Link Command block 966 uses the data stored in register 954 to generate up to 4 LCNTL bytes as controlled by timing signals TT8 to TT11 and any special programmable LCNTL parameters required from Serial Protocol Define Register 211. The 1 to 4 bytes generated by block 966 as the TRANS LCNTL signal goes to gate 982 of FIG. 44, where it is time multiplexed during times TT0 to TT3 to encoder 704 to be converted to 10-bit characters before being sent to register 702 through OR MUX 708. The Message Data Word Counter 957 is loaded in the preferred embodiment from the low order 16-bits of Header Word 2 data received from buffer 150 at TT0 time as shown in FIG. 42. The Message Data Word Counter 957 is decremented at TT13 time as each 32-bit message data word is read from buffer 150. When the count decrements to zero, it is detected by the Count=0 signal and its inverse as generated by block 957 and gate 958.

Referring to FIG. 42, the timing shows that starting at time TT12 the data podion of the serial message is generated from 32-bit message data words read from buffer 150 and stored into register 701, as shown in FIG. 44. A serial sequence of four 10-bit characters is generated by MUX 980 from data stored into four-byte register 701, with data byte 0 being time multiplexed onto the TRANS NETWORK DATA signal at TT12 time, data byte 1 being time multiplexed onto the TRANS NETWORK DATA signal at TT13 time, data byte 2 being time multiplexed onto the TRANS NETWORK DATA signal at TT14 time, and data byte 1 being time multiplexed onto the TRANS NETWORK DATA signal at TT15 time. The 4 bytes generated by block 980 every TT12 to TT15 time goes through gate 978 to gate 982, where it is time multiplexed during times TT12 to TT15 to encoder 704 to be converted to 10-bit data characters before being sent to register 702 through OR MUX 708. After the LCNTL characters are generated, four data characters are transmitted every TT12 to TT15 time, as shown by FIG. 42, until Message Data Word Counter 957 (FIG. 45) is decremented to zero and causes the link trailer to be generated.

FIG. 41 shows the generation of the TT12 to TT15 signals. Gate 880 allows the input from the LCNTL logic to set IT12 latch 816 after the LCNTL field generation has completed. The following Char. Strobe signal causes TT12 latch 816 to set TT13 latch 817, while TT12 latch 816 gets reset. Likewise, the two following Char. strobes set the TT14 latch 818 and TT15 latch 819 and complete the generation of a 4-byte data entity. The timing then recycles for every successive 4 bytes as shown in FIG. 42, with TT15 causing TT12 to set again. This occurs through gate 879 which goes active at TT15 time as long as the end of the data has not been detected by the NOT COUNT=0 signal or block 130 is not performing an internally commanded GENERATE MESSAGE sequence. Gate 879 causes gate 880 to go active and causes TT12 to be repeated after every TT15 time.

The link trailer timing generation is shown in FIG. 41. When the Message Data Word Counter 957 (FIG. 45) is decremented to zero, signal COUNT=0 is generated to gate 882, which passes through gate 884 at TT15 and causes TT16 latch 820 to set following the TT15 signal rather than allowing the TT12 signal to set again, as shown in FIG. 42. The first one to four 10-bit characters following the data characters define the CRC field of the link trailer as shown in FIG. 42, and the CRC field occurs during TT16 to TT19 times. When the next Char. Strobe following the last TT15 time loads the last data character into register 702, at the same time TT16 latch 820 sets and TT15 latch 819 resets. The length of the CRC field, like the length of the DID field, is programmable based on the value stored into the SERIAL PROTOCOL DEFINE Register 211 (FIG. 39) during the initial load of data from the PROM Serial Format Protocol Controller 134. The SERIAL PROTOCOL DEFINE Register 211 is shown in more detail in FIG. 43 as block 932. Block 932 generates some programmable signals which define whether the length of the CRC field as CRC 2 BYTES, CRC 3 BYTES, or CRC 4 BYTES. These CRC control signals are used in FIG. 41 in gates 885,887, and 888 to determine the length of the CRC field and to control the associated timing. If CRC 2 Bytes is active, as in our example of the preferred serial protocol, the TT17 latch 821 is set next and controls the generation of the second CRC character (or byte). If CRC 3 Bytes is active, the TT17 latch sets as well as the TT18 latch 822 in a mutually exclusive sequence after the TT16 signal, and the 3 timing signals control the generation of three CRC characters. If CRC 4 Bytes is active, the TT17 and TT18 latches set as well as the TT19 latch 823 in a mutually exclusive sequence after the TT16 signal, and the 4 timing signals control the generation of four CRC characters. However, for the preferred serial protocol with CRC 2 Bytes being set, TT18 and TT19 do not get set but are skipped and TT20 follows TT17 as shown in FIG. 42. When CRC 3 Bytes and CRC 4 Bytes are zeroes, gate 888 goes to a zero and causes gate 890 to go to a 1 and set TT20 latch 900 through gate 894, immediately following TT17 when the next Char. Strobe following TT17 loads the second CRC character into register 702. At the same time TT20 latch 900 sets, TT17 latch 821 gets reset.

Figure 43A:
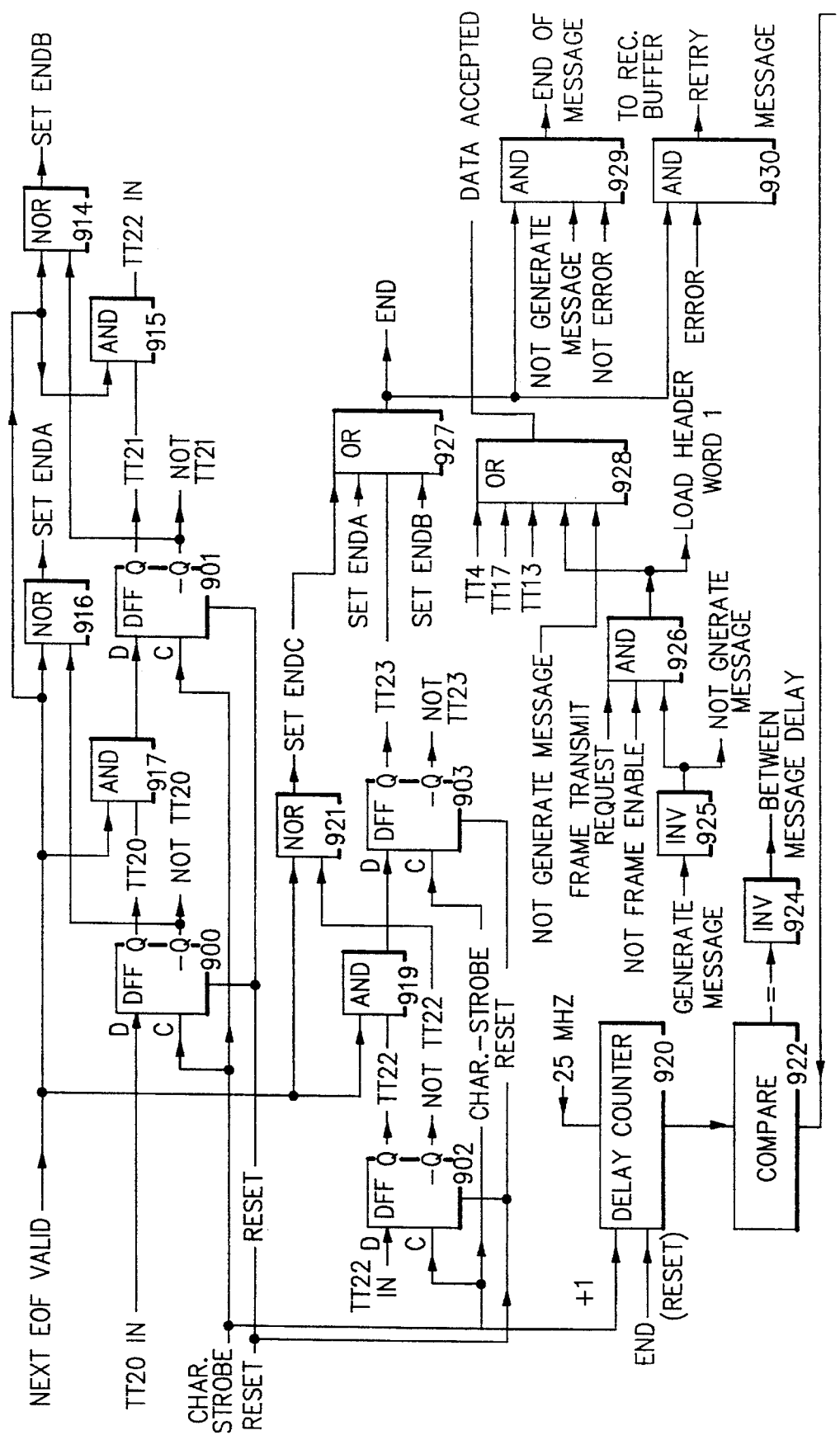
FIG. 43 shows a detailed logic diagram of the termination control and error detection function of our preferred embodiment of the serial frame transmit and protocol translation function of the present invention.

The final portion of the link trailer, the EOF or ABF field is transmitted after the CRC field during times TT20 to TT23, which are generated in FIG. 43. Gate 894 is active at the end of the CRC field and causes TT20 latch 900 to set and enable the generation of the EOF or ABF field, which terminates the message transmission. The first one to four 10-bit characters following the CRC characters define the EOF or ABF field of the link trailer as shown in FIG. 42, and the EOF or ABF field occurs during TT20 to TT23 times. When the next Char. Strobe following the last CRC time loads the last CRC character into register 702, at the same time TT20 latch 900 sets and TT17 latch 821 resets. The length of the EOF field is programmable based on the byte Enable values stored in Register 213 (FIG. 44) during the initial load of data from the PROM Serial Format Protocol Controller 134. MUX 973 selects the Enable bits from register 213 at the appropriate times to generate the NEXT EOF VALID signal and to thereby control the length of the EOF and ABF fields. As long as the NEXT EOF VALID signal is a logical one, the timing generation logic will generate another EOF or ABF byte. However, when the NEXT EOF VALID signal goes to a zero, the timing generation logic will end the message transmission. The NEXT EOF VALID signal is used in FIG. 43 in gates 916, 917, 914, 915, 919, and 921 to determine the length of the EOF or ABF field and to control the associated timing. If the NEXT EOF VALID signal is active during time TT20, the TT21 latch 901 sets next and controls the generation of the second EOF or ABF character (or byte). If the NEXT EOF VALID signal is active during time TT21, the TT22 latch sets next and controls the generation of the third EOF or ABF character. If the NEXT EOF VALID signal is active during time TT22, the TT23 latch sets next and controls the generation of the fourth EOF or ABF character. However, for the preferred serial protocol with the NEXT EOF VALID signal only being set through TT21 time and not at time TT22, causes TT23 not get set but instead to be skipped and the END OF MESSAGE follows TT22 as shown in FIG. 42. When the NEXT EOF VALID signal is zero during time TT22, gate 919 goes to a zero and causes gate 921 to go to a 1 and issue the END signal through gate 927.

Referring to FIG. 43, the type of CRC coding generated and transmitted during times TT16 to TT19 is programmable based on the value stored into the SERIAL PROTOCOL DEFINE Register 211 (FIG. 39) during the initial load of data from the PROM Serial Format Protocol Controller 134. The SERIAL PROTOCOL DEFINE Register 211 is shown in more detail in FIG. 43 as block 932. Block 932 generates some programmable signals which define the type and length of the CRC field as CRC TYPE 1, CRC TYPE 2, CRC TYPE 3, and CRC TYPE 4. These CRC control signals are used in gates 941 to 944 to select through OR MUX 948 the CRC field to be transmitted as the TRANS CRC signal to gate 982 of FIG. 44, where it is time multiplexed during times TT16 to TT19 to encoder 704 to be converted to 10-bit characters before being sent to register 702 through OR MUX 708. The preferred embodiment of block 130 contains 5 different CRC generators, as shown by blocks 936 to 940. All 5 generators are active simultaneously, receive byte serial data simultaneously from MUX 982 (FIG. 44) as it is sent to encoder 704, and generate 5 different types of common CRC fields simultaneously. During the CRC times TT16 to TT17, the selected CRC Generator (936 to 939) gates its calculated CRC values in byte wide segments to AND gates 941 to 944, where one of the four possible CRC codes is selected for transmission and the other three are gated-off. The fifth CRC Generator block 940 generates the fixed network CRC code as a check that valid data was received from buffer 150. If at TT17 there is not an identical compare between the incoming CRC vale from buffer 150 and the CRC value generated by block 940, ERROR latch 950 is set. When the Frame Transmit Enable signal goes to zero, the five CRC generators and the ERROR latch 950 are reset in preparation for the next message generation interval.

Referring to FIG. 44, the EOF and ABF data field generated and transmitted during times TT20 to TT23 is shown.

Both of these fields are programmable based on values stored in the registers 213 (EOF) and 210 (ABF). Register 213 (EOF) is organized in 11-bit sections—an Enable bit plus a 10-bit EOF pattern. The 11-bit values from Register 213 are multiplexed to form one 11-bit value at a time by MUX 973. 10 bits from MUX 973 are fed to AND gate 974, where it can be gated off if a CRC error was detected and latched in latch 950 (FIG. 43). The output of MUX 973 is allowed to pass through gate 974, when no error is detected and generate the EOF sequence from the 10-bit patterns stored in register 213 as the TRANS EOF signal. The TRANS EOF signal goes to gate 708 (which is the detailed implementation of the Transmit Message Assembly MUX 708 of FIG. 39), which brings together the various portions of the serial message by feeding them to register 702 through encoder 704 for transmission to the destination node. The eleventh bit selected by MUX 972 is of the Enable bit for the next 10-bit character and generates the NEXT EOF VALID signal from block 973. The NEXT EOF VALID signal goes to FIG. 43 to control timing signals TT20 to TT23. The number of EOF or ABF characters generated, ranging from 1 to 4 characters, must be identical and depends on the value of the NEXT EOF VALID signal which controls the timing gates TT20 to TT23—enabling one timing gate to generate one EOF or ABF character. For the preferred serial protocol, TT20 to TT22 will always be activated as shown in FIG. 42. During TT20 time the 10-bit first EOF pattern and the 2nd Enable bit of register 213 are gated to the output of MUX 973. 10 bits from MUX 973 are fed to OR gate 708 during TT20 time and the NEXT EOF VALID signal is sent as a logical 1 to pass through gate 917 and set TT21 latch 901 (FIG. 43). TT21 time being set will cause the 10-bit second EOF pattern and the 3rd Enable bit of register 213 to be gated to the output of MUX 973 through gate 974 to become the TRANS EOF signal and the NEXT SOF VALID signal, respectively, during TT21 time. The NEXT SOF VALID signal will be programmed to be a logical 1 during TT21 time for the preferred protocol, and will pass through gate 915 and set TT22 latch 902. TT22 time being set will cause the 10-bit third EOF pattern and the 4th Enable bit of register 213 to be gated to the output of MUX 973 through gate 974 to become the TRANS EOF signal and the NEXT SOF VALID signal, respectively, during TT22 time. The NEXT SOF VALID signal will be programmed to be a logical 0 during TT22 time for the preferred protocol defining only a three character EOF field. The NEXT SOF VALID signal being a zero disables gate 919 and enables gate 921 at TT22 time, so that for the next rise of the Char. Strobe signal, TT23 latch 903 is skipped over and the timing sequence is forced to set the END OF MESSAGE signal through gates 927 and 929, as shown in FIG. 42. TT23 would not be skipped over if the preferred serial protocol required a 4 byte EOF field.

Likewise, the ABF data field is generated and transmitted during times TT20 to TT23. The ABF (Abort) field is programmable based on values stored in the register 210 (ABF). Register 210 is organized in 11-bit sections—an Enable bit plus a 10-bit EOF pattern. The 11-bit values from Register 210 are multiplexed to form one 11-bit value at a time by MUX 971. 10 bits from MUX 973 are fed to AND gate 976, where it can be gated off if a CRC error was not detected and not latched in latch 950 (FIG. 43). The output of MUX 971 is allowed to pass through gate 976, only when an error is detected and it is used to abort an erroneous transmission. The 10-bit patterns stored in register 210 are transmitted as the TRANS ABF signal. The TRANS ABF signal goes to gate 708, which brings together the various portions of the serial message by feeding them to register 702 through encoder 704 for transmission to the destination node. The eleventh bit selected by MUX 971 is not used, as the ABF timing is established using the NEXT EOF VALID signal generated by MUX 973.

Referring to FIG. 43, the Recv Buffer 150 control signals are shown in detail. The DATA ACCEPTED signal is generated by OR gate 928 at various times to step the Recv Buffer Read (Address) counter. It is first stepped by the Load Header Word 1 signal 926 which reads the first 32-bit word from buffer 150 and stores it into registers 953 and 954 of FIG. 45. This occurs before the message generation process even begins, as controlled by AND gate 926 when block 130 is issuing A Frame Transmit Request signal, but it has not yet been responded to by Frame Transmit Enable signal through gate 834 (FIG. 40). The DATA ACCEPT signal is also pulsed at TT4 time after Header Word 2 has been received into register 952 and counter 957 in FIG. 45, TT13 time after the data words are received into register 701 (FIG. 44), and TT17 after the CRC word is received and checked by comparator 946 (FIG. 44). The END OF MESSAGE signal is generated by gate 929 as the last EOF byte is transmitted at time TT22, or the RETRY signal is generated by gate 930 as the last ABF byte is transmitted at time TT22. In addition, a programmable BETWEEN MESSAGE DELAY interval is created based on a value stored to register 932 and sent to comparator 922. When the End of a message is detected, the End signal 927 resets counter 920. Counter 920 then increments at a 25 MHZ rate until it compares to the value programmed into register 932 as detected by comparator 922. During the count time, signal 924 is generated to gate 838 of FIG. 40, which prevents another Frame Transmit Request signal 832 from being issued until the count compare occurs. This prevents the high speed block 130 logic from transmitting back-to-back messages that are two close together for the receiving node to handle. The receiving node can program this to be an interval that it can handle. The END signal 927 also causes the Frame Transmit Request signal 832 to go inactive as soon as the message transmission is completed. When the Frame Transmit request signal 832 goes to zero, it causes the Frame Transmit Enable signal to go to zero in response.

Block 130, besides converting and transmitting valid messages stored in buffer 150, can also respond to commands from the LINK Control and Switch Control Registers 172 (FIG. 14), as issued by the GENERATE MESSAGE signal 646 of FIG. 30. In this case, block 130 logic follows the same basic transmission format as it uses for the normal messages, except the DID, SID, LCNTL, and data fields come from the registers shown in FIG. 34, rather than from buffer 150. These GENERATE MESSAGE parameters are inserted into the Byte Serial Data Stream 982 (FIG. 44) by the TRANS GENERATE MESSAGE DATA signal 668 (FIG. 34), and through blocks 962, 964, and 966 of FIG. 45. The GENERATE MESSAGE signal 646 to gate 830 (FIG. 40) causes the Frame Transmit Request signal 832 to be issued immediately upon the detection of the signal 646, regardless of the status of the BUFFER EMPTY signal (which normally starts a block 130 operation. The GENERATE MESSAGE signal 646, through inverter 878 and gate 882 (FIG. 41), prevents TT12 latch 816 from setting a second time and instead causes TT16 to follow immediately after TT15, and thus restricts the Generate Message sequence to transmitting only 4 bytes of data. In addition, the GENERATE MESSAGE signal 646, through inverter 925 (FIG. 43), prevents the generation of the DATA ACCEPTED and END OF MESSAGE signals at buffer 150, because buffer 150 is not involved with these messages.

Alternate Paths through Network for Non-Blocking

While the unbuffered crossbar is still an efficient method of network interconnection, it tends to be impractical for large systems. An N×M crossbar permits total simultaneous interconnection, where all the N devices can be communicating simultaneously with different members of the set of M devices. The crossbar is "non-blocking" because their is nothing internal to the crossbar which prevents any given N device from connecting to an M device which is IDLE (is not connected to some other N device). If an N device desires to connect to an M device which is BUSY (previously connected to some other N device), no connection can be made until the previous connection is broken—however, this is referred to as "contention" and is not called "blocking".

When N and M become large (usually greater than 32 or 64) it becomes very unwieldy to build crossbars since there complexity increases at an N×M rate and their pin count increases at an (N×M)×W rate, where W=the number of pins per pod. Thus, large networks are usually built from multi-stage networks constructed by cascading several stages of smaller crossbars together to provide an expanded network. The disadvantage of multi-stage networks is that they are "blocking", i.e., a connection might not be able to be made to an IDLE M device because there is no path available in the network to provide the necessary connection to the IDLE device. A CLOS network can be "non-blocking" but at the cost of many stages.

The traditional blocking problems in multistage networks is circumvented by the preferred embodiment which uses the features described in "Multi-Function Network" by H. T. Olnowich et al U.S. Ser. No. 07/799,497, filed Nov. 27, 1991, abandoned in favor of U.S. Ser. No. 08/216,789 filed Mar. 23, 1994, which is generally applicable and the subject of a separate application filed contemporaneously herewith. In the preferred embodiment the parallel switch used as a stage of a single or multiple stage network will implement ALTERNATE PATHS between all N and M devices within the same network. This permits a non-blocked path between 2 devices to be found by "rearrangeability"—the act of trying or searching different alternate paths until a non-blocked connection is established.

Figure 46A:
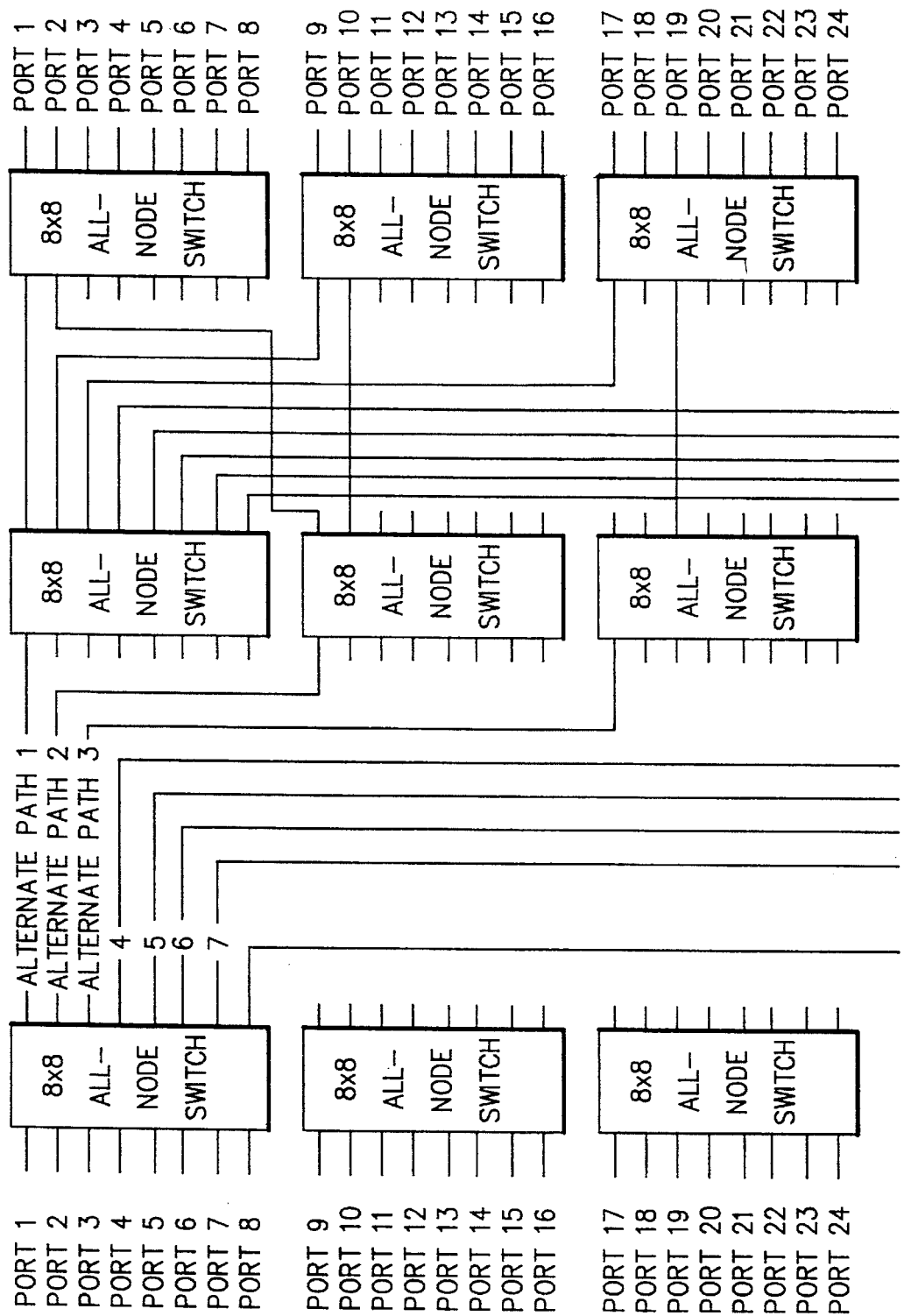
FIG. 46 shows a typical Alternate Path configuration as a 3-stage network as applied to a 64 node system that provides 8 alternate paths between any two nodes and always permits a non-blocked path to be found between any two IDLE nodes by searching.
Figure 46B:
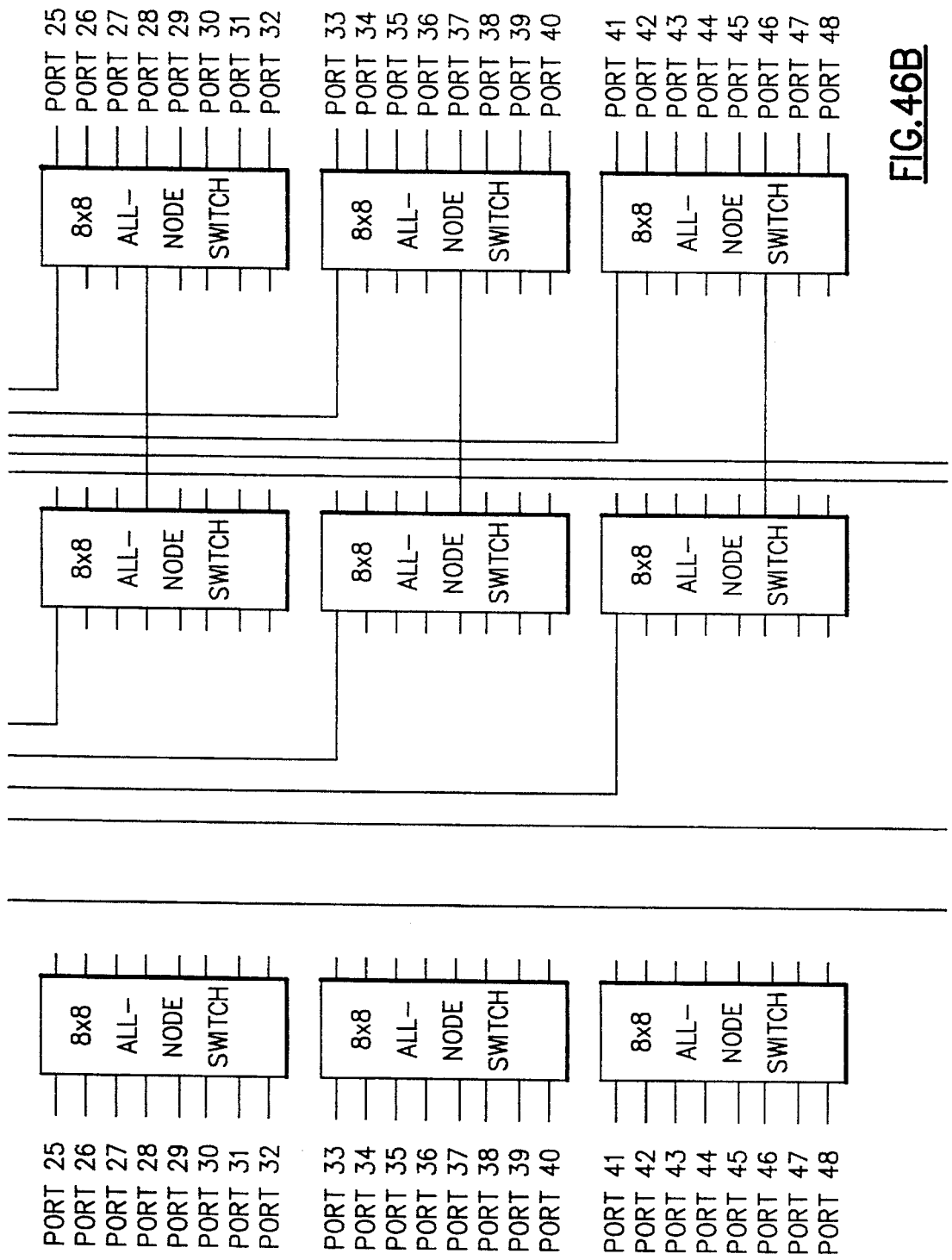

The Alternate Path concept can be applied to any number of nodes by adding stages to a minimal network. A typical example is shown in FIG. 46 for a 64 node network which can be minimally implemented in two stages. However, by adding a third stage as shown in FIG. 46, the network can be expanded to implement 8 alternate paths.

The disclosed network applies to multistage networks which implement Alternate Paths and which use these Alternate Paths to circumvent network blockage through searching. The device sending data into the network selects an Alternate Path either randomly or by the preferred embodiment based on the low order address bits of the node being accessed via the network. The sending node tries to establish a connection to the receiving node over the Alternate Path selected. If that path is blocked, it receives back a REJECT indication. It then rearranges its path selection decision and selects a different Alternate Path. The subsequent selection is made either randomly or by the preferred embodiment sequential searching method of storing the low order address bits of the node being addressed in a binary counter, incrementing the binary counter by +1 every time a REJECT indication is received, and then retrying the connection over the newly selected Alternate Path as defined by the binary counter. The preferred method of searching continues until blockage is successfully circumvented by finding an open path.

Applications for Heterogeneous and Homologous Processors.

RISC Application Accelerators

Applications which use commercially available processors include applications which couple RISC type processors, such as the RS/6000 type machines. These processors can be connected to the switch and this is my currently preferred best multi-module application. Homologous means like processors. However, here it is possible to define "hererogenous" to mean different transmission speeds to different nodes, as well as the broader meaning which is be applied commonly to the present application and on which far broader interpretation of heterogenous to means different kinds of processors, and those which may have different interfaces (serial or parallel).

Figure 47:
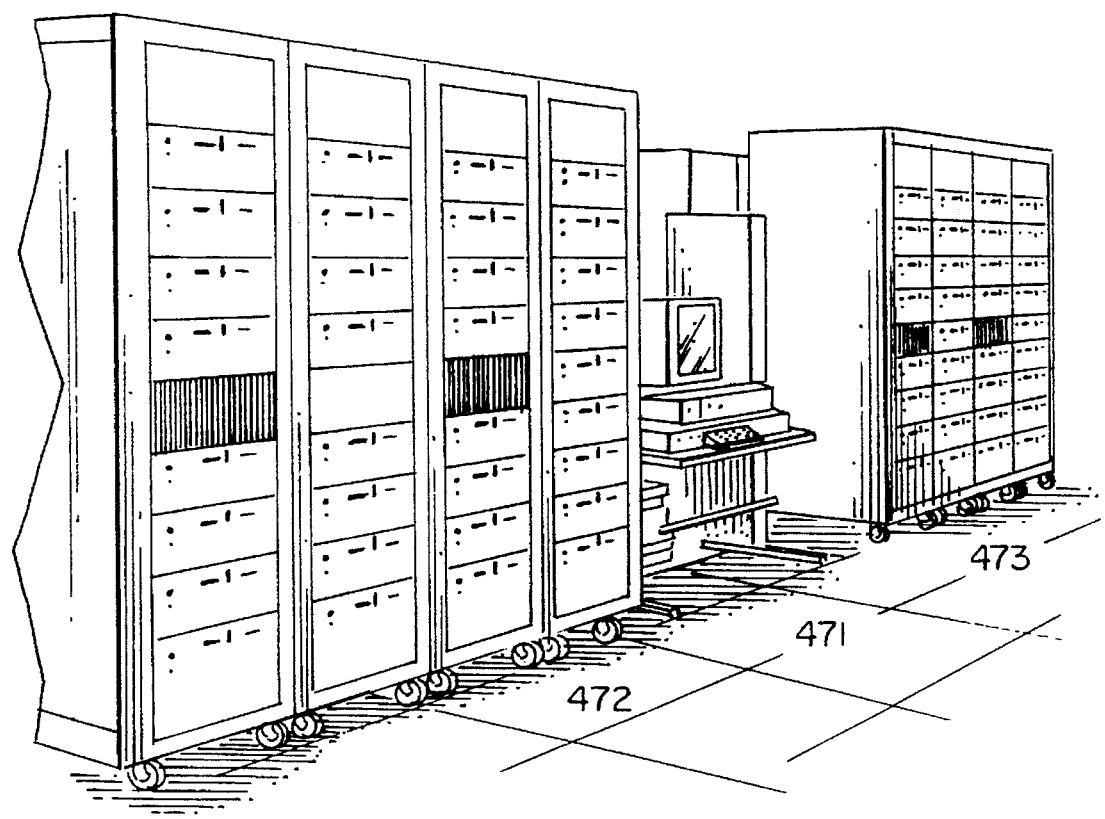
FIG. 47 shows a farm, illustrating a prior art laboratory which uses a LAN, which LAN can be replaced by a parallel switch configuration which provides LAN and WAN functions to illustrate an application of the present invention.

FIG. 47 shows a farm, illustrating a prior art laboratory which uses a LAN, which LAN can be replaced by a parallel switch configuration which provides LAN and WAN functions to illustrate an application of the present invention. In the prior art, representing a Fermi Laboratory, a plurality of banks of processors 472, 473 are now, in the prior art, interconnected or intercoupled by a LAN server 471. LAN server 471, in accordance with the inventions described herein could be replaced by the parallel switch allowing the former connections to be accelerated and made in parallel. With multi-media serial adapters 20 FIG. 3 and the corresponding ALLNODE parallel switching unit 30, the banks of processors 472, 473 could be homologous processors, or heterogeneous processors as shown in FIG. 3. This application allows existing processor configurations to be used as part of a parallel processing configuration.

This application requires little programming to provide applications. Parasoft Corporation, 2500 East Foothill Blvd., Pasadena, Calif. 91107, commercially offers the "Express" Parallel Processing Toolkit known as "EXPRESS". This application offers the functions and can be readily modified by those of ordinary skill in the art, with the above teaching to provide a driver for transfer to the network instead of to the current Ethernet connection which is provided. In its present form the Express toolkit uses the Ethernet as its communication medium when coupling multiple RS/6000 workstations. This technology has a low transmission rate and also, more significantly, an extremely high (milliseconds) latency or startup time. As such, a network of workstations connected via an Ethernet is very loosely coupled. The Express parallel toolkit is designed to make writing parallel and distributed programs easy. In fact EXPRESS has tools which make this process automatic. The present invention hardware constitutes ideal support for EXPRESS and its automatic parallelization of existing serial software. EXPRESS automatically generates parallel programs which will execute much more quickly in the environment of the present invention and enable a wide class of applications to take advantage of the supercomputer potential of multiple RS/6000 workstations with minimal effort. The EXPRESS toolkit must be modified slightly so it can execute on the present invention switch medium of coupling as opposed to the Ethernet medium. This modification can be provided upon commercial request to Parasoft Corporation.

The set up of a multi-stage chip set is provided by cascading between stages. Two clock cycles per stage sets up a connection on the network. Thus, after the initial I/O, whether you have a four by four matrix or an eight by eight matrix, each of these matrixes requires only two cycles.

Cascading to a next chip would take four cycles for a destination connection. However once connected, the coupled sender and receiver nodes only have a latency of the transfer time.

The Express System takes a program which is written on one computer, say an RS/6000, and puts it through a compiler and compiles it like leafs of a run on a parallel machine. The Express software is provided for each of the machines, permitting them to run the parallel software. Accordingly, the Express software may be considered a parallel operating system. It provides a way for different computers which have serial processors, such as the RISC systems common to SUN Sparc Workstations (Sun Microsystems, Inc.) and International Business Machines Corporations RS/6000, two disparate systems, enabling them to operate together, to run the same parallel software. However, with the ALLNODE switch system which has been provided, this parallel operating system can now become an interconnection matrix between such machines and dramatically accelerate the parallel system operations, because the system can be coupled in an asynchronous mode directly and with parallel word transfer of information. The switch effectively turns the machines into a closely coupled parallel system with latency between nodes after connection only limited by the distance a signal has to be transferred.

The interface protocol, applicable to PCs, OS/2s, RISC processors, isolates software programmers from actual hardware I/O interfaces by just having the operational program do a call to the emulator low level driver to interface, similar to I/O devices. Here because the interface is a different parallel or serial interface, a programmer would call a different I/O driver if he was going to send data out a parallel network versus a different driver if he was going to send it out of a serial network. It also doesn't have to be done by Express. Express goes through a a number of steps that it uses to send a message out. With the emulator it can send messages to users in parallel. It does not need to do a conversion. The low level driver call can be named in a program an arbitrary name which is recognized. These special calls would be in addition to Express as special software that when it transfers data, it takes that data however it was formatted and sends it out and then the hardware in addition to that formats a protocol over the interface saying this is the starter message . . . this is the end of the message how many bytes in the message . . . and for disparate systems, a coding scheme. As the transfer is just data a communication interface at connected nodes can convert the data to a form its own operating system can execute. Such a system enables use of a different bit pattern for a starter frame and the end of frame and it goes through the switch. The receiver recognizes a different pattern for start and end of message and converts it via the our adapter. This is additional overhead for heterogeneous disparate systems but does and so there is some overhead to transfer the block of data, but this kind of data conversion applicable to an application is a matter of changing formats of data, whether it is ASCII or some other format needs to be handled link to link when these links are expected to see different formats. But this kind of system does not require a common operating system, only nodes with sufficient power to handle a conversion.

Figure 48:
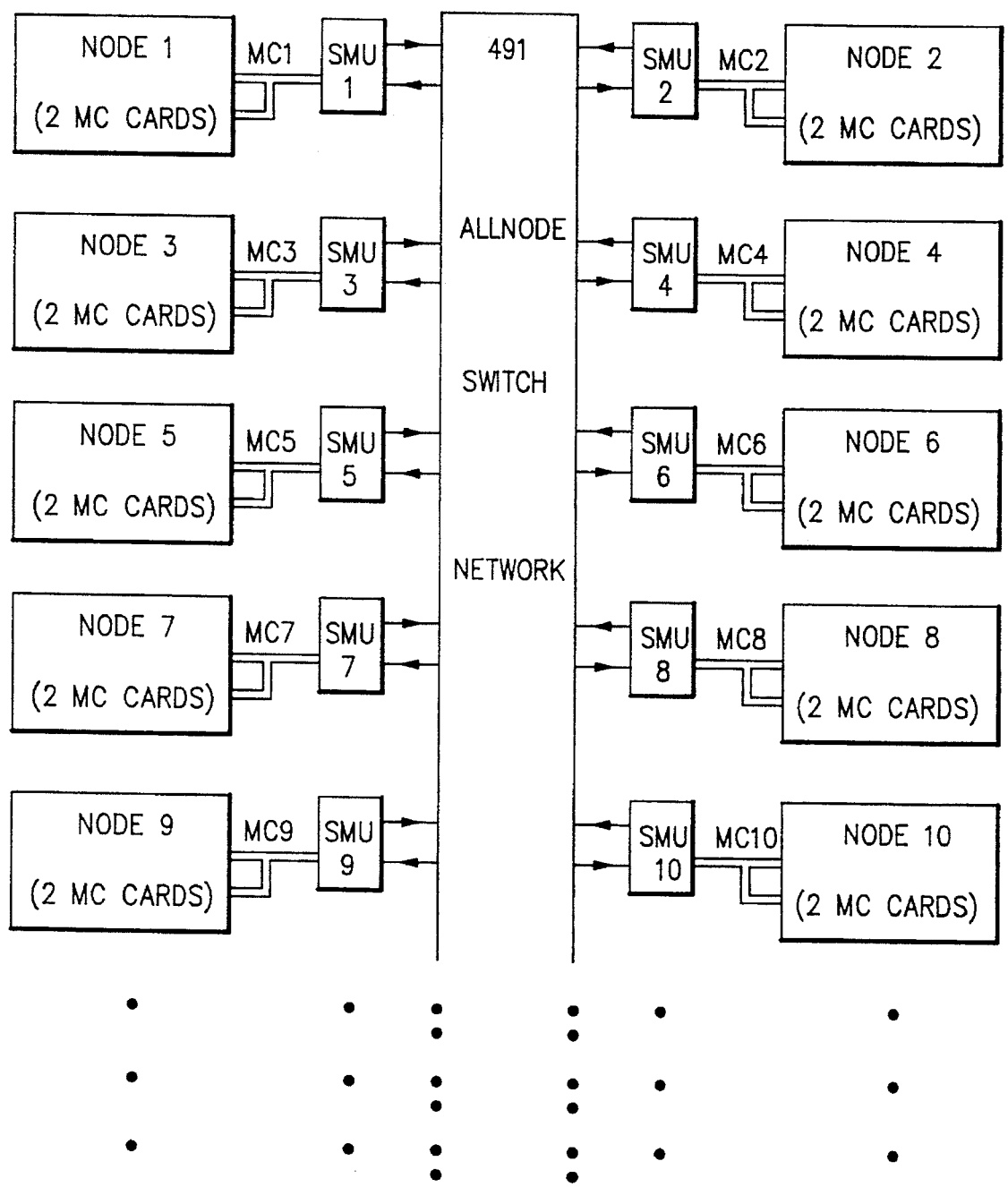
Figure 49:
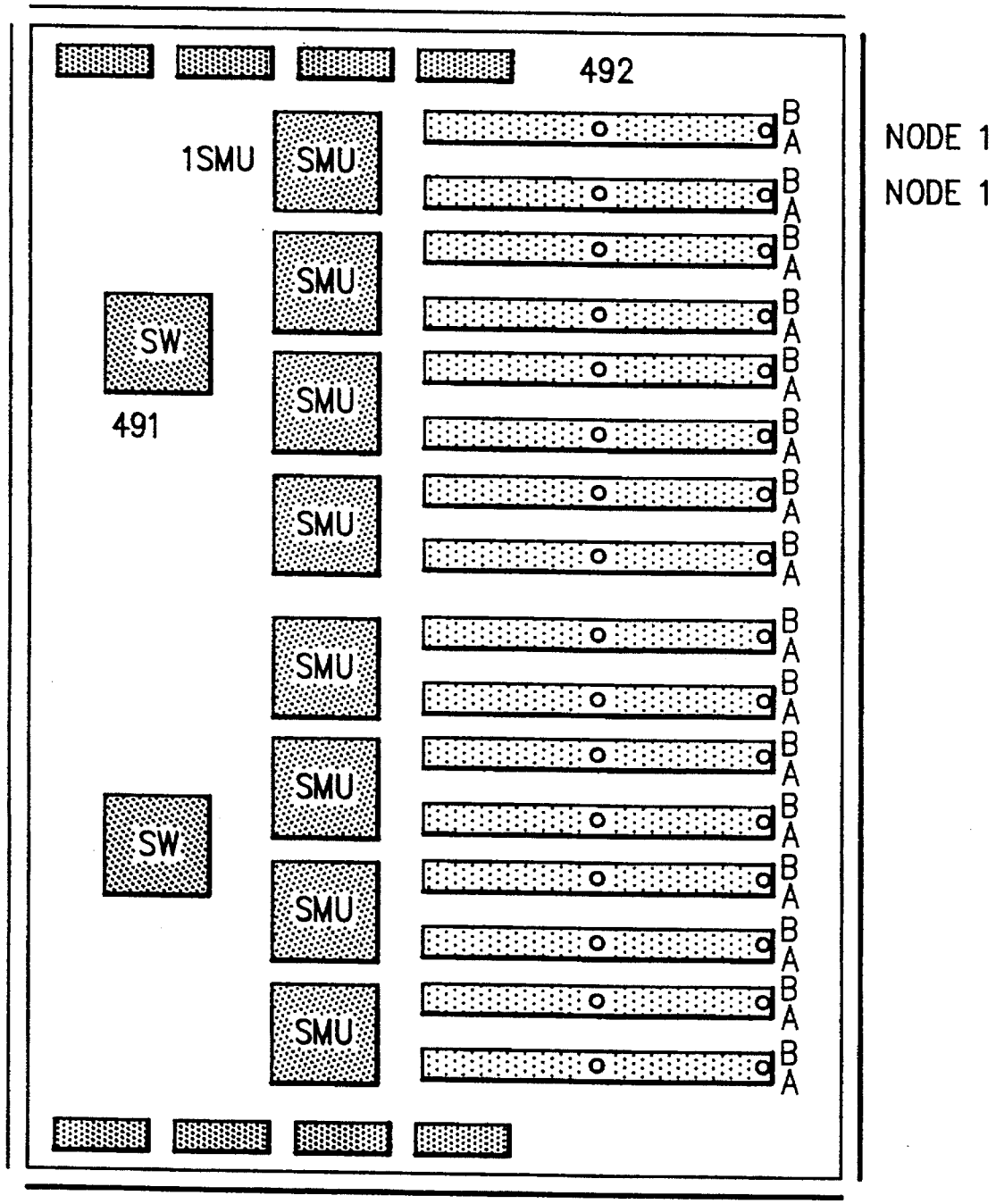
FIG. 49 shows a typical application planar.
Figure 50:
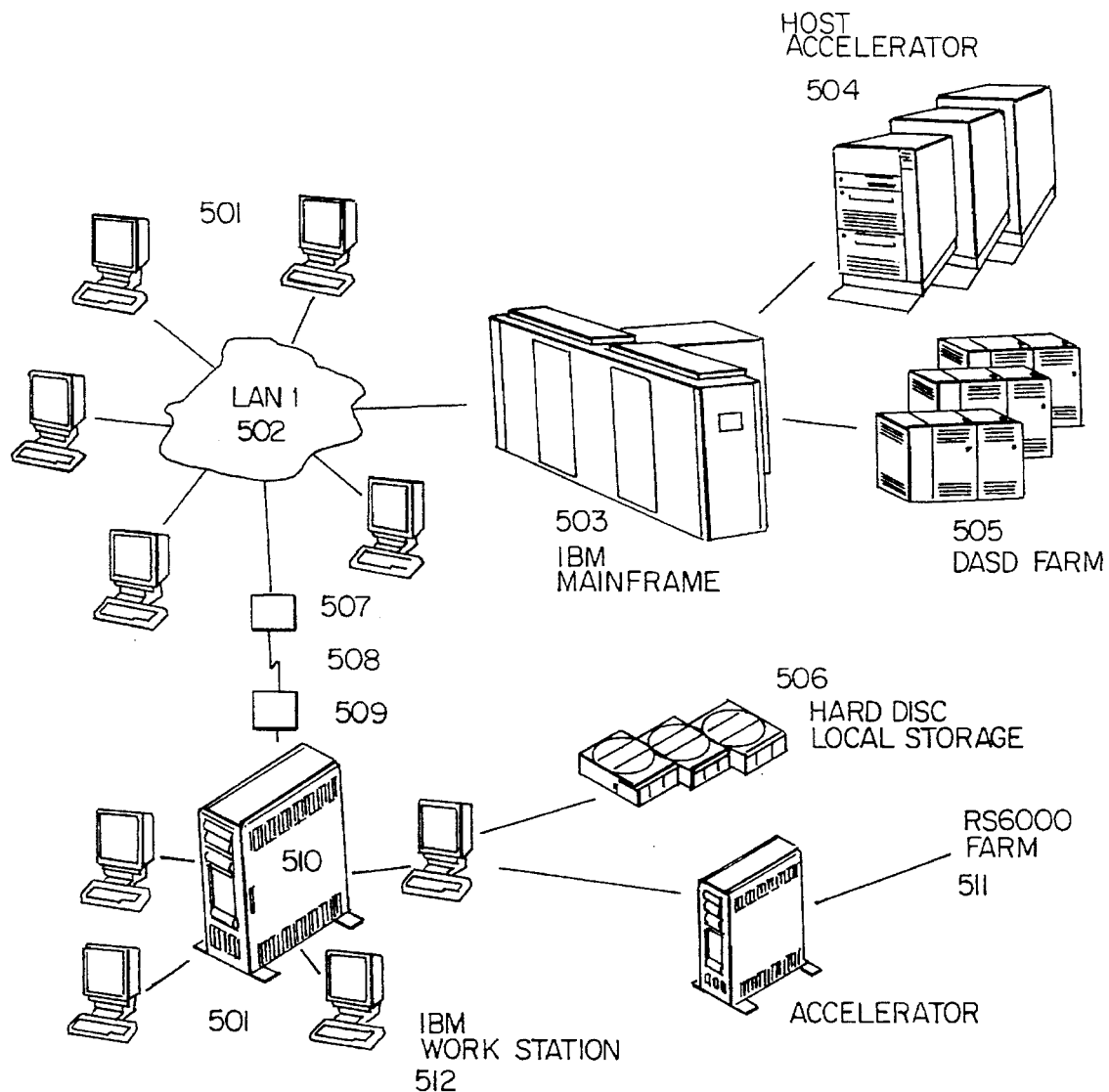
FIG. 50 shows multiple unit configurations which illustrates various applications of the heterogenous and homogenous computer systems.

These accelerations of activity of a computer system can be applied in a variety of manners. The system can be used as an application accelerator. FIG. 48 shows an application accelerator schematic, while FIG. 49 shows a typical application planar which can be used in the accelerator of FIG. 48, and in the various units of the invention which can be illustrated by FIG. 50. FIG. 50 shows multiple unit configurations which illustrates various applications of the hererogenous and homogenous computer systems.

In FIG. 48, the ALLNODE switch network can be coupled via an switch multiplexer to address two cards which can hold an RS/6000. In an application planar, the planar would have card connectors indicated as NODE 1 for each processor, an SMU coupler for the cards 1 SMU adapter so that the data signals from the 2 card single node with provide one set of data signals to the ALLNODE switch network 491. This network will connect to the other processors through the adapters SMU, in the manner which has been described. The planar will connect to other planars of a accelerator processor such as indicated by accelerator 511 in FIG. 50 via the planar ports 492 of FIG. 49.

FIG. 50 represents various applications for the parallel network applications described as part of multiple unit configurations. Many networks today use personal computers represented by the systems 501, which can be PCs of various types, based for instance on an Intel 286, 386, 486, an RS/6000 or a SUN workstations. Heterogeneous environments with a LAN which have a common ETHERNET connection represented by LAN 1 502 can be coupled together. These LANS can be connected or coupled via a wireless transmitter/receiver 507, a radio or satellite link 508 and another transmitter/receiver 509 which could be a transceiver or on of the AT&T Astrotec transmitter or receiver. The transmission of the coupled network could be by optical fiber. AT7T manufactures the Astrotec laser modules 1206 with transmissions up to 500 Mbs, and the 1218 with transmissions up to 1 gigabit. These laser modules could interface to the multi-media adapter with serial transmission between transceiver 509 and a combined Network Switch LAN/WAN 510 which can be used to couple other processors 501, 512 to the network. While the communications process between the transceivers 507 through the system to a workstation 512, other processors 501 can also communicate in parallel with each other. Other applications of an accelerator could be as a front end 504 to a host system, or as a stand alone accelerator 511. The Accelerator may transfer to and from a mass store and can do this through an IBM mainframe 503 or another smaller system 511. Within a box, for example 510, both the LAN management function and application acceleration can be provided. The systems with the Express software would normally handle MIMD processing. However, the kind of processing a system performs, whether MIMD, SIMD or a combination of modes is not restricted by the interconnection network which makes possible new computers.

Hardware Emulation of Serial to Parallel Conversion.

The coupling between an accelerator and a sending ALLNODE switch can be emulated in accordance with an alternative embodiment of the invention by a PC with a microchannel bus. In this alternative, the Nodes 1 of a planar in FIG. 49 could also be PC cards, and the serial protocols handled by the explicit hardware set forth above could be emulated by a personal computer which has a microchannel interface which passes through the data pod SMU. This PC must have the capability to connect to the sending serial device. As almost all PCs do have an external serial pod, this configuration, while more expensive, could be used. The serial to parallel conversion function required to interface with the ALLNODE switch network is capable of being provided by the standard IBM PCs and workstations. In this configuration IBM PCs and workstations can be used to execute software emulators of the Multi-Media serial to parallel adapter functions. This is because the IBM PC's and workstations are capable of interfacing with both the parallel ALLNODE Switch network and various forms of serial transmission media. Therefore, any standard PC or workstation serial interface, whether LAN, FDDI, RS-232, telephone line, or fiber, can be adapted through the PC or workstation by emulator software to interface with the ALLNODE Switch Network. For this configuration, a serial message would be received into the PC or workstation memory from one of the various serial transfer media. Serial to parallel emulator software would convert the serial message protocol to the ALLNODE Switch Network parallel protocol. In the preferred embodiment the PC or workstation would relay the converted message over a microchannel bus to the parallel network by transmitting the converted message to the ALLNODE Switch Network, where it would be routed and sent to a destination node. The destination node, could also be another IBM PC or workstation, which would receive the switch parallel protocol message into the PC or workstation memory. Then, the emulator software would convert the parallel message protocol to the a serial protocol, and relay the message to the appropriate serial interface.

This embodiment is not the least expensive mode. It will be recognized that the IBM PC or workstation which has a microchannel bus needs to be connected to the ALLNODE switch. The function of emulation can be handled by the protocol which has been developed. However, the protocol is handled by the hardware implementation described above within a chip requiring only a small portion of the real estate. With the hardware implementation, the microchannel gateway provided by the IBM PC or OS/2 becomes surplus. The hardware implementation can be connected directly to a serial port receiving directly messages from disparate computers. As almost all small computer systems have such a serial pod, they can be directly connected either by wire or optical fiber.

LAN replacement applications.

ALLNODE as a LAN replacement.

An application of the switching network which is described herein as a generic network can be still called an ALLNODE network. It can be used as a current art LAN replacement. As an example, with LANS for current state-of-the-art connections of multiple independent processor units it is possible to obtain a transfer rate of 1 megabyte per second or better and a latency rate of 1 millisecond or better of the ALLNODE parallel switch depends upon the number of nodes utilized. A typical node would be 64 units. The transfer between these nodes could be 40 or 80 megabytes per second leaving a transfer rate within the switch being 2.5 to 5 gigabytes per second. Comparatively that is one megabyte and 5,000 megabytes. This is 5,000 times better than a conventional LAN and conventional ETERNET LAN. That is representative of 64 nodes. You can increase the number of nodes up to many thousand units and Speed increases almost linearly. Now comparing this devise with the LAN as to latency rather than milliseconds, an ALLNODE wire switch will have an initial latency of about 150 nanoseconds (even lower than 100 ns) which is submicrosecond latency as opposed to millisecond latency. The range has been reduced of transfers reduced by about a million times. Now in parallel systems, it is this rate that is more important even than the fantastic achievements of the number of bytes that can be transferred across particular line per second at the band width. Each LAN has a unit or comparative node that has to be practically self-sufficient and if it is going to communicate through the network to others it has to process itself through a "traffic cop" usually in a form of a multi-processor, a communications processor or LAN server, as they are called, which acts as a funnel through which all competing units must serially transfer their information. This is a bottleneck which is eliminated by the present device.

With the switch, interconnected processors can have long transfer paths, which permits even remote processors to be coupled in a farm arrangement which can operate as if the processors were were a tightly coupled unit and different groups of them can interact. This is because the communication time is infinitesimally small. The "traffic cop" is eliminated and parallel paths can be established to interconnect multiple processors. In general, in a parallel processing system when there are multiple processors, the processors can be divided such that a certain number of processors can work on a task. For example, four processors work on task one, six processors are working on task two, and ten processors can work on task three, etc. So with the generic ALLNODE switch you can partition a parallel process that will run multiple tasks at the same time, or you can use all the nodes to work together on one main task so that one task is running over all of the nodes of the system. In a preferred application for acceleration, RS/6000 processors are used as nodes. The RS6000 nodes run the current commercially available RS/6000 standard AIX software with the Parasoft Express parallel operating system overlay.

The provision for a set of software drivers allows the AIX systems to to interface programs having parallel applications to be connected through the ALLNODE multimedia serial data adapter. This driver sits on the AIX system and it is a way that the software communicates particularly to the new present invention. This software would uniquely adapt a system for the switch. Using the desired protocol it takes a message that is formatted normally in AIX and in Parasoft Express and the software driver outputs this message to the new and present invention. It will format the data. This described Express interface would provide the message sent over the network in the switch network format which is two header words followed by data and the two header words or 32 bits. They define the length of the message and the destination of the message and the source of the message and any unique command that goes along with the message and the software drivers make up the message in this parallel format.

In the the case of a serial adapter, if you are doing parallel processing, an Express driver would put the message into a format that could be transmitted serially and would have the serial parameters of start of frame and end of frame and DID destination ID and source ID and the various parameters that you would need on a software message which is then assembled by the multiplexer into a parallel message. The software that creates either message, whether parallel or serial, would be done the same way by AIX and Express. It's the unique low level driver that would take this message and convert to either serial or parallel format. Those drivers are made up in standard manner for each kind of communicating node on the network in the normal way. The serial solutions are available in in existing cards (eg ARTIC) that plug into PC's. The format of data with these cards would be normal with the addition of a header as to the destination.

Multi-cast and simulcast applications

While interconnection networks of some type have been used in computer systems, there is a need to provide a way for systems to be open, to allow disparate computers to be used as part of a network of intercommunicating machines. These machines may be homologous, or alike machines, or they can be heterogeneous, or different. The systems which are described herein can execute broadcast/multicast transfers over unbuffered asynchronous switching network 30. Details of this apparatus are described herein and in U.S. patent application Ser. No. 07/748,316, filed Aug. 21, 1991, entitled "Apparatus for Executing Broadcast/Multicast Transfers Over Unbuffered Asynchronous Networks," now U.S. Pat. No. 5,404,461. The advantage of this kind of network switch is that it is asynchronous and is simple. It provides a simple and limited low priority broadcast in an unbuffered multi-stage network capable of supporting one broadcast at a time in the network. However, it does consume all network facilities in the broadcast mode. It is this network which is preferred because it meets the needs of most networks and provides an inexpensive solution that does not require any clock signals whatever to execute. However, the switch network of the present invention using the same above described interface to heterogeneous and homologous systems can employ the broadcast and multicast function that resolves broadcast contention on a synchronous priority drive basis that permits one broadcast to follow the other at the earliest possible moment and the quickest possible speed. This network is desirable when multiple multi-cast operations will occur simultaneously within the network. It can be used in nodal networks where there are many nodes and where the tasks can be subdivided. There are applications where it is desirable for nodes to be groups in subsets and have subsets of nodes assigned to the same tasks to communicate with other nodes of the same subset. There are applications which involve this which would allow the network to support multicasts simultaneously. Furthermore, the switch network of the present invention is adaptable to the use of the HI-PRI signal with the related circuitry which is described in U.S. patent application Ser. No. 07/800,652, filed Nov. 27, 1991, now U.S. Pat. No. 5,444,705. That application is incorporated herein by reference. The switch interface requires only eight signals to transmit dual priority data through the network. Among the signals can be a High Priority signal, which when active indicates the message in process is in a high priority mode. This signal requires a line which must remain active during the duration of a priority broadcast and multicast operations. The details of that alternative are further described in the above referenced application filed concurrently herewith. However, the present preferred embodiment allows for simulcast from multiple nodes in a multi-cast environment, allowing one node to broadcast to multiple nodes, and nodes to receive from multiple senders when the receiving node can handle the information.

In a mutimedia mode, it is possible through the switch network to do something that wasn't possible before. One sender node can send voice and image information to multiple destination simultaneously without retransmitting it multiple times. This just one transmission going to multiple locations brings voice and image data simultaneously to all the locations from one or even multiple senders. The multiple senders frames, with very low latency of transmission, can be multicast to one or more nodes through alternate paths, and at a receiver, with receiver software, passes in as almost a single stream of data, albeit from different sources, which can be constructed into one consistent image or voice at the multiple receivers. With the multiple media switch it is possible to party line several, two or many, transmitters transmitting even simultaneously and getting a composite of their image at multiple stations. Length of messages also a important criteria that in the past state of the ad type solutions messages had to be long to anodize the long latency involved in getting a connection established in a connection broken to the switch. But with the present invention, the very high speed and the dynamically changeable characteristic of the switch, it is possible now to get excellent performance from short messages as well as long messages. The present system can replace the older type long message systems which were basically I/O switches and allowed devices like DASD's to send very long messages. This present system can still perform that type of function and do it well, but in addition, now it can perform a new type of function that switches short messages very quickly and can intermix short messages from various sources and collect them at any given node. An advantage of shorter message comes in the retry consideration where if you have to retry a long message you have to go all the way back to the beginning and start the long message whereas the short messages you can interrupted at any place in the middle because the message is short and then take right up from where you left off.

A further advantage of the switch technology elaborated here is that the connections or hook ups can be made without having any redundant switch effectively function to interrupt with the capability of redundancy and the full power is built right into the simplex switch and does not need extra switches to perform that function, a more efficient solution than other devices.

Clearly, the inventions which I have described by way of example and in illustration of the best mode of practicing the inventions in the various embodiments described provide a basis for much potential growth. Accordingly, it will be understood that those skilled in the art, both now and in the future, will make further developments even by way of invention, and these should be understood to be within the claimed scope which should be construed to protect and preserve the rights of an inventor.

What is claimed is:

1. A protocol to protocol translator comprising:

serial receiving means for receiving a complete serial data message transmitted serially under a serial protocol from a node coupled to the translator;

a storage device including translation data corresponding to the serial protocol, the translation data including data useful for decoding data fields of the complete serial data message;

serial translation means coupled to the serial receiving means and to the storage device for translating the complete serial data message from the serial protocol into a parallel protocol in response to the translation data and for storing into a send buffer a translated complete parallel data message, the serial translation means including means for inserting into the translated complete parallel data message preselected header information used by a switch network for routing the translated complete parallel data message, the parallel protocol including an N bit wide parallel format where N is a positive integer greater than one;

parallel sending means coupled to the send buffer for sending a stored complete data message in the parallel protocol to a coupled input port of the switch network, the coupled input port comprising N parallel data paths for receiving an N bit wide parallel data message; and a switch network, comprising:

a plurality of bufferless switching apparatus cascaded into a plurality of stages, said switching apparatus each including a plurality of switch inputs and a plurality of switch outputs, of the switch outputs included on each of said switching apparatus each coupled to a different one of the switching apparatus via a switch input of said different one of the switching apparatus, switch outputs of last stage switching apparatus each comprising a network output port and switch inputs of first stage switching apparatus each comprising a network input port;

the network output ports each coupled to a network input port through one of a plurality of nodes, each of said nodes comprising means for receiving a data message from a coupled network output port and means for sending a data message to a coupled network input port, said data message to a coupled network input port including a path connection request; and said switching apparatus each further comprising connection means for establishing a point-to-point communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active point-to-point communication paths between a plurality of network input ports and a plurality of network output ports in response to a plurality of connection requests received separately or simultaneously at said plurality of network input ports, said simultaneously active communication paths for transmitting concurrently a plurality of data messages received separately or simultaneously at said plurality of network input ports to said plurality of network output ports.

2. The translator according to claim 1 wherein the serial translation means further includes:

means for appending to the translated complete parallel data message a CRC check word in response to the translation data; and means for indicating when a network-ready data message is assembled in the send buffer.

3. The translator of claim 2, wherein the parallel sending means includes means for reading a 32-bit word from the send buffer about every 40 ns to achieve a parallel data message transmission rate of about 100 Megabytes per second.

4. The translator of claim 2, wherein the translation data includes preselected programmable data corresponding to a preselected serial protocol of the coupled node.

5. The translator of claim 4, wherein the parallel sending means includes means for receiving from the coupled input port of the switch network a reject signal issued by a destination of the translated complete parallel data message indicating an erroneous transmission of the translated complete parallel data message.

6. The translator of claim 5, wherein the translation means includes means for inserting into a current translated complete parallel data message a command for the parallel sending means to maintain in an active state connection paths in the switch network established for the current translated complete parallel data message for retries of a transmission of the current translated complete parallel data message.

7. The translator of claim 6, wherein the complete serial data message includes a link header having a start of frame delimeter (SOF) for indicating a beginning of a current data message, for identifying the serial protocol, for indicating to the parallel sending means to request that a new connection path be established in the switch network for the current data message, and for indicating to the parallel sending means to maintain an existing connection path in the switch network for use by the current data message.

8. The translator of claim 7, wherein the translation means includes SOF interpretation means for decoding a variable length SOF in the link header, the SOF interpretation means including:

SOF register means initialized from the PROM;

an SOF comparator coupled to the SOF register means for comparing link header data with SOF register means data; and means for indicating that a valid SOF has been decoded including means for indicating a length of the valid SOF.

9. The translator of claim 6, wherein the complete serial data message includes a link trailer having an end of frame delimeter (EOF) for indicating an end of a current data message, for causing a connection path in the switch network used to transmit the current data message to be broken, and for causing the connection path in the switch network path used to transmit the current data message to be maintained in an active state.

10. The translator of claim 9, wherein the translation means includes EOF interpretation means for decoding a variable length EOF in the link trailer, the EOF interpretation means including:

EOF register means initialized from the PROM;

an EOF comparator coupled to the EOF register means for comparing link trailer data with EOF register means data; and means for indicating that a valid EOF has been decoded including means for indicating a length of the valid EOF.

11. The translator of claim 10, wherein the parallel sending means includes means for sending an EOF signal to the send buffer for clearing the send buffer.

12. The translator of claim 10, further comprising continuous sequence means including:

registers for storing bit patterns;

comparators coupled to the registers for comparing received continuous sequences in a data message transmitted over a serial fiber data channel with the bit patterns; and means for generating continuous sequences coupled to the comparators for sending the generated continuous sequences over the serial fiber data channel in response to a positive indication from any one of the comparators, said registers and means for generating each initialized from the PROM.

13. The translator of claim 12, further comprising:

link control means for processing a link control data message in the translated complete parallel data message, if any; and means for removing from the translated complete parallel data message in the send buffer the link control data before sending the data in the send buffer.

14. The translator of claim 13, wherein the translation means includes:

means for cancelling a partially stored message or the translated complete parallel data message from the send buffer; and means for indicating that the send buffer is full and for indicating that the send buffer is empty.

15. The translator of claim 14, further comprising:

parallel receiving means for receiving and storing in a receive buffer a complete parallel data message transmitted in the parallel protocol from an output port of the switch network coupled to the translator, the coupled output port comprising N parallel data paths for sending the parallel data message;

parallel translation means coupled to the parallel receiving means for translating the stored complete parallel data message from the parallel protocol into the serial protocol in response to the translation data, the translation means including means for serializing the data message; and serial sending means for sending a data message translated into the serial protocol to the coupled node in the serial protocol.

16. The translator of claim 15, wherein the parallel translation means includes:

means for generating a link header and a link trailer including means for embedding the link header and the link trailer in a data message translated into the serial protocol.

17. The translator according to claim 16 wherein the parallel receiving means includes means for receiving the parallel data message at a rate of about 100 Megabytes per second.

18. A protocol to protocol translator comprising:

serial receiving means for receiving a complete serial data message transmitted serially under a serial protocol from a node coupled to the translator;

a storage device having translation data corresponding to the serial protocol and including preselected programmable data, the translation data including data useful for decoding data fields of the complete serial data message;

serial translation means coupled to the serial receiving means and to the storage device for translating the complete serial data message from the serial protocol into a parallel protocol in response to the translation data and for storing into a send buffer a translated complete parallel data message, the serial translation means including means for inserting into the translated complete parallel data message preselected header information used by a switch network for routing the translated complete parallel data message, the parallel protocol including an N bit wide parallel format where N is a positive integer greater than one;

parallel sending means coupled to the send buffer for sending a stored complete data message in the parallel protocol to a coupled input port of the switch network, the coupled input port comprising N parallel data paths for receiving an N bit wide parallel data message;

parallel receiving means for receiving and storing in a receive buffer a complete parallel data message transmitted in the parallel protocol from an output port of the switch network coupled to the translator, the coupled output port comprising N parallel data paths for sending the parallel data message;

parallel translation means coupled to the parallel receiving means for translating the stored complete parallel data message from the parallel protocol into the serial protocol in response to the translation data, the translation means including means for serializing the data message;

serial sending means for sending a data message translated into the serial protocol to the coupled node in the serial protocol;

the parallel sending means including means for receiving from the coupled input port of the switch network a reject signal issued by a destination of the translated complete parallel data message indicating an erroneous transmission of the translated complete parallel data message; and a plurality of bufferless switching apparatus cascaded into a plurality of stages, said switching apparatus each including a plurality of switch inputs and a plurality of switch outputs, of the switch outputs included on each of said switching apparatus each coupled to a different one of the switching apparatus via a switch input of said different one of the switching apparatus, switch outputs of last stage switching apparatus each comprising a network output port and switch inputs of first stage switching apparatus each comprising a network input port;

the network output ports each coupled to a network input port through one of a plurality of nodes, each of said nodes comprising means for receiving a data message from a coupled network output port and means for sending a data message to a coupled network input port, said data message to a coupled network input port including a path connection request; and said switching apparatus each further comprising connection means for establishing a point-to-point communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active point-to-point communication paths between a plurality of network input ports and a plurality of network output ports in response to a plurality of connection requests received separately or simultaneously at said plurality of network input ports, said simultaneously active communication paths for transmitting concurrently a plurality of data messages received separately or simultaneously at said plurality of network input ports to said plurality of network output ports.

\* \* \* \* \*